(12) United States Patent
Yoshida et al.

(10) Patent No.: US 8,417,808 B2
(45) Date of Patent: Apr. 9, 2013

(54) DEVICE LINKAGE CONTROL APPARATUS

(75) Inventors: Atsushi Yoshida, Kadoma (JP); Shouichi Araki, Osaka (JP); Hiroshi Kutsumi, Moriguchi (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 10/521,577

(22) PCT Filed: Jun. 26, 2003

(86) PCT No.: PCT/JP03/08071
§ 371 (c)(1),
(2), (4) Date: Jan. 18, 2005

(87) PCT Pub. No.: WO2004/010232
PCT Pub. Date: Jan. 29, 2004

(65) Prior Publication Data
US 2005/0257006 A1    Nov. 17, 2005

(30) Foreign Application Priority Data

Jul. 19, 2002  (JP) .................................. 2002-210745
Feb. 27, 2003  (JP) .................................. 2003-50848

(51) Int. Cl.
*G06F 15/173*    (2006.01)
*G06F 11/00*     (2006.01)

(52) U.S. Cl.
USPC .......................................... 709/224; 370/218

(58) Field of Classification Search .................. 709/224; 370/218
See application file for complete search history.

(56) References Cited

U.S. PATENT DOCUMENTS

| 5,870,559 | A  | * | 2/1999  | Leshem et al. ................. 709/224 |
| 6,400,996 | B1 | * | 6/2002  | Hoffberg et al. ................. 700/83 |
| 6,713,975 | B2 |   | 3/2004  | Yamauchi et al. |
| 6,751,508 | B2 |   | 6/2004  | Sasaki et al. |
| 7,151,966 | B1 | * | 12/2006 | Baier et al. ....................... 700/19 |
| 2003/0028531 | A1 | * | 2/2003 | Han et al. ........................... 707/6 |

FOREIGN PATENT DOCUMENTS

| JP | 2-254247   | 10/1990 |
| JP | 4-206498   | 7/1992  |
| JP | 5-250007   | 9/1993  |
| JP | 06-178356  | 6/1994  |

(Continued)

OTHER PUBLICATIONS

U.S. Appl. No. 10/527,697, which is the U.S. National Stage of PCT/JP03/014297, filed Nov. 11, 2003, Shouichi Araki et al.

*Primary Examiner* — Asghar Bilgrami
(74) *Attorney, Agent, or Firm* — Wenderoth, Lind & Ponack, L.L.P.

(57) ABSTRACT

A device linkage control system is provided that includes a life data recording apparatus for accumulating usage information on the use of devices by a user, as life data, and a life pattern extraction apparatus including an episode creation unit that takes, as element data, details related to an identified episode from among life data and creates episode data which is a combination of the element data. Moreover, the system includes an episode analysis unit that analyzes relationships between the element data included in the episode data, and a life pattern interpretation unit that identifies, from the relationships between the element data, the life pattern which is characteristic of the user, and records this pattern, as life pattern information, and a control apparatus for linkage controlling of the devices by using the life pattern information of the user stored in the life pattern storage unit.

29 Claims, 100 Drawing Sheets

FOREIGN PATENT DOCUMENTS

| | | |
|---|---|---|
| JP | 08-007188 | 1/1996 |
| JP | 10-198734 | 7/1998 |
| JP | 11-177919 | 7/1999 |
| JP | 2001-086572 | 3/2001 |
| JP | 2001-242948 | 9/2001 |
| JP | 2002-082702 | 3/2002 |
| JP | 2002-141176 | 5/2002 |
| JP | 2002-281574 | 9/2002 |
| JP | 2003-256951 | 9/2003 |
| JP | 2004-185607 | 7/2004 |

* cited by examiner

FIG. 6A

| Episode creation rules |
|---|
| 1. Add name of device that has had timer function used, into episode data.
2. Usage time of timer is between 6:00 to 9:00.
3. Create episode data separated on a per date basis. |

FIG. 6B

| Episode creation rules |
|---|
| 1. Add name of device that has had power turned-ON into episode data.
2. Device is used in the living room.
3. Create episode data separated on a per date basis. |

FIG. 6C

| Episode creation rules |
|---|
| 1. Title of content played on the DVD player.
2. Content viewed by the family(plurality of persons)
3. Create episode data separated on a per date basis. |

FIG. 7

Life data

| Date and time of operation | Device type | Details of operation | ... | |
|---|---|---|---|---|
| 2002/08/30 06:10 | Light | Timer ON | | — Data 701 |
| 2002/08/30 06:11 | Air conditioner | Timer ON | | — Data 702 |
| 2002/08/30 06:15 | Rice cooker | Timer ON | | — Data 703 |
| 2002/08/30 07:00 | Cooking range | Power ON | | — Data 704 |
| 2002/08/30 07:01 | Television | Power ON | | — Data 705 |
| 2002/08/30 08:30 | Air conditioner | Power OFF | | — Data 706 |
| 2002/08/30 08:31 | Light | Power OFF | | — Data 707 |
| ... | ... | ... | | |
| 2002/08/31 06:45 | Alarm clock | Timer ON | | — Data 708 |
| 2002/08/31 06:45 | Air conditioner | Timer ON | | — Data 709 |
| 2002/08/31 07:00 | Rice cooker | Timer ON | | — Data 710 |
| 2002/08/31 07:05 | Television | Timer ON | | — Data 711 |
| 2002/08/31 08:00 | Television | Power OFF | | — Data 712 |
| ... | ... | ... | | |

FIG. 8

Episode data

| Episode name {element data 1, element data 2,..., element data n} |
|---|
| 8/30    {Light, air conditioner, rice cooker} |
| 8/31    {Alarm clock, air conditioner, rice cooker, television} |
| 9/1     {Light, alarm clock, air conditioner, rice cooker, radio} |
| 9/2     {Light, air conditioner, rice cooker, radio} |
| 9/3     {Alarm clock, air conditioner, rice cooker, television} |
| 9/4     {Alarm clock, air conditioner, rice cooker, radio} |

FIG. 12

| Element name | Light | Air conditioner | Rice cooker | Alarm clock | Television | Radio |
|---|---|---|---|---|---|---|
| Frequency | 0.5 | 1.0 | 1.0 | 0.5 | 0.33 | 0.33 |

FIG. 13

Episode data

8/ 30 {Light, air conditioner, rice cooker}
8/ 31 {Alarm clock, air conditioner, rice cooker, television}
9/ 1 {Light, alarm clock, air conditioner, rice cooker, radio}
9/ 2 {Light, air conditioner, rice cooker, radio}
9/ 3 {Alarm clock, air conditioner, rice cooker, television}
9/ 4 {Alarm clock, air conditioner, rice cooker, radio}

Episode data

8/ 30 {Air conditioner, rice cooker, light}
8/ 31 {Air conditioner, rice cooker, alarm clock, television}
9/ 1 {Air conditioner, rice cooker, alarm clock, light, radio}
9/ 2 {Air conditioner, rice cooker, light, radio}
9/ 3 {Air conditioner, rice cooker, alarm clock, television}
9/ 4 {Air conditioner, rice cooker, alarm clock, radio}

FIG. 18

Life pattern information

Devices used together with the alarm clock in the morning (6:00 to 9:00)

{Air conditioner, rice cooker}

FIG. 22

Episode data

8/ 30  {Rice cooker, light}
8/ 31  {Rice cooker, alarm clock, television}
9/ 1   {Rice cooker, alarm clock, light, radio}
9/ 2   {Rice cooker, light, radio}
9/ 3   {Rice cooker, alarm clock, television}
9/ 4   {Rice cooker, alarm clock, radio}

FIG. 24A

Episode data

8/ 30 {}
9/ 2   {Radio}

FIG. 24B

Episode data

8/ 31  {Television}
9/ 1   {Light, radio}
9/ 3   {Television}
9/ 4   {Radio}

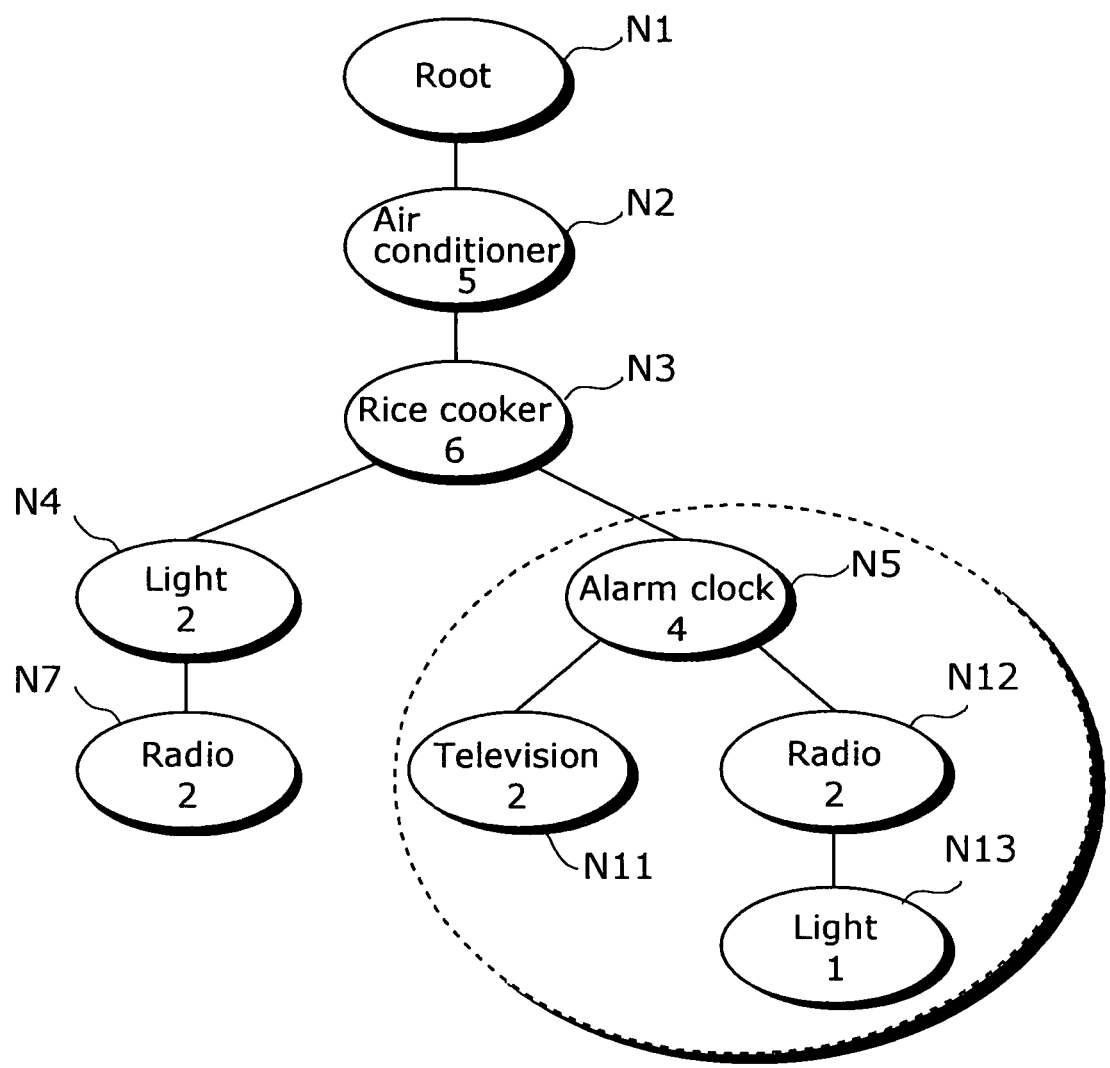

Subtree optimization FP-Tree

FP-Tree

Subtree optimization
FP-Tree

FP-Tree

FIG. 42

Element data creation rules

The group of the following details regarding device use by a user is assumed as element data:
· Device name
· Usage start time
· Usage end time

FIG. 43

Life data

| Date and time of operation | Device type | Details of operation | ... | |
|---|---|---|---|---|
| 2002/08/30 06:11 | Television | Power ON | | ← Data 4101 |
| 2002/08/30 06:15 | Air conditioner | Power ON | | ← Data 4102 |
| 2002/08/30 07:00 | Cooking range | Power ON | | ← Data 4103 |
| 2002/08/30 07:03 | Cooking range | Power OFF | | ← Data 4104 |
| 2002/08/30 08:30 | Air conditioner | Power OFF | | ← Data 4105 |
| 2002/08/30 08:31 | Television | Power OFF | | ← Data 4106 |
| 2002/08/30 08:45 | Light | Power OFF | | |
| ... | ... | ... | ... | |
| 2002/08/31 06:45 | Television | Channel 2 | | |
| 2002/08/31 06:45 | PC | Power ON | | |
| 2002/08/31 07:00 | Television | Volume UP | | |
| 2002/08/31 07:05 | Television | Channel 8 | | |
| 2002/08/31 08:00 | Television | Power OFF | | |
| ... | ... | ... | | |

FIG. 44

Element data

| Element ID | Device name | Start time | End time |
|---|---|---|---|
| 1 | Television | 6:11 | 8:31 |
| 2 | Air conditioner | 6:15 | 8:30 |
| 3 | Cooking range | 7:00 | 7:03 |
|  | Light |  | 6:45 |
| ⋮ | ⋮ | ⋮ | ⋮ |
|  | PC | 6:45 |  |
|  |  |  |  |
|  |  |  |  |

FIG. 46

| Episode data regarding use of television | Episode data regarding use of air conditioner |
|---|---|
| {television, air conditioner, cooking range} | {air conditioner, cooking range} <br> . <br> . <br> . |

FIG. 47

Element data creation rules

The group of the following details
regarding content or device use by a
user is assumed as element data:
· Content or device name
· Usage start time
· Usage end time

FIG. 51

Event creation rules

■Details of Event

Turning-ON the power of a random device

■Duration of event 5 minutes, starting from turning-ON of power

FIG. 52

Event data

| Element ID | Device name | Event details | Event duration |
|---|---|---|---|
| 1 | Television | Power ON | 6:11−6:16 |
| 2 | Air conditioner | Power ON | 6:15−6:20 |
| 3 | Cooking range | Power ON | 7:00−7:05 |
|  | Light |  |  |
| ⋮ | ⋮ | ⋮ | ⋮ |
|  | PC | Power ON | 6:45−6:50 |
|  |  |  |  |
|  |  |  |  |

FIG. 54

Episode data

Television turning-ON  {Air conditioner}

FIG. 55
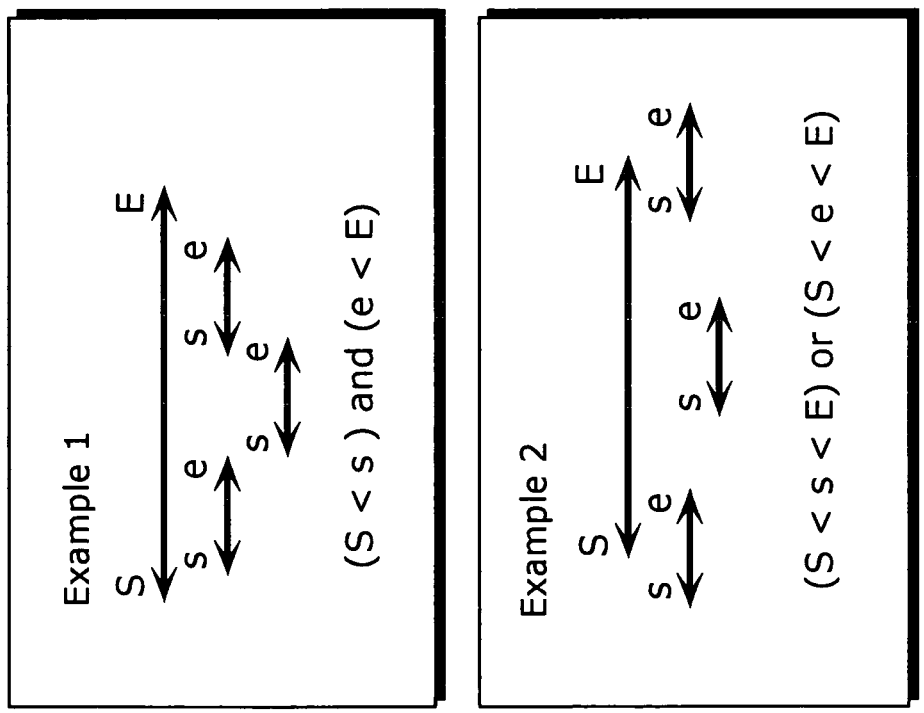
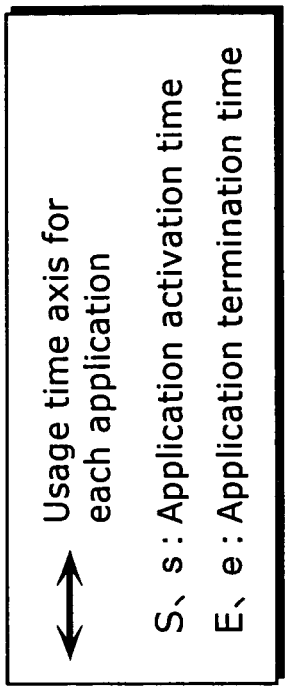

Life pattern information

FIG. 60A

Devices with confidence level equal to or greater than 0.30, with respect to the air conditioner {Rice cooker, light}

{Rice cooker, alarm clock, television}

{Rice cooker, alarm clock, radio}

FIG. 60B

Devices with confidence level equal to or greater than 0.30, with respect to the PC {PDA, calculator}

{PDA, printer, scanner}

FIG. 67

Timer linkage information

| Timer ID \ Linked timer ID | 001 Air conditioner | 002 Alarm clock | 003 Rice cooker | 004 Television | 005 |
|---|---|---|---|---|---|
| 001 Air conditioner | 0 | 30min | 60min | | |
| 002 Alarm clock | -30min | 0 | 30min | | |
| 003 Rice cooker | -60min | -30min | 0 | | |
| 004 Television | | | | 0 | |
| 005 | | | | | |

Key timer ID

FIG. 68A

Timer management information

| Timer ID | Date | Time | Name | Details of operation |
|---|---|---|---|---|
| 001 | 02/01/15 | 06:30:00 | Air conditioner | Power ON |
| 002 | 02/01/15 | 07:00:00 | Alarm clock | Alarm start-up |
| 003 | 02/01/15 | 07:30:00 | Rice cooker | End cooking |
| 004 | 02/01/15 | 07:30:00 | Television | Power ON |
| 005 | | | | |
| | | | | |

FIG. 68B

Timer management information

| Timer ID | Date | Time | Name | Details of operation |
|---|---|---|---|---|
| 001 | 02/01/15 | 06:30:00 | Air conditioner | Power ON |
| 002 | 02/01/15 | 06:00:00 | Alarm clock | Alarm start-up |
| 003 | 02/01/15 | 07:30:00 | Rice cooker | End cooking |
| 004 | 02/01/15 | 07:30:00 | Television | Power ON |
| 005 | | | | |
| | | | | |

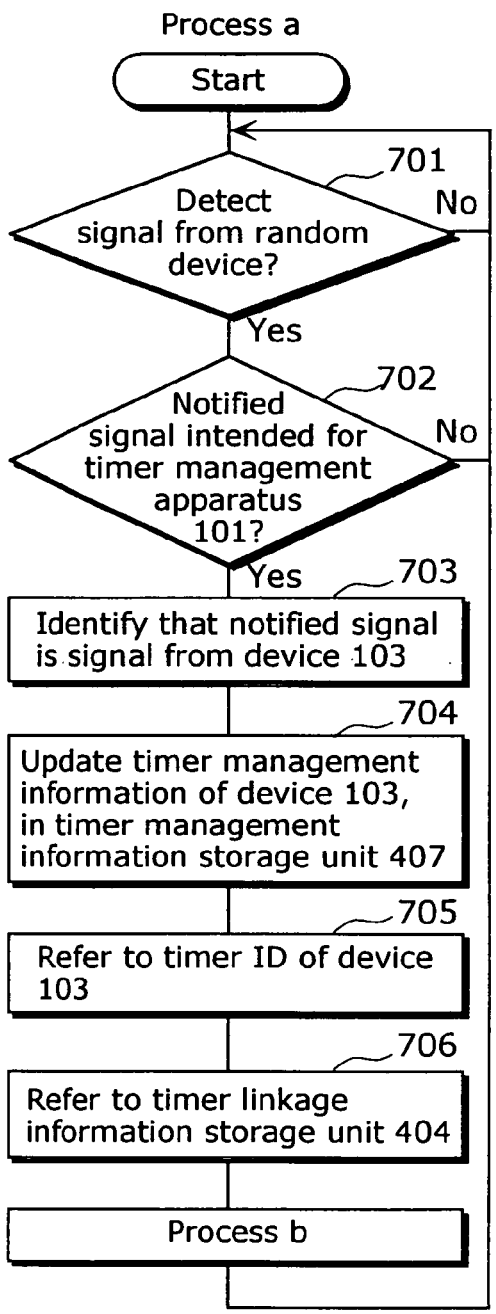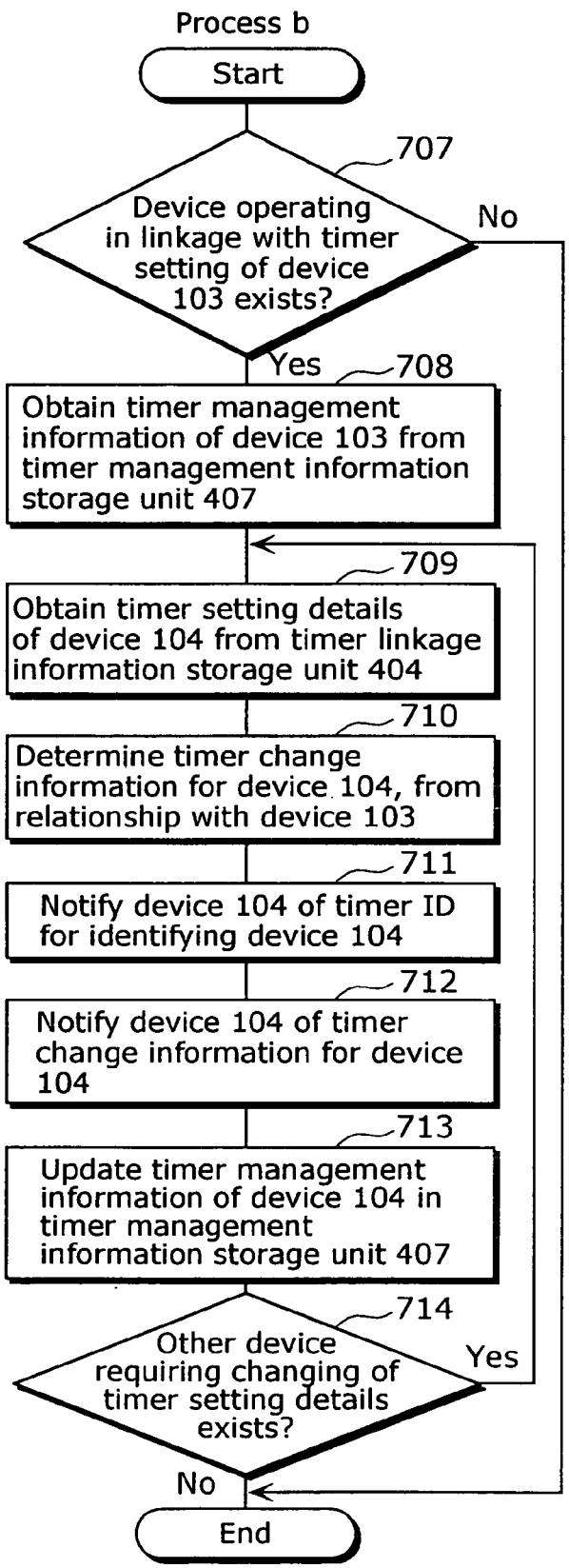
FIG. 70A — Process a
FIG. 70B — Process b

FIG. 71

Timer management information

| Timer ID | Date | Time | Name | Details of operation |
|---|---|---|---|---|
| 001 | 02/01/15 | 05:30:00 | Air conditioner | Power ON |
| 002 | 02/01/15 | 06:00:00 | Alarm clock | Alarm start-up |
| 003 | 02/01/15 | 06:30:00 | Rice cooker | End cooking |
| 004 | 02/01/15 | 07:30:00 | Television | Power ON |
| 005 | | | | |
| | | | | |

Process a

Process b

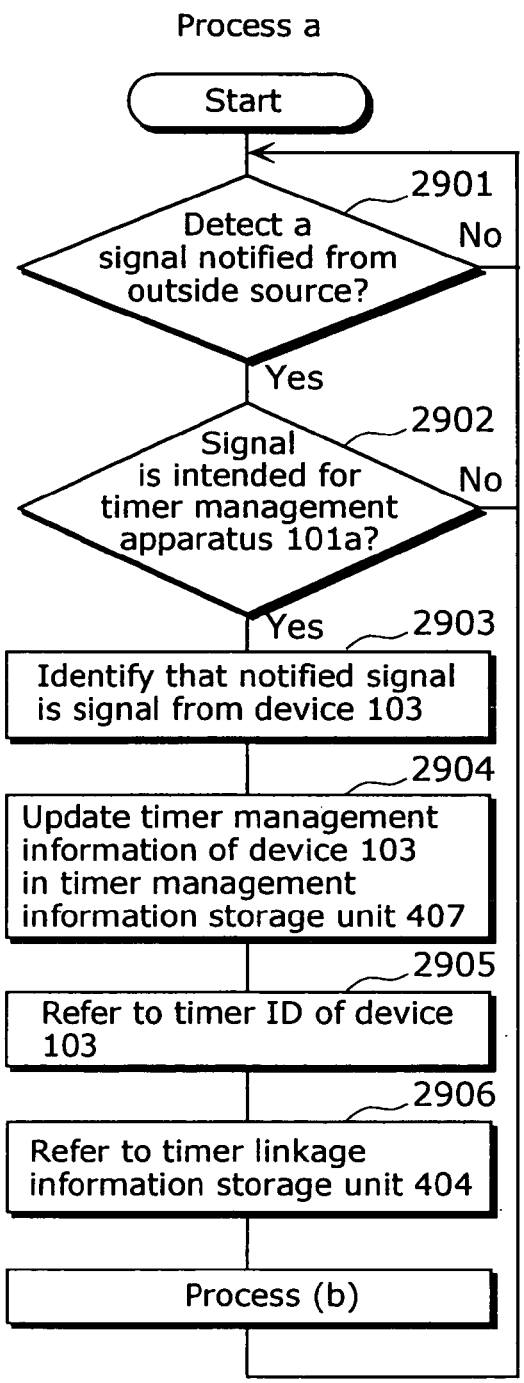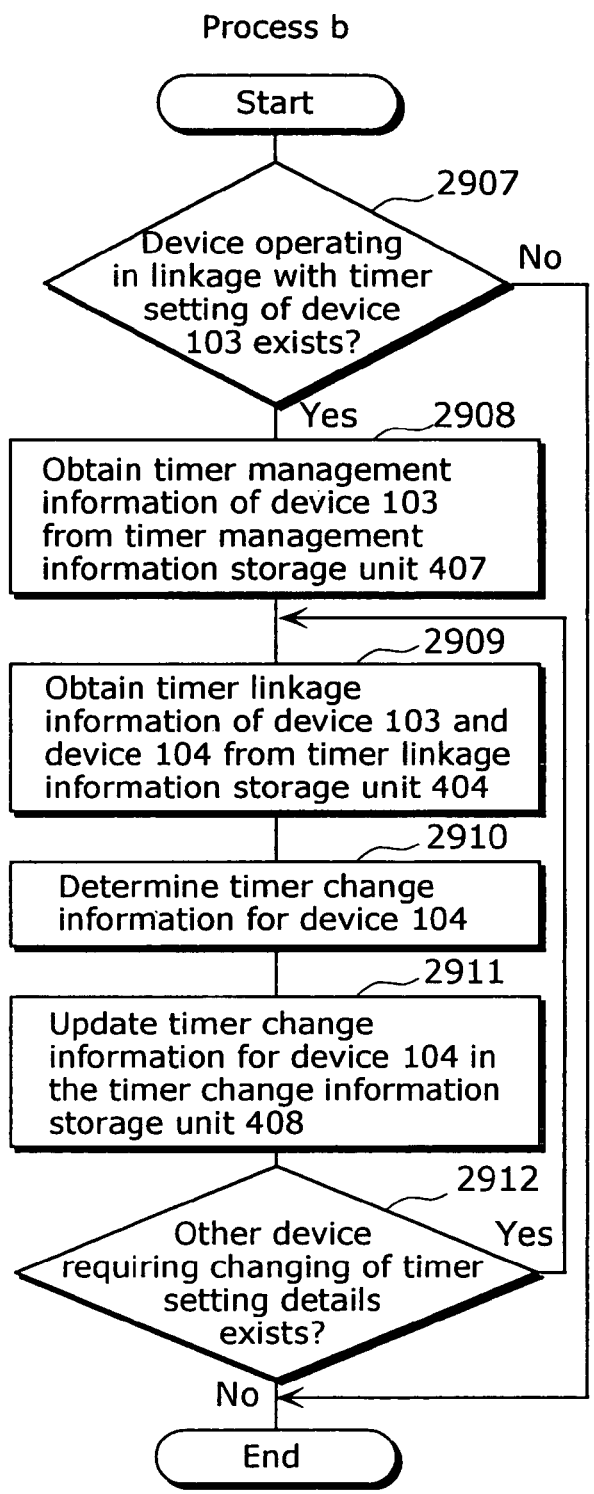
FIG. 78A Process a
FIG. 78B Process b

FIG. 80

Timer changing information

| Change ID | Change date | Change time | Change device name | Details of change | Setting time |
|---|---|---|---|---|---|
| 001 | Immediate execution | Immediate execution | Air conditioner | Setting of power ON time | 05:30:00 |
| 002 | Immediate execution | Immediate execution | Rice cooker | Setting of end cooking time | 06:30:00 |
| 003 | | | | | |
| 004 | | | | | |

FIG. 83

Condition selection information

| Timer linkage information ID | Distinguishing information (Time) | Distinguishing information (Day of the week) |
|---|---|---|
| ID:001 | 5:00−5:59 | |
| ID:002 | 6:00−6:59 | |
| ID:003 | 7:00−7:59 | |
| ID:004 | 8:00−8:59 | |
| ID:005 | 9:00−9:59 | |
| | | |

FIG. 86

Timer management information

| Timer ID | Date | Time | Name | Details of operation | Status |
|---|---|---|---|---|---|
| 001 | 02/01/15 | 05:30:00 | Air conditioner | Power ON | Valid |
| 002 | 02/01/15 | 06:00:00 | Alarm clock | Alarm start-up | Valid |
| 003 | 02/01/15 | 06:30:00 | Rice cooker | End cooking | Valid |
| 004 | 02/01/15 | 07:30:00 | Television | Power ON | Cancelled |
| 005 | | | | | |

Process a

Process b

FIG. 92

Interface information

| Timer ID | Device name | Interface |
|---|---|---|
| 001 | Air conditioner | Display |
| 002 | Alarm clock | Speaker |
| 003 | Rice cooker | LED |
| 004 | Television | Display, speaker |
| | | |

DEVICE LINKAGE CONTROL APPARATUS

BACKGROUND OF THE INVENTION

1. Field of the Invention

The present invention relates to an apparatus for controlling a plurality of devices such as home appliances by linkage, and particularly to an apparatus for controlling the plurality of devices to suit a life of a user.

2. Description of the Related Art

In the case where a user uses a plurality of devices, all setting details of each function provided in the plurality of devices have to be set, requiring complicated operations.

So far, various control systems have been proposed in view of the problems involved in a plurality of settings such as this.

For example, an AV device system has been proposed (official publication of Japanese Laid-Open Patent Application No. 11-177919 and so on) where, in a plurality of AV devices connected via a communication bus, an AV device in which timer presetting and execution are carried out notifies the timer presetting details to the AV devices operating in linkage with it, and the timer presetting of the AV devices operating in linkage is carried out. When a user presets the timer of a certain AV device, the AV device system automatically transmits the same presetting details to other AV devices operating in linkage with the AV device.

Furthermore, network home appliances that execute a script describing the operation of the home appliances, in conjunction with an event generated in response to a change in the state of another home appliance, has also been proposed (official publication of Japanese Laid-Open Patent Application No. 10-198734 and so on). According to these network home appliances, related processes are automatically executed in conjunction with another device.

In addition, a home appliance control network system has also been proposed (official publication of Japanese Laid-Open Patent Application No. 2001-86572 and so on) in which the network is provided with a controller, and the operating status of each home appliance that is subject to linked operation and controlled by the network controller is obtained and transmitted to each of the other home appliances. This home appliance control network carries out the linked operation of each home appliance and the efficient linked operation of the network as a whole.

However, although it is possible to carry out the same setting repeatedly for other devices by transmitting the presetting details to the plurality of devices in the aforementioned existing AV device system, setting different details in a plurality of devices having different functions cannot be carried out automatically.

Furthermore, the existing AV device system, network home appliance and home appliance control network system mentioned above stop at carrying out linked operations that have been set to correspond to various events. For example, according to the aforementioned existing network home appliances, when laundry is finished, a message stating that the laundry is finished is displayed on the television. However, this linked operation is fixed. In other words, it presumes that the resident has a habit of watching television, and such linked operation would no longer be of use in the case where that habit should be discontinued.

SUMMARY OF THE INVENTION

As such, the present invention is conceived in view of this problem and has as an objective to provide a device linkage control apparatus that can automatically select linked devices, and automatically set different details to suit the life pattern of a user.

In order to achieve the aforementioned objective, the device linkage control apparatus according to the first invention is a device linkage control apparatus which identifies a frequency of associated use between devices among a plurality of devices, and controls, in linkage with each other, a set of devices having a high frequency for being used in association with each other, the apparatus including: a life data accumulation unit operable to accumulate life data indicating a usage history of the plurality of devices; an episode creation unit operable to create, from the life data, a plurality of episode data, based on episode data creation rules which determine devices that have been used in association with each other, said plurality of episode data having, as data, a plurality of the devices that have been used in association with each other; an episode analysis unit operable to create, from the plurality of episode data, a frequent pattern tree representing, as a tree structure, a frequency at which the respective device sets are used in association with each other; a life pattern interpretation unit operable to identify, according to the frequent pattern tree, a combination of device sets as life pattern information, said device sets having a high frequency for being used in association with each other; and a control unit operable to control, in linkage with each other, said device sets having a high frequency for being used in association with each other, wherein, with regard to subtrees having respective nodes of the frequent pattern tree as roots, the episode analysis unit constructs the frequent pattern tree with a structure in which element data having a highest frequency becomes a root of a subtree, the life pattern interpretation unit identifies, based on the frequent pattern tree, a device A and a device B, which have a high frequency for being used in association with each other, as a combination having a high association frequency, even when each of said device A and said device B are combined and used in association with various other devices, and the control unit controls, in linkage with each other, at least said device A and said device B.

Here, as one embodiment of the present invention, the device linkage control apparatus according to the first invention is a device linkage control apparatus that controls a plurality of devices in linkage with each other, comprised of: a life data accumulation unit operable to generate life data by detecting usage of the devices in a user's daily life, and accumulate the generated life data, the life data indicating said usage, a life pattern information generation unit operable to i) identify two or more devices from among the plurality of devices based on the accumulated life data, and ii) generate life pattern information indicating the identified two or more devices, said two or more devices being used together or in conjunction with each other in the user's daily life, and a control unit operable to control the two or more devices indicated in the generated life pattern information, in linkage with each other.

Here, the life pattern information generation unit includes: an episode creation unit operable to create, based on the life data, a plurality of episode data, each of which is a collection of two or more of element data that respectively correspond to the plurality of devices, an episode analysis unit operable to structuralize a co-occurrence relationship between two or more element data respectively included in the episode data, and a life pattern interpretation unit operable to generate the life pattern information based on the structuralized co-occurrence relationship. The episode analysis unit structuralizes the co-occurrence relationship by representing, as a frequent pattern tree, an appearance frequency and a combination pattern of the element data included in the plurality of episode data created by the episode creation unit, the frequent pattern tree associating, in each node, a type of the element data and a frequency which indicates said appearance frequency.

According to the aforementioned first invention, it is possible to perform the linkage control of the plurality of devices to suit the life pattern and situation of the user by automatically recording the information on the device usage history and the content viewing history of a user as life data, then extracting life pattern information which is characteristic of the user from the life data according to predetermined rules, and using this life pattern information.

Furthermore, in the device linkage control apparatus according to the second invention, with regard to all nodes that are roots of subtrees, the episode analysis unit constructs the frequent pattern tree with a structure in which element data having the highest frequency becomes a root of a subtree.

According to the aforementioned second invention, it is possible to reduce, in the FP-Tree, separation of nodes of the same type into a plurality of nodes, and improve frequency pattern detection efficiency by constructing the structure of the FP-Tree created in the extraction of a life pattern in such a way that, with regard to every subtree within the FP-Tree, the element data with the highest frequency within the subtree necessarily becomes the root.

Furthermore, in the device linkage control apparatus according to the third invention, the episode analysis unit includes: an input episode data storage unit operable to store, as input episode data, the plurality of episode data created by the episode creation unit, an input episode number determination unit operable to obtain a number of the input episode data stored in the input episode data storage unit, a most-frequent element identification unit operable to identify the element data with the highest frequency from within each input episode data, a most-frequent element extraction unit operable to extract the element data with the highest frequency from within each input episode data, and add the extracted element data to output episode data, an output episode data storage unit operable to store the output episode data, an input episode classification unit operable to classify the input episode data according to the type of the element data, and a frequent pattern tree generation unit operable to generate the frequent pattern tree that associates, in respective nodes, the appearance frequency and combination pattern of the element data with the type of the element data and the frequency which indicates said appearance frequency, the element data being included in the output episode data stored in the output episode data storage unit.

According to the aforementioned third invention, it is possible to reduce the number of times processing is required in the construction of the FP-Tree by using an order for incorporating input data into the FP-Tree, which has been rearranged according to a predetermined calculation procedure.

Furthermore, in the device linkage control apparatus according to the fourth invention, the episode creation unit creates element data respectively indicating a device and the usage time of the device based on the life data, and creates, in the case where the usage times of the respective element data have a fixed inclusive relationship or an overlapping relationship, episode data that includes said respective element data.

According to the fourth invention, it is possible to extract a co-occurrence pattern for device and content usage which is characteristic of the user by taking the combination of devices and contents used simultaneously by the user, as episode data.

Furthermore, in the device linkage control apparatus according to the fifth invention, the episode creation unit creates, based on the life data, event data respectively indicating a device, an event occurring with the device, and an occurrence time of the event, and creates, in the case where the occurrence times of the respective event data have a fixed inclusive relationship or an overlapping relationship, episode data including element data corresponding to the devices indicated by said respective event data.

According to the fifth invention, it is possible to extract a co-occurrence pattern for device and contents usage which is dependent on an event which is characteristic of the user by taking the combination of devices and contents used by the user during a predetermined event.

Furthermore, in the device linkage control apparatus according to the sixth invention, the life pattern interpretation unit calculates, for each of the nodes that are in the parent-offspring relationship in the frequent pattern tree, a confidence level indicating a degree of the co-occurrence relationship, and generates the life pattern information with only the nodes that are connected with a confidence level that is equal to or higher than a fixed value.

According to the aforementioned sixth invention, it is also possible to extract the co-occurrence pattern included in an episode having a small number of appearances by obtaining a confidence level between nodes, with regard to the number of element data recorded in each node within the FP-Tree, and limiting the frequency pattern detection area to nodes having a confidence level that is equal to or greater than a threshold value.

Furthermore, in the device linkage control apparatus according to the seventh invention, a first and a second device respectively include a timer, and in the case where it is detected that setting details of the timer included in the first device is changed, the control unit changes setting details of the timer included in the second device.

According to the aforementioned seventh invention, when the user changes the timer setting details (preset time) of a random device, the timer linkage setting system identifies, using timer linkage information which is based on a predetermined user action pattern, the devices operating in linkage with the device that has had timer setting details changed, and automatically changes the respective timer setting details of the identified devices. Therefore, it is possible to reduce the complicated operations required of the user in the different timer settings of functions of the plurality of devices.

Furthermore, in the device linkage control apparatus according to the eighth invention, in the case where it is detected that the state of the first device indicated in the life pattern information has changed, the control unit i) previously generates and records change information indicating that the state of the second device indicated in the life pattern information should be changed, and ii) causes the state of the second device to change by controlling the second device according to the change information after a predetermined time elapses.

According to the aforementioned eighth invention, in the case where a device that cannot store a plurality of timer setting details is required to store a plurality of timer settings, it is possible to have the timer change information to be executed next, and onward, temporarily stored in the timer management apparatus, and after the timer setting details currently set in the device is executed, the next timer change information is transmitted and the timer setting details of the device is re-set. Therefore it is possible for a device that cannot store a plurality of timer setting details to perform a timer linkage with other devices at different times.

Furthermore, in the device linkage control apparatus in the ninth invention, the control unit previously stores a plurality of linkage information identifying details of the control and selection condition information indicating conditions for selecting one linkage information from among the plurality of linkage information; and in the case where it is detected that the state of the first device indicated in the life pattern information has changed, the control unit selects one of the plurality of linkage information by referring to the selection condition information, and causes the state of the second device indicated in the life pattern information to change, by controlling the second device according to the selected linkage information.

According to the aforementioned ninth invention, it is possible to automatically set a more suitable timer setting for the plurality of devices as the combination and relationships of the timer setting time of other devices operating in linkage with a device that has had timer setting details set is changed according to the date and time conditions of the timer setting details of the device, set by the user.

Furthermore, in the device linkage control apparatus in the tenth invention, the first and the second devices respectively include a timer, and in the case where it is detected that setting details of the timer included in the first device is cancelled, the control unit cancels the setting details of the timer included in the second device.

According to the aforementioned tenth embodiment, when the user cancels the timer setting of a random device, it is possible to have the timer management apparatus collectively cancel the timer settings of the other devices operating in linkage with the device that has had timer settings cancelled. Therefore, it is possible to reduce the operations required of the user in the timer cancellation of the plurality of devices.

Furthermore, in the device linkage control apparatus in the eleventh invention, the first and the second devices respectively include a timer, and in the case where it is detected that setting details of the timer included in the first device is changed, the control unit causes the second device to make a sound output or a display output by controlling the second device, said output indicating that said setting details is changed.

According to the aforementioned eleventh invention, by using an interface included in a random device, it is possible to have the user verify the changed timer settings of the device that has had timer setting details changed by the timer management apparatus.

Moreover, the present invention is not only realized as a device linkage control system such as that mentioned above, but can also be realized as a method and program thereof. In addition, the present invention can also be realized as the following: a device linkage control system that has devices to be controlled in addition to the aforementioned device linkage control apparatus; a life pattern information generating apparatus including the life data accumulation unit and the life pattern information generation unit in the aforementioned device linkage control apparatus, the method and program thereof; a device linkage control apparatus like the aforementioned device linkage control apparatus without the life data accumulation unit; and a life pattern information generating apparatus like the aforementioned life pattern information generation apparatus without the life data accumulation unit.

BRIEF DESCRIPTION OF DRAWINGS

FIGS. 6A, 6B, and 6C are diagrams showing examples of episode creation rules.

FIG. 7 is a diagram showing an example of life data.

FIG. 8 is a diagram showing an example of episode data.

FIG. 12 is a diagram showing an example of frequencies recorded in the frequency storage unit.

FIG. 13 is a diagram showing an example of the rearrangement of element data included in episode data.

FIG. 18 is a diagram showing an example of life pattern information stored in the life pattern storage unit.

FIG. 22 is a diagram showing an example of episode data created from the subtree in FIG. 21.

FIGS. 24A and 24B respectively show episode data created from the subtrees in FIGS. 23A and 23B.

FIG. 25 is a diagram showing an FP-tree integrated by the subtree combining unit.

FIG. 42 is a diagram showing an example of element data creation rules to explain the episode data extraction operation by the episode creation unit.

FIG. 43 is a diagram showing an example of life data to explain the episode data extraction operation by the episode creation unit.

FIG. 44 is a diagram showing an example of element data recorded in the element data storage unit.

FIG. 46 is a diagram showing an example of episode data created by the episode creation unit.

FIG. 47 is a diagram showing another example of element data creation rules.

FIG. 51 is a diagram showing an example of event creation rules to explain the episode data extraction operation by the episode creation unit.

FIG. 52 is a diagram showing an example of life data to explain the episode data extraction operation by the episode creation unit.

FIG. 54 is a diagram showing an example of episode data created by created by the episode creation unit.

FIG. 55 is a diagram showing another example of the temporal relationship between the duration of an episode and the use time of element data, and judgment conditions.

FIGS. 60A and 60B are diagrams showing examples of life pattern information recorded in the life pattern storage unit.

FIG. 67 is a diagram showing an example of timer linkage information stored in the timer linkage information storage unit.

FIGS. 68A and 68B are diagrams showing examples of timer management information stored in the timer management information storage unit.

FIGS. 70A and 70B are flowcharts showing the operational procedures up to the point in which the timer management apparatus detects a signal notified from the device (alarm clock) which has had timer setting details changed by a user, and timer change information is sent to the other devices.

FIG. 71 is a diagram illustrating the appearance of the changing of timer management information stored in the timer management information storage unit.

FIGS. 78A and 78B are flowcharts showing the operational procedure up to the point where the signal sent from a device (alarm clock) which has had timer setting details changed by a user is detected by the timer management apparatus, and timer change information is created.

FIG. 80 is a diagram showing an example of timer change information stored in the timer change information storage unit.

FIG. 83 is a diagram showing an example of condition selection information.

FIG. 86 is a diagram showing an example of timer management information stored in the timer management information storage unit.

FIG. 92 is a diagram showing an example of interface information stored in the interface information storage unit.

DETAILED DESCRIPTION OF THE INVENTION

The embodiments of the presentation shall be explained in detail hereinafter using the diagrams.

(First Embodiment)

Figure 1:
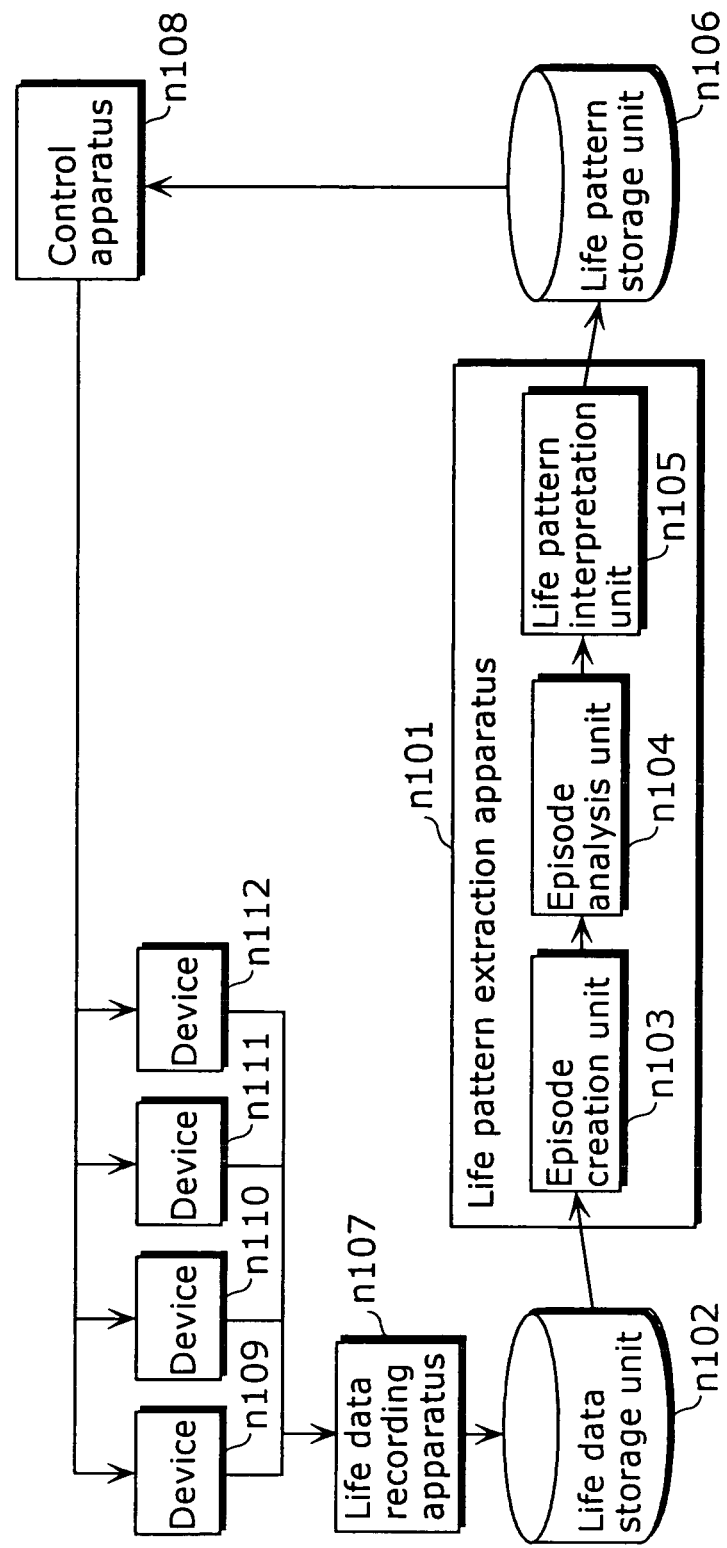
FIG. 1 is a block diagram showing the overall configuration of the device linkage control system according to the first embodiment of the present invention.

FIG. 1 is a block diagram showing the overall configuration of the device linkage control system in the first embodiment of the present invention. The device linkage control system is configured from a life pattern extraction apparatus n101, a life data storage unit n102, a life pattern storage unit n106, a life data recording apparatus n107, a control apparatus n108 and home appliances (devices) n109 to n112. Moreover, each of the modules (components) and devices are mutually connected via a wired network such as Ethernet (registered trademark) or a wireless network as represented by the 802.11b wireless network. Mutual transmission and reception of information, and controlling, is carried out via this network.

The home appliances n109 to n112 are devices such as a television, video deck, refrigerator, cooking range, or light.

The life data recording apparatus n107 is an apparatus that detects when a device is used by a user, generates life data indicating details of the use, and records the life data in the life data storage unit n102.

The life data storage unit n102 is a storage unit such as a hard disk for holding the life data.

The life pattern extraction apparatus 101 is an apparatus for extracting life pattern information which is characteristic of a user, from life data recording a device use history and a content viewing history of a user. The life pattern extraction apparatus 101 includes an episode creation unit n103, an episode analysis unit n104, and a life pattern interpretation unit 105. Here, life pattern information is information indicating two or more devices that are identified, from among the devices n109 to n112, to be used together or in linkage with each other in the daily life of the user.

The episode creation unit n103 is a processing unit for creating episode data, according to predetermined rules, from element data making up life data. Here, episode data is data from the gathering of two or more element data that have been set to correspond respectively to the home appliances n109 to 112.以降

The episode analysis unit 104 is a processing unit for analyzing the relationships among individual element data included in episode data. For this reason, the co-occurrence relation between two or more element data included in respective episode data is structured.

The life pattern interpretation unit n105 is a processing unit for extracting combinations of element data which are characteristic of the user. In other words, life pattern information is generated based on the co-occurrence relations structured by the episode analysis unit n 104.

The life pattern storage unit n106 is a storage unit such as a hard disk for storing life pattern information which is characteristic of the user, generated by the life pattern interpretation unit n105.

The control apparatus n108 is a control apparatus for linking up and controlling devices to suit the life pattern and situation of the user.

Figure 2:
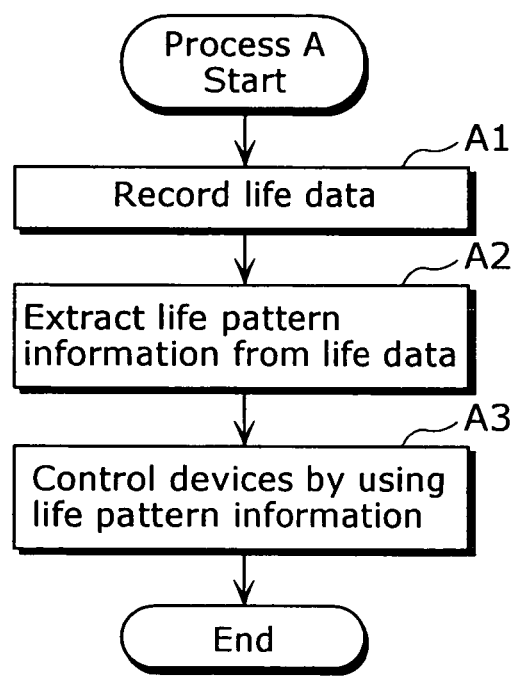
FIG. 2 is a flowchart showing the series of operations of the device linkage control system.

Next, the flowchart shown in FIG. 2 shall be used to explain the series of operations (process A) between each of the apparatuses in the system shown in FIG. 1.

When a user uses the devices n109 to n112 which are connected via a network, the life data recording apparatus n107 records information regarding the device used, as life data, in the life data storage unit n102 (step A1). This information includes the type and function, service, use time, place of use, user, and content used, and so on.

The life pattern extraction apparatus n101 extracts, according to predetermined rules, life pattern information which is characteristic of the user from the life data recorded in the life data storage unit n102, and records the information in the life pattern storage unit n106 (step A2).

Using the life pattern information of the user recorded in the life pattern storage unit n106, the control apparatus n108 carries out linked control of the plurality of devices connected via a network, to suit the life pattern and situation of the user (step A3).

Next, the method for extracting life pattern information which is characteristic of the user, from life data recorded in the history of the devices used and history of the contents viewed by the user, in the life pattern extraction apparatus in the aforementioned device linkage control system shall be explained in detail. Here, the detailed structure and operation of the life pattern extraction apparatus n101 shown in FIG. 1 shall be explained, providing as an example, the case where information on the history of the operation of the devices by the user is assumed as life data, from which co-occurrence relationships in device use characteristic of the user are extracted as life pattern information.

Figure 3:
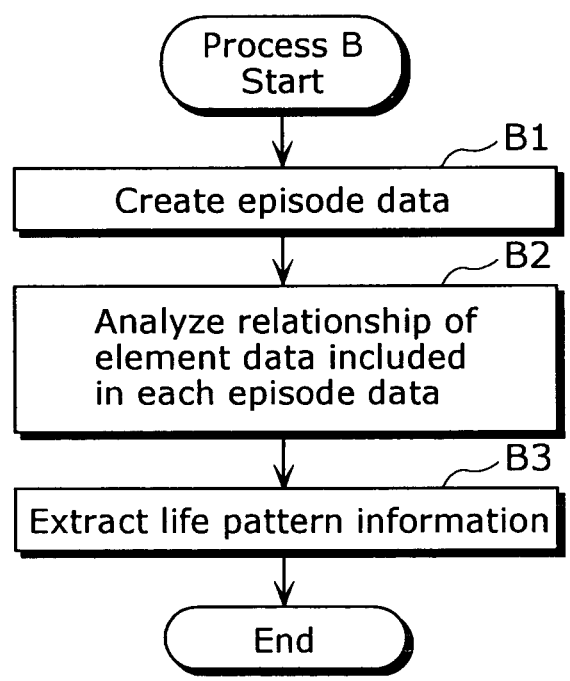
FIG. 3 is a flowchart showing the operation of the life pattern extraction apparatus.

First, the operation of each module making up the life pattern extraction apparatus n101 (process B) shall be explained using the flowchart shown in FIG. 3.

The episode creation unit 103 retrieves life data from the life data storage unit n102, and creates episode data by assuming a part of the life data as element data according to predetermined rules, and combining the element data (step B1).

The episode analysis unit n104 quantitatively analyzes the relationships among the element data included in respective episode data, and carries out an evaluation (step B2).

The life pattern interpretation unit n105 extracts parts which are characteristic of the user, as life pattern information, from the element data relationships, and records these in the life pattern information storage unit n106 (step B3).

In the system in FIG. 1, when a device is used by a user, details of the use are recorded as life data, and life pattern information which is characteristic of the user is extracted from the life data, through the aforementioned operation. Furthermore, by using the extracted life pattern information, the linked control of devices to suit the life pattern or situation of a user becomes possible.

Next, the detailed structure and operation of the episode creation unit n103 included in the life pattern extraction apparatus n101 shall be explained.

Figure 4:
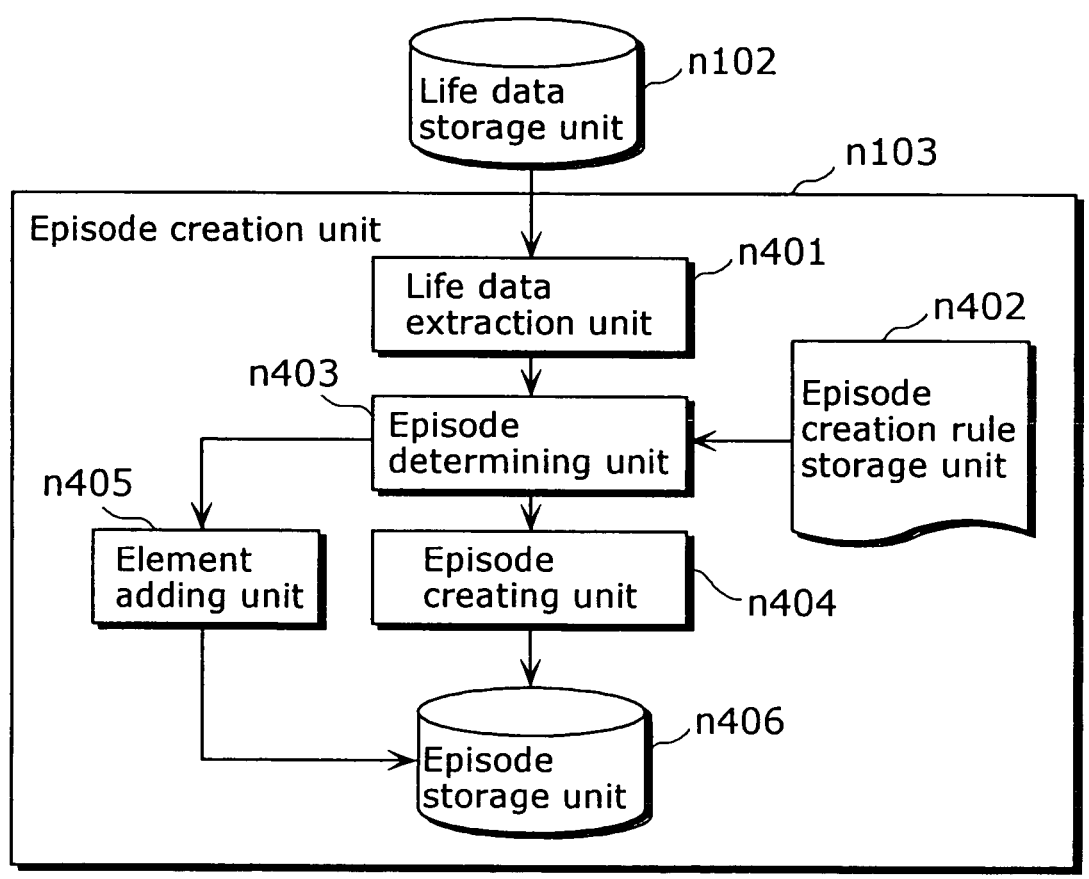
FIG. 4 is a block diagram showing the structure of the episode creation unit.

FIG. 4 is a block diagram showing the detailed structure of the episode creation unit n103. The episode creation unit n103 includes a life data extraction unit n401, an episode creation rule storage unit n402, an episode determining unit n403, an episode creating unit n404, an element adding unit n405, and an episode storage unit n406.

The life data extraction unit n401 is a processing unit for reading details of life data from the life data storage unit n102.

The episode creation rule storage unit n402 is a storage unit for recording episode creation rules describing rules on the creation of episode data.

The episode determining unit n403 is a processing unit for determining whether or not details of life data read from the life data storage unit n102 comply with conditions of the episode creation rules.

The episode creating unit n404 is a processing unit for creating new episode data.

The element adding unit n405 is a processing unit for adding new element data to existing episode data.

The episode storage unit n406 is a storage unit for storing episode data.

Figure 5:
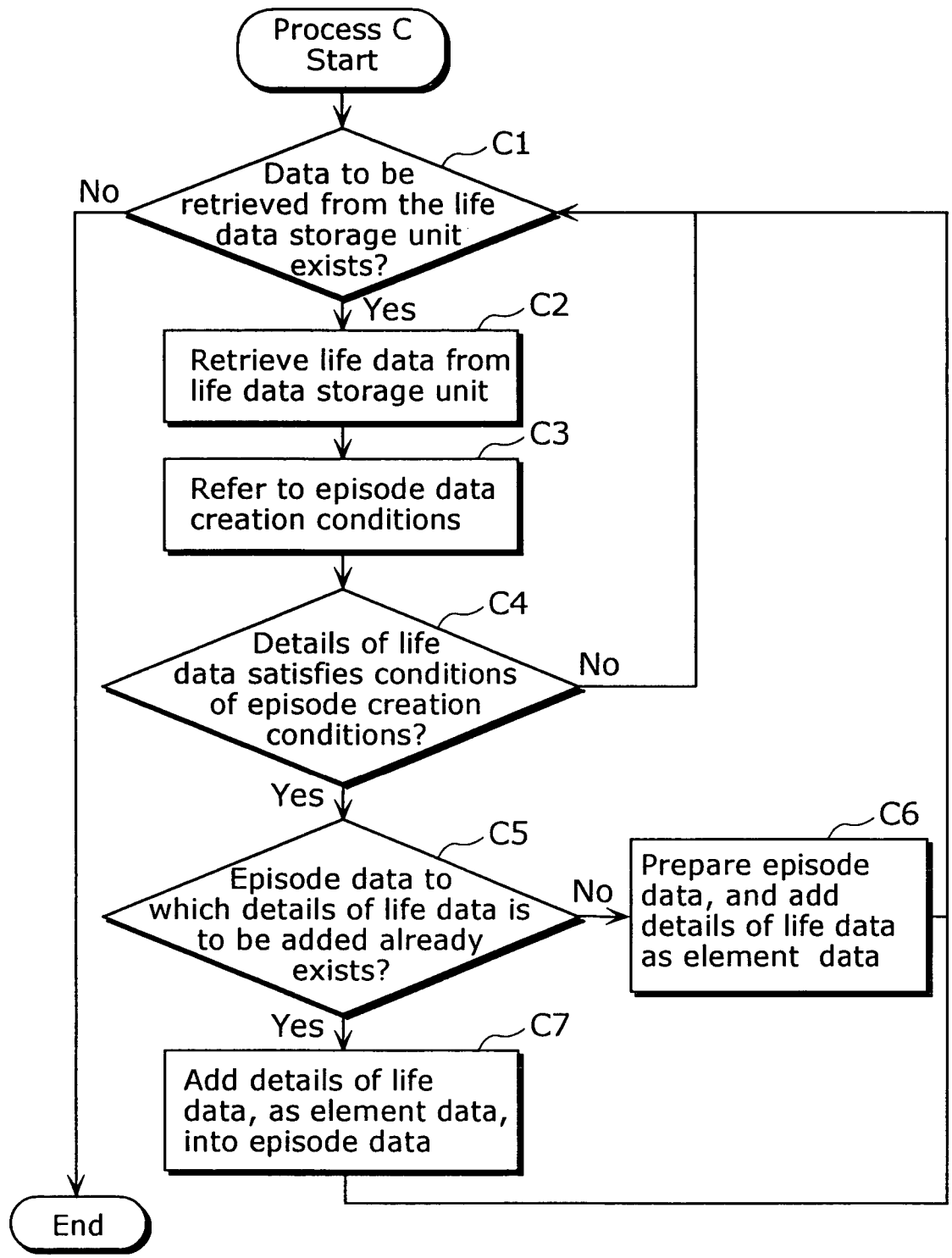
FIG. 5 is a flowchart showing the operation of the episode creation unit.

The operation (process C) in which episode data is created from the life data shown in FIG. 7, when the episode creation rules shown in FIG. 6A are provided, in the episode creation unit n103 structured in the above manner, shall be explained using the flowchart shown in FIG. 5. It should be pointed out that here, life data is the gathering of data (data 701 to 712) for each operation of the devices n109 to n112, as shown in FIG. 7. Each unit of data is composed of items such as "operation date and time" indicating the date and time the devices n109 to n112 were operated, "device type" identifying the devices n109 to n112 operated, and "operation detail" indicating the details of the operation. Furthermore, as shown in FIG. 6A, the episode creation rules is data describing conditions for the utilization of life data as episode data.

The life data extraction unit n401 checks the details stored in the life data storage unit n102 and judges whether or not life data that should be read for episode creation exists (step C1). In the present embodiment, the result of checking the details of the life data in FIG. 7 shows the existence of life data that should be read, therefore the process moves to step C2.

The life data extraction unit n401 sequentially reads life data from the life data storage unit n102 (step C2). In the present embodiment, data 701 is retrieved first from the life data in FIG. 7.

The episode determining unit n402 obtains the episode creation rules from the episode creation rule storage unit n402 (step C3). In the present embodiment, the episode creation rules in FIG. 6A are obtained.

The episode determining unit n403 determines whether or not the life data that was read complies with the episode creation rules (step C4). The process moves to step C5 in the case where the details of the life data complies with the episode creation rules, and moves to step C1 in the case of non-compliance. In the present embodiment, the process moves on to step C5 as the details of data 701 comply with the episode creation rules in FIG. 6A.

The episode determining unit n403, determines whether episode data, in which details of life data are to be added, is already prepared (step C5). In the present embodiment, episodes are created distinctly by date, in accordance with episode extraction conditions. For data 701, which is August 30 life data, episode data for August 30 is not yet prepared therefore the process moves to step C6.

The episode creating unit n404 creates new episode data, and adds a part of the life data that was read as element data, to episode data (step C6). In the present embodiment, the episode for August 30 is created according to the episode creation rules, and the device name of data 701 "light", is added. When all processes are concluded, the process moves to step C1.

Next, in the case where data 702 in FIG. 7 is read, steps C1 to C4 are also carried out and the process moves to step C5 (step C1 to C4), as in the case of data 701. With regard to data 702, the process moves to step C7 as the episode determining unit n403 determines that the August 30 episode to which data 702 is to be added, already exists (step C5).

Subsequently, the element adding unit n405 adds element data to the episode data (step C7). In the present embodiment, the device name of data 702 "air conditioner" is added to the August 30 episode data. When all processes are concluded, the process moves to step C4.

The same process is carried out for all life data shown in FIG. 7. FIG. 8 shows an example of the resulting episode data created from the life data shown in FIG. 7. Episode data, in which element data (device name) are listed, are generated on a per-date basis.

Next, the method for analyzing the relationship between each element data included in each episode data, used by the episode analysis unit 104 shall be explained.

Here, as a method for representing the relationship between units of element data, a method is used in which a frequent pattern tree (hereinafter referred to as FP-Tree) representing the frequency in which each element data is included in the same episode data, is constructed, and the structure of the FP-tree is evaluated.

Figure 9:
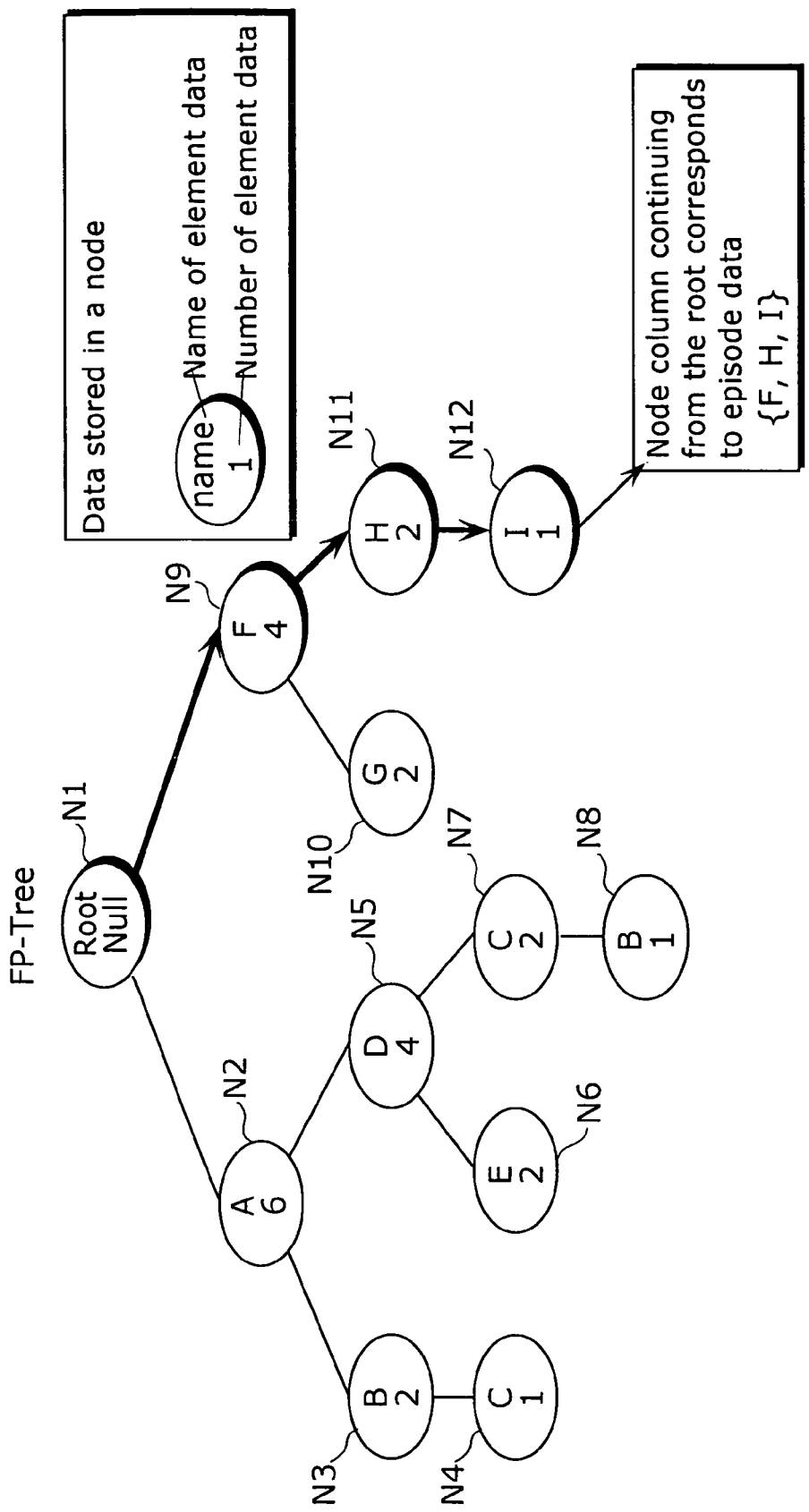
FIG. 9 is a diagram showing an example of an FP-Tree.

FIG. 9 shows an example of an FP-Tree. In an FP-Tree, a node recording the name and number of element data included in episode data is used, and the relationship of frequency patterns between units of element data are represented through the construction of the tree. The FP-tree is characterized by having element data with a higher frequency appearing in a node that is closer to the root of the tree. Furthermore, a group of element data included in each episode data is represented by the nodes passed in tracking each node from the root of the FP-Tree.

Figure 10:
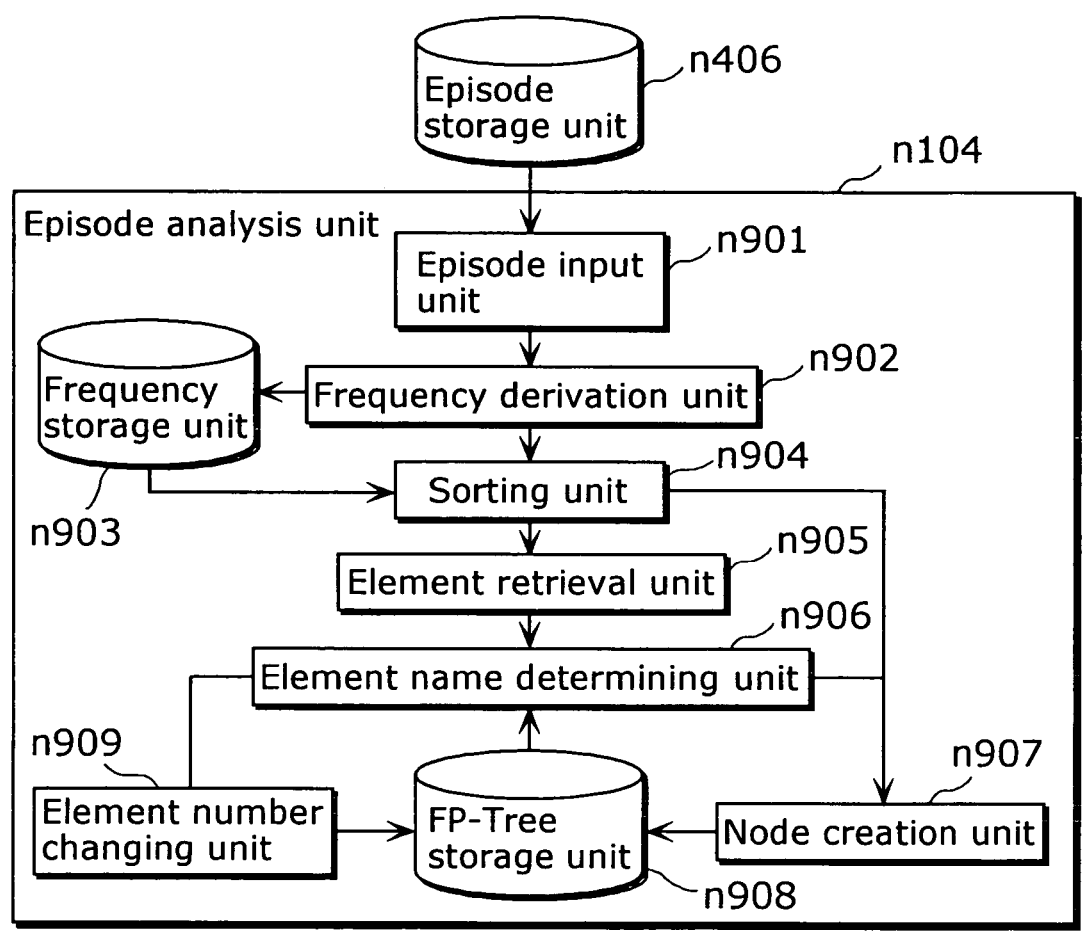
FIG. 10 is a block diagram showing the structure of the episode analysis unit.

FIG. 10 is a block diagram showing the structure of the episode analysis unit n104. The episode analysis unit n104 includes an episode input unit n901, a frequency derivation unit n902, a frequency storing unit n903, a sorting unit n904, an element retrieval unit n905, an element name determining unit n906, a node creation unit n907, an FP-Tree storage unit n908, and an element number changing unit n909.

The episode input unit n901 is an input unit for reading episode data from the episode storage unit n406.

The frequency derivation unit 902 is a processing unit for obtaining a frequency indicating the ratio in which an element data is included in each episode data. Here, the value for frequency is obtained through the mathematical formula below.

$$\text{Frequency of element } A = \frac{\text{Number of episodes including element } A}{\text{Total number of episodes}}$$

The frequency storage unit n903 is a storage unit such as a hard disk, for recording the frequency of each element data included in episode data.

The sorting unit n904 is a processing unit for rearranging element data recorded in episode data, in a decreasing order of frequency.

The element retrieval unit n905 is a processing unit for sequentially retrieving element data from episode data.

The element name determining unit n906 is a processing unit for determining the name of element data recorded in each node.

The node creation unit n907 is a processing unit for creating new nodes on an FP-Tree.

The FP-Tree storage unit n908 is a storage unit such as a memory for holding details of an FP-Tree.

The element number changing unit n909 is a processing unit for changing the number of element data recorded in a node.

Figure 11:
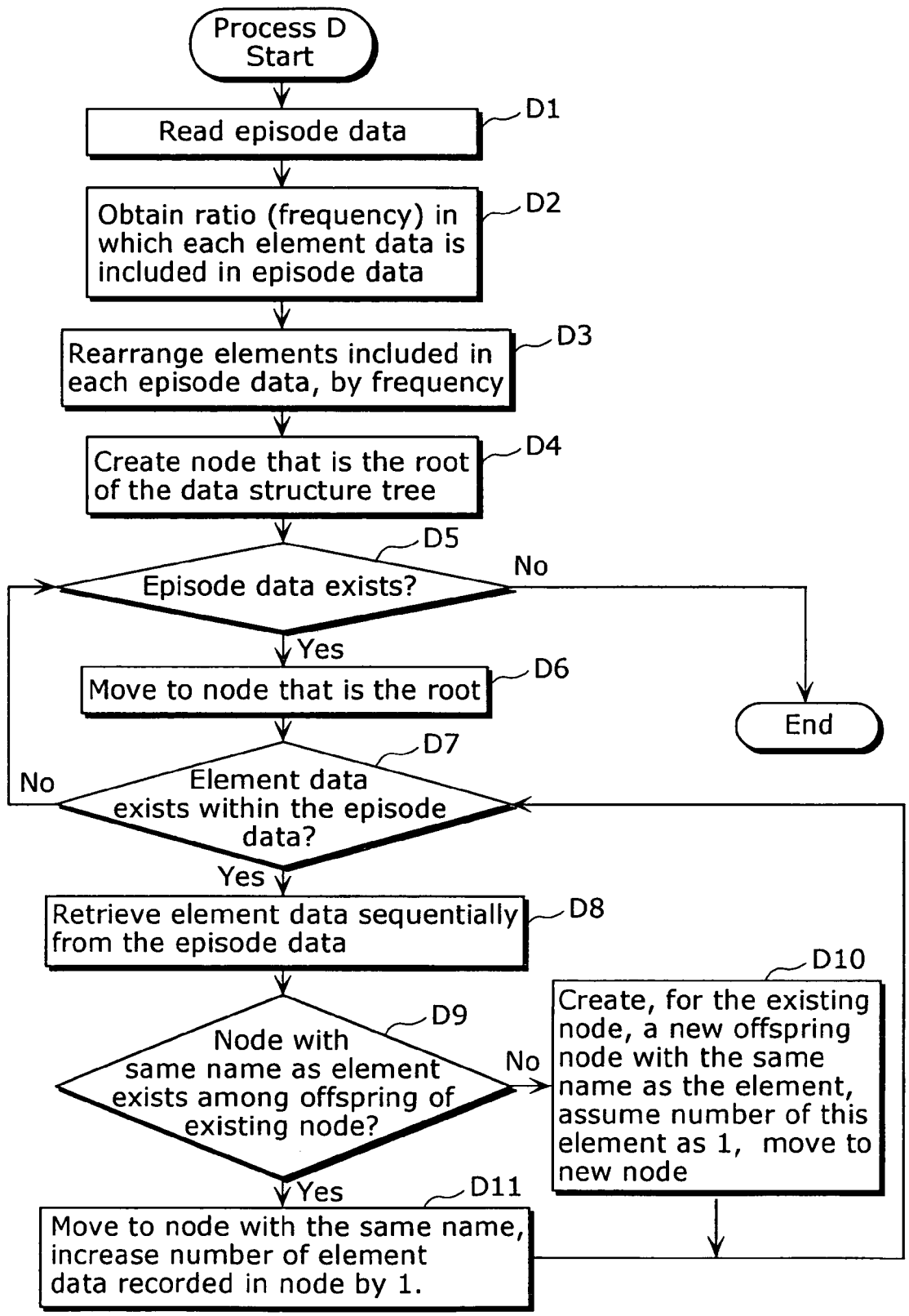
FIG. 11 is a flowchart showing the operation of the episode analysis unit.

The flowchart in FIG. 11 shall be used to explain the operation for the construction of an FP-Tree when the episode data in FIG. 8 is provided to the episode analysis unit n104 structured in the manner above.

The episode input unit n901 reads episode data (step D1). In the present embodiment, the episode data in FIG. 8 is read into the episode analysis unit n104.

The frequency derivation unit n902 obtains the frequency of each element data included in the episode data and records the result in the frequency storage unit n903 (step D2). In the present embodiment, the frequency of each element data is obtained from the episode data in FIG. 8, and recorded in the frequency storage unit n903. FIG. 12 shows the result recorded in the frequency storage unit n903. Here, frequency refers to the ratio of episode data in which the element data appears, from among all the episode data.

The sorting unit n904 rearranges the elements included in each episode data, in a decreasing order of frequency (step D3). In the present embodiment, the element data are rearranged as shown in the episode data in FIG. 13.

Figure 14:
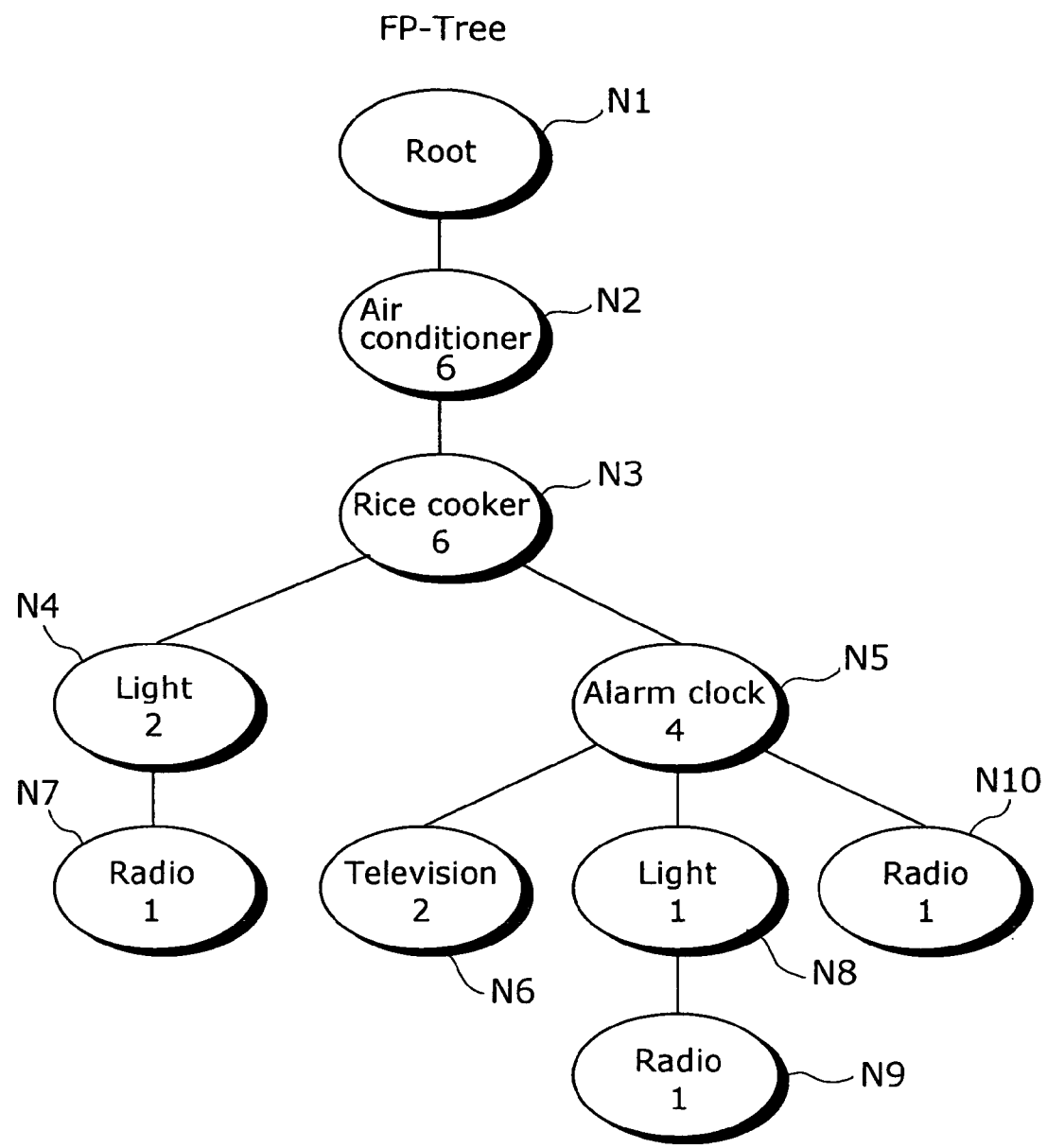
FIG. 14 is a diagram showing an example of an FP-Tree constructed by the episode analysis unit.

The node creation unit n907 creates a node which becomes the root of an FP-Tree (step D4). In the present embodiment, a node N1 in FIG. 14 is created.

The element retrieval unit n905 checks whether episode data to be added on to the FP-tree exists (step D5). The process moves to step D6 if episode data exists, and concludes if non-existent. In the present embodiment, the episode data of August 30 is selected, and the process moves to step D6.

The process moves to the node to become the root of the FP-Tree (step D6). In the present embodiment, the process moves to the node N1 in FIG. 14.

The element retrieval unit n905 determines whether or not element data to be incorporated into the FP-Tree exists within the episode data (step D7). The process moves to step D8 in the case where element data remains, and moves to step D5 in the case where element data does not exist within the episode data. In the present embodiment, the process moves to step D8 as element data exists in the August 30 episode.

The element retrieval unit n905 sequentially retrieves element data from the episode data (step D8). In the present embodiment, the element data "air conditioner" is first retrieved from the August 30 episode.

The element name determining unit n906 determines whether or not a node having the same name as the retrieved element data exists in the offspring nodes of the current node (step D9). Here, the process moves to step D10 in the case where an offspring node having the same name does not exist, and moves to step D11 when a node having the same name exists. In the present embodiment, the process moves to step D10 as the current node N1 (root) does not have an offspring node.

The node creation unit n907 creates an offspring node having the same name as the element data retrieved from the current node, and the process moves to the offspring node (step D10). Furthermore, the number of element data recorded in the node which is the destination of the movement, is assumed as 1. In the present embodiment, a new node N2 having the name "air conditioner" is created from the current node N1 (root), and the process moves to the node N2.

The process moves to step D7 when all processes are concluded.

With regard to the August 30 episode, steps D7 to D10 are repeated in the same manner for the remaining element data, and the process moves to step D5.

The element retrieval unit n905 subsequently retrieves episode data for August 31 (step D5).

The same process as that in the August 30 episode data is performed. The process moves to step D9. In the present embodiment, the element data "air conditioner" is retrieved in steps D6 to D8 (steps D6 to D8).

In the present embodiment, the element name changing unit n906 determines that the offspring node N2 having the same name as the element data "air conditioner" exists in the offspring node of the current node N1 (root). As such, the process moves to step D11 (step D9).

The element number changing unit n909, moving to the offspring node having the same name as the element data, increases the element number held in the node by 1 (step D11). In the present embodiment, the process moves to the node N2 having the name "air conditioner", and the number of element data recorded in the node N2 is changed from 1 to 2.

Hereinafter, the processes steps D5 to D11 are repeated in the same manner for all element data included in each episode data, and after all the element data are incorporated into the FP-Tree, the process concludes with step D5. In the present embodiment, the FP-Tree shown in FIG. 14 is constructed by carrying out the aforementioned process on the episodes in FIG. 8. Moreover, the node numbers are provided in the order in which the nodes are created.

Next, the method used in the life pattern interpretation unit, for extracting a device usage pattern that is characteristic of the user, from the FP-Tree shall be explained.

Figure 15:
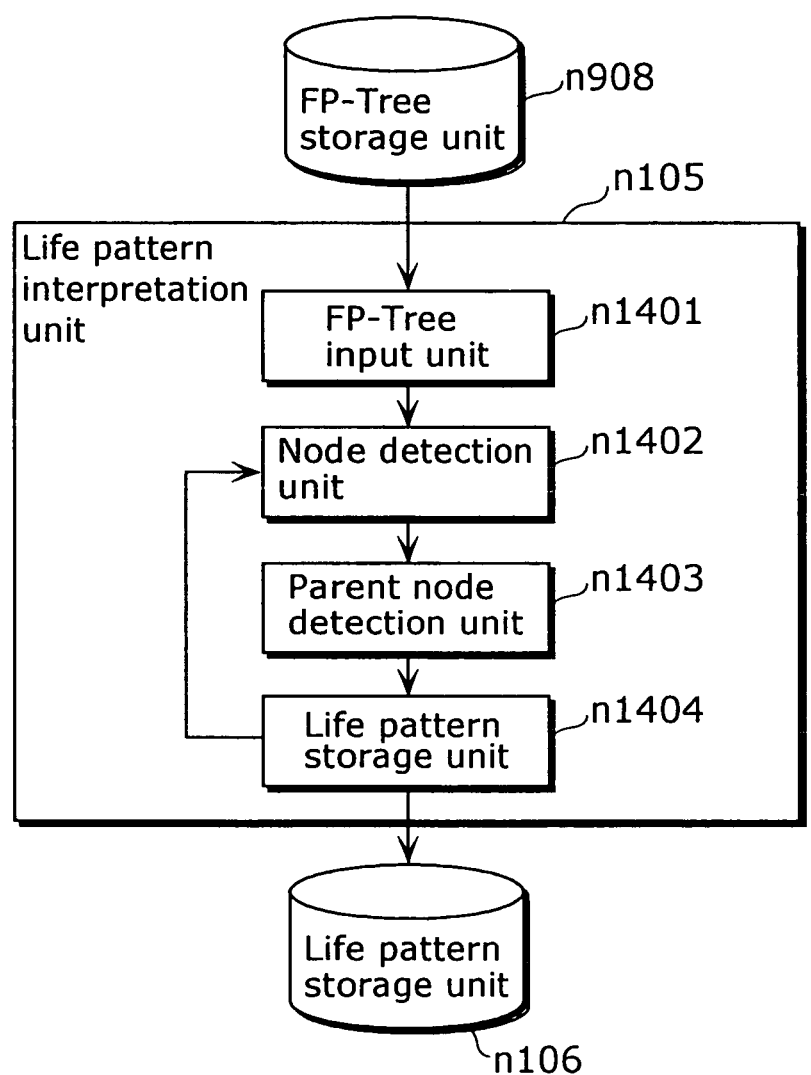
FIG. 15 is a block diagram showing the structure of the life pattern interpretation unit.

FIG. 15 is a block diagram showing the structure of the life pattern interpretation unit n105. The life pattern interpretation unit n105 includes an FP-Tree input unit n1401, a node detection unit n1402, a parent node detection unit n1403, and a life pattern storage unit n1404.

The FP-Tree input unit n1401 is a processing unit for retrieving FP-Tree data from the FP-Tree storage unit n908.

The node detection unit n1402 is a processing unit for detecting the location of the node which stores the element data having the name which is the prescribed name, and moving the process to that node.

The parent node detection unit n1403 is a processing unit for checking whether or not a parent node exists for a current node, and moving the process to that parent node, if it exists.

The life pattern storage unit n1404 is a processing unit that stores the information stored in the detected node, into the life pattern storage unit n106.

Figure 16:
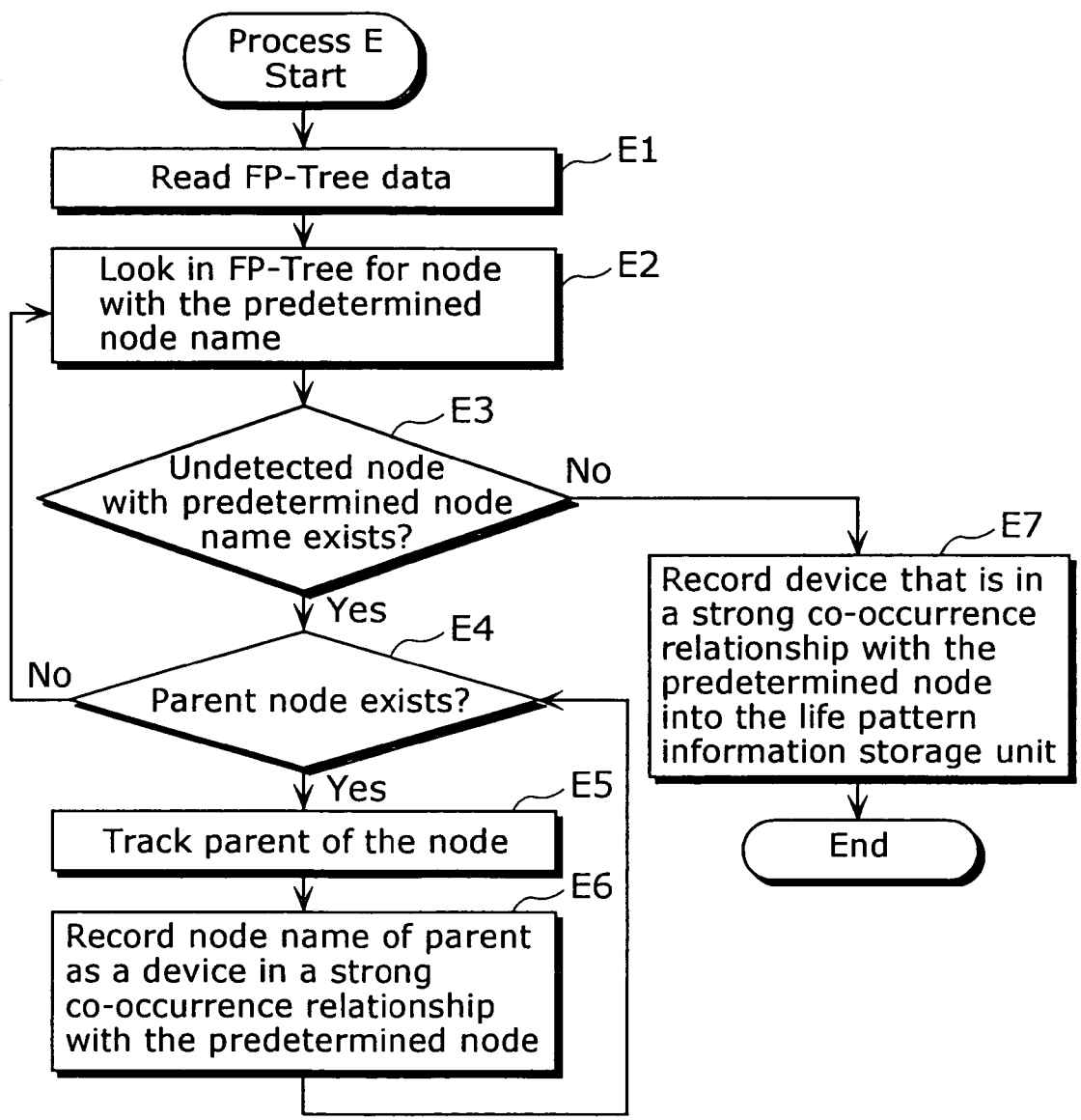
FIG. 16 is a flowchart showing the operation of the life pattern interpretation unit.

The operation (process E) of the life pattern interpretation unit n105 structured in the above manner shall be explained using the flowchart shown in FIG. 16, using as an example, the case where devices used together with the "alarm clock" in the FP-Tree in FIG. 14, are identified.

The FP-Tree output unit n1401 reads the FP-Tree data stored in the FP-Tree storage unit n908 (step E1). In the present embodiment, the FP-Tree in FIG. 14 is read.

Figure 17:
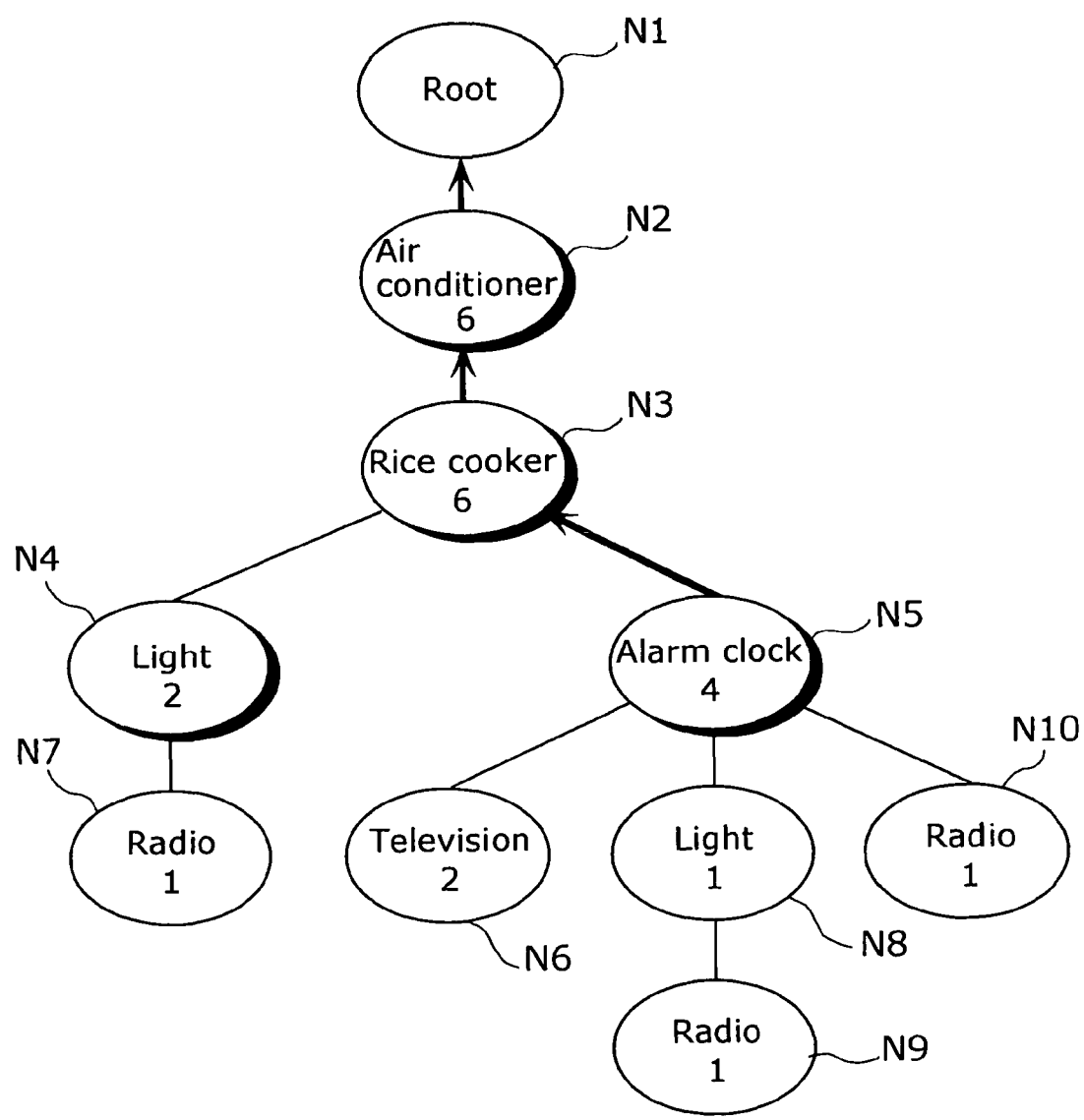
FIG. 17 is a diagram showing an example of the node detection within an FP-Tree by the node detection unit.

The node detection unit n1402 detects the location of the node bearing the prescribed name (step E2). FIG. 17 is a diagram showing an example of node detection within an FP-Tree. In the present embodiment, the detection for a node with the name "alarm clock" is performed, and the process moves to N5 in FIG. 17.

The node detection unit 1402 determines whether or not an undetected node bearing the prescribed node name exists (step E3). When such a node does not exist, the process moves to step E7. If such a node exists, the process moves to step 4. In the present embodiment, the process moves to step E4 as the node N5 having the name "alarm clock" exists.

The parent node detection unit n1403 determines whether or not a parent node exists for the current node (step E4). If a parent node exists, the process proceeds to step E5. If there is no parent node, the process moves to step E2. In the present embodiment, the process moves to step E5 as a parent node N3 exists for the current node N5. However, in the case where the parent node is the "root", the process moves to step E2.

The process moves to the parent node of the current node (step E5). In the present embodiment, the process moves from the current node N5 to its parent node N3.

The life pattern storage unit n1404 records the name of the element data stored in the current node as being in a co-occurrence relationship in terms of usage with the element data having the prescribed name, for which detection was initially carried out (step E6). In the present embodiment, "rice cooker" is recorded as the element data used together with the "alarm clock".

Subsequently, steps E2 to E6 are repeated likewise for remaining undetected nodes in the FP-Tree, and when it is determined in step E3 that all nodes have been detected, the process moves to step E7.

The life pattern storage unit n1404 stores, into the life pattern storage unit n106, the element data combination stored in step E6 as life pattern information that is characteristic of the user (step E7).

In the present embodiment, the life pattern information shown in FIG. 18 is stored, from the FP-Tree in FIG. 14, into the life pattern storage unit n106, through the series of processes mentioned above.

As explained above, in the present embodiment, it is possible to extract, from life data storing the life details of the user, a device usage co-occurrence pattern that is characteristic of the user, as life pattern information that is characteristic of the user. In other words, according to the present embodiment, the device usage history, content viewing history, or the like, of a user is automatically recorded as life data, and life pattern information that is characteristic of the user is extracted from the life data according to predetermined rules. By using the life pattern information, it is possible to carry out linked control of a plurality of devices to suit the life pattern and situation of the user.

Moreover, although in the present embodiment, the combination of devices using the timer function between 6:00 and 9:00 every morning is considered as a single unit of life episode data according to the episode creation rules in FIG. 6A, episode data can also be created under conditions other than the timer function and use time.

For example, by using episode creation rules relating to power on/off operation and location of usage for a device, as in the episode creation rules shown in FIG. 6B, it becomes possible to treat the combination of devices used at an specific location as episode data, and it is possible to extract the device usage co-occurrence pattern in a specified location.

Furthermore, for example, by making conditions out of i) viewing details of a content or usage details of a service that has been used, and ii) the relationship of persons using these together, as in the episode creation rules shown in FIG. 6C, it becomes possible to extract a co-occurrence relationship for content use, or a co-occurrence relationship that is dependent on personal relationships.

Furthermore, in the present embodiment, by tracking the parent node of a random node in the life pattern interpretation, the element data that is in a strong co-occurrence relationship with the random node is identified. However, aside from this, it is also possible to identify a life pattern that is characteristic of the user, using the properties of the data structure in the FP-Tree.

For example, with respect to the number of element data stored in each node, it is possible to extract the combination of nodes having a number of element data that is equal to or greater than a fixed threshold value, and these can be assumed as element data having mutually strong co-occurrence relationships.

Moreover, in the life pattern information extraction by the life pattern extraction apparatus n101 mentioned previously, for example, it becomes possible to extract the device combination pattern for the use of AV devices such as a television and video recorder by the user, and it becomes possible to use this for device operation assistance such as the linked activation and linked termination of AV devices using this pattern.

Furthermore, for example, the relationship of television viewing details and air conditioner or light settings can be extracted, and it is possible to use a content viewing-dependent type of linked device control such as the automatic linked control of the air conditioner and light settings, using the aforementioned relationships, to suit the content (details, genre, and so on) being viewed by the user.

(Second Embodiment)

Next, the device linkage control system in the second embodiment of the present invention shall be explained. The second embodiment relates to an episode analysis unit that performs frequency pattern detection more efficiently for the episode analysis unit in the first embodiment by constructing an FP-Tree in which the unit of element data with the highest frequency among the element data included in a sub-tee becomes the root of the subtree, for all subtrees within the FP-Tree, in the episode analysis unit in the first embodiment.

In other words, the device linkage control system in the present embodiment has almost the same configuration as the device linkage control system in the first embodiment except for having the characteristic of including a new episode analysis unit n104a in place of the episode analysis unit n104.

Figure 19:
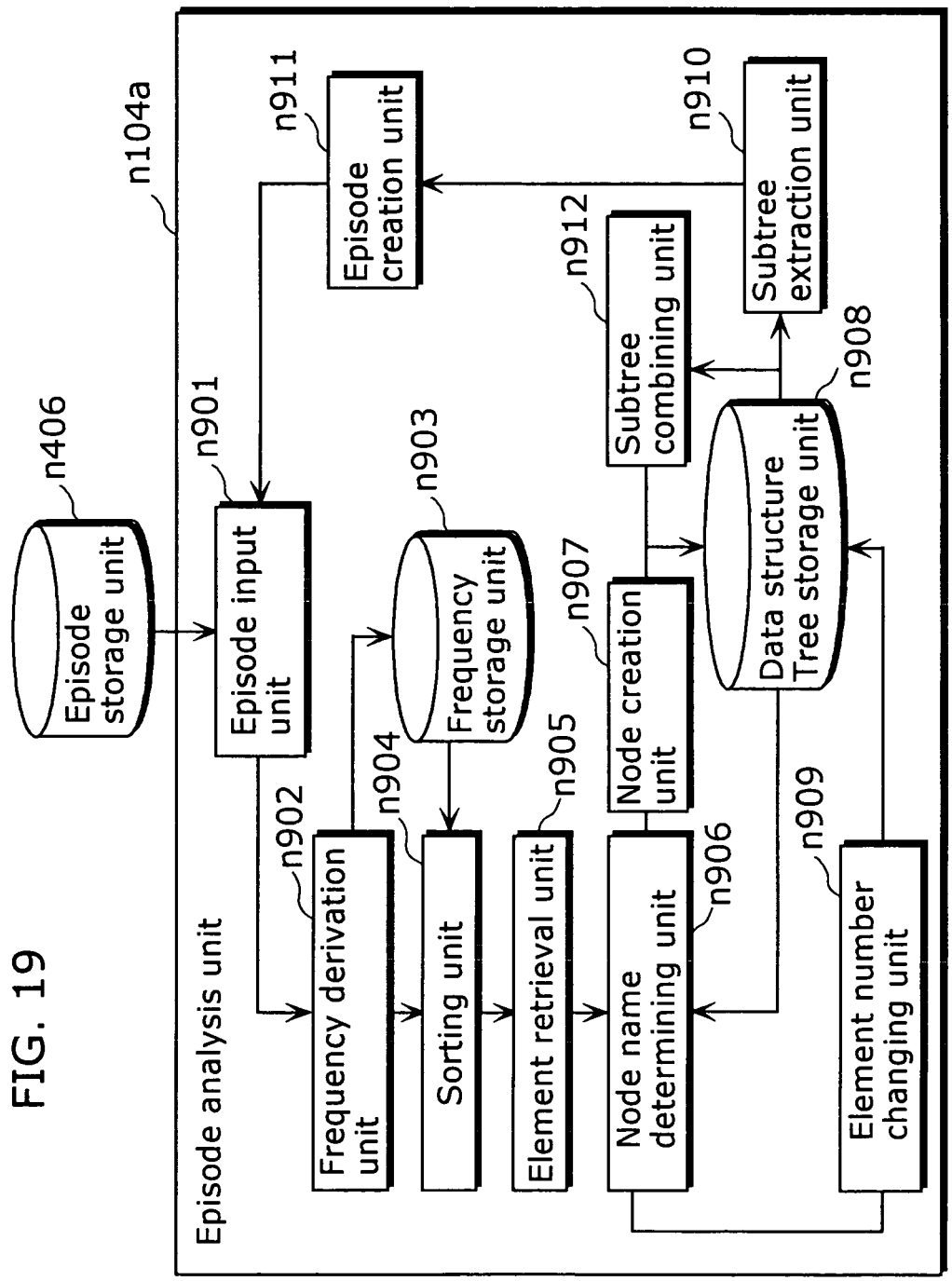
FIG. 19 is a block diagram showing the structure of the episode analysis unit in the second embodiment of the present invention.

FIG. 19 is a block diagram showing the structure of the episode analysis unit n104a in the present embodiment. The episode analysis unit n104a includes a subtree extraction unit n910, an episode creation unit n911, and a subtree combining unit n912, in addition to the modules n901 to n909 included in the episode analysis unit n104 in the first embodiment shown in FIG. 10. Furthermore, explanation for the modules n901 to n909 in the episode analysis unit n104a is omitted as these modules are the same as the modules in the first embodiment.

The subtree extraction unit n910 is a processing unit for extracting a subtree which has, as its root, the offspring node of the node that is the root of the FP-Tree.

The episode creation unit n911 is a processing unit that sequentially tracks the nodes within a subtree starting from the root, and creates episode data anew by combining the element data stored in the nodes.

The subtree combining unit n912 is a processing unit for combining a plurality of subtrees into one tree again.

Figure 20:
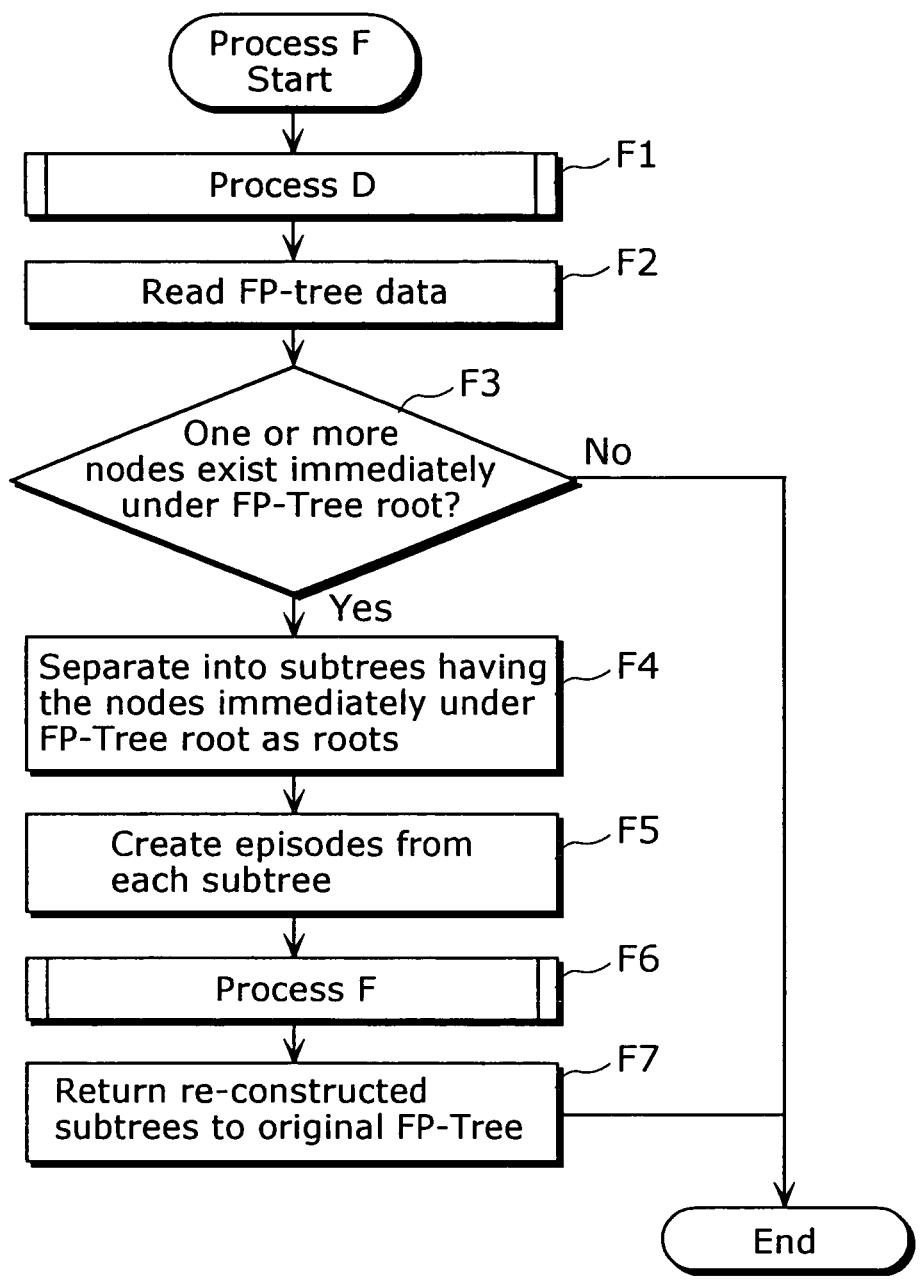
FIG. 20 is a flowchart showing the operation of the episode analysis unit.

The series of operations (process F) leading to the construction of an FP-Tree from the episode data in FIG. 8, in the episode analysis unit n104a as structured above, shall be explained using the flowchart in FIG. 20.

First, the same process is performed as in steps D1 to D11 shown in FIG. 11 in the first embodiment (step F1).

The subtree extraction unit n910 reads the FP-Tree data stored in the data structure storage unit n908 (step F2). In the present embodiment, the FP-Tree data shown in FIG. 14 is read.

The subtree extraction unit n910 checks whether or not an offspring node exists for the node which is the root of the FP-Tree (step F3). In the case where an offspring node exists, the process moves to step F4. In the case where an offspring node does not exist, the process is concluded. In the present embodiment, the node N2 exists as the offspring node of node N1, therefore the process moves to step F4.

Figure 21:
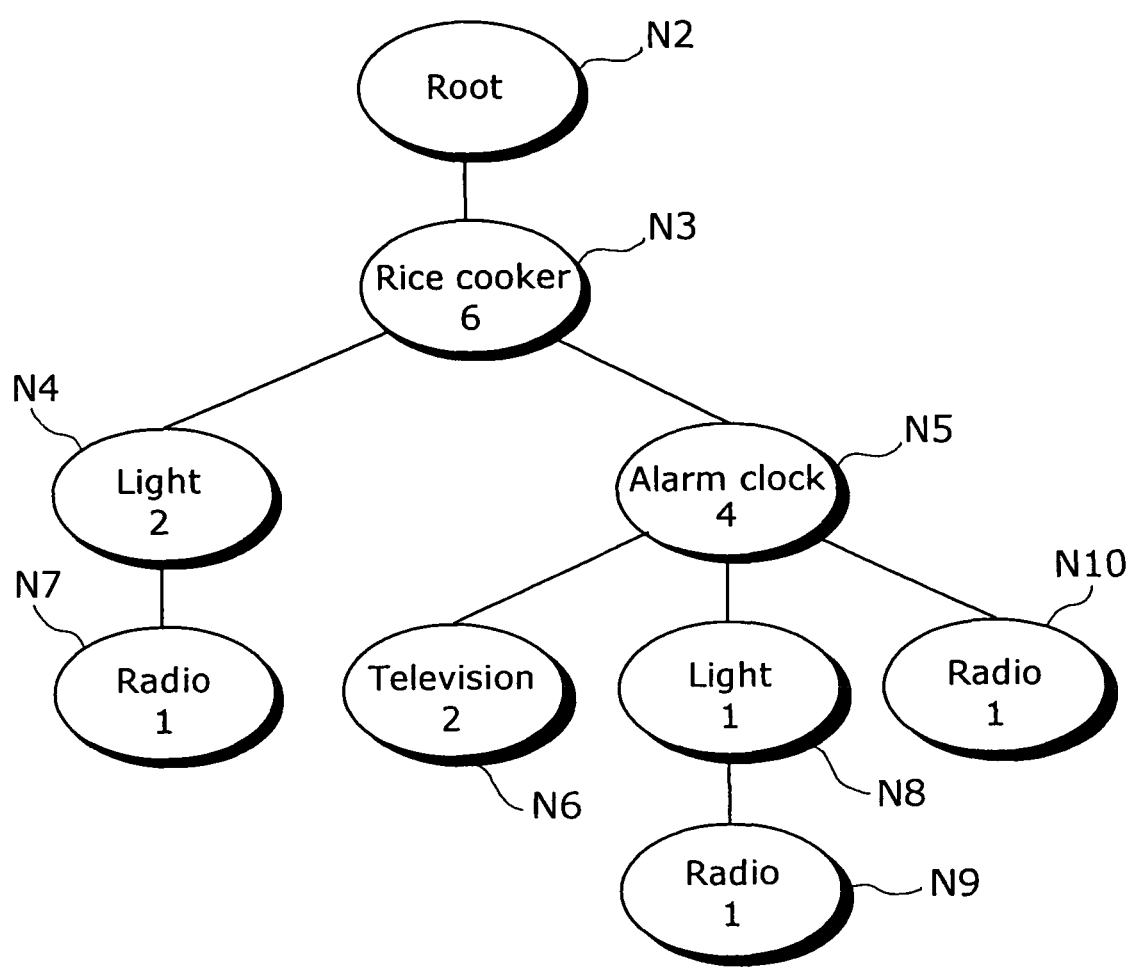
FIG. 21 is a diagram showing an example of a subtree extracted by the episode analysis unit.

The subtree extraction unit 910 extracts the subtree which has, as its root, the offspring node of the node equivalent to the root of the FP-Tree (step F4). In the present embodiment, the subtree that has the node N2 as a root is extracted. In the present embodiment, the subtree, shown in FIG. 21, having the node N2 as a root, is created from the FP-Tree in FIG. 14.

The episode creation unit n911 sequentially tracks each node of the subtree starting from the root, and creates episode anew by combining the element data stored in the nodes (step F5). In the present embodiment, with regard to the subtree shown in FIG. 21, the episode data shown in FIG. 22 is created by sequentially tracking each node starting from the root.

Figure 23A:
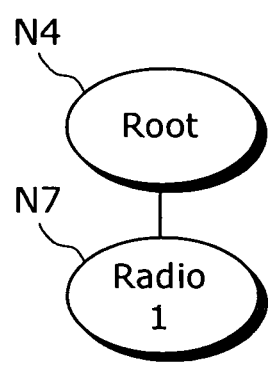
FIGS. 23A and 23B are diagrams respectively showing subtrees, in the FP-Tree in FIG. 21, having the node N4 and node N5 as roots.
Figure 23B:
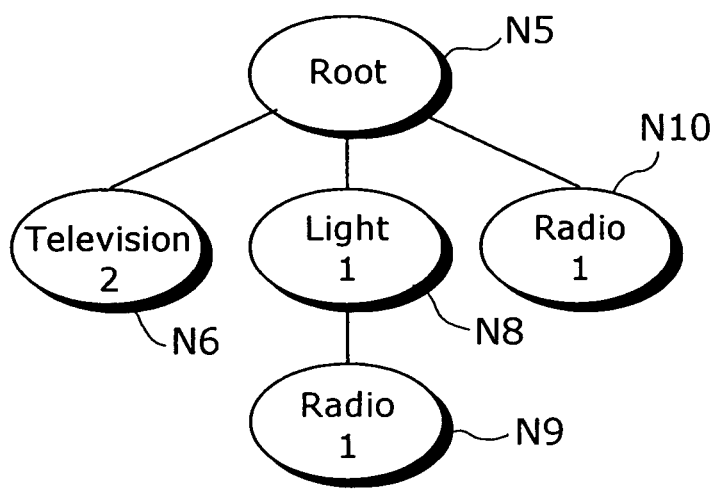

The process F shown in FIG. 20 is performed recursively on the episode created from the subtree. In the present embodiment, the same process F is recursively carried out with regard to the episode data shown in FIG. 22 (step F6). For example, with regard to the FP-Tree in FIG. 21, the subtrees having the node N4 and node N5 as roots are respectively shown in FIGS. 23A and 23B, and the episode data shown in FIGS. 24A and 24B are created from the subtrees in FIGS. 23A and 23B respectively. This is repeated until there are no more subtrees, then the process moves to step F7.

The subtree combining unit n912 integrates the recursively constructed subtree FP-Trees, to the positions in the original FP-Tree (step F7). In the present embodiment, the FP-Tree in FIG. 25 is constructed by carrying out the aforementioned process.

Figure 26B:
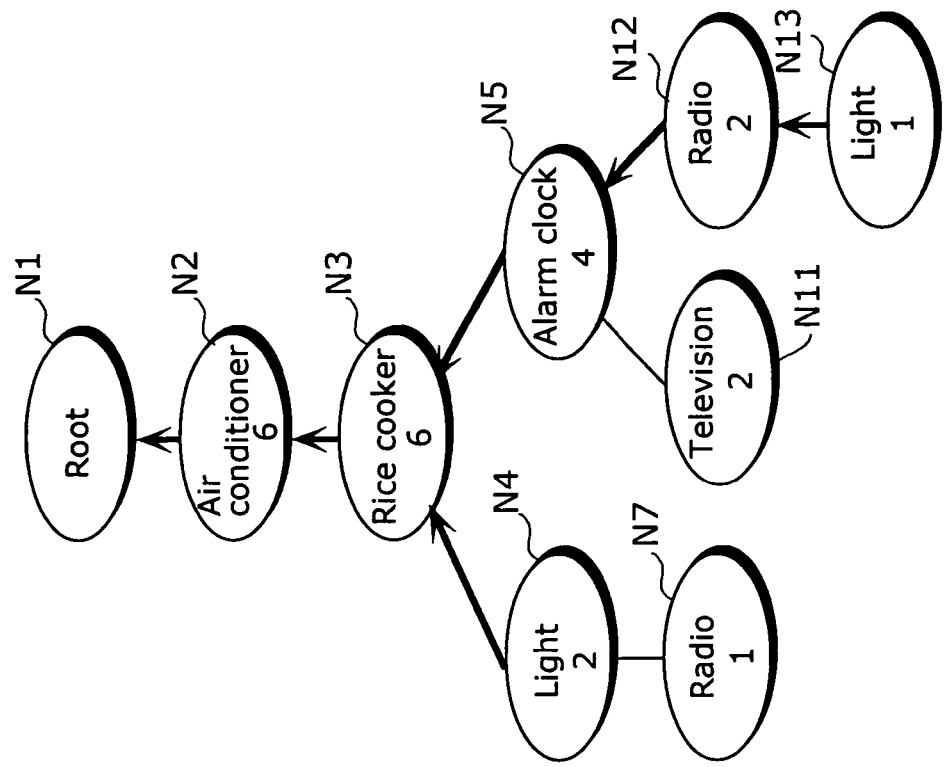
FIG. 26B shows the analysis of the FP-tree shown in FIG. 25, by the life pattern analysis unit.
Figure 26A:
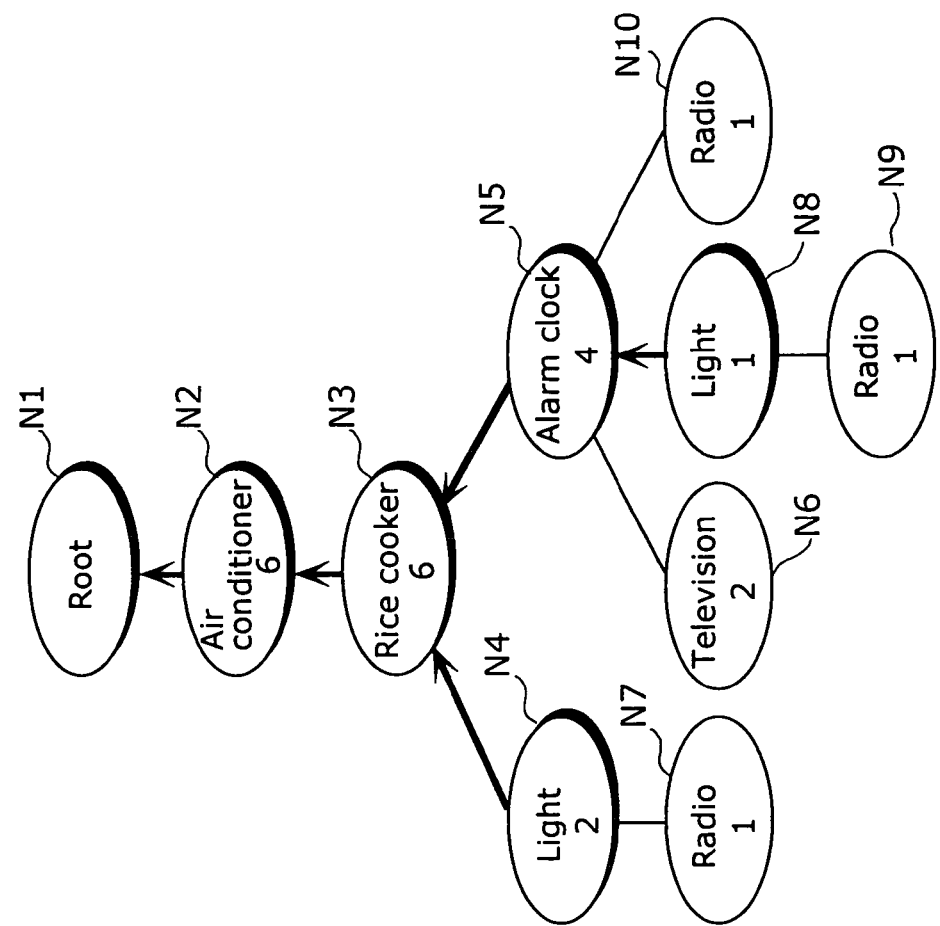
FIG. 26A shows the analysis of the FP-tree shown in FIG. 14, by the life pattern analysis unit.

FIGS. 26A and 26B are diagrams explaining by comparison with the first embodiment, how the FP-Tree constructed by the episode analysis unit n104a is interpreted in the succeeding life pattern interpretation unit n105. FIG. 26A shows the interpretation for the FP-Tree in the first embodiment shown in FIG. 14, and FIG. 26B shows the interpretation for the FP-Tree in the present embodiment shown in FIG. 25. As shown in FIG. 26A, a node "radio" does not exist as a parent for a node "light" in the FP-Tree in FIG. 14, therefore at the time of use, "radio" is element data having no co-occurrence relationship with "light". However, as shown in FIG. 26B, a node "radio" exists as a parent for a node "light" in the FP-Tree in FIG. 25, therefore at the time of use, "radio" is an element having a partial co-occurrence relationship with "light".

Figure 27B:
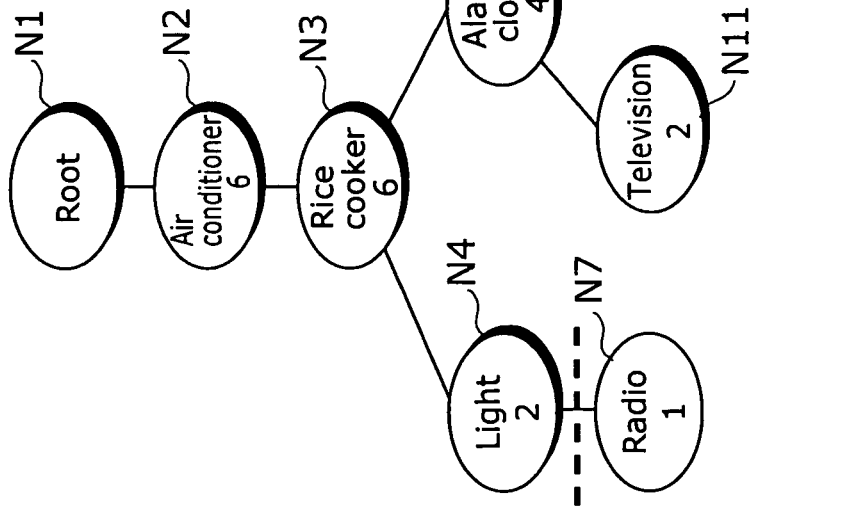
FIGS. 27A and 27B are diagrams respectively showing element data extracted through the FP-Trees in FIGS. 26A and 26B, in the case where the detection area in the FP tree is limited.
Figure 27A:
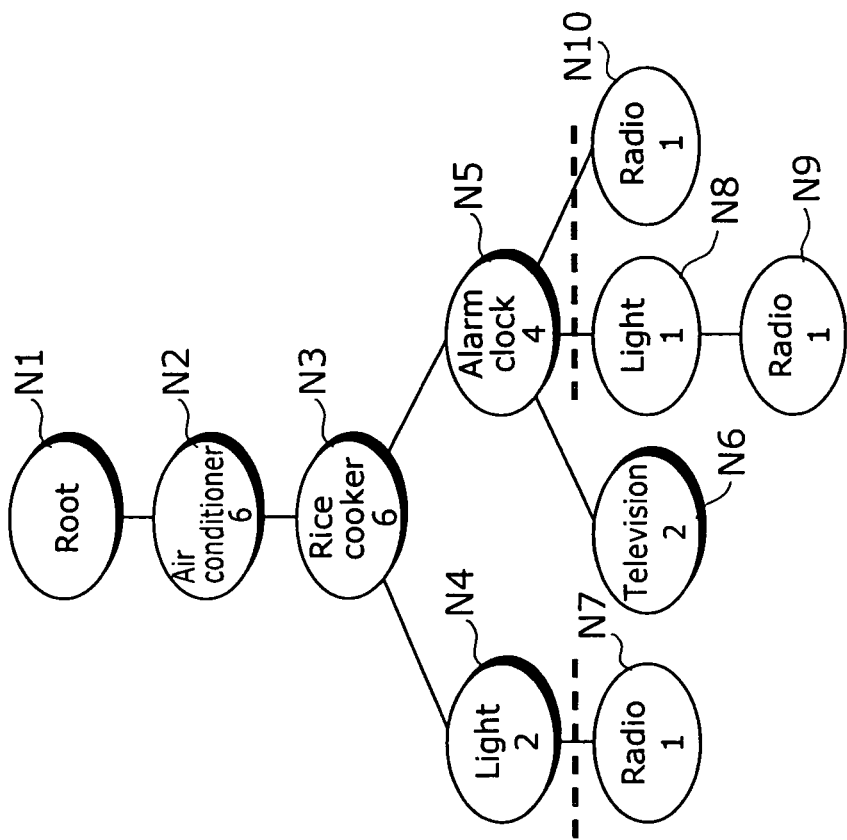

Furthermore, as shown in FIGS. 27A and 27B, in the case where the detection area of the FP-Tree is limited by providing a threshold value ("1" for example) for the number of elements for each node (for example, the case where only nodes having a number of elements greater than 1 are detected), element data "radio" is excluded in the FP-Tree in the first embodiment, as shown in FIG. 27A. However, in the FP-Tree in the present embodiment, it is possible to prevent the exclusion of the element data "radio" by consolidating dispersed elements.

As explained above, in the FP-Tree constructed by the episode analysis unit n104 in the first embodiment, element data of the same type are dispersed to a plurality of nodes as element data actually having a high frequency is relegated to a node that is farther from the root by another element data having a higher frequency, and the element data detection efficiency is decreased. However, in the episode analysis unit n104 in the present embodiment, deterioration of detection efficiency as a result of the element data dispersal is prevented, and co-occurrence relationships are extracted more accurately. In other words, according to the present embodiment, the dispersal of element data of the same type to a plurality of nodes in the FP-Tree is reduced and frequency pattern detection efficiency can be improved by constructing the structure of the FP-Tree created in the extraction of a life pattern, in such a way that for all subtrees within the FP-Tree, the element data with the highest frequency within a subtree is necessarily the root.

Furthermore, compared to the FP-Tree constructed by the episode analysis unit n104 in the first embodiment, the number of nodes included in the FP-Tree decreases depending on the details of episode data for the FP-Tree constructed by the episode analysis unit n104a in the present embodiment. Therefore the effect of reducing the memory capacity needed for storing FP-Tree data is also achieved.

In this manner, in the life pattern extraction by the life pattern extraction apparatus n101 including the episode analysis unit n104a in the present embodiment, the overlooking of element data that are in a co-occurrence relation at the time of use is reduced further than in the first embodiment. For example, it is possible to extract a device combination pattern in the use of AV devices such as a television and a video recorder by a user, and this can be used in device operation assistance such as the linked activation and linked termination of AV devices using that pattern.

Furthermore, for example, the relationship of television viewing details and air conditioner or light settings can be extracted, and it is possible to use a content viewing-dependent type of linked device control such as the automatic linked control of air conditioner and light settings, using the aforementioned relationships, to suit the content (details, genre, and so on) being viewed by the user.

Third Embodiment

Next, the device linkage control system in the third embodiment of the present invention shall be explained. The present embodiment relates to a process for changing the arrangement of the element data included in episode data so that an FP-Tree having the same structure as an FP-Tree constructed by the episode analysis unit n104a in the second embodiment is constructed by using only the episode analysis unit n104 in the first embodiment.

Figure 28:
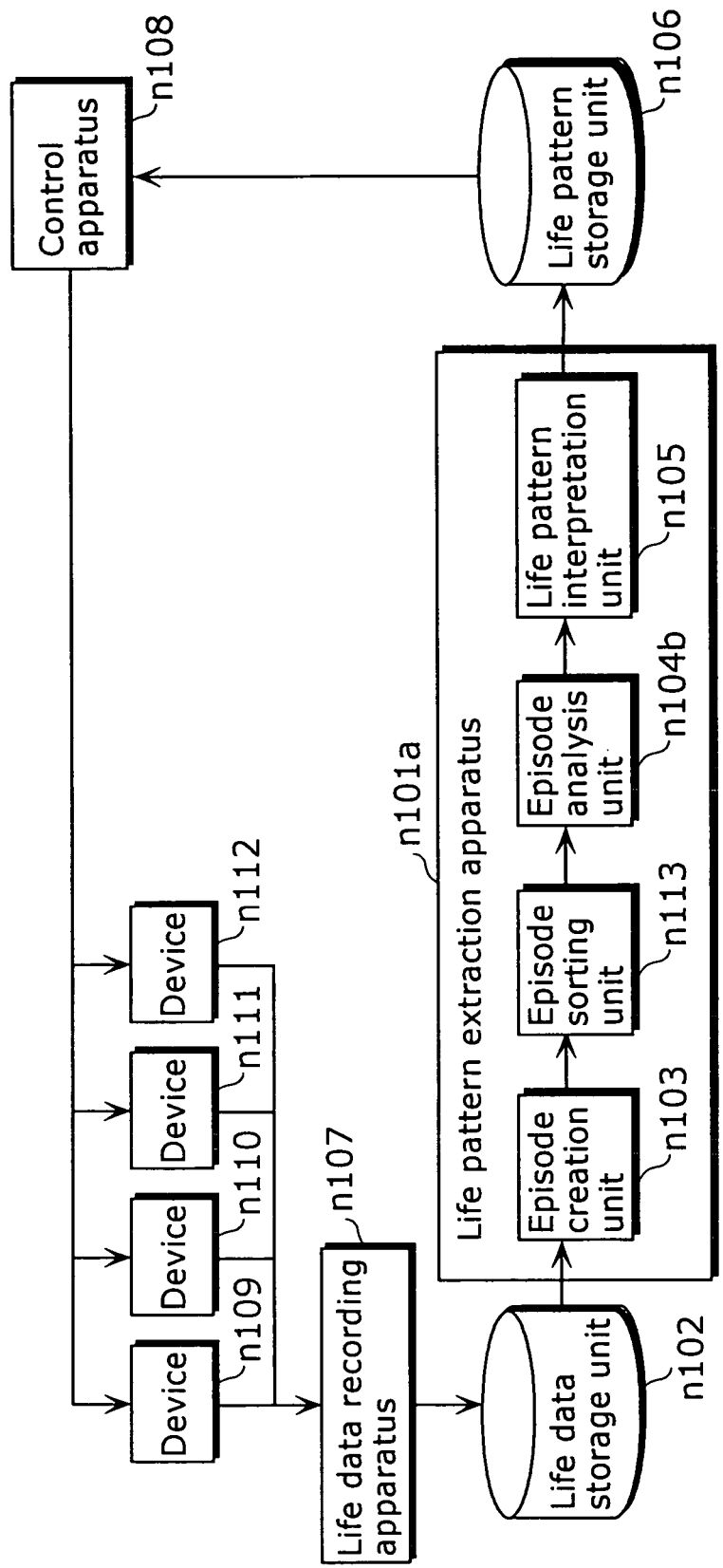
FIG. 28 is a block diagram showing the configuration of the device linkage control system in the second embodiment of the present invention.

FIG. 28 is a block diagram showing the structure of the device linkage control system in the present embodiment. The device linkage control system in the present embodiment possesses almost the same configuration as the device linkage control system in the first embodiment except for including a new episode sorting unit n113 in life pattern extraction apparatus n101a, and including a simpler episode analysis unit 104b in place of the episode analysis unit n104 in the first embodiment.

The episode sorting unit n113 is a processing unit for rearranging the order of elements included in an episode extracted by the episode creation unit n103.

Figure 29:
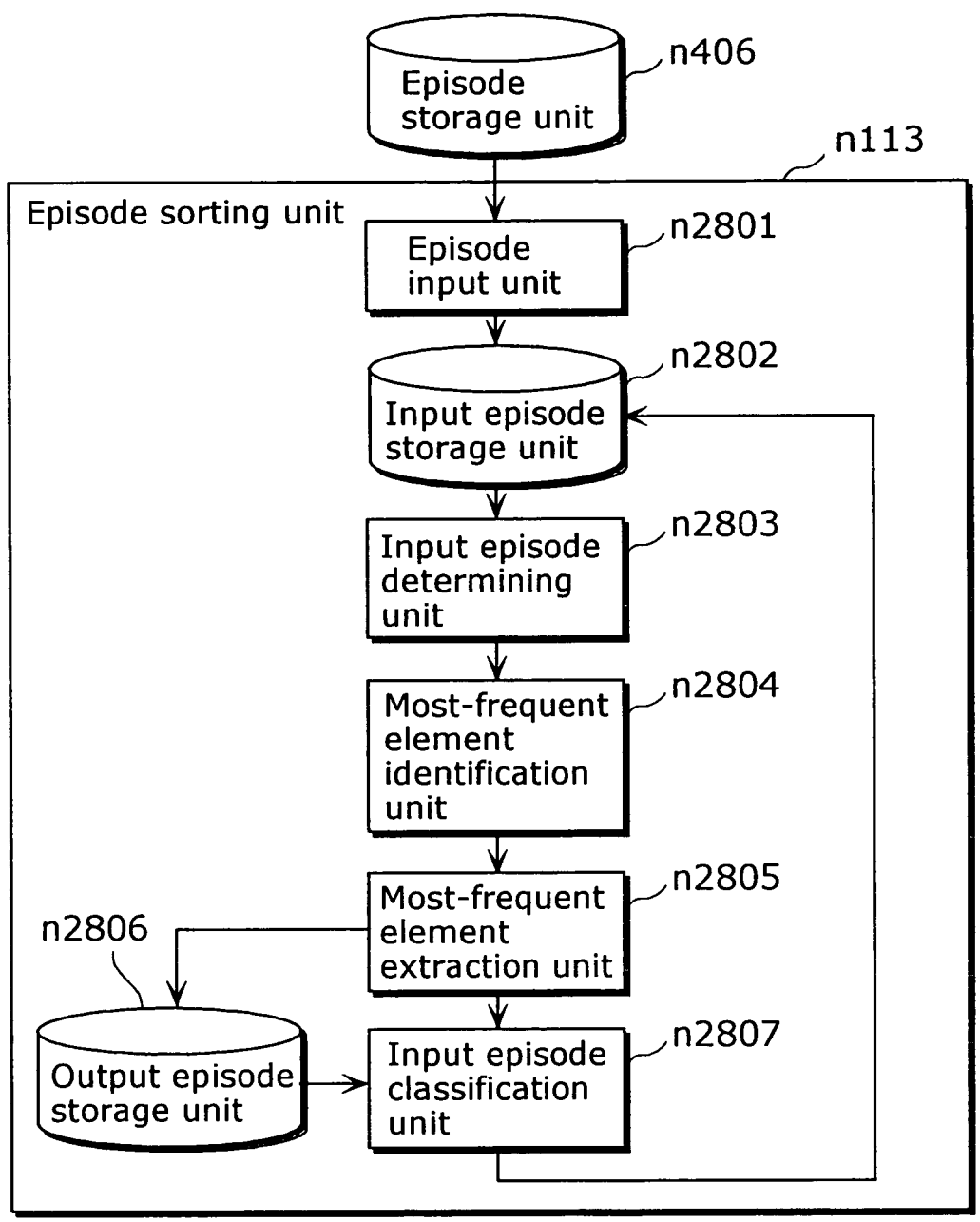
FIG. 29 is a block diagram showing the structure of the episode sorting unit.

FIG. 29 is a block diagram showing the structure of the episode sorting unit. The episode sorting unit n113 includes an episode input unit n2801, an input episode storage unit n2802, an input episode number determining unit n2803, a most-frequent element identification unit n2804, a most-frequent element extraction unit n2805, an output episode storage unit n2806, and an input episode classification unit n2807.

The episode input unit n2801 is an input unit for reading episode data from the episode storage unit n406.

The input episode storage unit n2802 is a storage unit such as a memory for storing the episode data that has been read, as input episode data.

The input episode number determining unit n2803 is a processing unit for determining the number of input episode data.

The most-frequent element identification unit n2804 is a processing unit for finding the element having the highest frequency from within the input episode data.

The most-frequent element extraction unit n2805 is a processing unit for extracting the element having the highest frequency from within the input episode data.

The output episode storage unit n2806 is a storage unit such as a memory for storing the element data extracted by the most-frequent element extraction unit n2805, as output episode data.

The input episode classification unit n2807 is a processing unit for grouping the input episode data that have been extracted of the most frequent elements, according to the type of the element data extracted.

Figure 30:
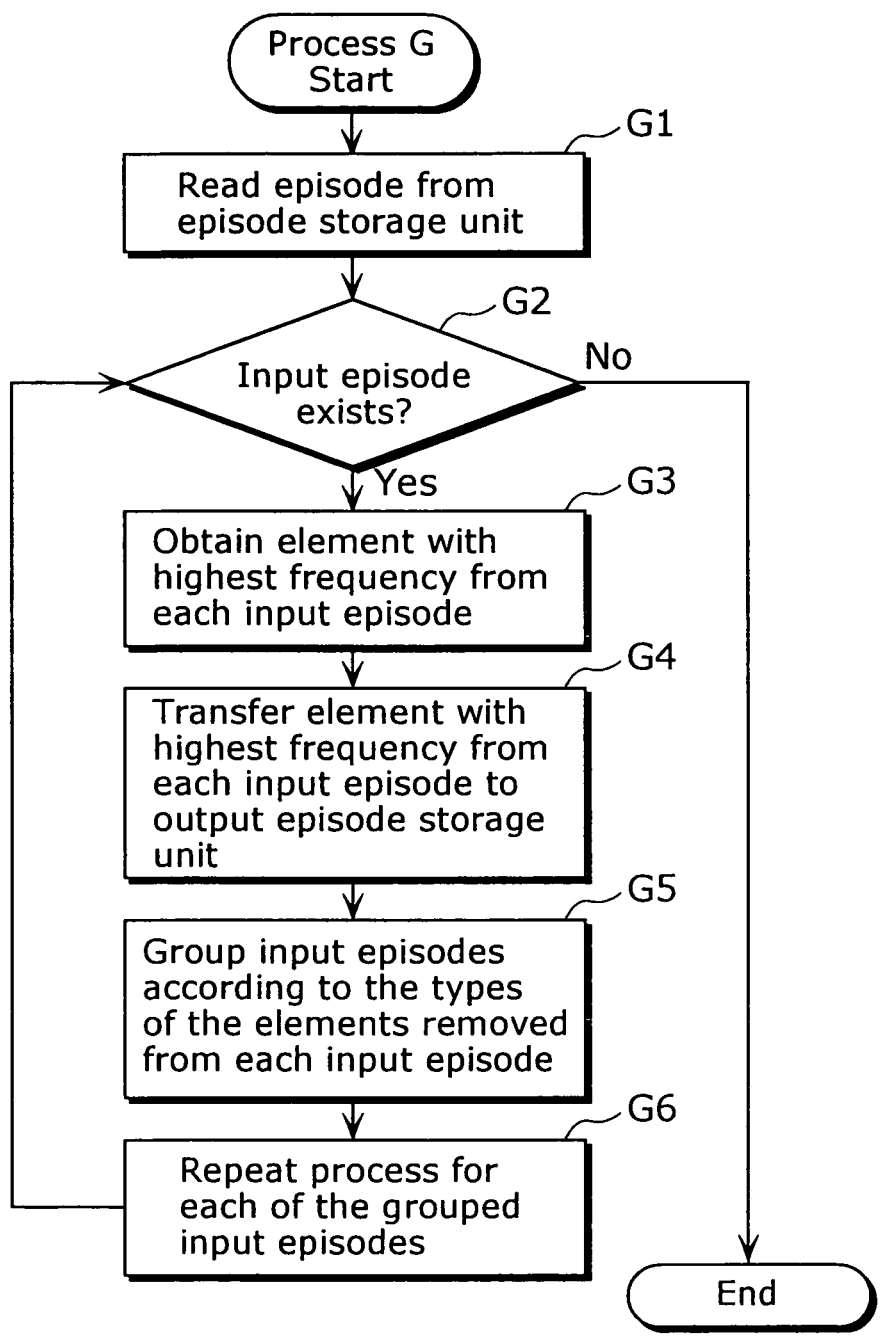
FIG. 30 is a flowchart showing the episode data rearrangement operation by the episode sorting unit.
Figure 31:
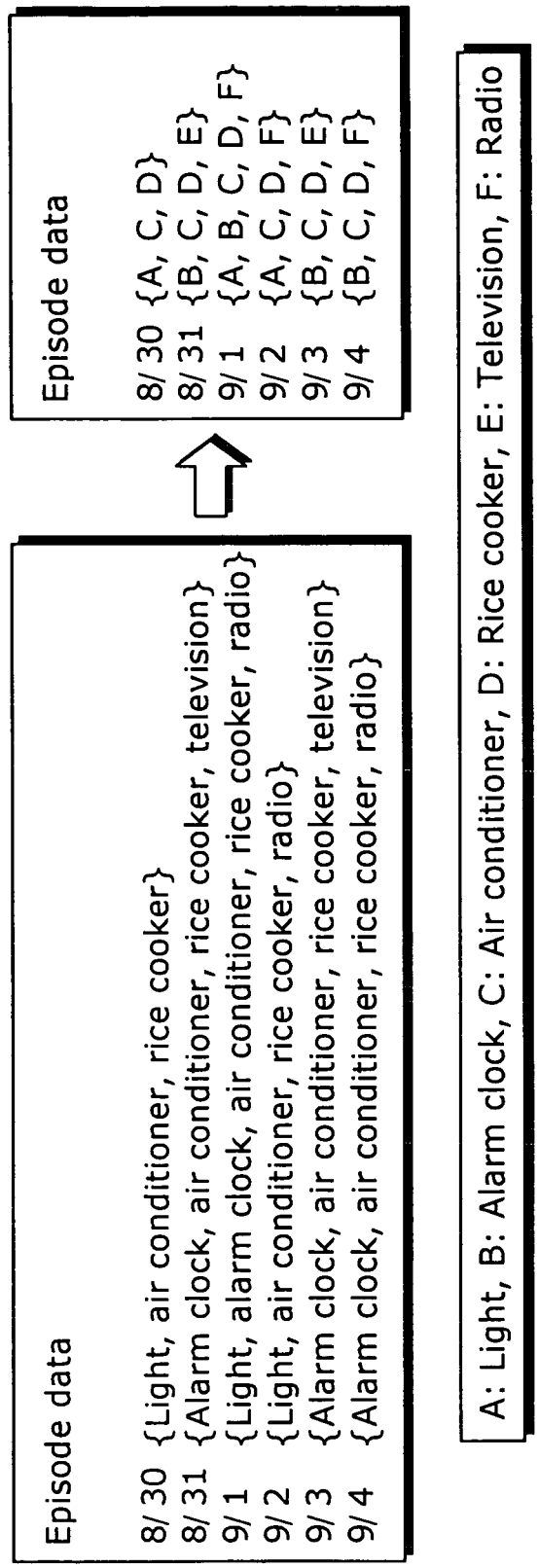
FIG. 31 is a diagram showing an example of episode data to explain the episode data rearrangement operation by the episode data sorting unit.

Next, the series of operations (process G) for rearranging the details of episode data, in the episode sorting unit shall be explained using the flowchart shown in FIG. 30 and the episode data in FIG. 31.

Here, explanation with regard to the rearrangement of episode data in FIG. 31 shall be carried out with the names of the element data being substituted with letters of the alphabet to simplify explanation.

The episode input unit n2801 reads episode data from the episode data storage unit n406, and stores the episode data in the input episode storage unit n2802 (step G1). In the present embodiment, the episode on the left side in FIG. 31 is read.

The input episode number determining unit n2803 checks whether or not there is input episode data including element data stored in the input episode storage unit 2802, with the process moving to step G3 if input episode data including element data exists, and concluding if not (step G2). In the present embodiment, the process moves to step G3 as input episodes exist in the input episode storage unit.

The most-frequent element identification unit n2804 identifies the element data having the highest frequency from within each of the input episode data (step G3).

The most-frequent element extraction unit n2805 extracts the element data having the highest frequency from within each of the input episode data, and stores the extracted element data in the output episode storage unit n2806 (step G4).

The input episode classification unit n2807 classifies the input episodes according to the types of the extracted element data (step G5).

Figure 32:
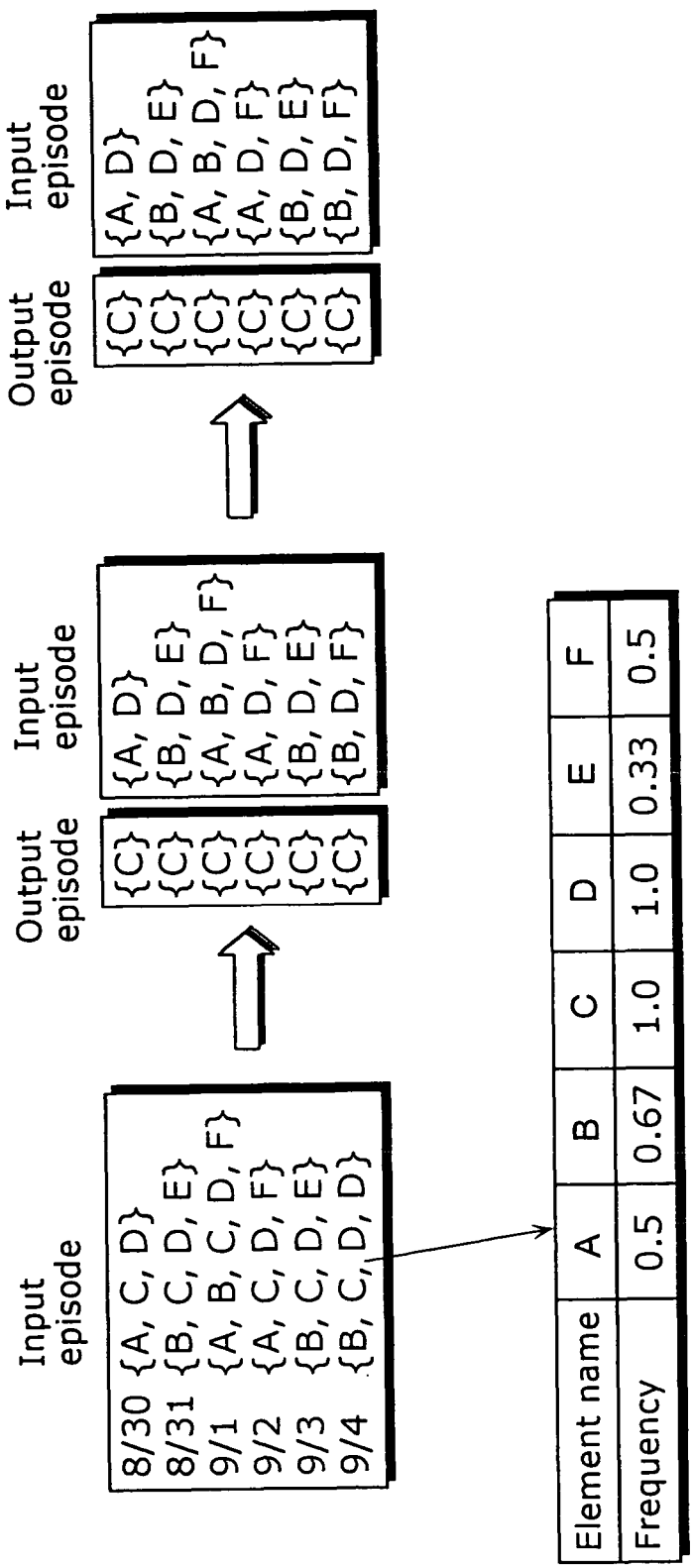
FIG. 32 is a diagram illustrating the appearance of the processes in steps G3 to G5 in FIG. 30.
Figure 33:
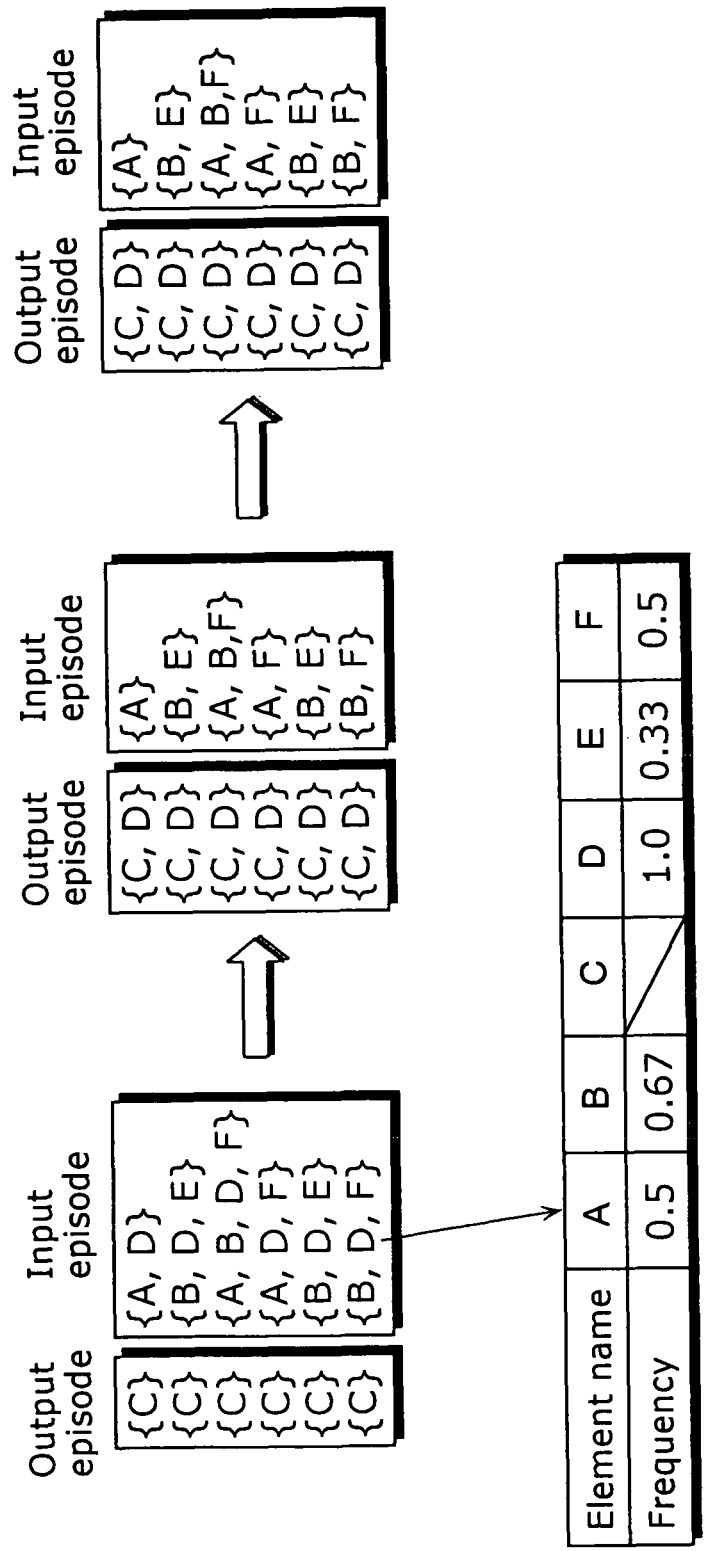
FIG. 33 is a diagram illustrating the appearance of the process in step G6 in FIG. 30 (first cycle in the repetition of steps G2 to G5).
Figure 34:
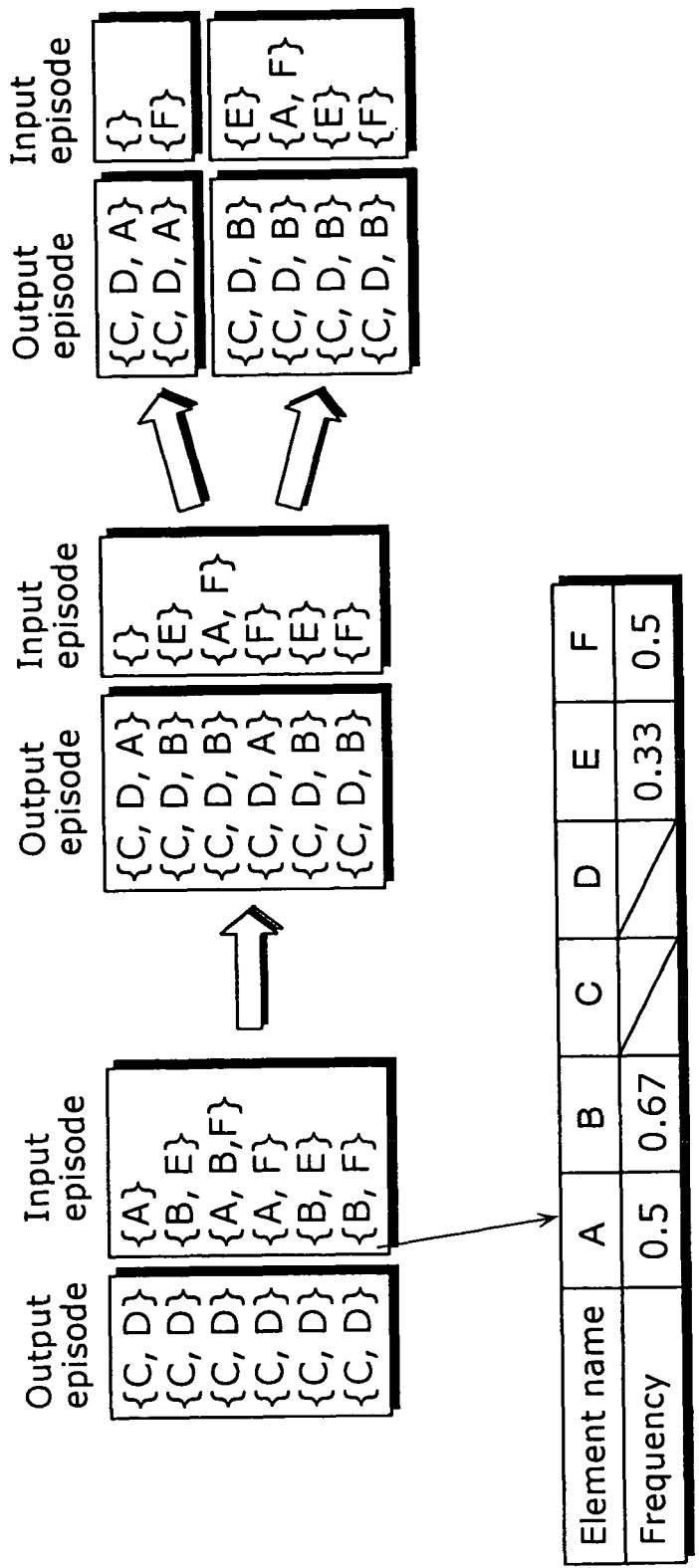
FIG. 34 is a diagram illustrating the appearance of the process in step G6 in FIG. 30 (second cycle in the repetition of steps G2 to G5).
Figure 35:
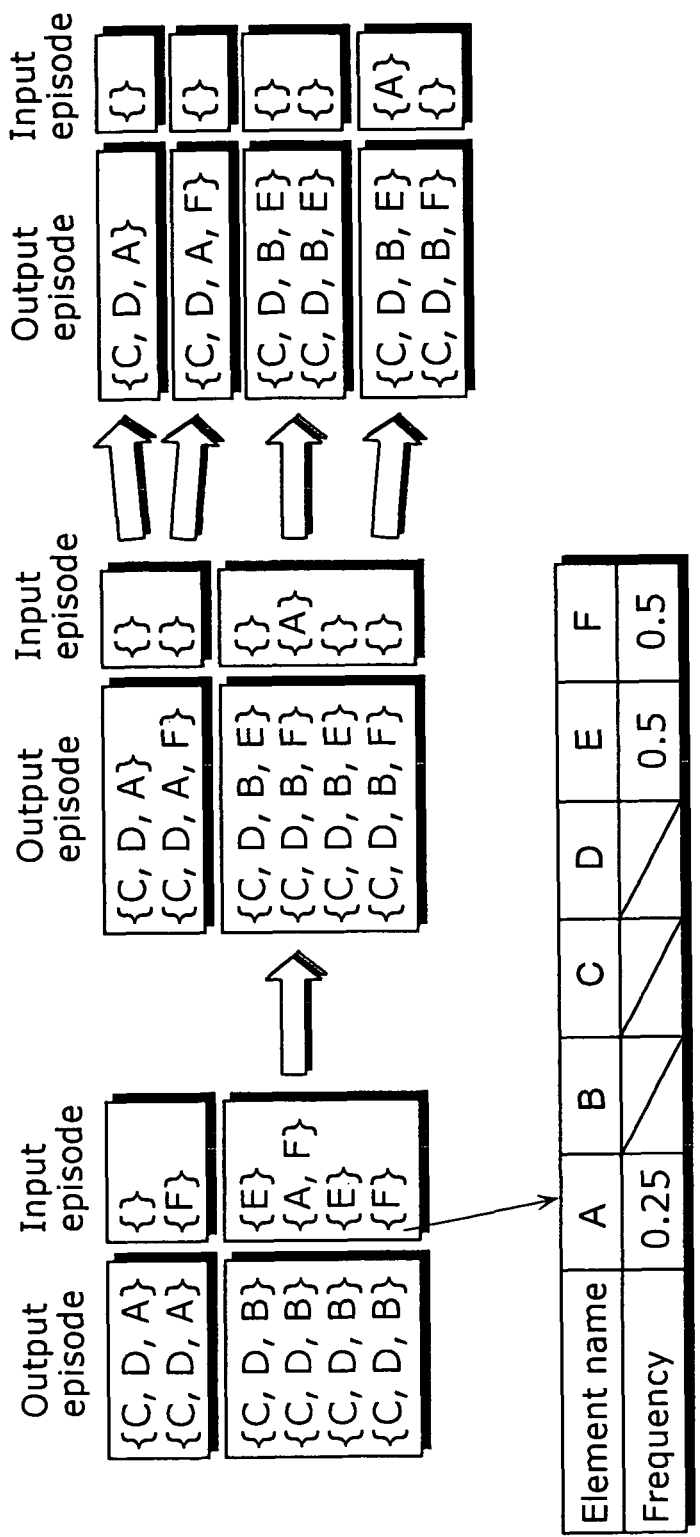
FIG. 35 is a diagram illustrating the appearance of the process in step G6 in FIG. 30 (third cycle in the repetition of steps G2 to G5).

The appearance of the process of steps G3 to G5 is as shown in FIG. 32. Here, the leftmost table shows the appearance of the process in step G3, the center table shows the appearance of the process in step G4, and the rightmost table shows the appearance of the process in step G5.

In continuing, steps G2 to G5 are repeatedly carried out for each of the classified input episode data. In the present embodiment, the course in which output episode data are created through the repeated performance of steps G2 to G5 on the classified episode data are shown in FIGS. 33 to 36. FIGS. 33 to 36 respectively show the appearance of the first, second, third, and fourth cycle of the process in steps G3 to G5.

Figure 36:
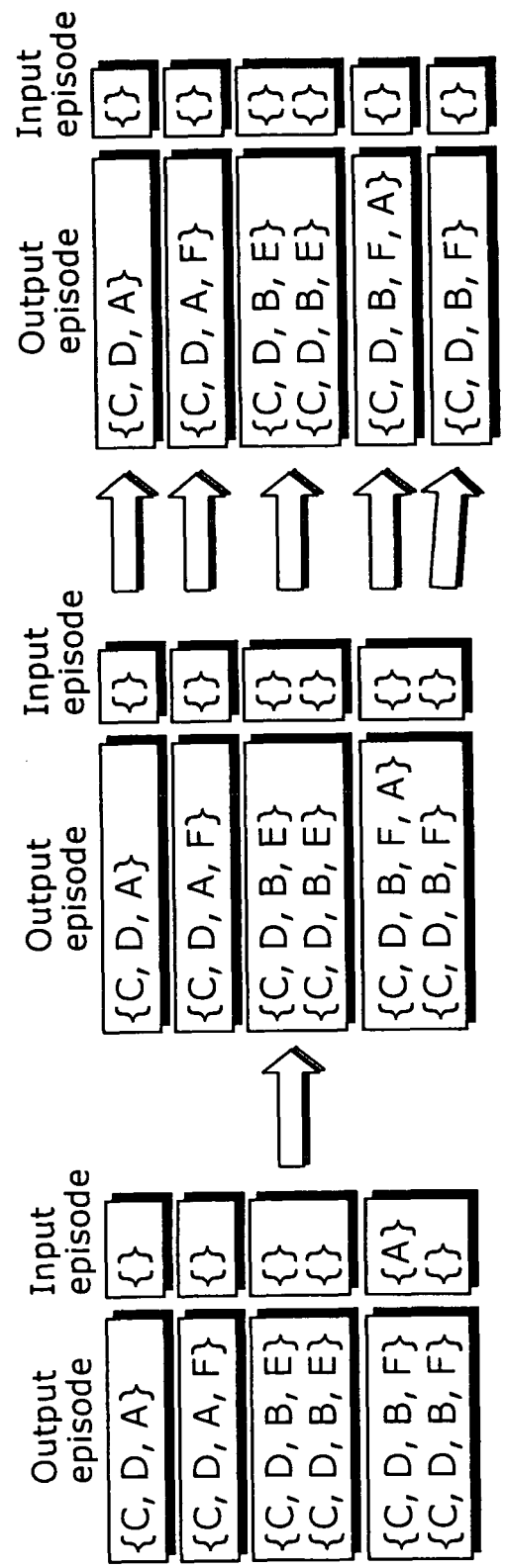
FIG. 36 is a diagram illustrating the appearance of the process in step G6 in FIG. 30 (fourth cycle in the repetition of steps G2 to G5).
Figure 37:
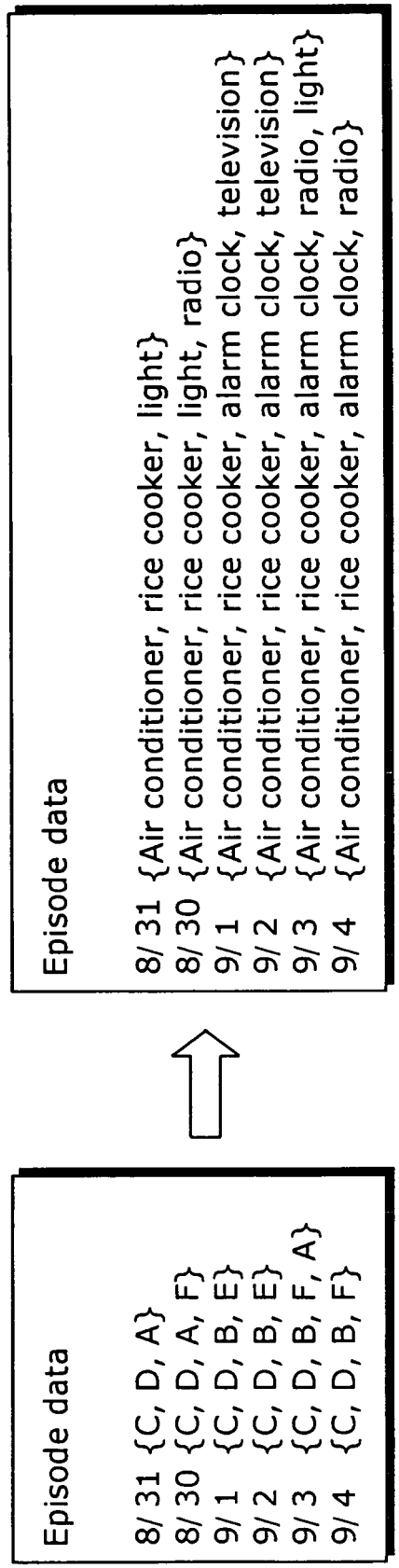
FIG. 37 is a diagram showing an example of output episode data generated by the episode sorting unit n113.

Through the aforementioned process, the episode data corresponding to the table at the right of FIG. 36, in other words, the episode data shown in FIG. 37 is obtained.

Next, the episode analysis unit n104b in the present embodiment shall be explained.

Figure 38:
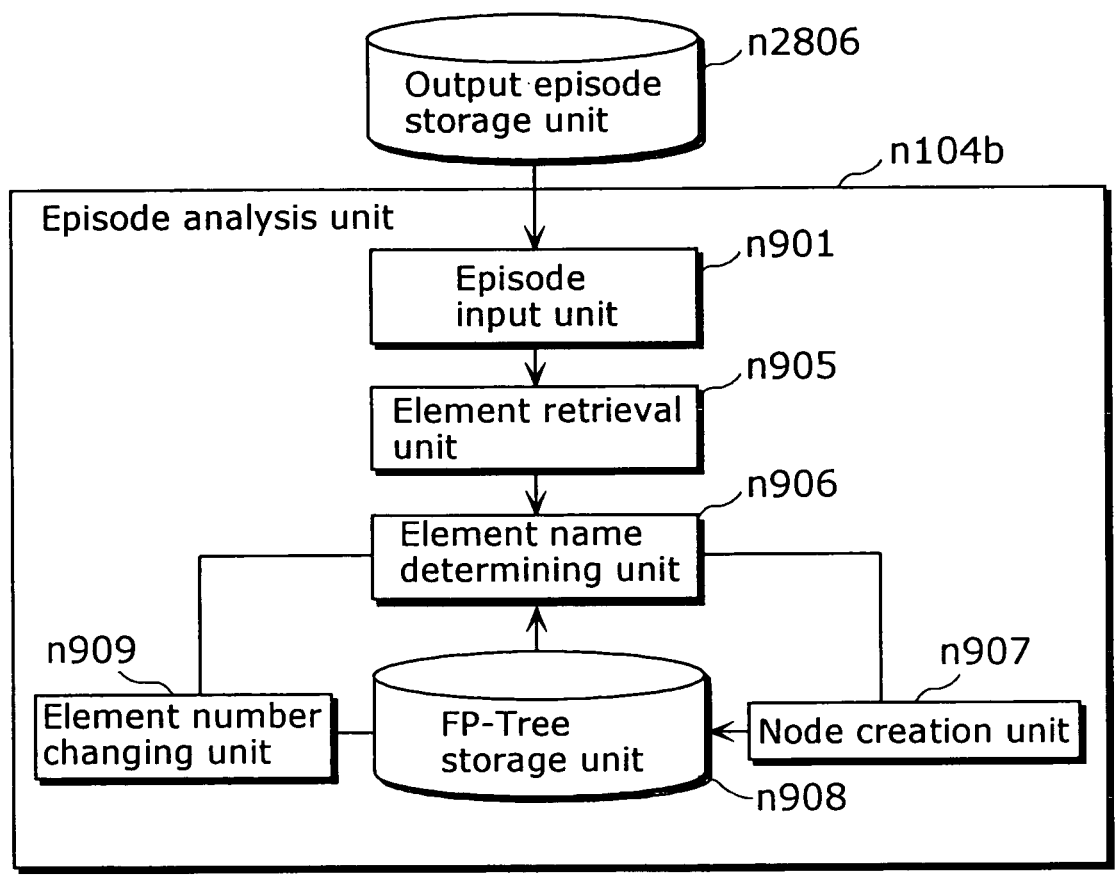
FIG. 38 is a block diagram showing the structure of the episode analysis unit.

FIG. 38 is a block diagram showing the structure of the episode analysis unit n104b. The episode analysis unit n104b includes the modules n901 and n905 to n909 that are part of the modules included in the episode analysis unit n104 in the first embodiment, shown in FIG. 10. As these modules are the same as the modules in the episode analysis unit in the first embodiment, explanation shall be omitted.

Figure 39:
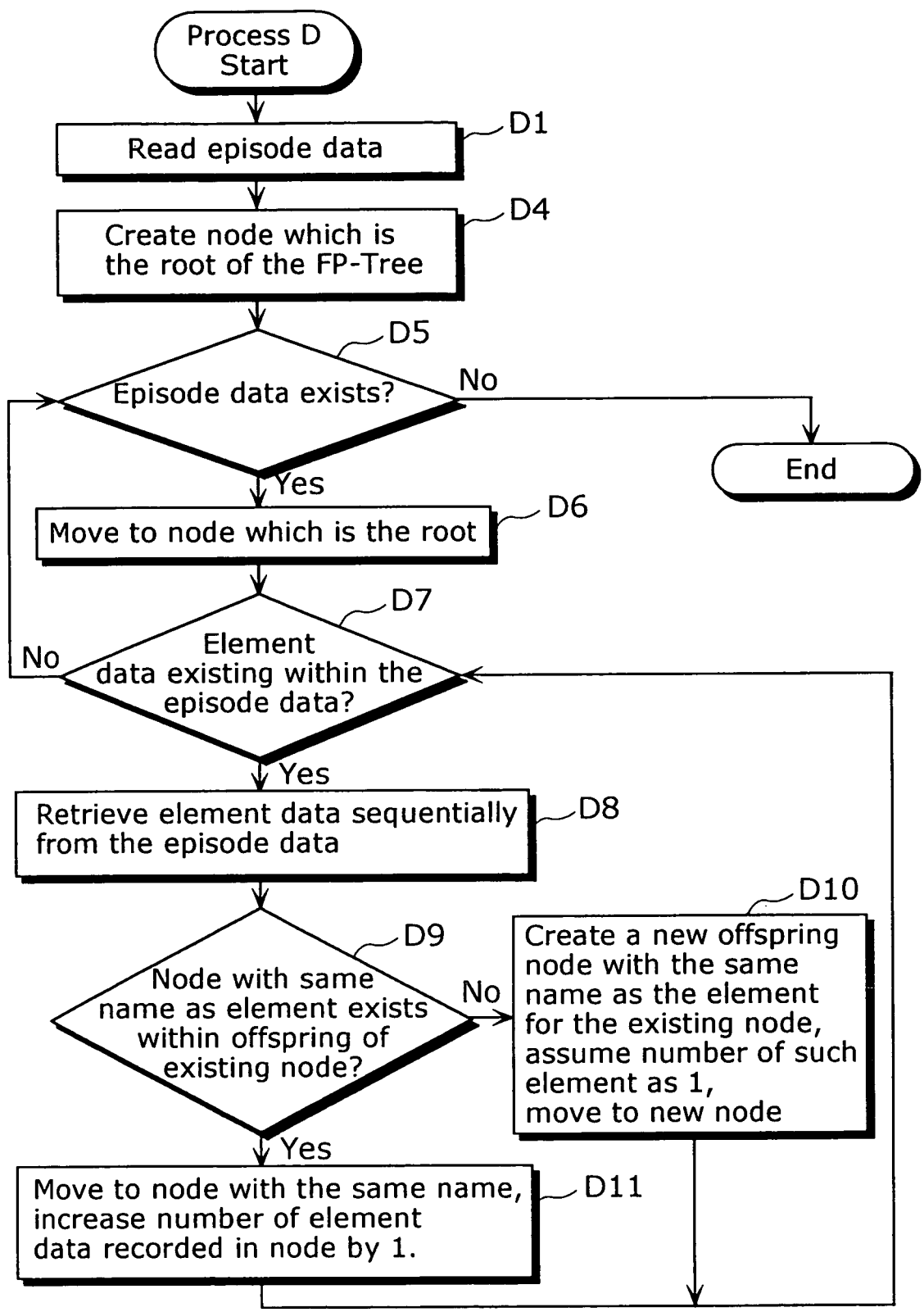
FIG. 39 is a flowchart showing the operation of the episode analysis unit.

Next, the operation of the episode analysis unit n104b (process D) shall be explained using the flowchart in FIG. 39 and the output episode in FIG. 37.

The episode input unit n901 reads the output episode data stored in the output episode storage unit n2806 (step D1). In the present embodiment, the output episode data shown in FIG. 37 is read.

The node creation unit n907 creates the node that is the root of the FP-tree (step D4). In the present embodiment, the node N1 in FIG. 14 is created.

The element retrieval unit n905 determines whether or not episode data to be added to the FP-Tree exists (step D5). In the present embodiment, the August 30 episode is selected and the process moves to step D6.

The process moves to the node that is the root of the FP-Tree (step D6). In the present embodiment, the process moves to the node N1 in FIG. 14.

The element retrieval unit n905 determines whether or not element data to be incorporated into the FP-Tree exists within the episode data (step D7). The process moves to step D8 in the case where element data exists, and moves to step D5 in the case where element data does not exist. In the present embodiment, the process moves to step 8 as element data remains in the August 30 episode data.

The element retrieval unit n905 sequentially retrieves element data from the episode data (step D8). In the present embodiment, the element data "air conditioner" is first retrieved from the August 30 episode.

The element name determining unit n906 determines whether or not a node having the same name as the element data exists in the offspring of the current node (step D9). The process moves to step D10 when a node having the same name does not exist, and moves to step D11 when a node having the same name exists. In the present embodiment, the process moves to step D10 as the existing node N1 does not have any offspring.

The node creation unit n907 creates an offspring node, for the existing node, having the same name as the element name and the process moves to the offspring node (step D10). Furthermore, the number of elements held in the offspring node is assumed as 1. In the present embodiment, a new node N2 named "air conditioner" is created for the existing node N1 (root), and the process moves to the node N2. When all processes are finished, the process moves to step D7.

The same operations in steps D7 to D10 are repeated for the remaining element data in the August 30 episode data, then the process moves to step D5.

Steps D7 to D11 are also repeated, with regard to the other episode data, in the same manner as in the life pattern extraction apparatus in the first embodiment. The process is concluded when it is determined that episode data to be incorporated in the FP-Tree does not exist.

Through the aforementioned process, it becomes possible to construct an FP-Tree having the same structure as the FP-Tree obtained in the second embodiment, shown in FIG. 25.

In this manner, the FP-Tree constructed by the episode analysis unit in the second embodiment can be made in the episode analysis unit n104b in the present embodiment by constructing an FP-Tree only once, for the episode data. In other words, according to the present embodiment, by using an order of incorporating input data into the FP-tree, which has been rearranged according to a predetermined computation procedure, at the time of construction of an FP-tree created in the extraction of life patterns, it is possible to reduce the number of times processing is carried out in the construction of the FP-Tree.

Moreover, up to this point, explanation has been made for the case in which construction of the FP-Tree is possible with consideration being given only to the parent-offspring relationship between nodes, in the FP-Tree construction in the first to third embodiments. However, having the improvement of FP-Tree detection efficiency, and so on, as an objective, there are cases in which a tree structure in consideration of a nodal relationship that is not within the parent-offspring relationship between nodes, is constructed. In this case, the method explained in the second embodiment in which an FP-Tree is broken down to subtrees then reconstructed, will entail a very complicated process. As such, in the present embodiment, the optimization of subtrees can be completed in a single construction of the FP-Tree, and the effect of being able to rapidly construct the optimized FP-Tree from the subtrees, without needing a complicated process, is achieved by carrying out the rearrangement of element data within the episode data.

Moreover, in the life pattern information extraction of the life pattern extraction apparatus n101a included in the episode analysis unit n140b in the present embodiment, life pattern extraction can be performed more rapidly than in the second embodiment. For example, it is possible to extract a device combination pattern in the use of AV devices such as a television and a video recorder by a user, and this can be used in device operation assistance such as the linked activation and linked termination of AV devices using that pattern.

Furthermore, for example, the relationship of television viewing details and air conditioner or light settings can be extracted, and it is possible to use a content viewing-dependent type of linked device control such as the automatic linked control of air conditioner and light settings, using the aforementioned relationships, to suit the content (details, genre, and so on) being viewed by the user.

Fourth Embodiment

Next, the device linkage control system in the fourth embodiment of the present invention shall be explained. The present embodiment relates to a method for extracting a device use co-occurrence pattern which is characteristic of a user, not only by distributing a part of life data stored in the life data storage unit n102 to each episode data according to episode creation rules, as with the episode creation unit n103 in the first embodiment, but by creating, from life data, new element data regarding the period of usage of devices, and creating episode data from the temporal usage relationship between the element data.

In other words, the device linkage control system in the present embodiment possesses almost the same configuration as the device linkage control system in the first embodiment except for having the characteristic of including a new episode creation unit n103a in place of the episode creation unit n103 in the first embodiment.

First, the structure of the episode creation unit n103a in the present embodiment shall be explained.

Figure 40:
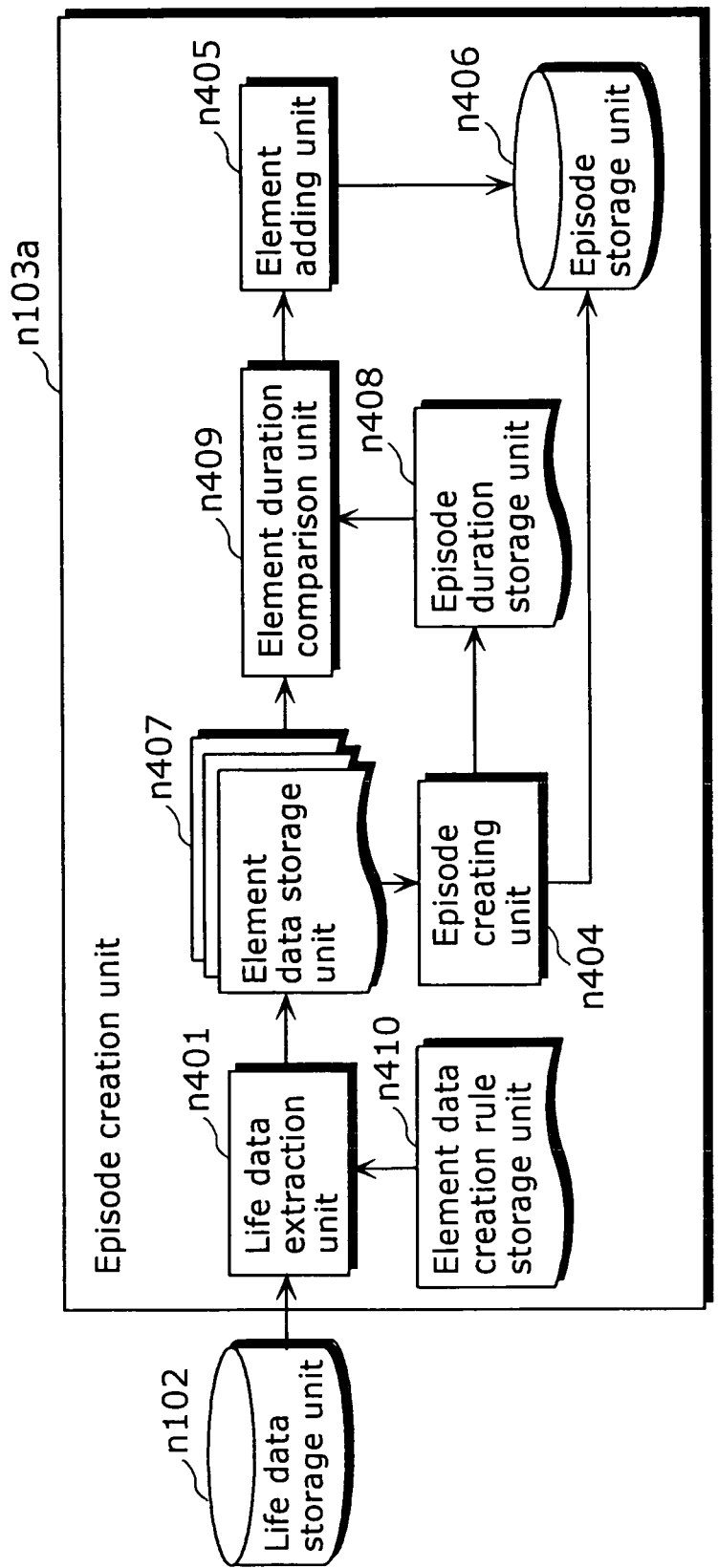
FIG. 40 is a block diagram showing the structure of the episode creation unit in the fourth embodiment of the present invention.

FIG. 40 shows the module structure of the episode creation unit n103a in the present embodiment. The episode creation unit n103a includes an element data storage unit n407, an episode duration storage unit n408, an element duration comparison unit n409, and an element data creation rule storage unit n410, in addition to the life data extraction unit n401, the episode creating unit n404, the element adding unit n405, and the episode storage unit n406, in the first embodiment, shown in FIG. 4. Furthermore, explanation for the modules n401, n404, n405, and n406 is omitted as these modules are the same as the modules in the episode creation unit n103 in the first embodiment.

The element storage unit n407 is a storage unit such as a memory for temporarily storing element data retrieved from life data, according to element data creation rules.

The episode data duration storage unit n408 is a storage unit for storing a criterion (temporal condition) for determining whether or not to add element data to episode data.

The element duration comparison unit n409 is a processing unit for determining whether or not to add element data to episode data.

The element data creation rule storage unit n410 is a storage unit for storing element data creation rules indicating details of rules for the creation of element data.

Figure 41:
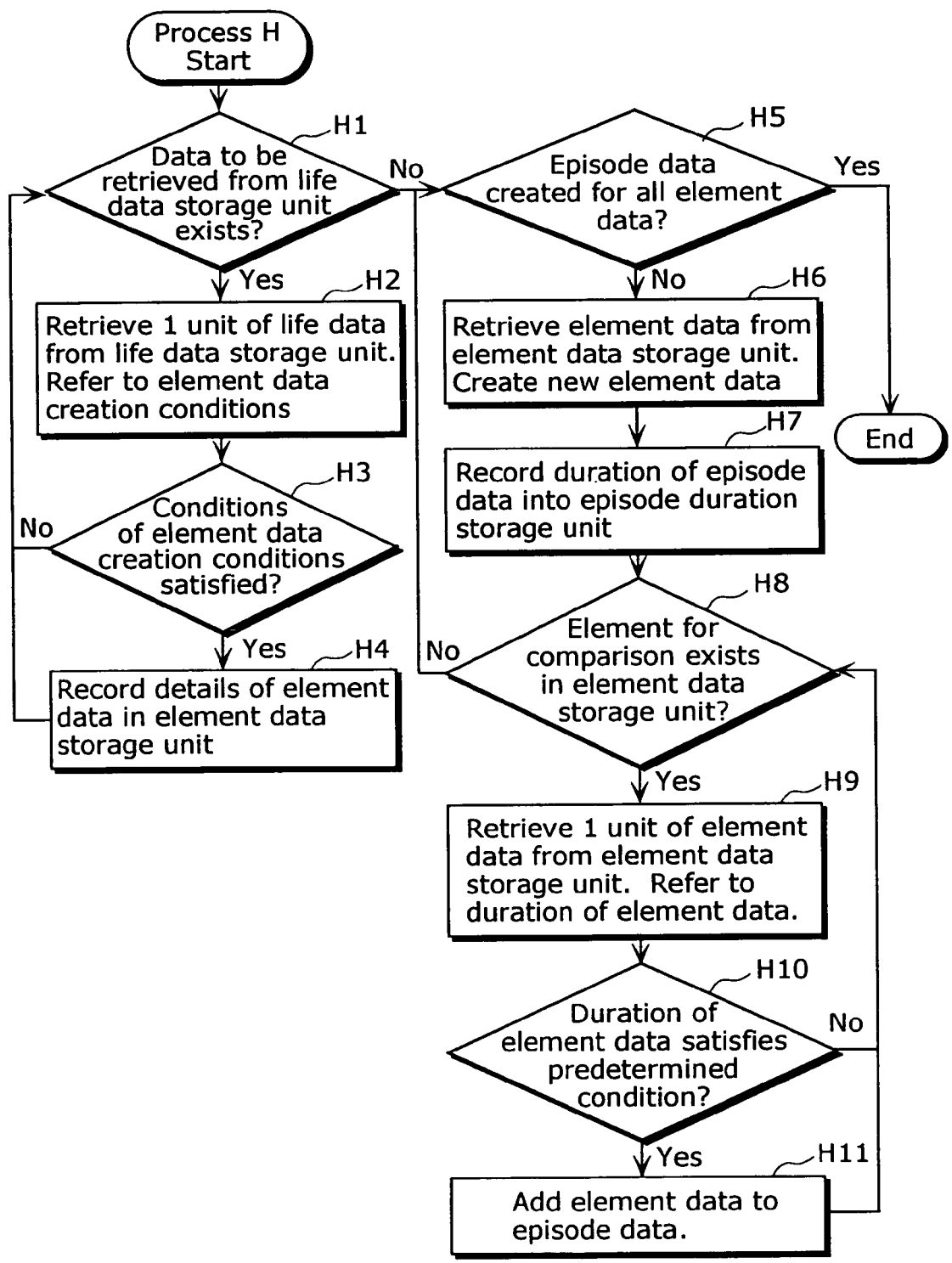
FIG. 41 is a flowchart showing the episode data extraction operation by the episode creation unit.

Next, the operation (process H) for extracting episode data from life data in the episode creation unit n103a shall be explained using the flow chart shown in FIG. 41. In the present embodiment, the case in which the element data creation rules in FIG. 42 and the life data in FIG. 43 are provided shall be explained as an example.

The life data extraction unit n401 determines whether or not life data to be retrieved exists in the life data storage unit n102 (step H1). The process moves to step H2 if life data exists, and moves to step H6 if life data does not exist. In the present embodiment, the process moves to step H2 as life data exists in the life data storage unit n102.

The life data extraction unit n401 reads life data from the life data storage unit n102, and refers to the element data creation rules held in the element data creation rule storage unit n402 (step H2). In the present embodiment, data 4101 is read from the life data in FIG. 43, and the details of the element data creation rules in FIG. 42 are referred to.

The life data extraction unit n401 determines whether or not to record a part of the life data read from the life data storage unit n102 into the element data storage unit n407 as new element data, according to the element data creation rules (step H3). The process moves to step H4 when recording. In the case where recording is not carried out, the process moves to step H1. In the present embodiment, life data 4101 that has been read out relates to the start of use of devices, and in order to comply with the details of the element data creation rules, the process moves to step H4.

The life data extraction unit n401 records the life data that has been read, into the element data storage unit n407, according to details of the element data creation rules (step H4). In the present embodiment, the type of device used, and the usage start time as well as end time information are recorded in the element data storage unit n407, according to the details of the element data creation rules shown in FIG. 42.

The processes in steps H1 to H4 are carried out in the same manner with regard to the remaining life data stored in the life data storage unit n102. After the reading of all the details stored in the life data storage unit n102 is completed, the process moves to step H5. In the present embodiment, the new element data shown in FIG. 44 are recorded in the element data storage unit n407 as the result of the processes in steps H1 to H2.

The episode creating unit n404 determines whether or not episode data have been created with regard to all the element data (step H5). The process is concluded when episode data are created for all the element data, and moves to step H6 if not. In the present embodiment, the process moves to step H6 as element data for creating episode data exists.

The episode data creating unit n404 retrieves, from the element data storage unit n407, element data for which episode data has not yet been created, and creates episode data regarding the element data (step H6). In the present embodiment, element data regarding the use of the "television" is retrieved from the element data showing in FIG. 44, and episode data regarding the use of the "television" is created.

The episode creating unit n404 records the usage start time and usage end time of the element data for which episode data is created, into the episode duration storage unit n408, as the duration of the episode (step H7). In the present embodiment, television usage start time "6:11" and end time "8:31" are recorded into the episode duration storage unit n408. This becomes the duration of the episode regarding the use of the television.

The element data duration comparison unit n409 checks whether or not element data for which a comparison of the duration of episode data and usage time of other element data is to be performed, remains in the element data storage unit n407 (step H8). The process moves to H9 if data to be performed of comparison exists, and moves to step H5 if no data remains. In the present embodiment, the process moves to step H9 as element data, such as "air conditioner" and "cooking range", that have usage time to be compared with the television exist.

The element duration comparison unit n409 reads element data from the element data storage unit n407, and refers to the episode data duration recorded in the episode duration storage unit n408 (step H9). In the present embodiment, first, element data regarding the use of the "air conditioner" is sequentially read from the element data, and the duration "start time 6:11~end time 8:31" of the episode data regarding the television is referred to.

Figure 45:
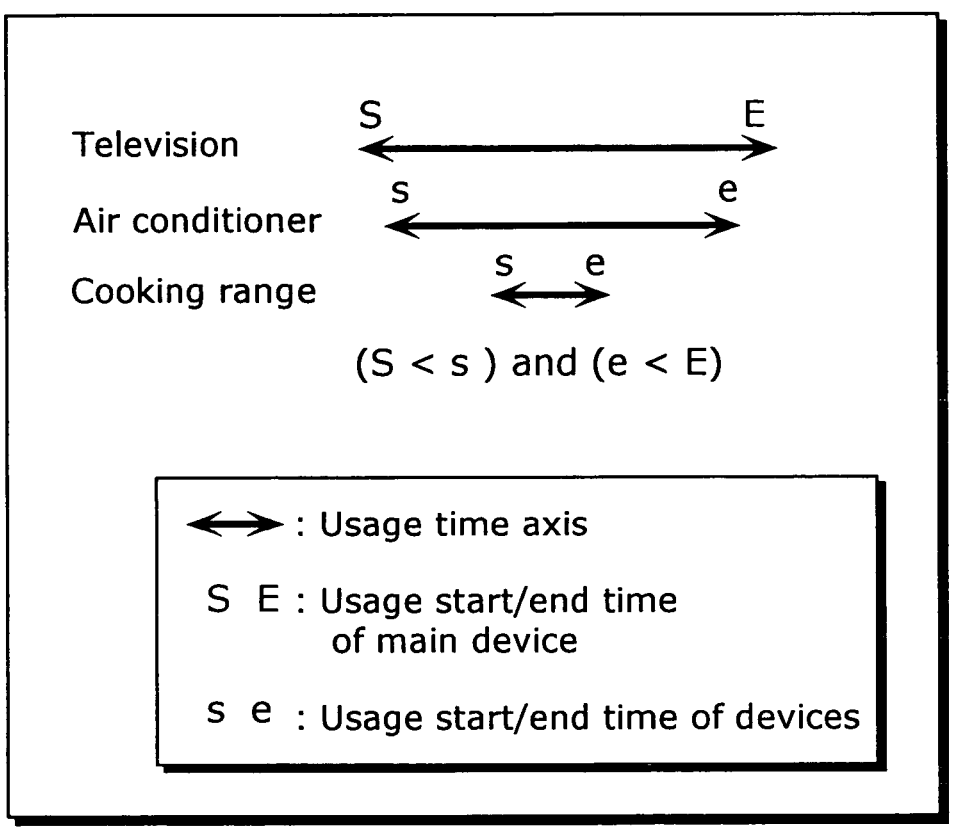
FIG. 45 is a diagram showing an example of the temporal relationship between the duration of an episode and the use time of element data, and judgment conditions.

The element duration comparison unit n409 determines whether or not the element data that has been read is within the duration of the episode data (step H10). The process moves to step H11 when the conditions are satisfied, and moves to step H8 when not satisfied. Here, as a condition for determining the temporal relationship of the episode data duration and the element data usage time, it is assumed that the usage time of each element data has to be within the episode data duration, as shown in FIG. 45. In the present embodiment, the process moves to step H11 as the usage time of the air conditioner is within the duration of the usage time of the television.

The element adding unit n405 adds the element data into the episode data. In the present embodiment, the element data "air conditioner" is added to the episode data regarding the use of the television (step H11).

By repeatedly carrying out steps H5 to H11, episode data regarding the use of element data is created. FIG. 46 shows the episode data created in the present embodiment.

The episode creation unit n103a extracts, from life data, the combination of devices that a user uses at the same time, as described above.

As explained above, in the first embodiment, details of the life data is only classified into each episode. However, in the present embodiment, new element data regarding the type and the period of use of the device is created from the life data stored in the life data storage unit n102. Due to the creation of episode data regarding the co-occurrence of these new element data, it becomes possible to create episode data representing the appearance of the device usage of the user more elaborately, and it becomes possible to perform the extraction of the life pattern of the user in greater detail. In other words, according to the present embodiment, it is possible to extract the co-occurrence pattern of device and content use which is characteristic of the user by taking the combination of devices and contents used simultaneously by a user as episode data.

Moreover, although the group of the type and period of use of a device is assumed as new element data, and episode data is created from the relationship of usage times between the element data, apart from the types of the devices, it is also possible to create element data using the type, and so on, of the functions or contents used, and create episode data from the relationship of usage times between the element data. For example, by using the element data creation rules in FIG. 47, the content viewing time and device function usage time are assumed as element data, and it is possible to create episode data indicating the relationship of the usage times of the content data and the function.

Figure 48:
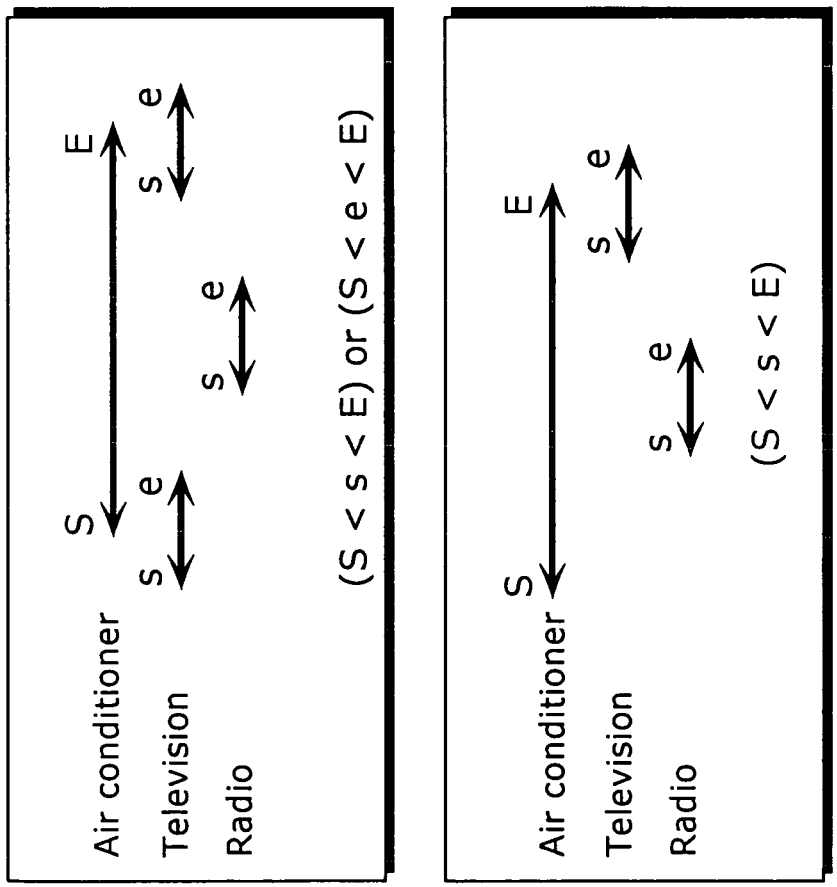
FIG. 48 is a diagram showing another example of the temporal relationship between the duration of an episode and the use time of element data, and judgment conditions.

Furthermore, although the element duration comparison unit n409 carries out determination using a temporal relation as in FIG. 45, it is also possible to create episode data by using other conditions for determination. Conditions such as those shown in FIG. 48, for example, can also be used as determining conditions for the creation of episode data. FIG. 48 shows an example (upper-left frame) of a case in which the activation time or termination time of the usage times of each element data are within the duration of the episode data, and an example (lower-left frame) in which the activation times of the usage times of each element data are within the duration of the episode data.

Moreover, in the life pattern information extraction by the life pattern extraction apparatus n101 including the episode creation unit n103 in the present embodiment, it is possible to extract the combination pattern of lights that are simultaneously on, from the time that the lights in each room are ON, for example, and it is possible to perform an operation assistance-type of linked control for the linked turning-ON, linked turning-OFF, and so on, of lighting devices.

Furthermore, for example, based on the relationship of the time frame in which applications are executed and the time frame in which contents are viewed on a PC, it is possible to extract the combination pattern of contents and applications that are simultaneously used, and it is possible to perform operation-dependent type of linked control such as the linked activation and linked termination of applications to suit the operation details in the PC.

Fifth Embodiment

Next, the device linkage control system in the fifth embodiment of the present invention shall be explained. The present embodiment relates to a method that extracts information regarding an event occurring in life from the life pattern storage unit n102 in the first embodiment, and creates, as episode data, an event-dependent device usage relationship that is characteristic of the user.

In other words, the device linkage control system in the present embodiment possesses almost the same configuration as the device linkage control system in the first embodiment except for having the characteristic of including a new episode creation unit n103b in place of the episode creation unit n103 in the first embodiment.

Figure 49:
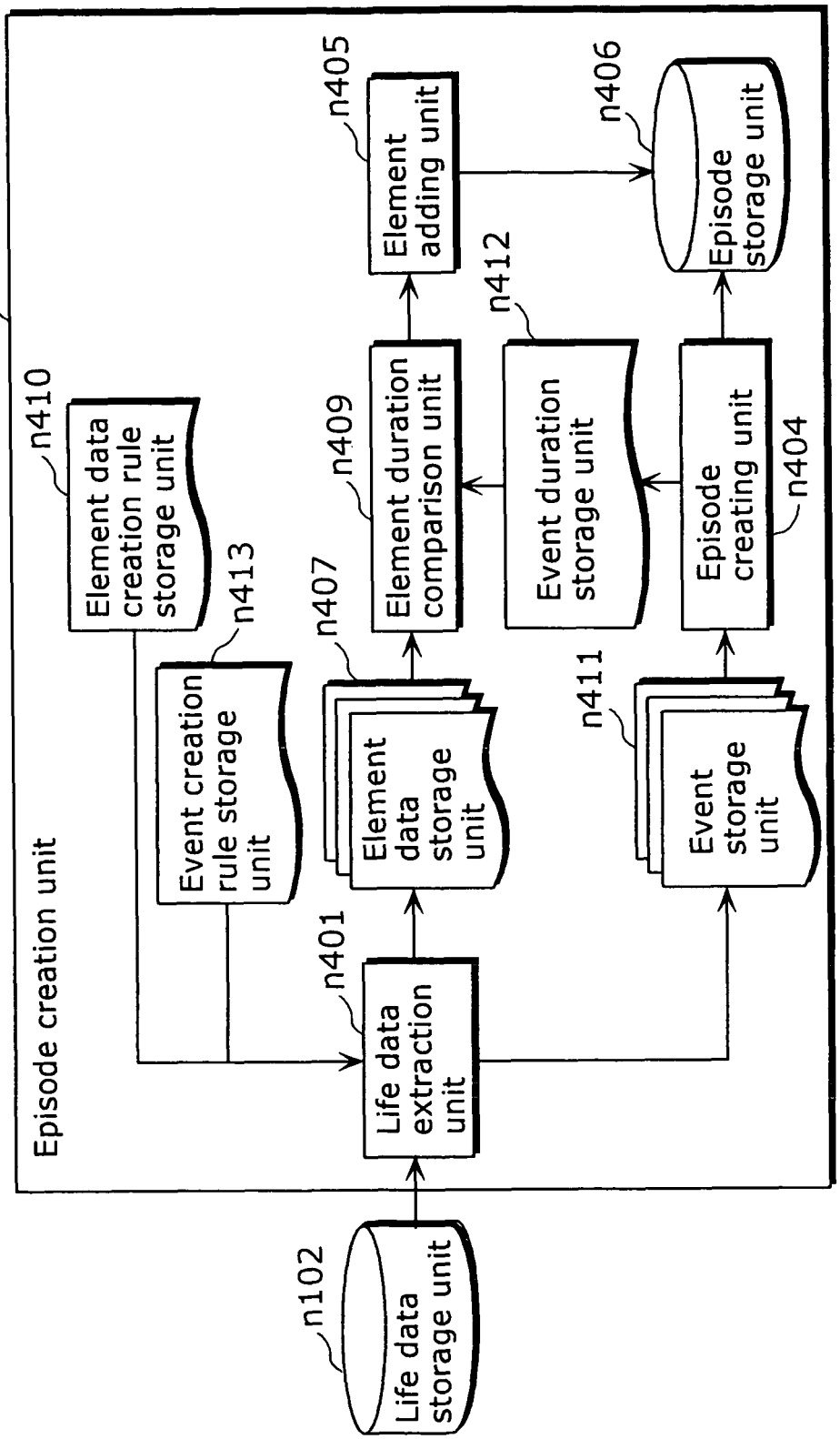
FIG. 49 is a block diagram showing the structure of the episode creation unit in the fifth embodiment of the present invention.

FIG. 49 is a block diagram showing the structure of the episode creation unit n103b in the present embodiment. The episode creation unit n103 includes an element data creation rule storage unit n410, an event storage unit n411, an event duration storage unit n412, and an event creation rule storage unit n413, in addition to the modules n401 to n409 included in the episode creation unit n103a in the fourth embodiment. Furthermore, explanation for the modules n401 to n409 is omitted as these modules are the same as the modules in the fourth embodiment.

The element data creation rule storage unit n410 is a storage unit for storing element data creation rules indicating the details of element data creation rules.

The event storage unit n411 is a storage unit such as a memory for recording event information recorded in life data.

The event duration storage unit n412 is a storage unit such as a memory for recording the duration in which an event has taken place.

The event creation rule storage unit n413 is a storage unit for storing event creation rules indicating conditions for extracting events from life data.

Figure 50:
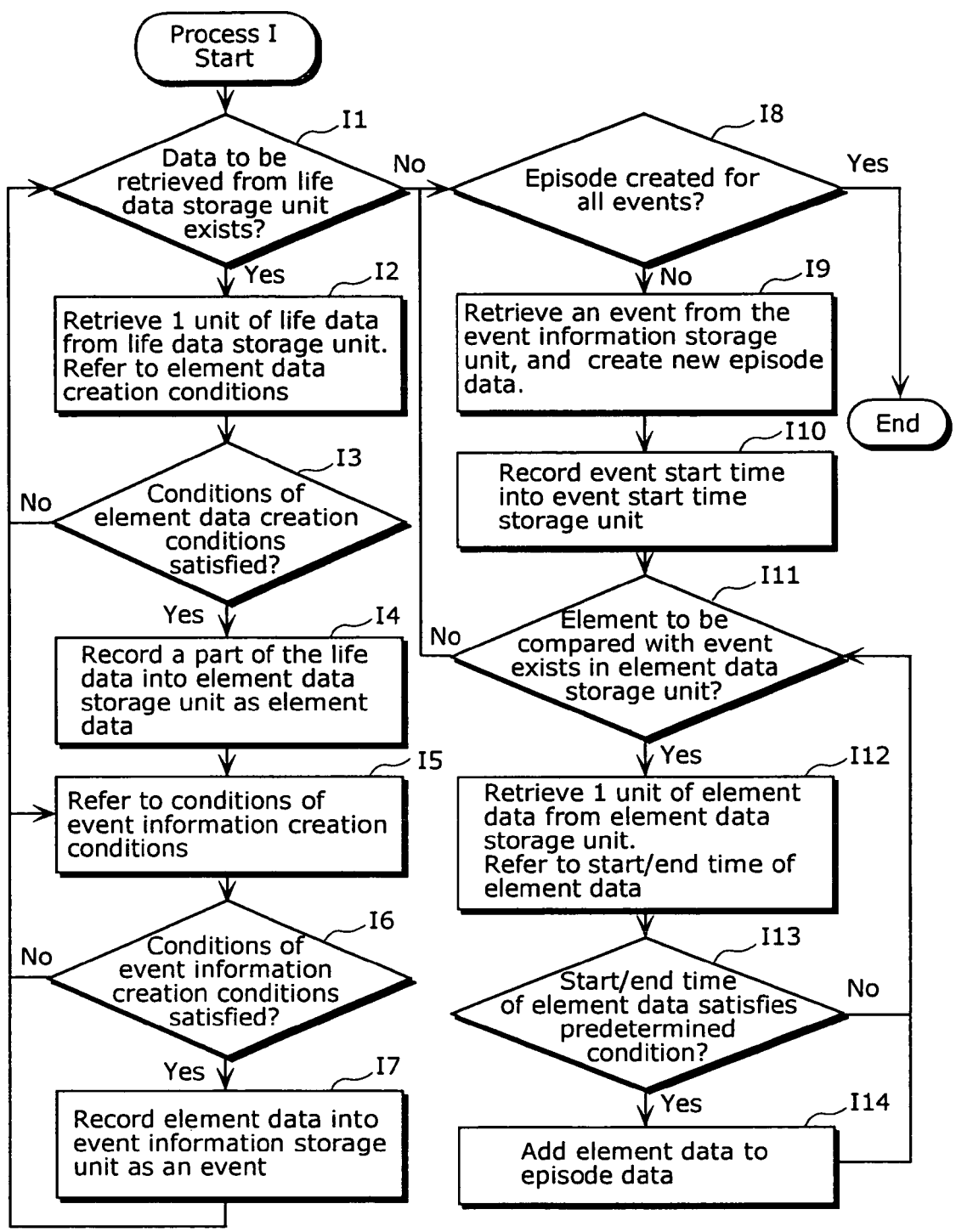
FIG. 50 is a flowchart showing the episode data extraction operation by the episode creation unit.

Next, the operation (process I) in which episode data is extracted from life data, in the episode creation unit, shall be explained using the flowchart shown in FIG. 50. In the present embodiment, explanation shall be carried out, taking as an example, the case in which the element data creation rules shown in FIG. 42, the event creation rules shown in FIG. 51, and the life data in FIG. 43 are provided.

In the same manner as in the first embodiment, life data is read from the life pattern storage unit n102, and element data is created according to the element data creation rules and recorded in the element data storage unit n407 (step I1 to I4). In the present embodiment, element data is extracted from the life data in FIG. 43 according to the element data creation rules in FIG. 42, and the element data shown in FIG. 44 is recorded in the element data storage unit n407.

The life data extraction unit n401 refers to the event creation rules recorded in the event creation rule storage unit n413 (step I5). In the present embodiment, the event creation rules in FIG. 51 are referred to.

The life data extraction unit n401 determines whether or not the life data complies with the event creation rules (step I6). Here, the process moves to step I7 if the event creation rules are satisfied, and moves to step I1 if not satisfied. In the present embodiment, data 4101 is first read from the life data storage unit n102, and as its details comply with the details "turning-ON the power of a device" in the event creation rules, the process moves to step I7.

The life data extraction unit n401 records the details of the life data, as event information, into the event storage unit n411 (step I7). In the present embodiment, the details of the first five minutes from the turning-ON of a television is recorded as a television turning-ON event in the event storage unit n411, according to the details of the event creation rules.

Element data and event information are created by repeatedly carrying out the processes in steps I1 to I4 and steps I5 to I7, and after the retrieval of all life data from the life data storage unit n102 is complete, the process moves to step I8. In the present embodiment, the element data shown in FIG. 44 and the event data shown in FIG. 52 are created from the life data shown in FIG. 43, through steps I1 to I4 and steps I5 to I7.

The episode data creating unit n404 retrieves, from the event storage unit, one piece of event information for which event data has not been created, and creates episode data (step I9). In the present embodiment, event information regarding the "turning-ON of the television" is retrieved from the event data shown in FIG. 52, and episode data regarding the "television turning-ON" event.

The episode creating unit n404 records, into the event duration storage unit n412, the duration of the event from which the episode data was created (step I10). In the present embodiment, the duration "6:11-6:16" of the television turning-ON event is recorded in the event duration storage unit n412.

The element duration comparison unit n409 checks whether or not element data that needs to be compared with the duration of the episode exists in the element data storage unit n407 (step I11). The process moves to step I12 if element data to be compared exists, and moves to step I8 if element data does not exist. In the present embodiment, the process moves to step I12 as element data such as "air conditioner" and "cooking range" having usage times to be compared with the event information exists.

The element duration comparison unit n409 reads element data from the element data storage unit n407, and refers to the episode duration recorded in the event duration storage unit n408 (step I12). In the present embodiment, element data regarding the use of the "television" is read from the element data, and the duration "6:11-6:16" of the episode data regarding the "television turning-ON" event is referred to.

Figure 53:
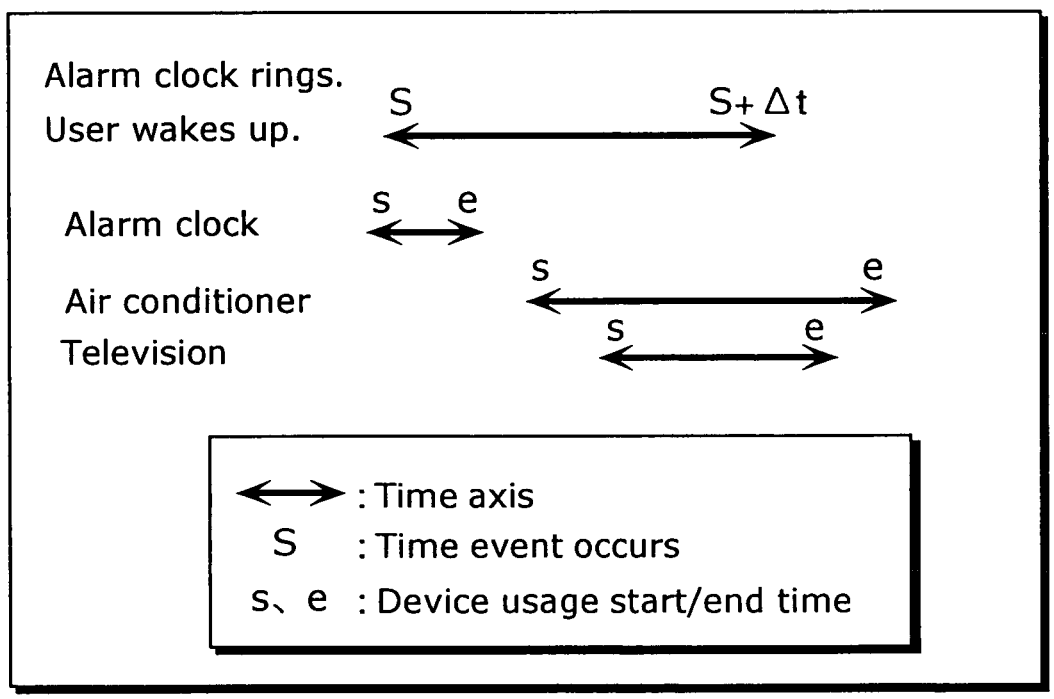
FIG. 53 is a diagram showing an example of the temporal relationship between the duration of an episode and the use time of element data, and judgment conditions.

The element duration comparison unit n409 determines whether or not the element data that was read is within the duration of the episode data (step I13). Here, the process moves to step I14 if conditions are satisfied, and moves to step I11 if not satisfied. Here, the inclusion of the duration of each element data within the duration of the episode data, as shown in FIG. 53, is assumed as a condition for determining the temporal relationship of the episode data and the element data. In the present embodiment, the process moves to step I11 as the element data "alarm clock" is not included in the duration of the episode data "television turning-ON".

In step I11, the steps I11 and I12 are performed in the same manner even in the case where data regarding the use of the data element "air conditioner" is retrieved.

Next, as the element data "air conditioner" is included in the duration of episode data regarding the "television turning-ON" event in step I13, the process moves to step I14.

The element adding unit n405 adds the element data to the episode data. In the present embodiment, the element data "air conditioner" is added to the episode data regarding the "television turning-ON" event (step I14).

By repeatedly performing the aforementioned steps I8 to I14, the episode data shown in FIG. 54 is extracted.

In this manner, through the addition of a module for identifying, from life data, event information occurring within the daily life of the user, it is possible to create episode data indicating the relationship of the time of occurrence of each event and the usage time of each device, and it is possible to extract the device usage pattern of the user. In other words, according to the present embodiment, by assuming the combination of devices and contents used by the user under a predetermined event, it is possible to extract a co-occurrence pattern for event-dependent device and content use, which is characteristic of the user.

Moreover, although explanation is carried out in the present embodiment having the type of a device as element data, it is also possible to have, as element data, the type of the function or content used, and create episode data indicating the co-occurrence relationships of the event and the above usages.

Furthermore, although the element duration comparison unit n409 carries out determination using a temporal relationship as in FIG. 53, it is possible to create episode data using other conditions for determining. Conditions such as those shown in FIG. 55, for example, can be used as determination conditions for creating episode data. FIG. 55 shows an example (upper-left frame) where the activation time for the usage time of each element data comes after the activation time of the episode data, and the termination time of the element data comes before the termination time of the episode data, and an example (lower-left frame) where the activation time or the termination time for the usage time of each element data is within the duration of the episode data.

Furthermore, although in the present embodiment, the creation of episode data regarding the use of other devices in relation to the activation of a device is carried out by using the event creation rules in FIG. 51, it is also possible to create episode data regarding events other than those mentioned, by using event creation rules other than those in FIG. 51.

Furthermore, in the life pattern extraction by the life pattern extraction apparatus n101 including the episode creation unit n103 in the present embodiment, by extracting the relationship of the usage times for a digital door key operation event upon coming home, turning-ON the lights of the house, turning-ON the power of the television and air conditioner, and so on, for example, it is possible to perform an event-dependent type of linked control such as performing the linked activation of devices within the household, in time with the coming home event.

Sixth Embodiment

Next, the device linkage control system in the sixth embodiment of the present invention shall be explained. The present embodiment relates to a method for identifying, in an FP-Tree, element data with a strong co-occurrence relationship even among element data included in episode data having a low number of appearances.

In other words, the device linkage control system in the present embodiment possesses almost the same configuration as the device linkage control system in the first embodiment except for having the characteristic of including a new life pattern interpretation unit n105a in place of the life pattern interpretation unit n105 in the first embodiment.

Figure 56:
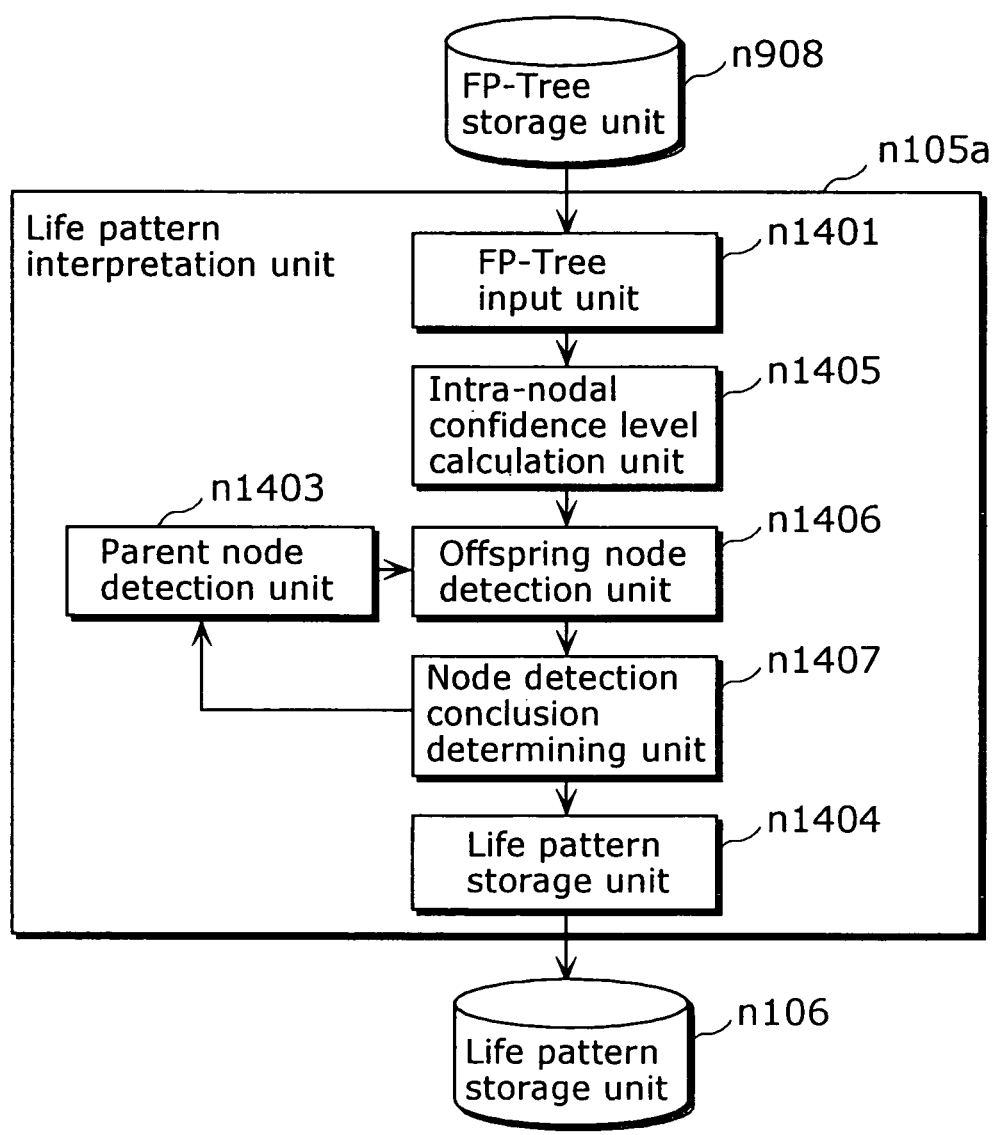
FIG. 56 is a diagram showing another example of the temporal relationship between the duration of an episode and the use time of element data, and judgment conditions.

FIG. 56 shows the structure of the modules of the life pattern interpretation unit n105a in the present embodiment. The life pattern interpretation unit n105a includes an intra-nodal confidence level calculation unit n1405 and a node detection conclusion determining unit n1407 in addition to the modules n1401 to n1404 included in the life pattern interpretation unit n105 in the first embodiment, shown in FIG. 15. Furthermore, explanation on the modules n1401 to n1404 shall be omitted as these modules are the same as the modules in the first embodiment.

The intra-nodal confidence level calculation unit n1405 is a processing unit for obtaining the confidence levels between each of the nodes.

The node detection conclusion determining unit n1407 is a processing unit for determining whether or not detection of all nodes is completed.

Figure 57:
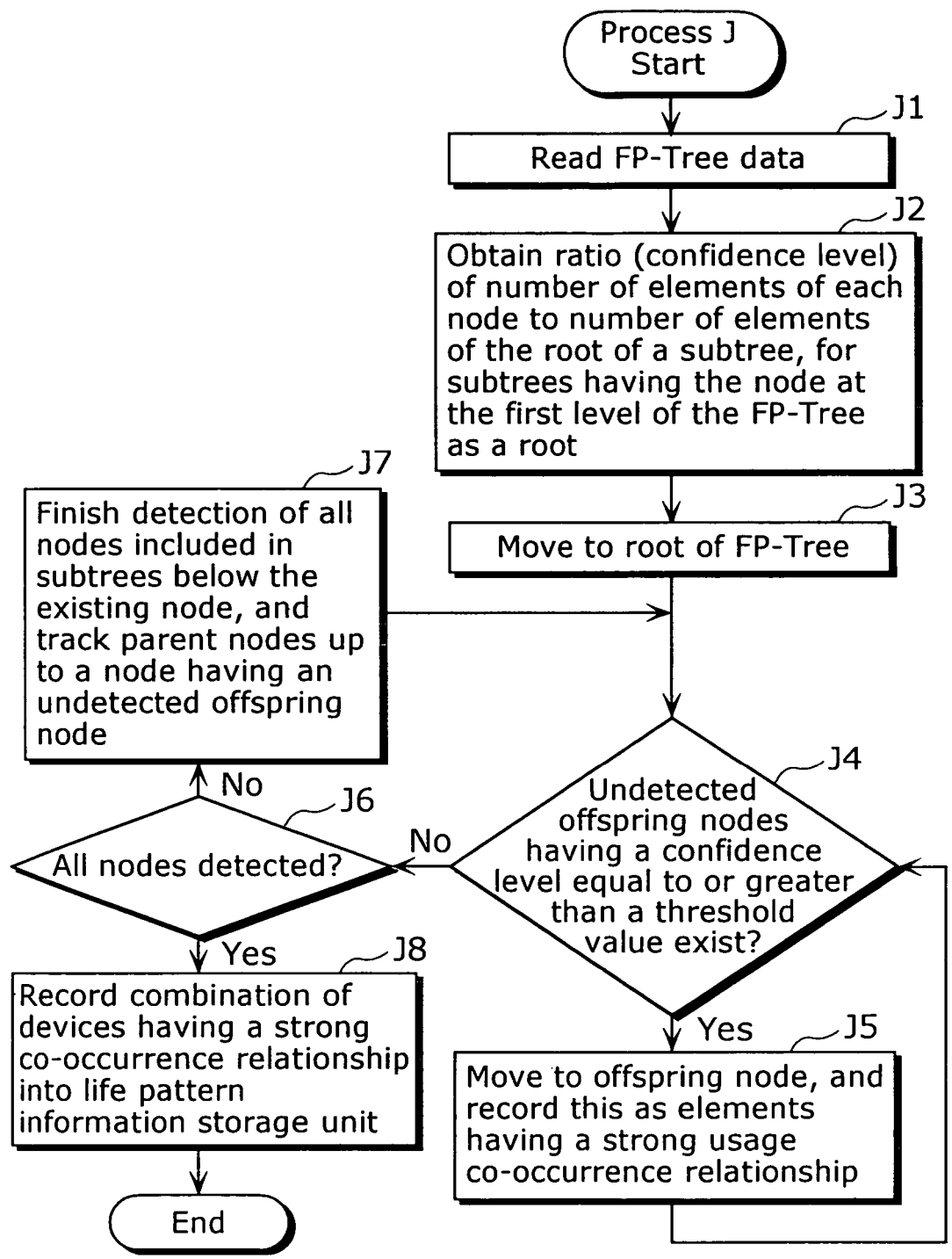
FIG. 57 is a flowchart showing the co-occurrence pattern extraction operation by the life pattern interpretation unit.
Figure 58:
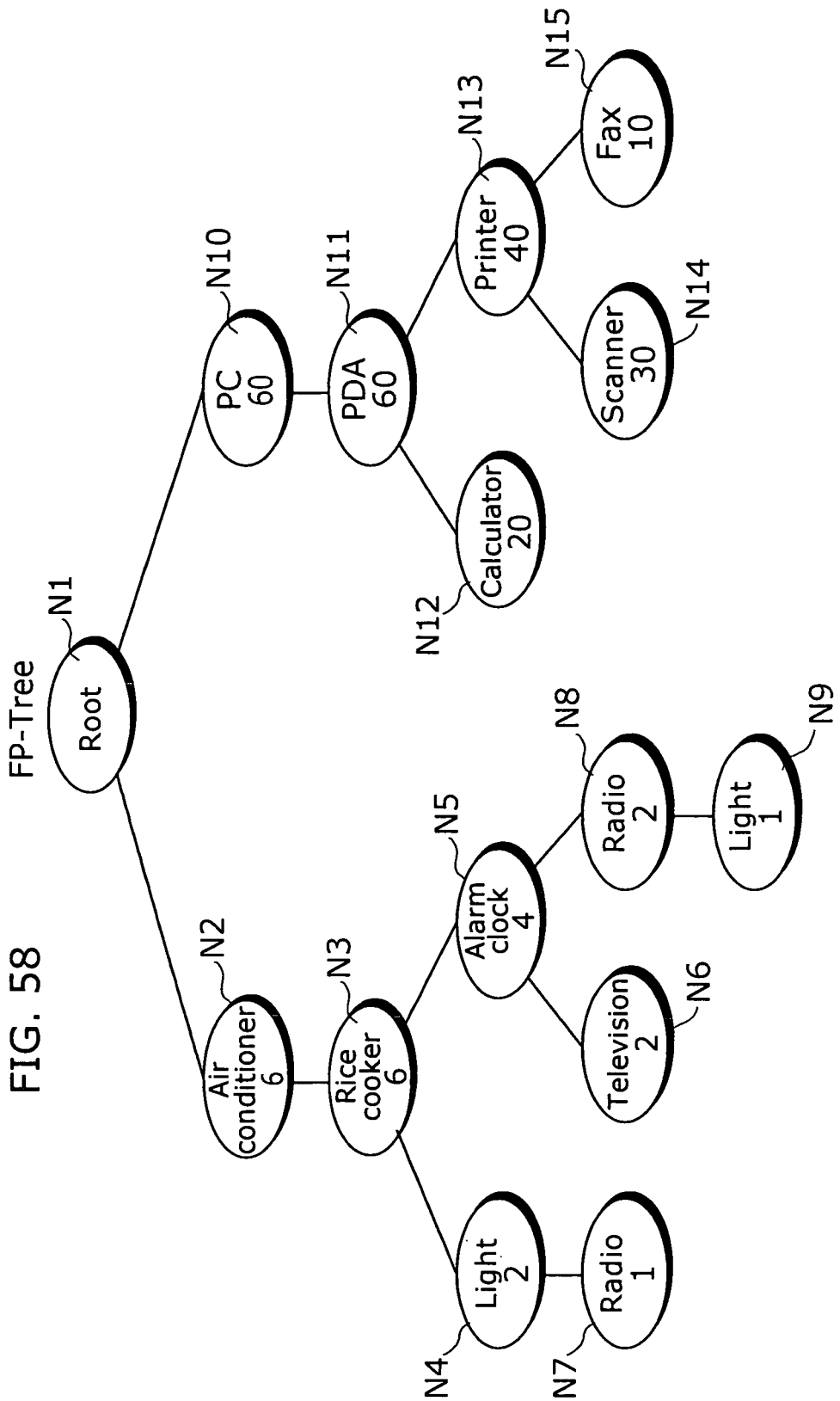
FIG. 58 is a diagram showing an example of an FP-Tree to explain the co-occurrence pattern extraction operation by the life pattern interpretation unit.

The method (process J), used in the life pattern interpretation unit n105a constructed in the aforementioned manner, for extracting a co-occurrence pattern of element data, which is characteristic of the user, in the case where the FP-Tree shown in FIG. 58 is provided; shall be explained using the flowchart shown in FIG. 57.

The FP-Tree input unit n1401 reads FP-Tree data. In the present embodiment, the FP-Tree shown in FIG. 57 is read (step J1).

The intra-node confidence level calculation unit n1405 obtains the confidence level between each of the nodes using the formula below (step J2).

$$\text{Confidence level of element } B \text{ with respect to element } A = \frac{\text{Number of episodes including both element } A \text{ and element } B}{\text{Number of episodes including element } A}$$

Figure 59:
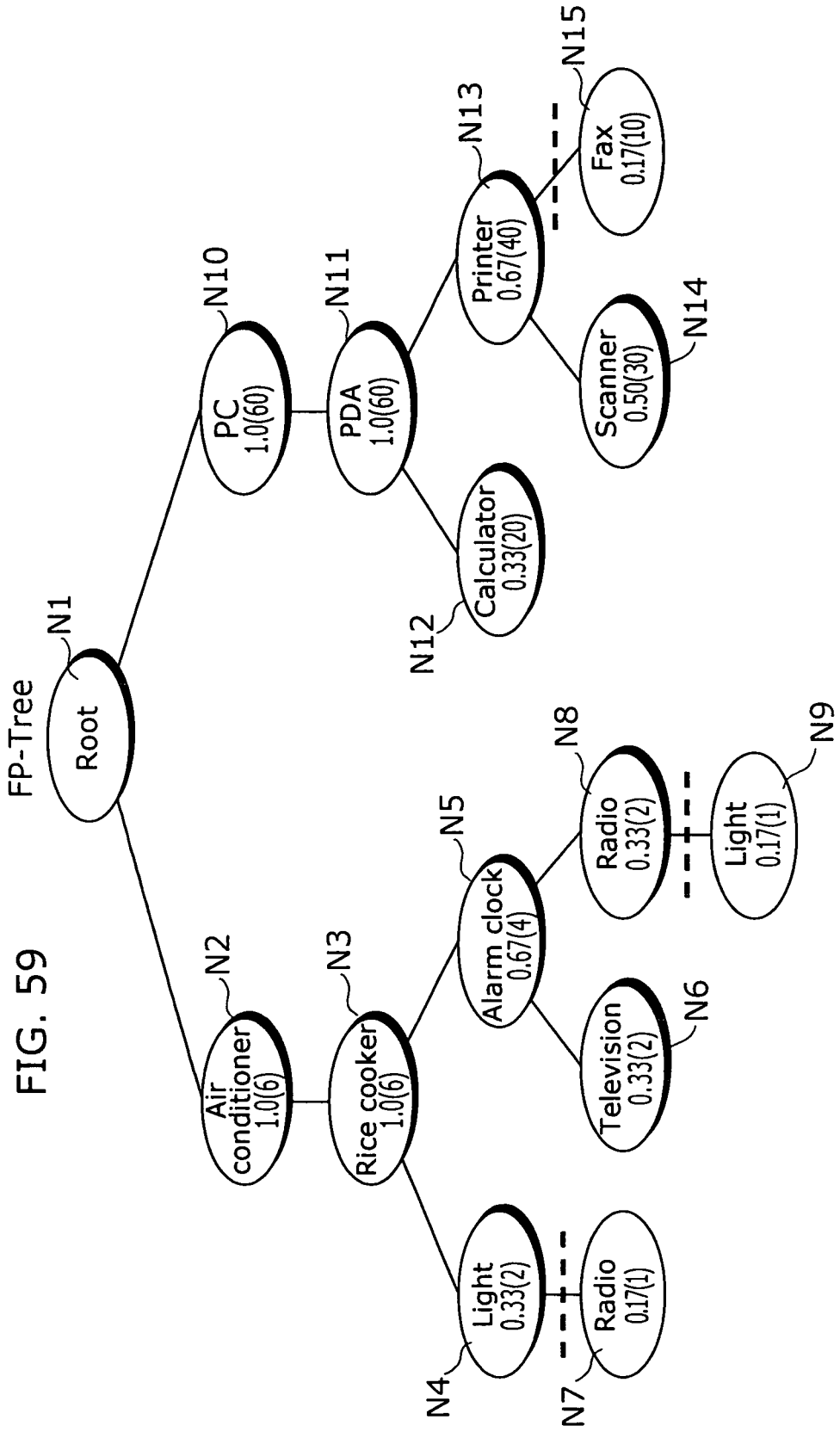
FIG. 59 is a diagram showing the confidence level obtained with regard to the subtree having the node N2 as a root and the subtree having the node N10 as a root, in FIG. 58.

In the present embodiment, the confidence levels between the nodes and root of respective subtrees is obtained using the formula, with regard to the subtree having a node N2 as a root and the subtree having a node N10 as a root, in FIG. 58. FIG. 59 shows the results in the obtainment of the confidence levels.

The process moves to root of the FP-Tree (step J3). In the present embodiment, the process moves to the node N1 in FIG. 59.

The offspring node detection unit n1406 determines whether or not there exists, for the existing node, an offspring node that is still undetected and has a confidence level value which is equal to or greater than a threshold value (step J4). The process moves to step J5 if an offspring node satisfying the conditions exists, and moves to step J6 if not. In the present embodiment, the confidence level threshold value is assumed as 0.3, and as the result of the detection of undetected nodes having a confidence level equal to or greater than the threshold value, among offspring nodes of the node N1, reveals that nodes (N2, N10) satisfying the conditions exist, the process moves to step J5.

The process moves to the offspring nodes, and the element name stored in the node is recorded as being an element with a strong co-occurrence relationship with other elements (step J5). In the present embodiment, first the process moves to node N2, and the element name "air conditioner" stored in the node N2 is recorded.

Steps J4 and J5 are repeated, and the process moves up to a node that does not have an offspring node that satisfies the conditions. At this time, the element name stored in the node to which the process has moved is recorded as an element having a strong co-occurrence relationship with other elements. In the present embodiment, after moving to a node N4 in FIG. 59, the process moves to step 36 as offspring nodes satisfying the conditions no longer exist.

The node detection conclusion determining unit n1407 checks whether or not all nodes have been detected (step J6). The process moves to step J8 if all nodes have been detected, and moves to step J7 if an undetected node exists. In the present embodiment, the process moves to step J7 as an undetected node exists.

The parent node detection unit n1403 tracks parent nodes until it reaches a node having an offspring node that satisfies the conditions (step J7). In the present embodiment, the process moves from the node N4 to a node N3 having offspring nodes satisfying the conditions.

After detection of all nodes through the repetition of steps J4 to J7 is concluded, the process moves to step J8.

The life pattern storage unit n1404 records, into the life pattern storage unit n106, the nodes with a confidence level equal to or higher than the threshold value resulting from the detection, as the combination of element data having strong co-occurrence relationships (step J8). In the present embodiment, the details in FIGS. 60A and 60B are recorded into the life pattern storage unit n106 as life pattern information.

According to the explanation above, in the present embodiment, it is possible to extract the combination of elements having a strong co-occurrence relationship, meaning the combination of elements which are characteristic of the user, regardless of the number of appearances of episode data, by obtaining the confidence level of element data recorded in each node. In other words, according to the present embodiment, it is also possible to extract the co-occurrence pattern included in episodes with a low number of appearances by obtaining the confidence level among nodes, with respect to the number of element data recorded in each node within the FP-Tree, and limiting the coverage of the frequency pattern detection to the nodes having a confidence level which is equal to or higher than the threshold value.

Moreover, in the life pattern extraction by the life pattern extraction apparatus n101 including the life pattern interpretation n105a in the present embodiment, even in the case where, in the course of one week, a PC and audio equipment are used on weekdays and the television and video deck are used on Saturday and Sunday, for example, it is possible to extract the combination patterns of the PC and audio equipment, and the television and video deck regardless of the number of times device usages are combined, and it is possible to carry out linked control such as operation assistance during the use of these devices.

Figure 61:
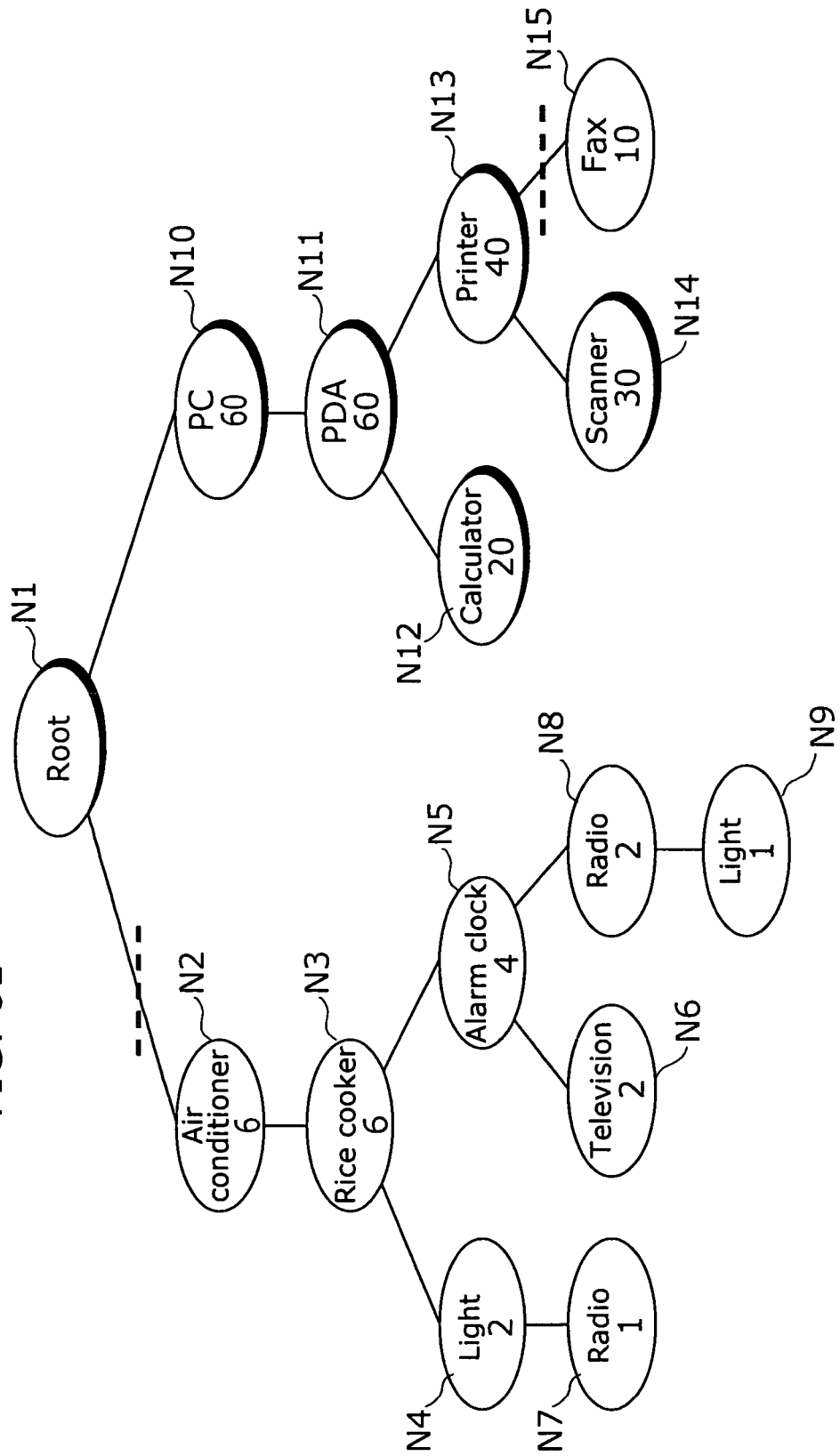
FIG. 61 is a diagram showing an example of the extraction of life pattern information made from the combination of element data having a strong co-occurrence relationship, with the number of elements as a threshold value.

Furthermore, although the combination of element data having a strong co-occurrence relationship is executed using the confidence levels for the roots of each subtree in the present embodiment, it is also possible to use the number of elements in each node, in place of the aforementioned confidence levels. For example, as shown in FIG. 61, the same result can also be obtained by recording the nodes having a number of elements exceeding ten into the life pattern storage unit n106, as the combination of element data having a strong co-occurrence relationship.

Next, the concrete structure and operation of the life data recording apparatus n107 that performs the recording of a device use history and a content viewing history of the user, as life data, into the life data storage unit n102, and the linked device control apparatus n108 that links and controls a plurality of devices using the life pattern information of the user shall be explained. The explanation shall be made, using as an example, a system which, in the case where a user changes the timer setting of a random device, identifies the devices that operate in linkage with the random device, and performs the linked control of the timer setting details of the identified devices.

Here, the timer linkage setting system made up of the life data recording apparatus n107 and linked device control apparatus n108 is a system that sets or changes the timer settings of a plurality of devices. The system includes: a timer setting detail notification unit for notifying a timer management unit of the details of a timer setting or changing in at least one device; a timer management unit for managing the timer setting details (preset time, and so on) of each of the devices, and determining, based on the timer setting details notified by the device, timer change information for changing the timer setting details of the other devices; and a timer setting detail changing unit for changing the timer setting of each of the devices based on the timer setting details determined by the timer management unit. When the timer setting details of a random device which is a part of the plurality of devices is changed, the timer management unit is notified of the changed setting details. The timer management unit determines, as timer change information, the timer setting details of the linked devices, and notifies this to the timer setting detail changing unit.

Figure 62:
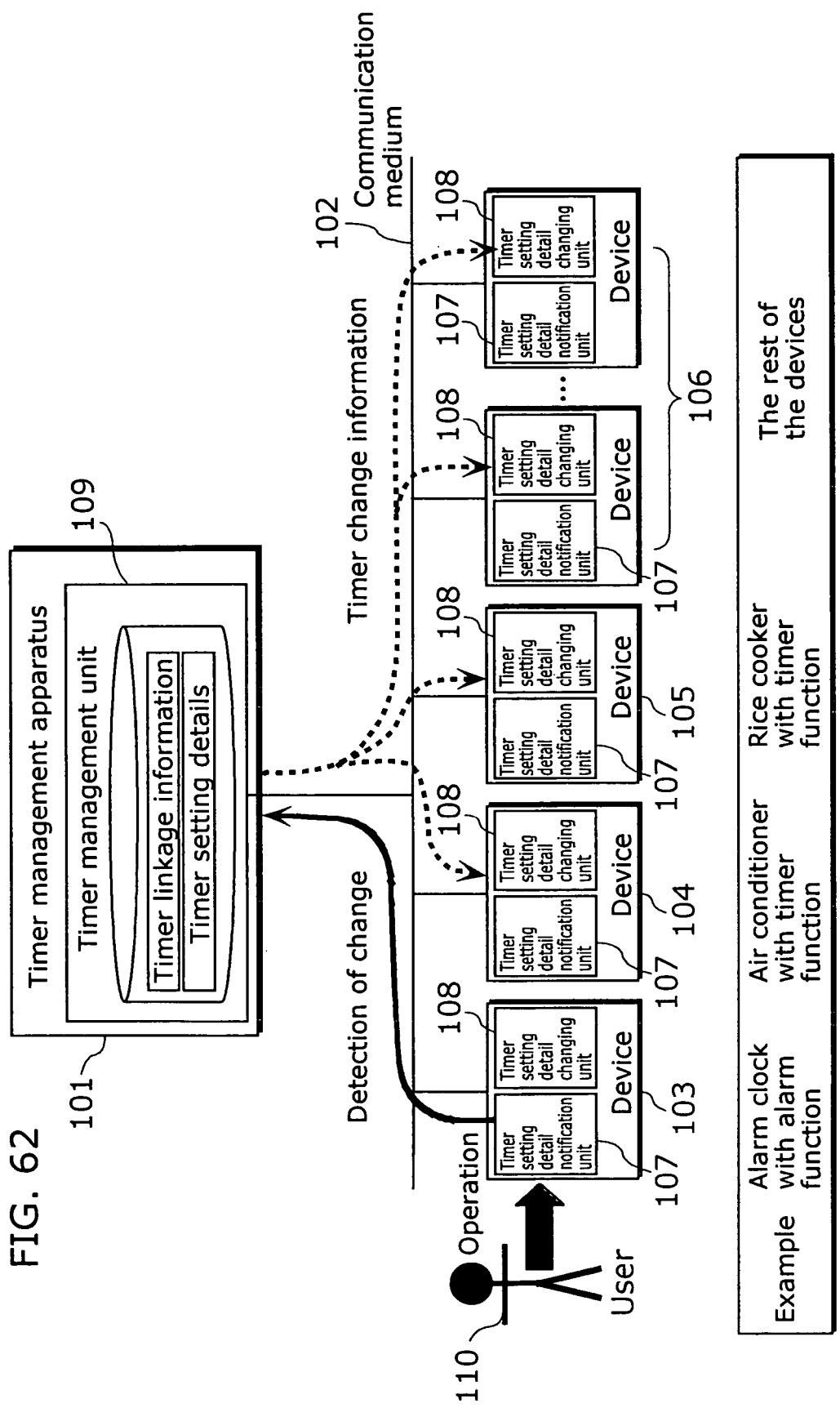
FIG. 62 is a schematic block diagram of the timer linkage setting system as an example of an application of the present invention.

FIG. 62 is an outline block diagram of the timer linkage setting system in the present invention. The main structure of the outline block diagram includes a plurality of devices 103, 104, 105, and 106 having different functions, such as an alarm clock with an alarm function, an air conditioner with a timer function, a rice cooker with a timer function, a light with a timer function, a ventilator with a timer function, a washing machine with a timer function, a bath tub with a timer function, and a timer management apparatus that receives timer setting or changing details from the plurality of devices 103, 104, 105, and 106, and transmits timer setting or changing details to the plurality of devices.

The plurality of devices 103, 104, 105, and 106 include a timer setting detail changing unit 108 for setting and changing timer details, and a timer setting detail notification unit 107 for notifying the timer management unit of the timer details.

In addition, the plurality of devices respectively possess requisite functions (main functions), for example, an alarm sound generating function of the alarm clock, a rice-cooking function of the rice cooker, heating, cooling, dehumidifying functions of the air conditioner, a hot-water filling function of the bath tub, switch ON, OFF and brightness adjustment functions of the light, a ventilation function of the ventilator, and a washing function of the washing machine. Each of these functions operates in linkage with the timer, and the function of each device can be controlled by a control unit of the device, in accordance to the timer.

For example, the operation of each function is started (for example, the start of heating by the air conditioner) and ended (for example, the end of rice-cooking by the rice cooker) at the times set.

In this manner, the plurality of devices possesses different main functions, and the operation of each main function can be controlled through the timer.

The timer management apparatus 101 includes a timer management unit 109 that detects the details of the timer setting change transmitted from the random device, creates linked timer change information for the devices 104 to 106 that operate in linkage with the device 103 which notified the timer setting details, and carries out notification of the created timer change information to the plurality of devices 104 to 106. In other words, the timer management apparatus 101 is a timer instruction apparatus for instructing timer settings to devices.

To be specific, the plurality of devices 103 to 106 respectively include: a timer setting detail notification unit 107 for notifying the timer management apparatus of changed timer setting details, when the timer setting details are changed by a user 110 for example; a timer setting detail changing unit 108 for changing the timer setting details in accordance to a detected signal, when the signal notified. from another device is detected. The timer management apparatus detects the details of the timer setting change transmitted from the random device, and identifies the devices 104 to 106 that operate in linkage with the device 103 that notified the timer setting details. The timer management apparatus creates, for the identified devices 104 to 106, timer change information according to timer linkage information that are based on a predetermined user action pattern, and carries out the notification of the created timer change information to the plurality of devices 104 to 106. Furthermore, the system also includes a communication medium 102 connecting the devices 103 to 106 and the timer management apparatus 101.

Seventh Embodiment

Next, the device linkage control system in the seventh embodiment of the present invention shall be explained. Hereinafter, the present embodiment shall be explained under the assumption that a device 103 is an alarm clock, a device 104 is an air conditioner with a start-up time that allows timer presetting, a device 105 is a rice cooker with an end cooking time (preset time) that allows timer presetting, and a plurality of devices 106 which are other devices (none in particular).

Figure 63:
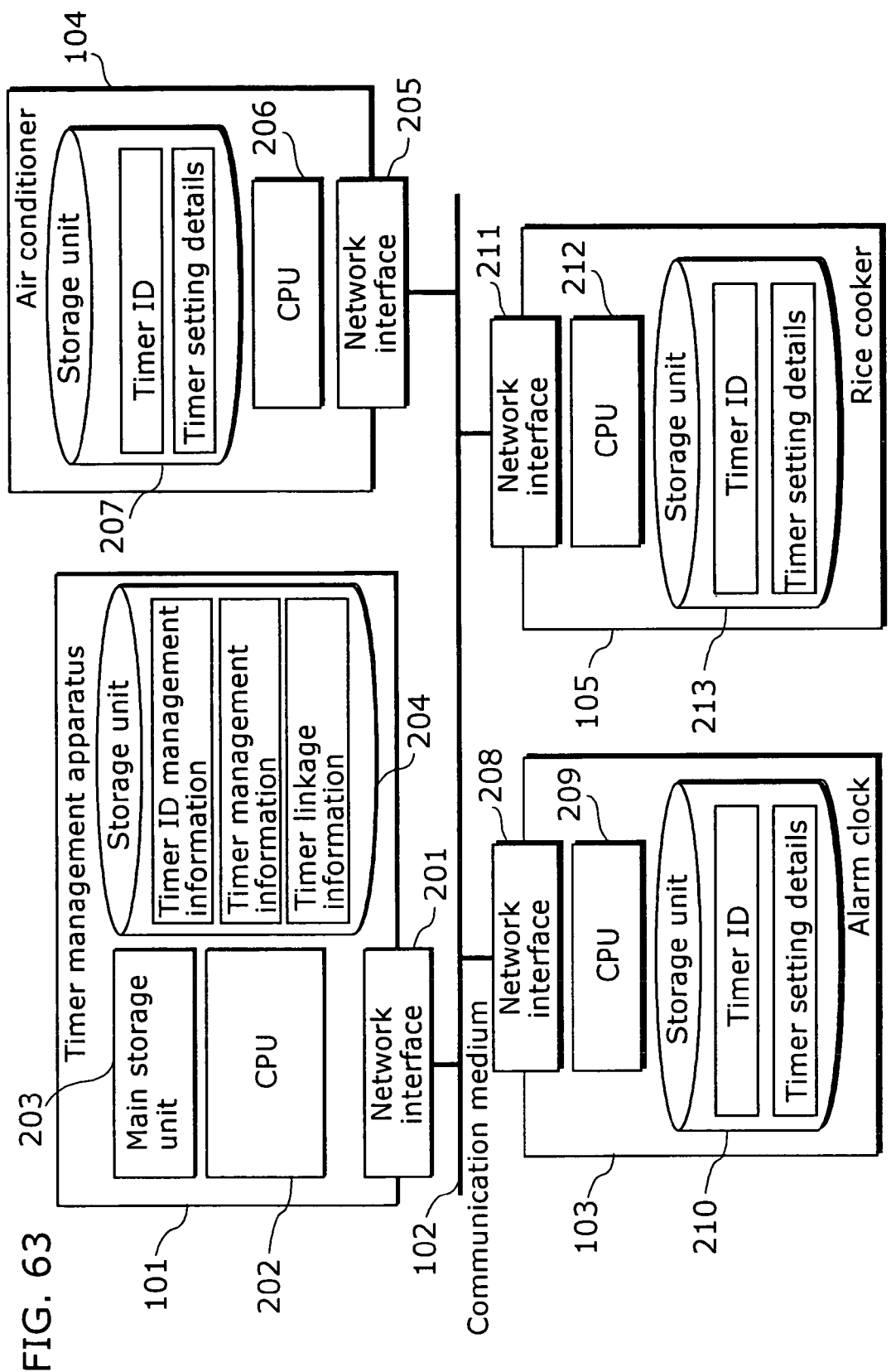
FIG. 63 is a diagram of the hardware configuration of the device linkage control system in the seventh embodiment of the present invention.

FIG. 63 is a diagram showing the hardware configuration of the device linkage control system in the present embodiment. Units that are the same as the units in FIG. 62 are given identical numberings, and explanation for these shall be omitted. The device linkage control system is configured from a timer management apparatus 101, a communication medium 102, an alarm clock 103, an air conditioner 104, and a rice cooker 105.

A network interface 201 is an interface with which the timer management apparatus 101 carries out communication with the other devices 103 to 106.

A CPU 202 is a processor for executing predetermined operational procedures in the timer management apparatus 101.

A main storage unit 203 is a memory or the like for temporarily storing information to be used by the CPU 202.

A storage unit 204 is a storage unit such as a hard disk for storing timer ID management information, timer management information, and timer linkage information.

A network interface 205 is an interface with which the air conditioner 104 carries out communication with the timer management apparatus 101.

A CPU 206 is a processor for executing predetermined operational procedures (operations such as fanning, heating, cooling, and dehumidifying, for example) in the air conditioner.

A storage unit 207 is a storage unit such as a memory for storing a timer ID and the timer setting details of the air conditioner.

A network interface 208 is an interface with which the alarm clock 103 carries out communication with the timer management apparatus 101.

A CPU 209 is a processor for executing predetermined operational procedures in the alarm clock 103.

A storage unit 210 is a storage unit such as a memory for storing a timer ID and timer setting details of the alarm clock 103.

A network interface 211 is an interface with which the rice cooker 105 carries out communication with the timer management apparatus 101.

A CPU 212 is a processor for executing predetermined operational procedures (cooking operation, for example) in the rice cooker 105.

A storage unit 213 is a storage unit such as a memory for storing a timer ID and timer setting details of the rice cooker 105.

Further, the timer ID and timer setting details shall be explained later.

Next, the detailed functions of each apparatus configuring the device linkage control system in the present embodiment shall be explained.

Figure 64:
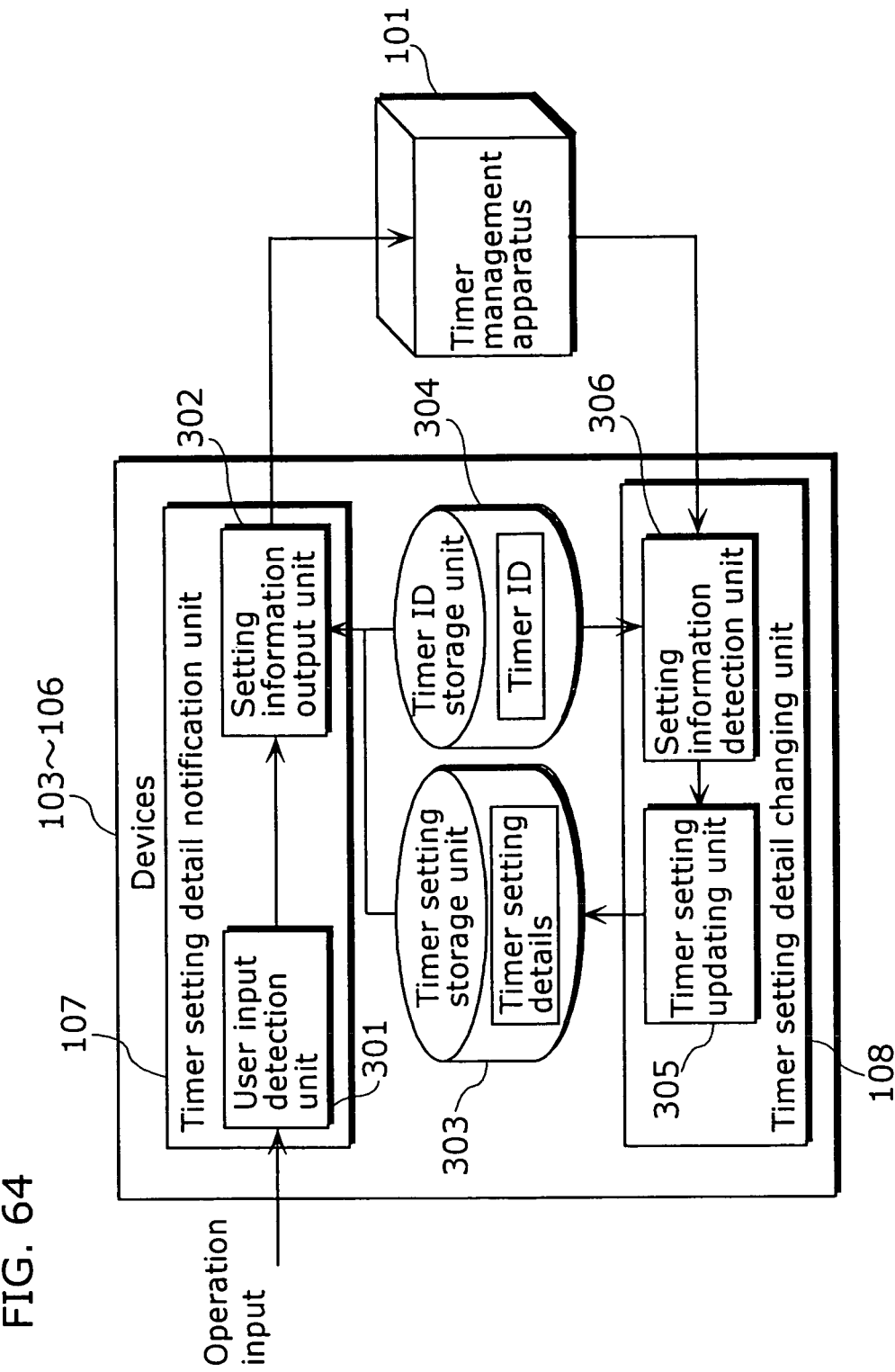
FIG. 64 is a block diagram showing the common functional structure included in every device.
Figure 65:
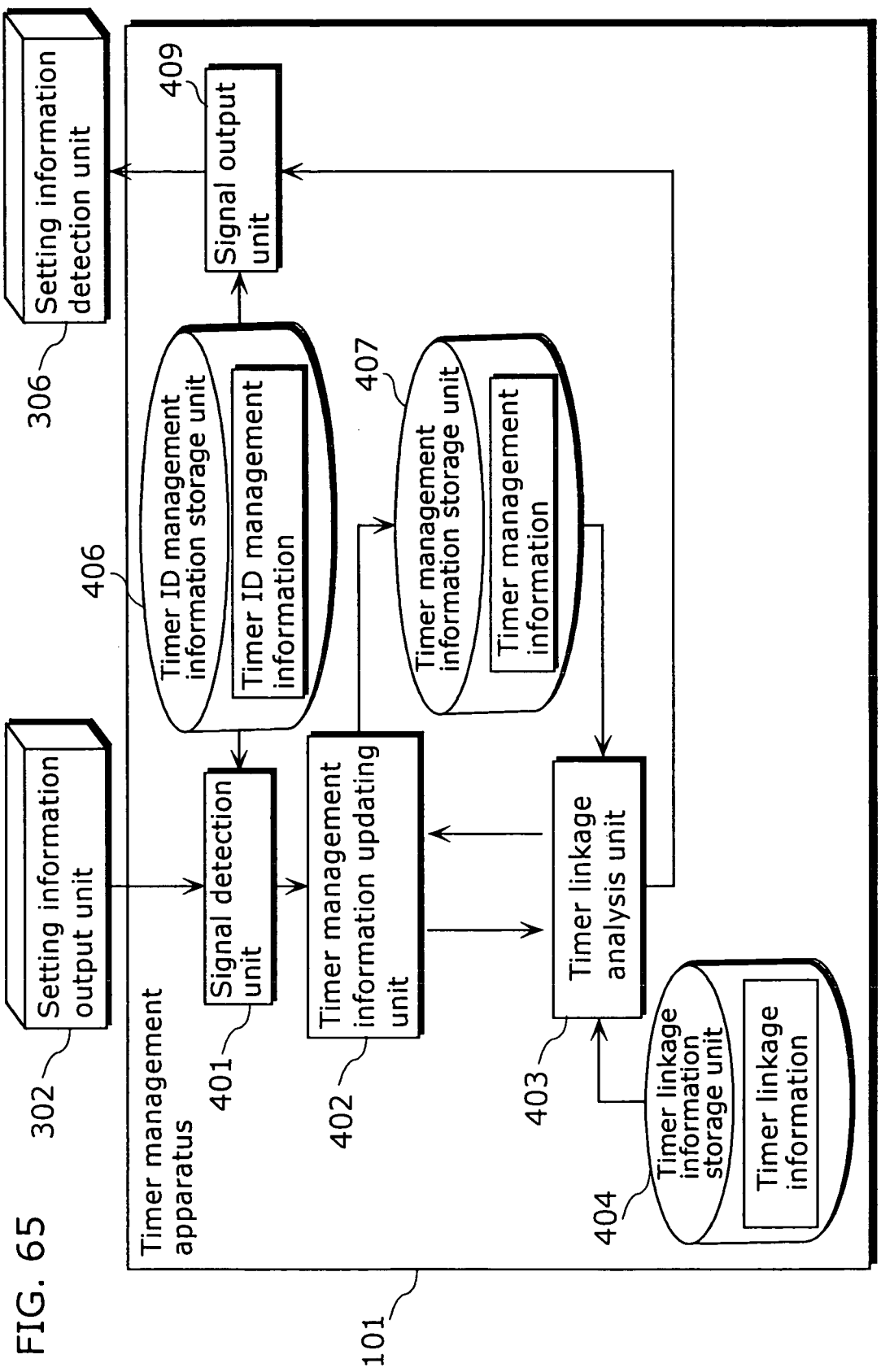
FIG. 65 is a function block diagram showing the structure of the timer management apparatus.

FIG. 64 is a diagram showing the structure of the function blocks provided in common to the alarm clock, the air conditioner, and the rice cooker. Further, FIG. 65 is a diagram showing the structure of the function blocks provided in the timer management apparatus 101. Furthermore, the modules in FIG. 64 and FIG. 65 which are the same as in FIG. 62 are given the same numbering, and their explanations shall be omitted.

First, explanation shall be made regarding each function block provided for each of the devices 103 to 106 such as the alarm clock, the air conditioner, and the rice cooker. Each of the devices 103 to 106 respectively include, in terms of function, a user input detection unit 301 and a setting information output unit as a timer setting detail notification unit n107, a timer setting storage unit 303, a timer ID storage unit 304, and as the timer setting detail changing unit 108, a timer setting updating unit 305 and a setting information detection unit 306.

The user input detection unit 301 is an input device or the like for detecting the presence of an operation from a user, and notifying the setting information output unit 302 of an operation from the user when the operation is present.

The timer setting storage unit 303 is a storage unit such as a memory for storing the details of the timer settings of the devices 103 to 106.

The timer ID storage unit 304 is a storage unit such as a memory for recording timer IDs which are uniquely allocated to distinguish the respective timer setting details of the devices 103 to 106 with the timer setting details of others.

The setting information output unit 302 is an output unit for notifying the timer management apparatus 101 of the timer ID and timer setting details of the device per se in the case where there is a change in the timer setting details recorded in the timer setting storage unit 303, when there is a notification from the user input detection unit 301. In the present embodiment, the timer setting details is read from the timer setting storage unit 303, the timer ID is read from the timer ID storage unit 304, and the process of detecting whether or not there is a change in the timer setting details, or notifying the timer ID and timer setting details, is performed.

The timer updating unit 305 is a processing unit for updating the timer setting details stored in the timer storage unit 303.

The setting information detection unit 306 is a processing unit for detecting the presence of a signal notified from the timer management apparatus 101, and judging, when a signal is detected, whether or not the signal notified from the timer management apparatus 101 is addressed to the device per se by comparing the timer ID stored by the device per se in the timer ID storage unit 304 and the timer ID included in the signal notified from the timer management apparatus 101.

Next, explanation shall be made regarding the functions of each function block provided for the timer management apparatus 101. The timer management apparatus 101, as shown in FIG. 65, includes in terms of function, a signal detection unit 401, a timer management information updating unit 402, a timer linkage analysis unit 403, a timer linkage information storage unit 404, a timer ID management information storage unit 406, a timer management information storage unit 407, and a signal output unit 409.

The signal detection unit 401 is a processing unit for detecting the presence of a signal notified from a random device, and judging, in the case where a signal is detected, whether or not the detected signal is addressed to the timer management apparatus 101.

The timer management information updating unit 402 is a processing unit for updating timer management information stored within the timer management information storage unit 407.

The timer linkage analysis unit 403 is a processing unit for identifying the other devices that operate in linkage with the device which has had the timer setting details changed by the user, and creating new timer setting details for the identified devices, as timer change information.

The timer linkage information storage unit 404 is a storage unit such as a memory for storing timer linkage information for determining the linkage method of the timer settings of among the plurality of devices 103 to 106 based on a predetermined user action pattern.

The timer ID management information storage unit 406 is a storage unit such as a memory for storing the timer IDs of all the devices 103 to 106 configuring the timer setting system in the present invention.

The timer management information storage unit 407 is a storage unit such as a memory for storing timer management information of all the devices 103 to 106 configuring the timer setting system in the present invention.

The signal output unit 409 is an output unit for notifying the devices 103 to 106 of the timer change information created by the timer linkage analysis unit 403.

Next, the timer setting method in the device linkage control system (referred to here as timer management system) in the present embodiment shall be explained.

Figure 66:
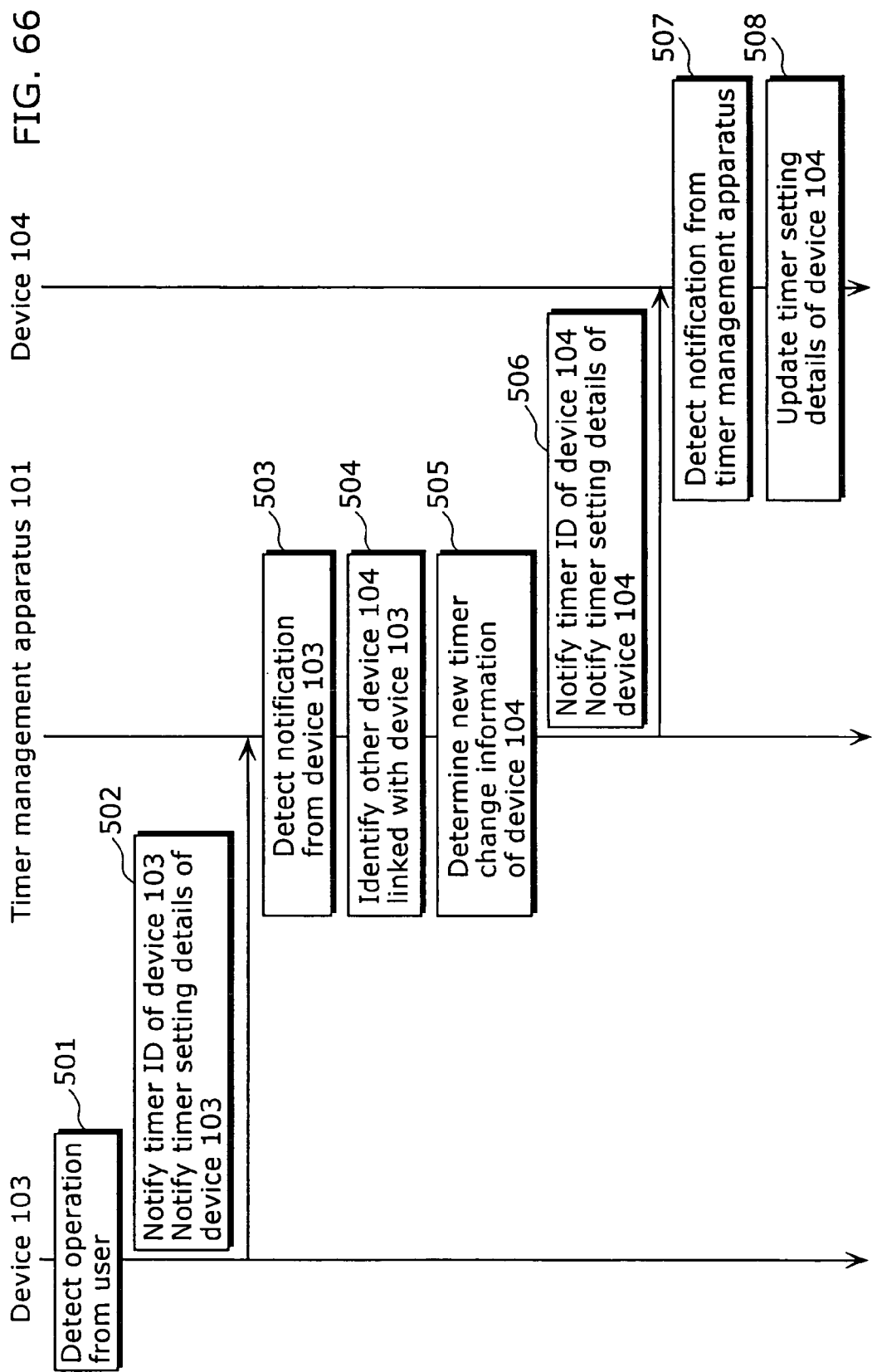
FIG. 66 a sequence diagram showing the operation of each device and the timer management apparatus, from the point where the timer setting details of a device is changed by a user until the timer settings of other devices operating in linkage with the device is changed.

First, the operational relationships of the device 103, the timer management apparatus 101, and the device 104 in the process starting from when the timer setting details of the device 103 is changed by a user 110 until the timer setting of the device 104 operating in linkage with the device 103 is changed, in the present embodiment, is shown in the sequence diagram in FIG. 66. Hereinafter, the operational relationships shown in the sequence diagram in FIG. 66 shall be explained.

First, the setting of timer details of a certain device 103 is changed by an operator (user) 110.

The device 103 detects that timer settings have been changed by the user (step 501).

The device 103 notifies the timer management apparatus 101 of the timer ID and the changed timer setting details (step 502).

The timer management apparatus 101 detects the signal notified from the device 103 (step 503).

The timer management apparatus 101 identifies the devices linked with the device 103 (step 504).

The timer management apparatus 101 determines the timer change information (timer ID, timer setting details) for the device 104 that was identified in the aforementioned step 504 (step 505).

The timer management apparatus 101 notifies the device 104 of the timer change information (step 506).

The device 104 detects the signal notified from the timer management apparatus 101 (step 507).

The device 104 updates timer setting details with the timer change information notified from the timer management apparatus 101 (step 508).

Next, the operational procedure for each function block shown in FIG. 64 and FIG. 65 shall be explained.

Here, in the present embodiment, explanation shall be made for the case which assumes that the memory map shown in FIG. 68A is stored in the timer management information storage unit 407, and the memory map shown in FIG. 67 is stored in the timer linkage information storage unit 404.

Furthermore, explanation shall be made regarding the operational procedures of the device 103 (alarm clock), the device 104 (air conditioner), the device 105 (rice cooker), and the devices 106 (other devices; here, the case where none are existing is assumed), and the timer management apparatus 101 in the case where the timer setting (alarm) of the device 103 (alarm clock) is changed by the user.

Figure 69:
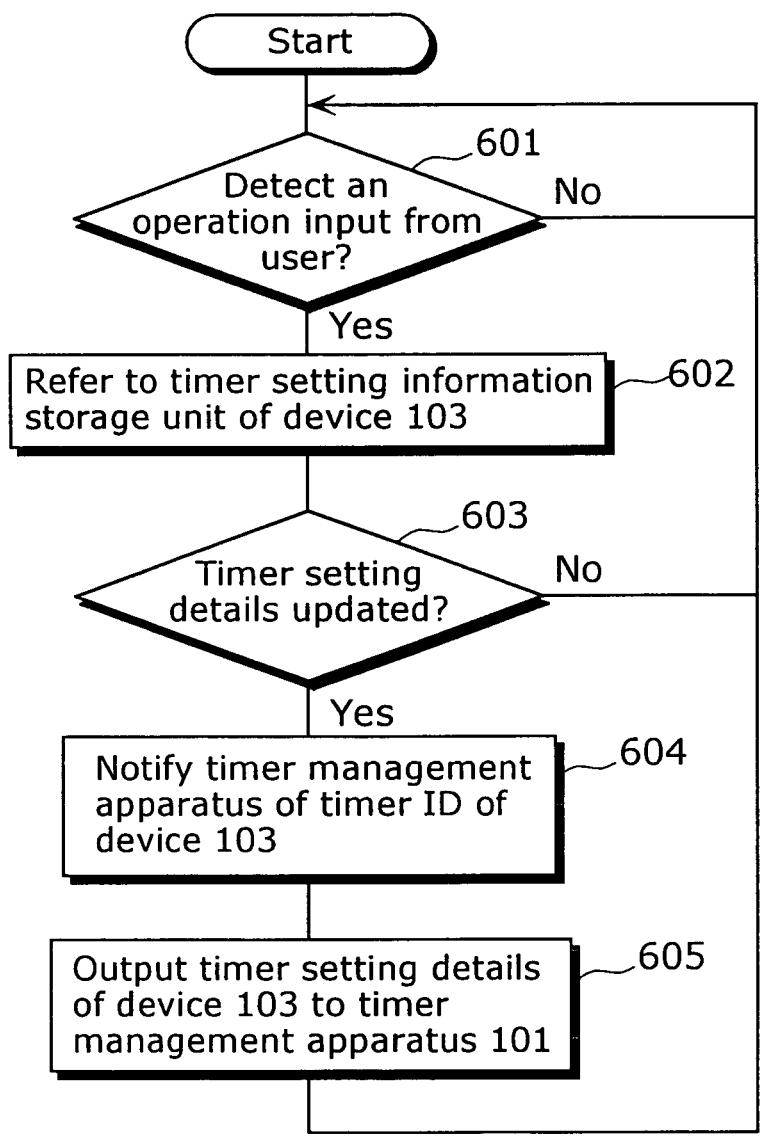
FIG. 69 is a flowchart showing the operational procedures up to the point in which the timer setting details of a device (alarm clock) is changed, and the timer management apparatus is notified of the changed timer setting details.

First, the operational procedure starting from when the timer setting details (preset time, for example, the time at which the alarm rings) of the device 130 (alarm clock) is changed until the timer management apparatus is notified of the changed timer setting details, is shown in the flowchart in FIG. 69.

Hereinafter, the operational procedure shown in the flowchart in FIG. 69 shall be explained.

The user input detection unit detects the presence of an operation by a user with regard to a random device 103 (step 601). Here, when an operation by a user is detected, the user input detection unit 301 informs the setting information output unit 302 that there was an operation by the user. Subsequently, the process moves to step 602 mentioned below. When an operation by a user is not detected, step 601 is repeated. In the present embodiment, the process moves to step 602 for the alarm clock which was operated by the user, and step 601 is repeated for the air conditioner and the rice cooker.

The setting information output unit 302 refers to the timer setting details of the device 103, in the timer setting storage unit 303 (step 602). In the present embodiment, the time setting of the alarm of the alarm clock is referred to.

The setting information output unit 302 checks whether or not the timer setting details referred to in step 602 has been updated (step 603). Here, the process moves to step 604 when the timer setting details have been updated. When there is no update, the process returns to step 601. In the present embodiment, the process moves to step 604 as the alarm time setting of the alarm clock has been changed by the user.

The setting information input unit 302 reads the timer ID of the device 103 stored in the timer ID storage unit 304, and notifies this to the timer management apparatus 101 (step 604). In the present embodiment, the timer ID of the alarm clock is notified to the timer management apparatus 101.

The setting information input unit 302 notifies the timer management apparatus 101 of the timer setting details of the device 103, stored in the timer setting storage unit 303 (step 605). In the present embodiment, the alarm setting details of the alarm clock is notified to the timer management apparatus 101.

Although step 604 and step 605 are performed in sequence here, they can also be performed in parallel with each other.

As explained above, the device 103, on which the timer setting details have been changed by the user, carries out the notification to the timer management apparatus 101 of the timer ID and changed timer setting details of the device 103.

Moreover, although the device 103 carried out the notification of the timer ID and changed timer setting details of the device to the timer management apparatus 101, in the present embodiment, it is also possible to have the device 103 notifying the timer ID, with the timer management apparatus 101 reading the timer setting details of the device 103 when there is such a notification. Alternatively, in the case where there is a change in settings of the device 103, it is also possible to simply have a signal regarding the change sent to the timer management apparatus, and have the timer management apparatus 101 read the timer ID of the device 103 and the timer setting details.

Furthermore, it is also possible to have the timer management apparatus 101 regularly checking if there has been an update on the timer setting details of the device 103, and have the changed timer setting details read into the timer management apparatus, when a change there is a change.

Next, using the flowcharts in FIGS. 70A and 70B, explanations shall be made regarding the operational procedure in which the timer management apparatus 101 detects the signal notified from the device 103 (alarm clock) on which the timer setting details have been changed by the user, then identifies the devices 104 to 105 (air conditioner and rice cooker) operating in linkage with the device 103 (alarm clock), and in addition creates timer change information for the devices 104 to 105 (air conditioner and rice cooker), and notifies this to the other plurality of devices 103 to 106. It should be noted that the details of process (b) shown in FIG. 70A is equivalent to that in FIG. 70B.

The signal detection unit 401 detects the presence of a notification to the timer management apparatus 101 from an outside source (step 701). Here, step 701 is repeated when a signal is not detected. In the present embodiment, the timer management apparatus 101 detects a signal from the alarm clock, and the process moves to step 702.

The signal detection unit determines whether or not the signal detected in step 701 is from the device 103, addressed to the timer management apparatus 101 (step 702). Here, the process moves to step 703 when it is determined that the detected signal is a signal sent to the timer management apparatus 101. When the detected signal is a signal relayed from the device 103 to the other devices 104 to 106, the process returns to step 701. In the present embodiment, the process moves to step 703 as the signal sent from the alarm clock is a signal sent to the timer management apparatus 101.

The signal detection unit 401 refers to timer ID management information storage unit 406 and identifies which device the signal was relayed from, and informs the timer management information updating unit 402 of the identified device information (timer ID, timer setting details) (step 703). In the present embodiment, the signal detection unit 401 notifies the timer management information updating unit 402 that the detected signal is information regarding the alarm setting of the alarm clock.

The timer management information updating unit updates the timer management information of the device 103, stored in the timer management information storage unit 407, with the timer setting details sent from the device 103 (step 704).

In the present embodiment, the timer management information of the alarm clock in the memory map in FIG. 68A, stored in the timer management information storage unit 407 is updated with the condition shown in the memory map shown in FIG. 68B. Here, timer management information indicates identifiers of the devices, "Timer ID", "Date" of the timer, "Time" of the timer, device "Name", and "Details of operation", as shown in the diagrams.

For example, when the alarm clock's timer setting detail time is changed from 7:00 to 6:00, the timer management information is changed, with reference to the timer ID of the alarm clock, from 7:00 to 6:00, as shown by the change in the time of the timer ID from that in FIG. 68A to that in FIG. 68B.

The timer linkage analysis unit 403 obtains, from the timer management information updating unit 402, the timer ID of the device 103 which has had timer management information changed (step 705). In the present embodiment, the timer linkage analysis unit 403 obtains the timer ID (002) of the alarm clock.

The timer linkage analysis unit 403 refers to timer linkage information (shown in FIG. 67) which is based on a predetermined user action pattern, stored inside the timer linkage information storage unit 404, and obtains the linked operation information among each of the devices 103 to 106 (step 706). In the present embodiment, the memory map in FIG. 67, stored in the timer linked information storage unit 404 is referred to, and the timer linkage information which determines the operating time relationship of the respective timer settings of the alarm clock, air conditioner, and rice cooker, is obtained.

The timer linkage analysis unit 403 identifies the devices 104 to 106 that operate in linkage with the device 103 from the timer ID obtained in step 705 and the timer linkage information obtained in step 706 (step 707). Here, the process returns to step 701 when there are no such devices operating in linkage.

In the present embodiment, when 002 is taken as the key timer ID from the timer linkage information in FIG. 67 and the timer ID of the alarm clock, the air conditioner and the rice cooker which are linked to the alarm clock are identified as the devices operating in linkage.

The timer linkage analysis unit 403 obtains the updated timer setting details of the device 103 by referring to the timer management information storage unit 407 (step 708). In the present embodiment, the setting details of the alarm (6:00 A.M.) of the alarm clock is obtained from FIG. 68B stored in the timer management information storage unit 407.

The timer linkage analysis unit 403 refers to the timer linkage information stored inside the timer linkage information storage unit 404, and obtains the temporal relationship of the timer setting details of the device 104 identified in step 707 and the timer setting details of the device 103 (step 709). In the present embodiment, the relative time (−30 minutes) of the air conditioner timer setting details with respect to the alarm clock, shown in FIG. 67, is obtained.

Here, the timer linkage information is the informationalized temporal relationship between the timer setting functions possessed by each of the devices, and indicates, in the present embodiment, the relative temporal relationship of the timer setting time of the device, which is the key, and the timer setting time of the linked device. For example, in the case where the user changes the timer setting of the alarm clock, the timer settings of the air conditioner and the rice cooker are changed in linkage with the timer setting details of the alarm clock, which is taken as the key. Furthermore, in the case where the user changes the timer setting of the air conditioner, the changing of the timer details of the alarm clock and the rice cooker is carried out in linkage with the timer setting details of the air conditioner, which is taken as the key.

The timer linkage analysis unit 403 determines the timer change information for the device 104, from the timer setting details of the device 103 obtained in step 708 and the temporal relationship of the timer setting details of the device 104 with respect to the device 103, obtained in step 709 (step 710). In the present embodiment, the timer change information (5:30 A.M.) for the air conditioner is determined from the alarm setting details (6:00 A.M.) of the alarm clock and the temporal relationship (−30 minutes) of the timer setting details of the air conditioner with respect to the alarm clock.

The signal output unit 409 refers to the timer ID management information storage unit 406 and notifies the timer ID of the device 104 to the plurality of devices 103 to 106 (step 11). In the present embodiment, the timer ID for distinguishing the timer setting details of the air conditioner, from the timer ID management information storage unit 406, is notified to the alarm clock, the air conditioner, and the rice cooker.

The signal output unit notifies the plurality of devices 103 to 106 of the timer change information (step 712). In the present embodiment, the timer change information for the air conditioner is notified to the alarm clock, the air conditioner, and the rice cooker.

The timer management information updating unit 402 updates the timer management information of the device 104, stored inside the timer management information storage unit 407, with the timer change information for the device 104 (step 713). In the present embodiment, the timer management information (6:30 A.M.) of the air conditioner in the memory map shown in FIG. 68B, stored in the timer management information storage unit 407, is updated with the timer change information (5:30 A.M.), as shown in FIG. 71.

The process returns to step 709 in the case where there are also other devices among the devices 105 to 106 that are linked to the device 103 (step 714). When there are no other such linked devices, the process returns to step 701. In the present embodiment, the process returns to step 709 as aside from the air conditioner, the rice cooker exists as a device operating in linkage with the alarm clock.

In the same manner as the air conditioner, steps 709 to 714 are also repeated for the rice cooker, and the new timer setting details of the rice cooker is stored in the timer management information storage unit 407, and the process returns to step 701.

As explained above, it is possible for the timer management apparatus 101 to detect the timer setting details notified from the device 103 which has had timer setting details changed, create the timer change information for the other devices 104 to 106 that operate in linkage with the device 103 from the timer linkage information which is based on a predetermined user action pattern, and send this to the other devices 103 to 106.

Moreover, although in the present embodiment, steps 709 to 714 are repeated separately for rice cooker and air conditioner, the process for the rice cooker and the air conditioner can also be simultaneously carried out in parallel with one another.

Furthermore, carrying out steps 704, 710, and 713 in the same process is more efficient.

Figure 72:
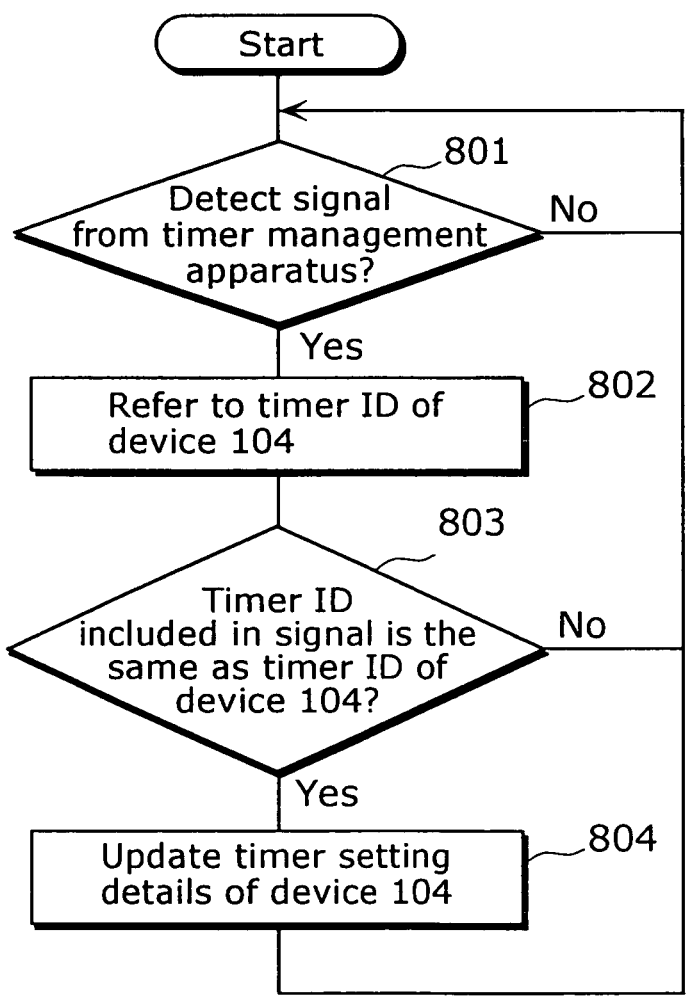
FIG. 72 is a flowchart showing the operational procedure from the point where the plurality of devices detect the timer change information sent from the timer management apparatus, up to the point where the timer setting details stored in the timer setting storage unit is updated.

Next, using the flowchart shown in FIG. 72, explanation shall be made regarding the operational procedure in which the plurality of devices 103 to 106 (air conditioner, rice cooker) detects the timer change information notified from the timer management apparatus 101, and the timer setting details stored in the timer setting storage unit 303 is updated with the timer change information.

The setting information detection unit 306 detects the presence of a signal sent from the timer management apparatus 101 (step 801). Here, in the case a signal is not detected, step 801 is repeated. In the present embodiment, the notification from the timer management apparatus 101, to the alarm clock, air conditioner, and rice cooker, is detected and the process moves to step 802.

The setting information detection unit 306 obtains the timer ID by referring to the timer ID storage unit 304 (step 802). In the present embodiment, the setting information detection unit 306 refers to the timer ID storage unit 304 and obtains a timer ID for distinguishing respective timer functions, for each of the alarm clock, the air conditioner, and the rice cooker.

The setting information detection unit 306 compares the timer ID included in the signal sent from the timer management apparatus 101 and the timer ID of the device per se, obtained in step 802 (step 803). Here, the process moves to step 804 when the timer IDs match. The process returns to step 801 when the timer IDs do not match. In the present embodiment, as the timer IDs of the air conditioner and rice cooker are transmitted from the timer management apparatus 101, the air conditioner and the rice cooker move on to step 804. The alarm clock returns to step 801.

The timer setting updating unit 305 updates the timer setting details stored in the timer setting storage unit 303 with the timer change information notified by the timer management apparatus 101 (step 804). Here, the timer IDs are referred to, and the timer setting details regarding matching timer IDs are changed. In the present embodiment, the timer setting updating unit 305 respectively changes the air conditioner timer setting time to 5:30 A.M. and the rice cooker timer setting details to 6:30 A.M.

As explained above, the timer setting details of the devices 103 to 106 are changed to new timer setting details according to the timer ID notified by the timer management apparatus 101, and the timer change information. Accordingly, in the case where the user changes the timer settings of one device, it is possible to automatically reflect the detail changes on all of the other linked devices without having to carry out the same setting changes on all of the other devices. In other words, according to the present embodiment, when a user changes the timer setting details of a random device, the complex operations involved in the different timer settings of the plurality of devices, needed to be done by the user, can be reduced as the timer linkage setting system identifies the devices operating in linkage with the device which has had timer setting details changed using timer linkage information which is based on a predetermined user action pattern, and automatically changes each of the timer setting details of the identified devices.

Moreover, although explanation is carried out in the present embodiment using an alarm clock, an air conditioner, and a rice cooker, it goes without saying that the objective of the present invention is still achieved even when using devices having a timer function, other than those mentioned above.

Figure 73:
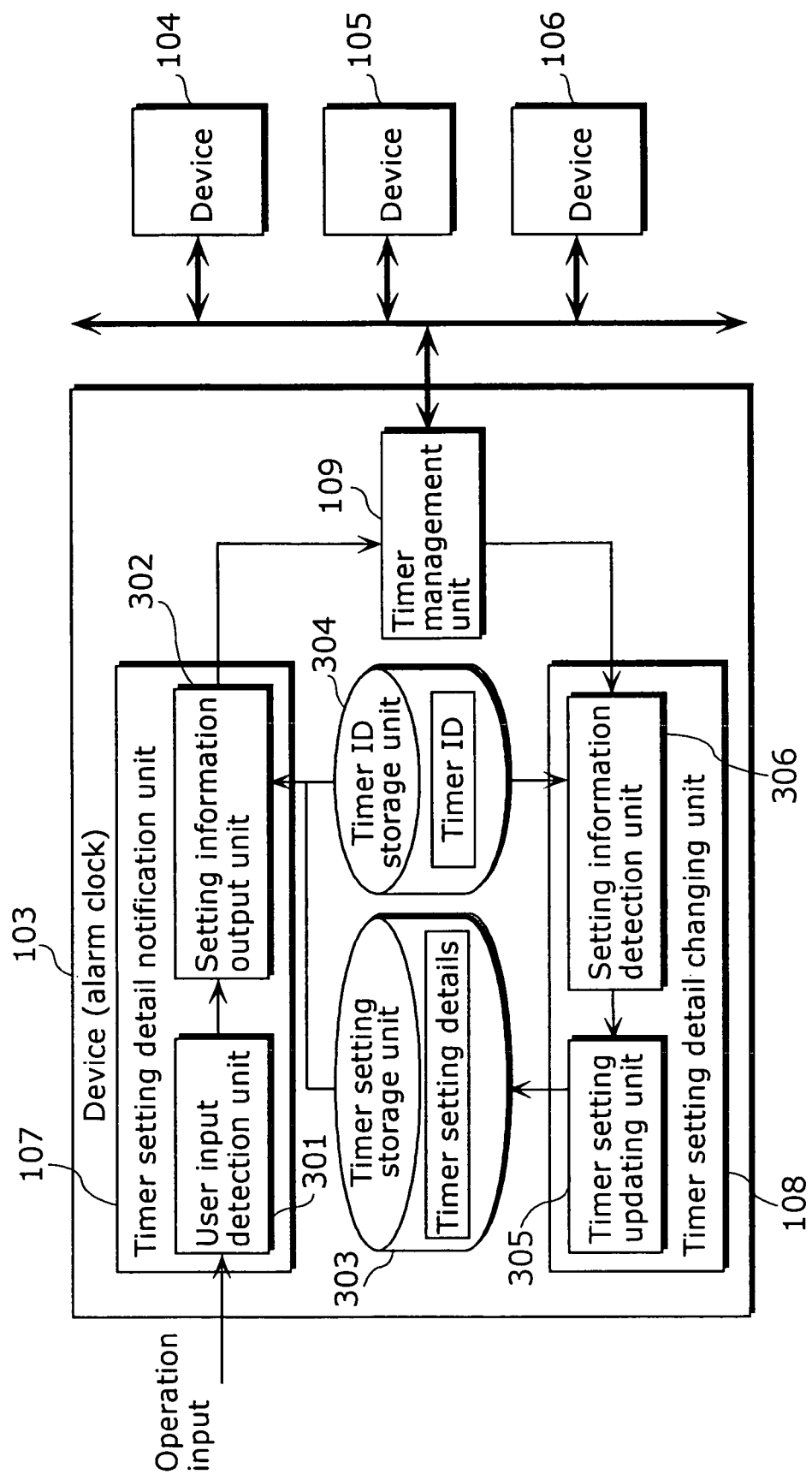
FIG. 73 is a diagram showing an example of the provision of a timer management unit inside a device.

Furthermore, although the present embodiment uses the case where the timer management unit 109 is provided only in the timer management apparatus 101 and not in the other devices, it goes without saying that the objective of the present invention is still achieved even in the case where the timer management unit 109 is included in a random device 103a, as in the function blocks shown in FIG. 73.

In addition, although the present embodiment uses FIG. 67 as the memory map stored in the timer linkage information storage unit 404, and FIG. 68A, FIG. 68B and FIG. 71 as the memory maps stored in the timer management information storage unit 407, it goes without saying that the objective of the present invention is still achieved even when a different memory map is used.

Furthermore, although the present embodiment describes the changing of the timer setting details, the same effects can be attained even in the case where new timer setting details for a device are set, and change, new setting, or the like, are included in the setting operations.

In addition, although explanation is carried out in the present embodiment using an alarm clock, an air conditioner, and a rice cooker, it goes without saying that the same effects are attained even when using devices having a timer function, other than those mentioned above.

Furthermore, the present embodiment shows the case where the timer management apparatus 101 possesses the function for storing and managing the timer setting details of all the devices using the timer management information updating unit 402 and the timer management information storage unit 407. However, by adopting a function structure as that of a timer setting instruction apparatus 111 shown in FIG. 74, it is possible to change the timer setting details of a device operating in linkage with a device which has had timer setting details changed by the user, and forward the changed timer setting details, without managing the timer setting details of the other devices.

Figure 74:
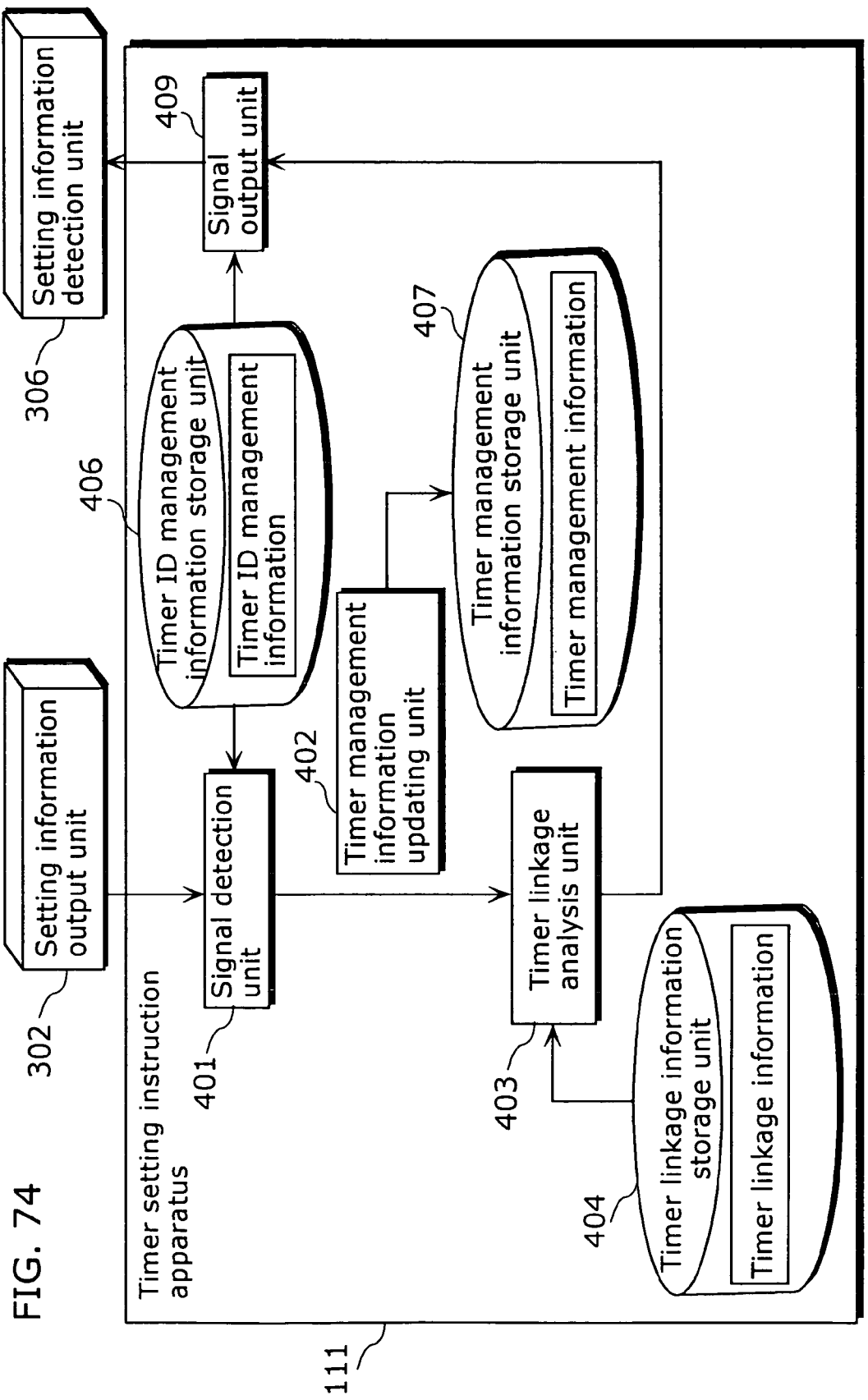
FIG. 74 is a function block diagram showing the structure of the timer setting instruction apparatus.
Figure 75A:
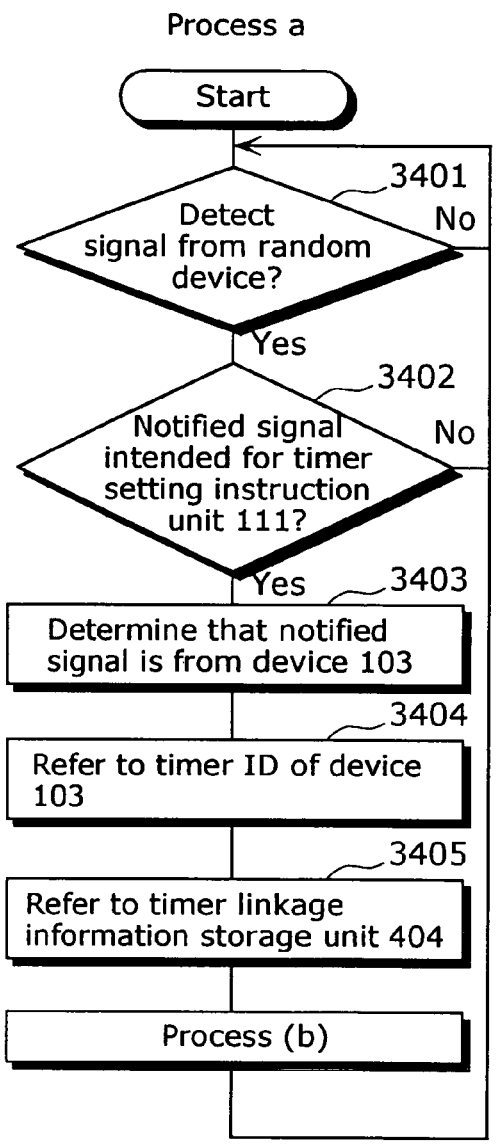
FIGS. 75A and 75B are flowcharts showing the operational procedure of the timer setting instruction apparatus.
Figure 75B:
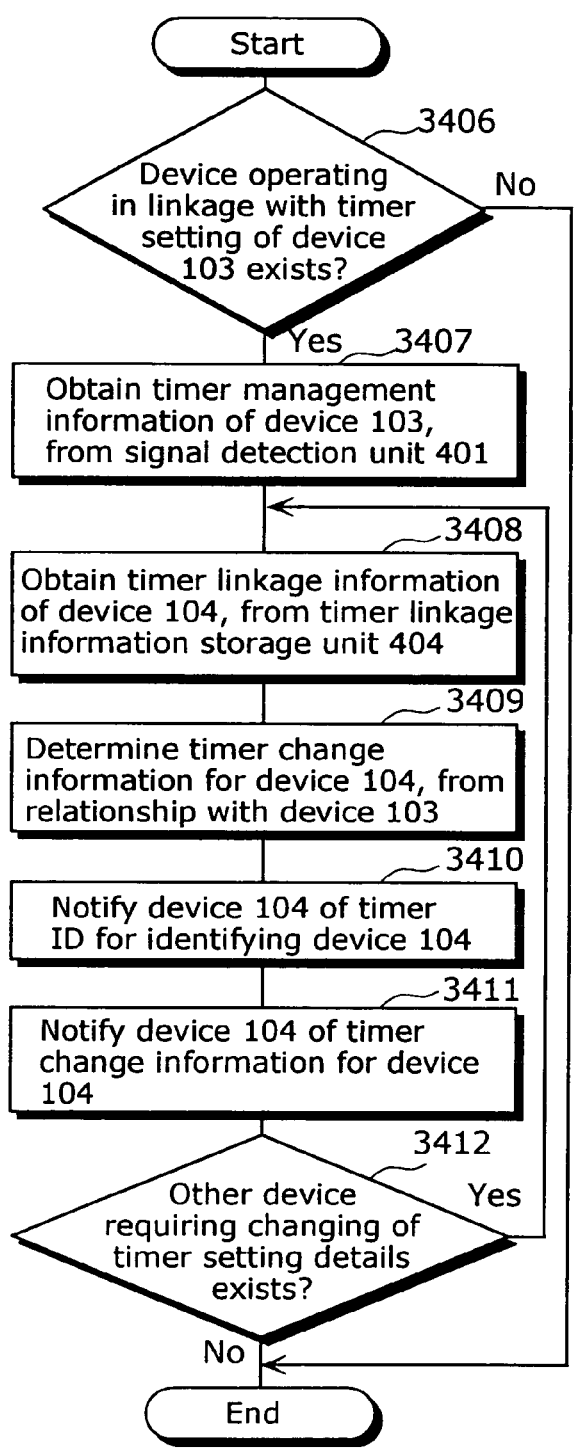

FIG. 74 is a function block diagram of a timer setting instruction apparatus 111 such as the one above. The timer setting instruction apparatus 111 is constructed from only a part of the modules included in the timer management apparatus 101 shown in FIG. 65. FIGS. 75A and 75B are flowcharts showing the operational procedure of a timer setting instruction apparatus 111 such as the one above. In addition, the details of process (b) shown in FIG. 75A is equivalent to FIG. 75B.

The signal detection. unit 401 detects the presence of notifications from an outside source, to the timer setting instruction apparatus 111. Here, step 3401 is repeated when a signal is not detected (step 3401).

The signal detection unit 401 determines whether or not a signal received in step 3401 is a signal sent from the device 103 intended for the timer setting instruction unit 111 (step 3402). Here, in the case where the detected signal is determined to be a signal sent to the timer setting instruction apparatus 111, the process moves to step 3403. In the case where the detected signal is a signal sent from the device 103, intended for the other devices 104 to 106, the process returns to step 3401.

The signal detection unit 401 refers to the timer ID management information storage unit 406 and identifies the device from which the signal was sent, and forwards the identified device information (timer ID, timer setting details) to the timer linkage analysis unit 403 (step 3403).

The timer linkage analysis unit 403 obtains, from the signal detection unit 401, the timer ID of the device 103 which has had timer setting details changed.

The timer linkage analysis unit 403 refers to the timer linkage information (shown in FIG. 67) which is based on a predetermined user action pattern, stored in inside the timer linkage information storage unit 404, and obtains the linked operation information among each of the devices 103 to 106 (step 3405).

The timer linkage analysis unit 403 identifies the devices 104 to 106 operating in linkage with the device 103, using the timer ID obtained in step 3404 and the timer linkage information obtained in step 3405 (step 3406). Here, the process returns to step 3401 in the case where devices operating in linkage do not exist.

The timer linkage analysis unit 403 obtains the changed timer setting details of the device 103 by referring to the signal detection unit 401 (step 3407).

The timer linkage analysis unit 403 refers to the timer linkage information stored inside the timer linkage information storage unit 404, and obtains the temporal relationship of timer setting details of the device 104 identified in step 3405 and the device 103 (step 3408).

The timer linkage analysis unit 403 determines the timer change information for the device 104, from the timer setting details of the device 103 obtained in step 3407 and the temporal relationship of the timer setting details of the device 104 with respect to the device 103 obtained in step 3408 (step 3409).

The signal output unit 409 refers to the timer ID management information storage unit 406, and notifies the timer ID of the device 104 to the plurality of devices 103 to 106 (step 3410).

The signal output unit 409 notifies the timer change information to the plurality of devices 103 to 106 (step 3411).

The process moves to step 3408 in the case where another device linked to the device 103 exists among the devices 105 to 106. In the case where another linked device does not exist, the process returns to step 3401 (step 3412).

Figure 76:
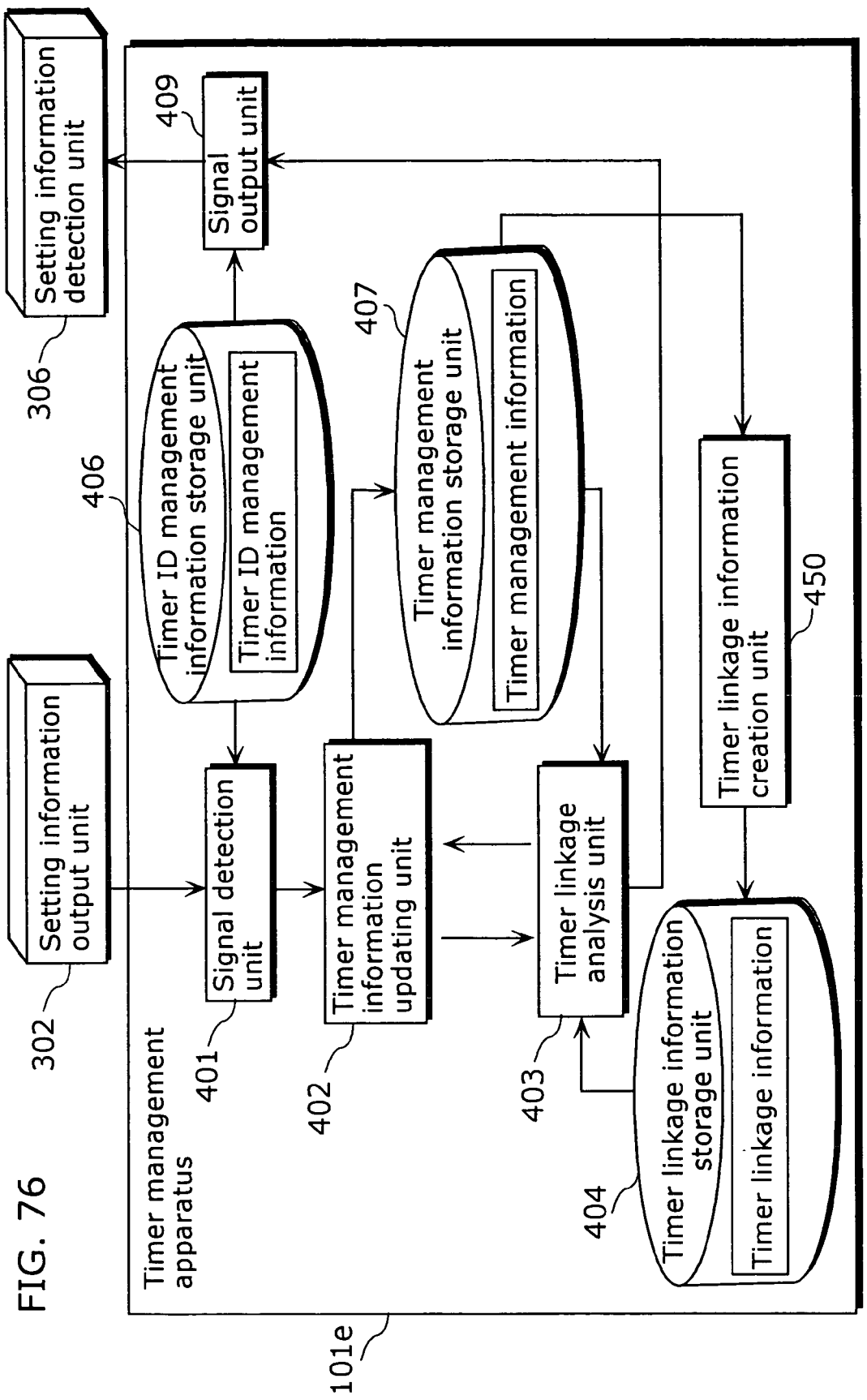
FIG. 76 is a function block diagram showing the structure of the timer management apparatus in the variation.

Here in the present embodiment, explanation with regard to the structure and operation of the timer management apparatus 101 is carried out under the assumption that the timer linkage information is provided beforehand. However, as in a timer management apparatus 101e shown in FIG. 76, it is also possible to build into the timer management unit, a timer linkage information creation unit 450 having the function of the life pattern extraction apparatus n101 in the first to sixth embodiments.

Furthermore, with regard to the method for creating the timer linkage information shown in FIG. 67 in the present embodiment, creation is possible through the identification of the combination of devices having a strong co-occurrence relationship in terms timer function usage, from among countless devices, by the timer linkage information creation unit 450 in the same manner as the life pattern extraction apparatus explained in the first to sixth embodiments, and the statistical obtainment of the relationship of the timer function usage times from the usage history of each of the identified devices, with regard to the temporal relationship of operations.

Eighth Embodiment

Next, the device linkage control system in the eighth embodiment of the present invention shall be explained. The present embodiment relates to a method in which a device that is unable to store a plurality of timer setting details carries out a timer linkage with other devices at different times by temporarily storing the timer change information determined by the timer management apparatus 101 inside the timer management apparatus, and afterwards forwarding this to the plurality of other devices.

In other words, the device linkage control system in the present embodiment has almost the same configuration as the device linkage control system in the seventh embodiment except for having the characteristic of including a new timer management apparatus 101a in place of the timer management apparatus 101 in the seventh embodiment. Moreover, the function blocks provided for devices 103 to 106 in the present embodiment are the same as those in the seventh embodiment of the present invention.

Figure 77:
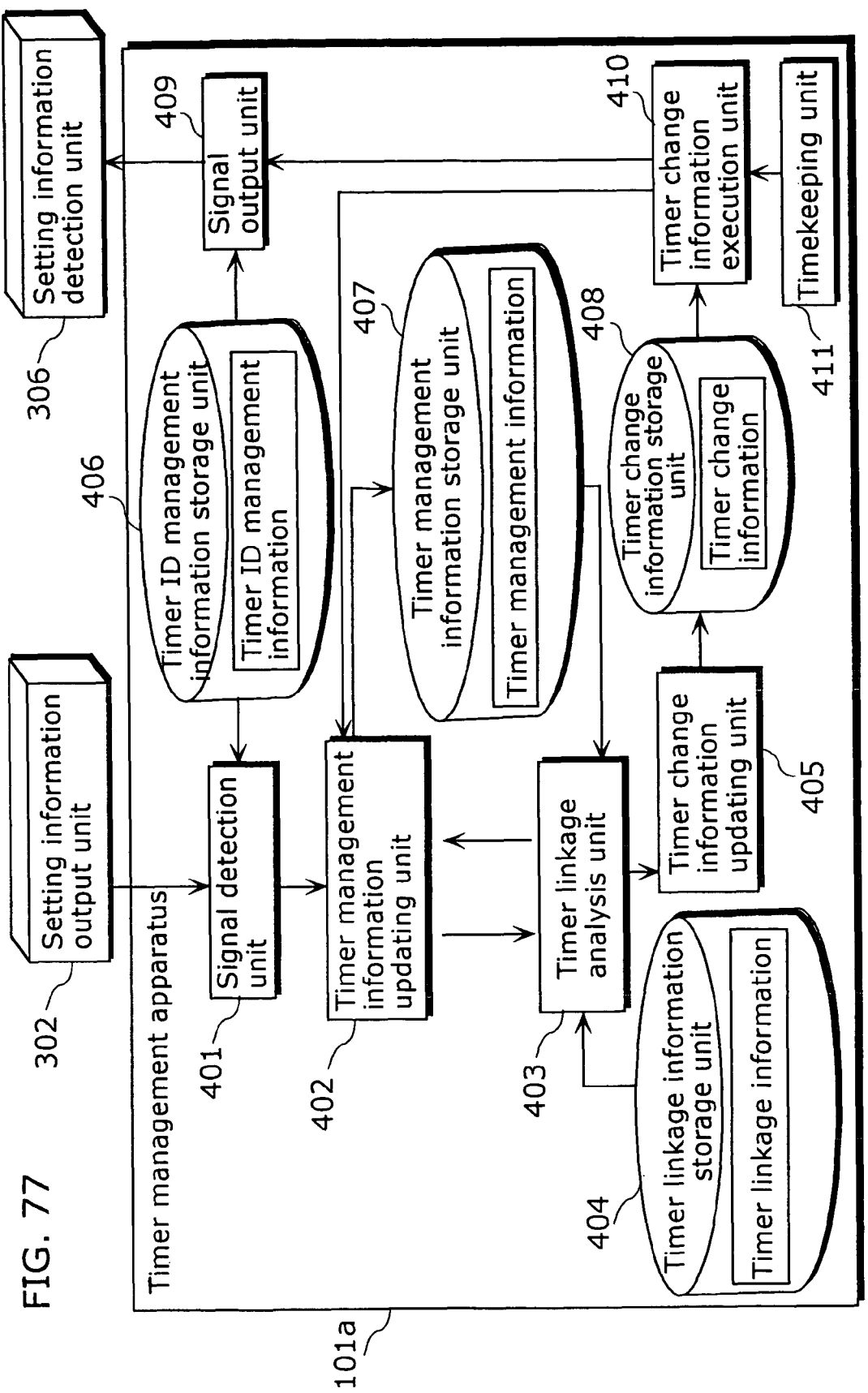
FIG. 77 is a function block diagram of the timer management apparatus in the eighth embodiment of the present invention.

FIG. 77 is a function block diagram of the timer management apparatus 101a in the present embodiment. The timer management apparatus 101a includes a timer change information updating unit 405, a timer change information storage unit 408, a timer change information execution unit 410, and a timekeeping unit 411, in addition to the modules 401 to 404, 406, 407, and 409 included in the timer management apparatus 101 in the seventh embodiment, shown in FIG. 65. The modules that are the same with those in FIG. 65 are given the same numbering and explanation for these shall be omitted.

The timer change information updating unit 405 is a processing unit for updating the details in the timer change information storage unit 408.

The timer change information storage unit 408 is a storage unit such as a memory for storing timer change information created by the timer linkage analysis unit 403.

The timer change information execution unit 410 is a processing unit for managing the timing in which the timing change information stored in the timer change information storage unit 408 is notified to the devices 103 to 106.

The timekeeping unit 411 is a timer, or the like, for notifying the current time to the timer change information execution unit 410.

Next, the operational procedure of the timer management apparatus 101a, as structured above, shall be explained. Here, explanation shall be carried out under that assumption that the memory map shown in FIG. 68A and the memory map shown in FIG. 67 are respectively stored in the timer management information storage unit 407 and the timer linkage information storage unit 404.

The operational procedure in which the signal notified from the device 103 (alarm clock) that has had timer setting details changed by a user is detected by the timer management apparatus 101a, and the devices 104 to 106 (air conditioner, rice cooker) operating in linkage with the device 103 (alarm clock) are identified, and the timer change information is created, is as shown in the flowcharts in FIGS. 78A and 78B. Furthermore, the details of the process (b) shown in FIG. 78A is equivalent to that in FIG. 78B. In addition, the operational procedure in which the timer change information created through the operational procedure shown in the flowcharts in FIG. 78A and FIG. 78B is notified to each of the devices, is as shown in the flowchart in FIG. 79.

Hereinafter, the operational procedures in the flowcharts in FIGS. 78A, 78B and FIG. 79 shall be explained. It should be noted that the operational procedure of steps 2901 to 2910 are the same as the operational procedure of steps 701 to 710 in the seventh embodiment.

The timer change information updating unit 405 stores, in the timer change information storage unit 408, the new timer setting details for the device 104 and the device 103 obtained through the timer linked analysis unit 403 (step 2911). In the present embodiment, the timer change information (5:30 A.M.) of the air conditioner, obtained in step 2910, is stored in the timer change information storage unit 408. In addition, the timer change information (6:00 A.M.) of the alarm clock 103 is also stored.

In the case where another device operating in linkage with the device 103 exists among the devices 105 to 106, the process returns to step 2909. In the case where another linked device does not exist, the process returns to step 2901 (step 2912). In the present embodiment, the process returns to step 2909 as the rice cooker exists, aside from the air conditioner, as a device operating in linkage with the alarm clock.

Steps 2909 to 2911 are repeated on the rice cooker in the same manner as with the air conditioner. The timer change information for the rice cooker is stored in the timer change information storage unit 408, and the process returns to step 2901.

Furthermore, in the present embodiment, the memory map in FIG. 80 is stored in the timer change information storage unit 408 after the aforementioned process is completed. Here, the timer change information is structured from a "change ID" for distinguishing each timer change information created by the timer linkage analysis unit 403, a "change date" indicating the date for performing the timer change, a "change time" indicating the time for performing the timer change, a "change device name" indicating the device on which the change is to be performed, a "details of change" indicating the device details to be changed, and a "setting time" indicating the time to which the setting is changed.

Figure 79:
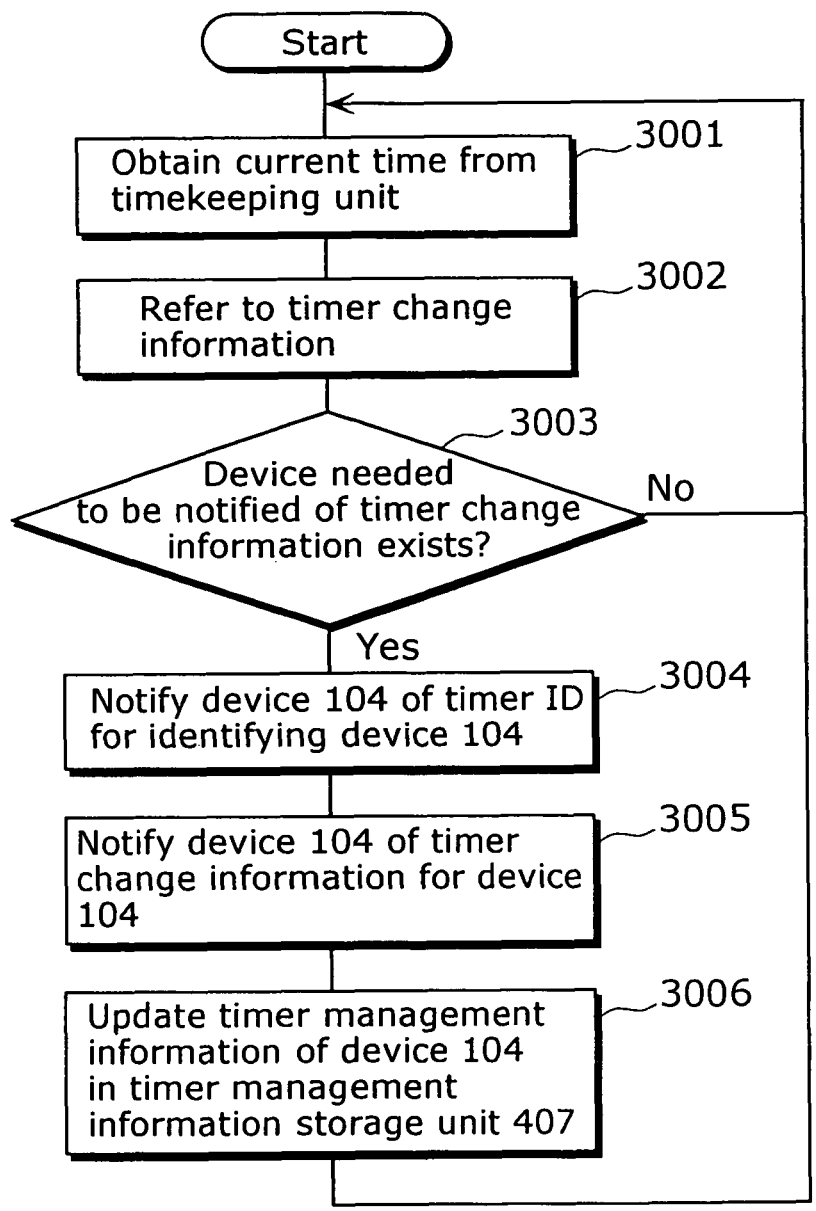
FIG. 79 is a flowchart showing the operational procedure up to the point where timer change information is notified to each device.

Next, the operation in which the timer change information is, transmitted from the timer management apparatus 101a to the devices 103 to 106 shall be explained using the flowchart in FIG. 79.

When a predetermined time is reached, the timer change information storage unit 410 obtains the current time from the timekeeping unit 411 (step 3001).

The timer change information execution unit 410 refers to the timer change information stored inside the timer change information storage unit 408, and obtains the time information at which the timer change information needs to be notified to the plurality of devices 103 to 106 (step 3002). In the present embodiment, the time for changing the timer setting times of the air conditioner and rice cooker is not designated, and information designating immediate execution is obtained.

The timer change information execution unit 410 compares the current time obtained in step 3001 and the time information for notifying the timer change information to the plurality of devices 103 to 106 (step 3003). Here, when it is the time at which the timer change information needs to be notified to the plurality of devices 103 to 106, the process moves to step 3004. When it is not the time at which the timer change information needs to be notified to the plurality of devices 103 to 106, the process returns to step 3001. In the present embodiment, the process moves to step 3004 as it is indicated that the timer change information for the air conditioner and the rice cooker are to be forwarded immediately.

The signal output unit 409 refers to the timer ID management information storage unit 406 and notifies the timer ID of the device 104 to the plurality of devices 103 to 106 (step 3004). In the present embodiment, the timer ID for distinguishing the timer setting details of the air conditioner from the timer ID management information storage unit 406 is notified to the alarm clock, the air conditioner, and the rice cooker.

The signal output unit 409 notifies. the timer change information to the plurality of devices 103 to 106 (step 3005). In the present embodiment, the timer change information of the air conditioner is notified to the alarm clock, the air conditioner, and the rice cooker.

The timer management information updating unit 402 updates the timer management information of the device 104 stored inside the timer management information storage unit 407 with the timer change information of the device 104 (step 3006).

Steps 3001 to 3006 are repeated if there is still another device that requires the changing of timer setting details.

In the present embodiment, the timer management information (6:30 A.M.) of the air conditioner in the memory map, shown in FIG. 68B, stored in the timer management information storage unit 407 is updated with the new time (5:30 A.M.). Furthermore, steps 3001 to 3006 are repeated for the rice cooker, in the same manner as in the case of the air conditioner, and the memory map stored in the timer management information storage unit 407 is changed to that in FIG. 71.

As explained above, the timer management apparatus 101a detects the timer setting details notified from the device 103 that has had timer setting details changed, creates timer change information for the other devices 103 to 106 that operate in linkage with the timer setting details, and notifies the timer change information to the plurality of devices 103 to 106.

Moreover, in the present embodiment, explanation is made for the case where the timer management information storage unit and the timer change information storage unit are provided separately. However, it is also possible to integrate these as a shared unit, with the timer change information updating unit updating the timer change information in the timer management information storage unit, and the timer change information execution unit transmitting the timer change information from the timer management information storage unit to the signal output unit.

Moreover, the information processing method used by the devices 103 to 106 for notifying the timer management apparatus 101a of the setting details changed by the user is the same as the operational procedure shown in the flowchart in FIG. 69. Furthermore, the information processing method in which the timer setting details of the device 103 to 106 is updated to the timer change information notified by the timer management apparatus 101a is the same as the operational procedure shown in the flowchart in shown in FIG. 72, in the seventh embodiment.

As mentioned above, in the present embodiment, a device that is unable to store a plurality of timer setting details can carry out timer linkages with other devices at different times as it is possible, in the case where a need to store a plurality of timer settings arises, for the device that is unable to store a plurality of timer setting details, to have the timer change information to be executed next, and onwards, stored temporarily in the timer management apparatus 101a, and to have the next timer change information notified and the timer setting details of the device reset, after the current timer setting details of the device is executed. In other words, according to the present embodiment, it is possible for a device that is unable to store a plurality of timer setting details to carry out timer linkages with other devices at different times as it is possible, in the case where a need to store a plurality of timer settings arises, for the device that is unable to store a plurality of timer setting details, to have the timer change information to be executed next, and onwards, stored temporarily in the timer management apparatus 101a, and have the next timer change information notified and the timer setting details of the device reset, after the current timer setting details of the device is executed.

Moreover, although explanation is carried out in the present embodiment using an alarm clock, an air conditioner, and a rice cooker, it goes without saying that the objective of the present invention is still achieved even when using devices having a timer function, other than those mentioned above.

Furthermore, although the present embodiment uses the case where the timer management unit 109 is provided only in the timer management apparatus 101a and not in the other devices, it goes without saying that the objective of the present invention is still achieved even in the case where the timer management unit 109 is included in a random device, as in the function blocks shown in FIG. 73.

Furthermore, although FIG. 80 is used as the memory map stored in the timer change information unit 408 in the present embodiment, it goes without saying that the objective of the present invention is still achieved even when a memory map, other than that mentioned above, is used.

Ninth Embodiment

Next, the device linkage control system in the ninth embodiment of the present invention shall be explained. The present embodiment relates to a method in which the means for changing the timer settings of the other devices 104 to 106 according to the timer setting notified by the device 103, changes.

Hereinafter, explanation shall be carried out, using as an example, the case where the time relationship of the respective timer change information of the air conditioner and the rice cooker, and the alarm setting time of the alarm clock changes according to the alarm setting time of the alarm clock that has had timer settings changed.

The device linkage control system in the present embodiment has almost the same configuration as the device linkage control system in the seventh embodiment except for having the characteristic of including a new timer management apparatus 101b in place of the timer management apparatus 101 in the seventh embodiment.

Figure 81:
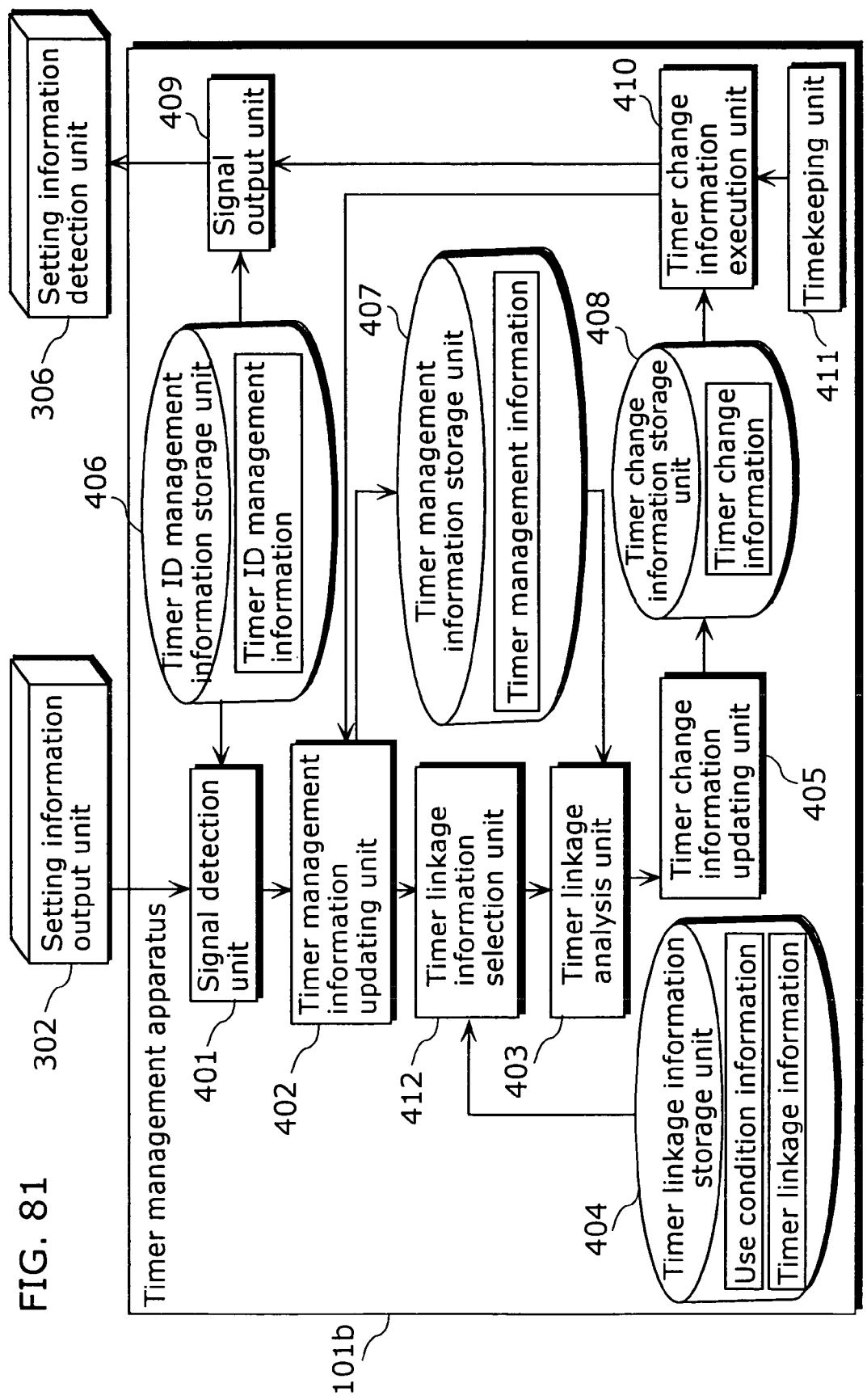
FIG. 81 is a function block diagram of the timer management apparatus in the ninth embodiment of the present invention.

FIG. 81 is a function block diagram of the timer management apparatus 101b in the present embodiment. The timer management apparatus 101b includes a timer linkage information selection unit 412, in addition to the modules 401 to 411 included in the timer management apparatus 101a in the eighth embodiment, shown in FIG. 77. The modules that are the same as those in FIG. 77 are given the same numbering and explanation for these shall be omitted.

The timer linkage information storage unit 404 in the present embodiment holds a plurality of timer linkage information that is based on predetermined user action patterns, and in addition, holds use condition information that defines which timer linkage information, from among the plurality of timer linkage information, should be selected.

Furthermore, the timer linkage information selection unit 412 is a timer linkage information selection unit that refers to the timer setting details of the device 103 that has notified the changed timer setting details from the timer management information storage unit 407, and selects, based on the use condition information held in the timer linkage information storage unit 404, the timer linkage information to be referred to by the timer linkage analysis unit 403.

In the present embodiment, each function block provided in the devices 103 to 106 are the same as in the seventh and eighth embodiments of the present invention.

Figure 82:
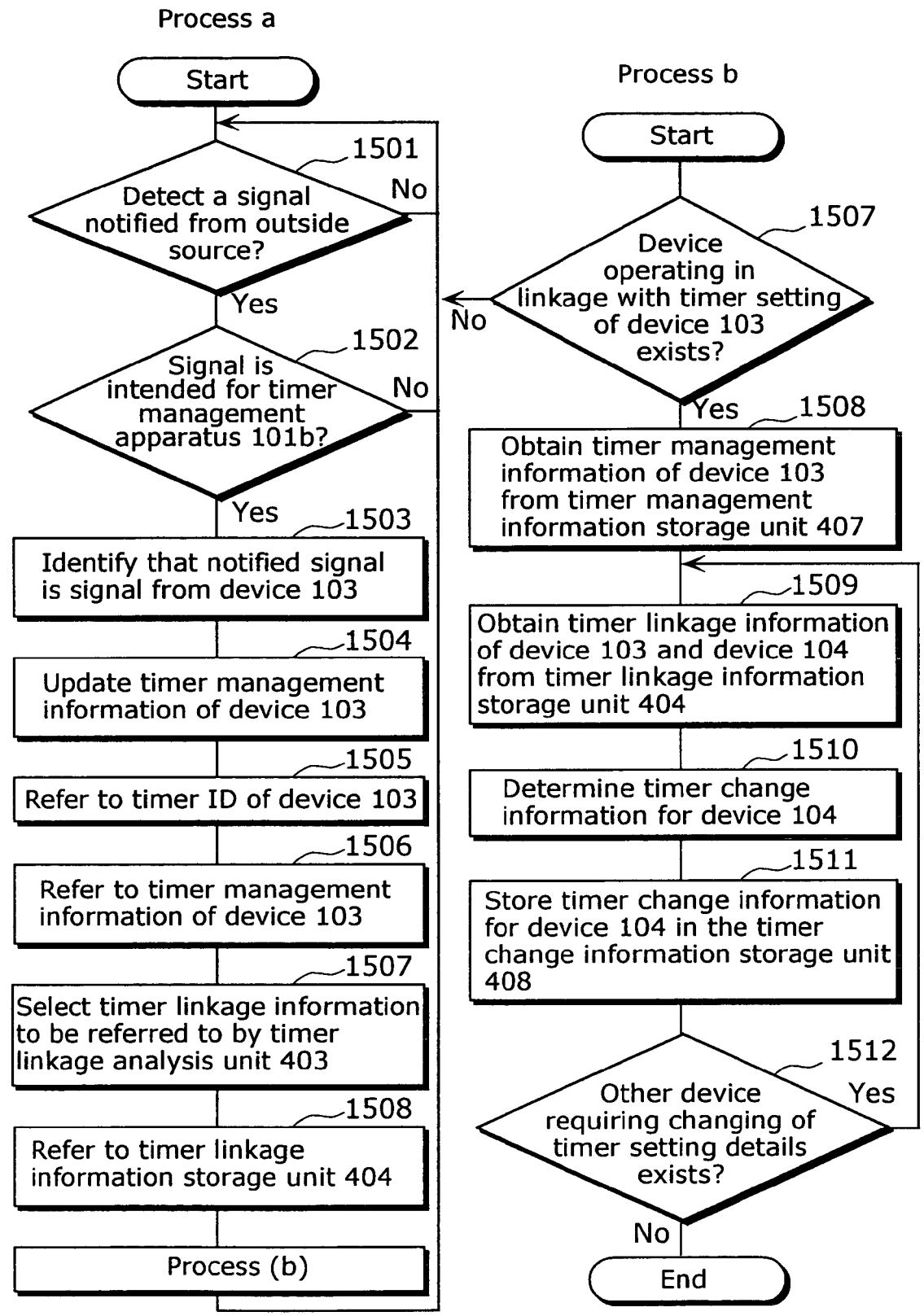
FIG. 82 are a flowcharts showing the operational procedure up to the point where the signal sent from the device (alarm clock) is detected by the timer management apparatus, and other devices (air conditioner and rice cooker) that operate in linkage with the device (alarm clock) are identified, and timer change information is created.

Next, the operational procedure in the timer management apparatus 101b in the present embodiment shall be explained. The operational procedure in which the signal notified from the device 103 (alarm clock) is detected by the timer management apparatus 101a, and the other devices (air conditioner, rice cooker) operating in linkage with the device 103 (alarm clock) are identified, and the timer change information is created, is as shown in the flowcharts in FIG. 82. Furthermore, the details of the process (b) shown in process a in FIG. 82 is equivalent to process b in FIG. 82.

The signal output unit 401 detects the presence of a sent to the timer management apparatus 101b from an outside source (step 1501). Here, step 1501 is repeated when a signal from an outside source is not detected. In the present embodiment, the timer management apparatus 101b detects the signal notified from the alarm clock, and the process moves to step 1502.

The signal detection unit 401 determines whether the signal detected in step 1501 is a signal notified from the device 103 intended for the timer management apparatus 101b (step 1502). Here, the process moves to step 1503 in the case where the detected signal is determined to be a signal sent to the timer management apparatus 101b. In the case where the detected signal is a signal sent from the device 103 to the other devices 104 to 106, the process returns to step 1501. In the present embodiment, the process moves to step 1503 as the signal notified from the alarm clock is a signal sent to the timer management apparatus 101b.

The signal output unit 401 refers to the timer ID management information storage unit 406, identifies the timer setting of the device from which the detected signal was sent, and informs the timer management information updating unit 402 of the result of the identification (step 1503). In the present embodiment, the signal output unit 401 notifies the timer management information updating unit 402 that the detected signal is information regarding the alarm of the alarm clock.

The timer management information updating unit 402 updates the timer management information of the device 103, stored in the timer management information storage unit 407 with the timer setting details notified from the device 103 (step 1504). In the present embodiment, the operating time for the alarm of the alarm clock within the memory map in FIG. 68A, stored in the timer management information storage unit 407, is updated to assume the appearance of the memory map in FIG. 68B.

The timer linkage analysis unit 403 refers to the timer setting details of the device 103 and obtains a timer ID (step 1505). In the present embodiment, the timer linkage analysis unit 403 obtains the timer ID (002) of the alarm clock.

The timer linkage information selection unit 412 obtains the changed timer management information of the device 103 from the updated timer management information storage unit 407 (step 1506).

The timer linkage information selection unit 412 selects the timer linkage information to be used by the timer linkage analysis unit 403 by comparing the timer management information of the device 103 and the use condition information stored in the timer linkage information storage unit 404 (step 1507). In the present embodiment, the second timer linkage information is selected from the condition selection information shown in FIG. 83 as the alarm of the alarm clock is set at 6 o'clock in the morning.

Figure 84:
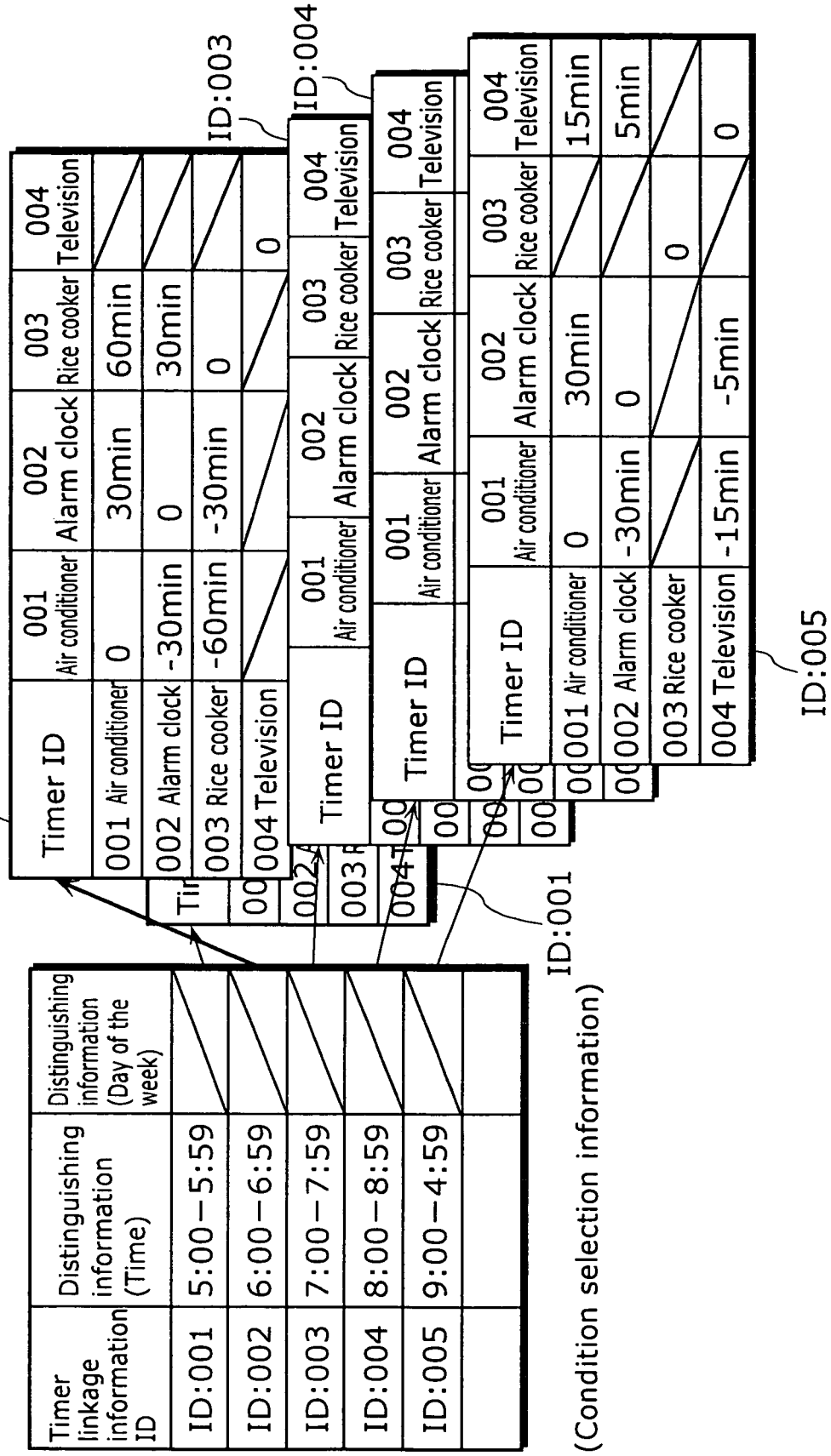
FIG. 84 is a diagram illustrating the selection of a file of timer linkage information corresponding to conditional timer linkage information.

Here, the timer linkage information ID (shown in FIG. 83) is a code indicating "002". The file (details are the same as that shown in FIG. 67) of the timer linkage information of the conditional timer linkage information ID: 002, shown in FIG. 84, is selected according to this code, and the user action pattern within the file is selected and the process is carried out.

Hereinafter, the operational procedure in steps 1507 to 1512 of process b in FIG. 82 is the same as the operational procedure in steps 2907 to 2912 of process b in FIG. 78B.

Furthermore, the operational procedure up to the point at which the timer change information for the devices 103 to 106, created through the operational procedures shown in the flowcharts for process a and process b in FIG. 82, is sent to each of the devices 104 to 106 is the same as the operational procedure shown in the flowchart in FIG. 79.

Furthermore, the information processing method used in the devices 103 to 106 for notifying the timer management apparatus 101b of the setting details is the same as the operating procedure shown in the flowchart in FIG. 69. In addition, the information processing method for updating the timer setting details of the devices 103 to 106 with the timer change information notified by the timer management apparatus 101b is the same as the operational procedure shown in the flowchart in FIG. 70.

As explained above, timer setting for the plurality of devices which is even more suited to the action pattern of the user is possible as the linkage method for the combination and functions of the devices 104 to 106 operating in linkage with the device 103 are changed according to the time at which the user uses the device 103. In other words, according to the present embodiment, timer setting for the plurality of devices which better suits the date and time condition-coordinated action pattern of a user can be set automatically as the combination and relationship of the timer setting times of the plurality of other devices operating in linkage to a device that has had timer setting details set are changed according to the date and time condition of the timer setting details of the device set by the user.

Moreover, although explanation is carried out in the present embodiment using an alarm clock, an air conditioner, and a rice cooker, it goes without saying that the objective of the present invention is still achieved even when using devices having a timer function, other than those mentioned above.

Furthermore, although the present embodiment uses the case where the timer management unit 109 is provided only in the timer management apparatus 101b and not in the other devices, it goes without saying that the objective of the present invention is still achieved even in the case where the timer management unit 109 is included in a random device, as in the function blocks shown in FIG. 73.

Furthermore, although the memory map in FIG. 83 is used as the use condition information in the present embodiment, it goes without saying that the objective of the present invention is still achieved even when a memory map, other than that mentioned above, is used.

Furthermore, although the present embodiment shows an example where the selection of the timer linkage information is carried out by referring only to time information as the use condition information, it goes without saying that the objective of the present invention is still achieved even when the timer linkage information is changed, and date and time information other than time information, such as date, day, month, year, holiday, and week day, are used instead.

Tenth Embodiment

Next, the device linkage control system in the tenth embodiment of the present invention shall be explained. The present embodiment relates to the timer setting cancellation in a plurality of devices that operate by linked timer settings.

In other words, the device linkage control system in the present embodiment has almost the same configuration as the device linkage control system in the seventh embodiment except for having the characteristic of including a new timer management apparatus 101c in place of the timer management apparatus 101 in the seventh embodiment.

Figure 85:
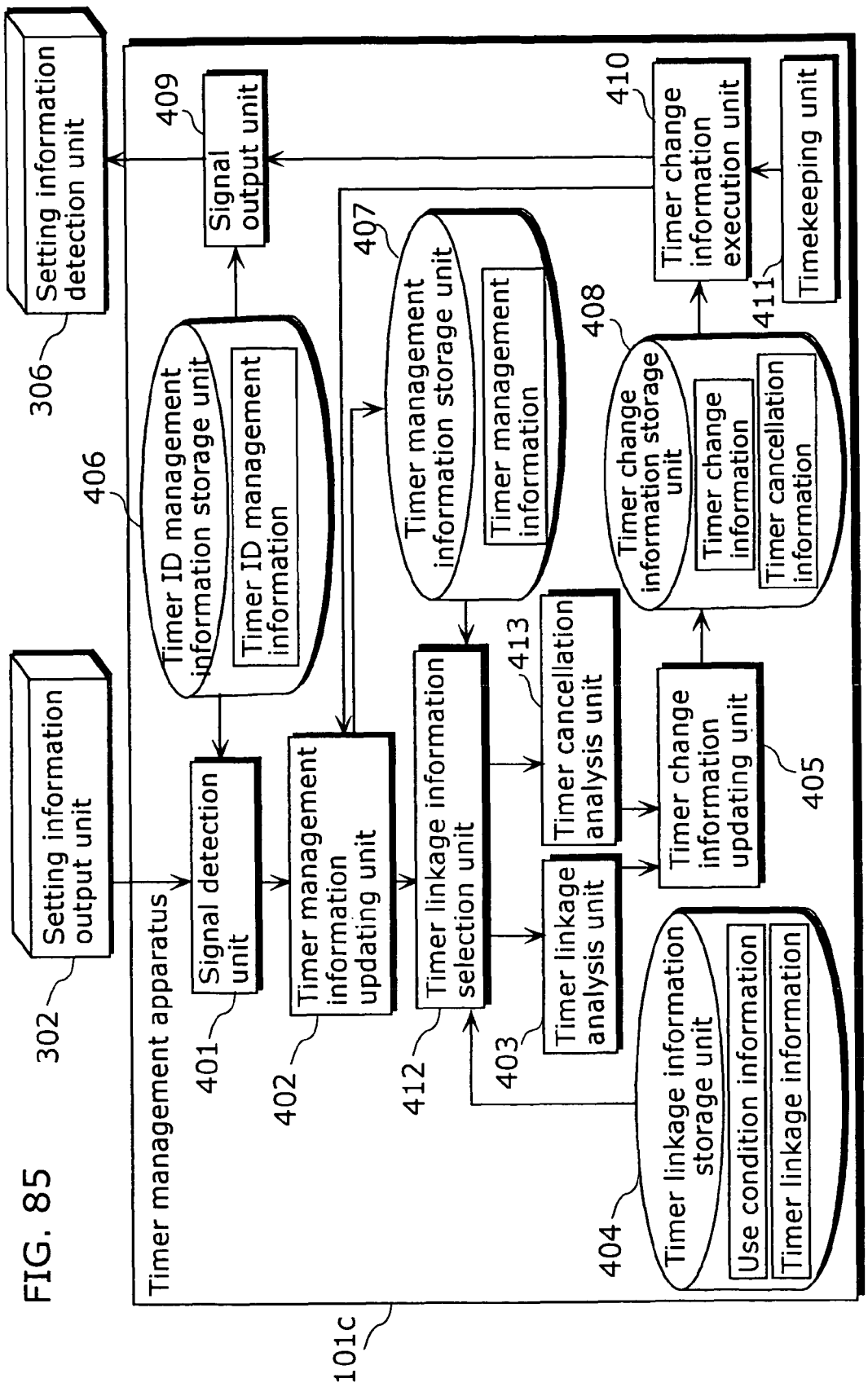
FIG. 85 is a function block diagram showing the structure of the timer management apparatus in the tenth embodiment of the present invention.

FIG. 85 is a function block diagram of the timer management apparatus 101c in the present embodiment. The timer management apparatus 101c includes a timer cancellation analysis unit 413, in addition to the modules 401 to 412 included in the timer management apparatus 101b in the ninth embodiment, shown in FIG. 81. The modules that are the same as the modules in FIG. 81 are given the same numbering, and explanation on these shall be omitted.

The timer cancellation analysis unit 413 is a processing unit for identifying the plurality of other devices operating in linkage with a device 103 that has had timer settings cancelled by a user, and outputting timer cancellation information for canceling timer settings.

Furthermore, a memory map, shown in FIG. 86, indicating whether the timer function is in a valid or a cancelled status, is used as the memory map stored in the timer management information storage unit 407.

In addition, the function blocks provided in the devices 103 to 106 are the same as the function blocks in FIG. 64.

Next, explanation shall be made regarding the operational procedure in the respective function blocks of the device 103 (alarm clock), the device 104 (air conditioner), the device 105 (rice cooker), the device 106 (other devices; here, the case where none are existing is assumed), and the timer management apparatus 101c.

Figure 87:
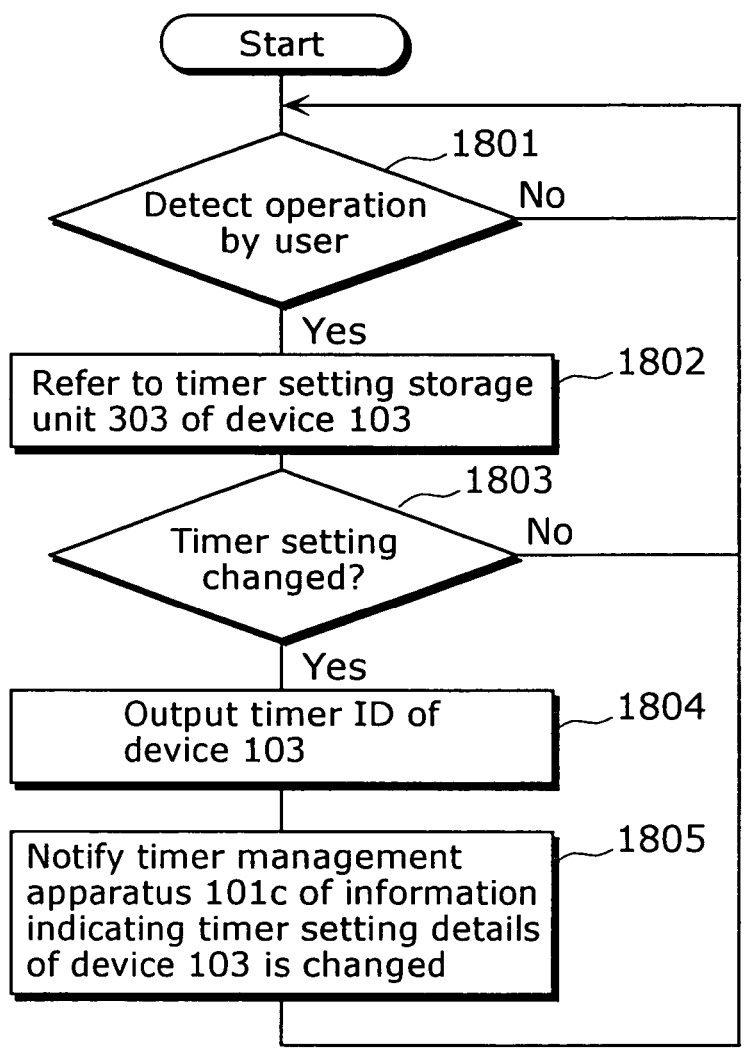
FIG. 87 is a flowchart showing the operational procedure from the point where the timer setting of a device is cancelled, up to the point where this information is notified to the timer management apparatus.

The operational procedure, in the case where the timer setting of the device 103 is cancelled by the user, up to the point where the information indicating the cancellation of the timer settings of the device 103 is notified to the timer management apparatus 101c, is as shown in the flowchart in FIG. 87. Hereinafter, the operational procedure shown in the flowchart in FIG. 87 shall be explained.

The user input detection unit 301 detects the presence of an operation by the user with regard to the device 103 (step 1801). Here, when an operation by the user is detected, the user input detection unit notifies the setting information output unit 302 of the presence of the operation. Here, when an operation by the user is not detected, step 1801 is repeated. In the present embodiment, the process moves to step 1802 for the alarm clock as there is an operation by the user with regard to the alarm clock. Aside from the alarm clock, the process is repeated as is for the air conditioner and the rice cooker.

The setting information output unit 302 refers to the details in the timer setting storage unit 303, and obtains the timer setting details (step 1802). In the present embodiment, setting details for the alarm of the alarm clock is obtained by referring to the storage unit 210.

The presence of a change in the timer setting details obtained in step 1802 caused by the user is detected (step 1803). Here, the process returns to step 1801 when there is no change in the alarm setting. In the present embodiment, the process moves to step 1804 as the timer setting of the alarm clock is cancelled by the user.

The setting information output unit 302 obtains the timer ID of the device 103 from the timer ID storage unit 304 and notifies this to the timer management apparatus 101c (step 1804). In the present embodiment, a timer ID indicating the setting of the alarm of the alarm clock is notified to the timer management apparatus 101c.

The setting information output unit 302 sends the information that the timer setting details is cancelled, from the timer setting storage unit 303 of the device 103, to the timer management apparatus 101c (step 1805). In the present embodiment, information indicating that the alarm setting of the alarm clock is cancelled is notified to the timer management apparatus 101c.

Thus, in this manner, the device 103 that has had timer settings cancelled by the user notifies the timer management apparatus 101c of information indicating that timer setting details are cancelled.

Figure 88A:
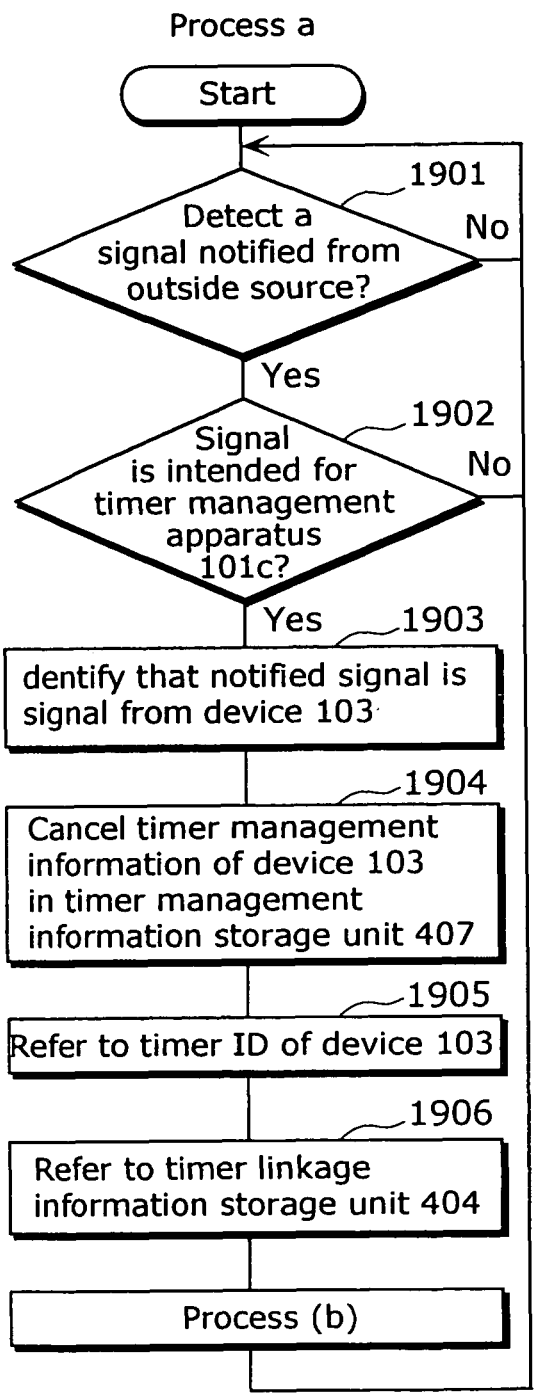
FIGS. 88A and 88B are flowcharts showing the operational procedure up to the point where the signal sent from the device which has had timer settings cancelled by a user is detected by the timer management apparatus, and other devices operating in linkage with the device are identified.
Figure 88B:
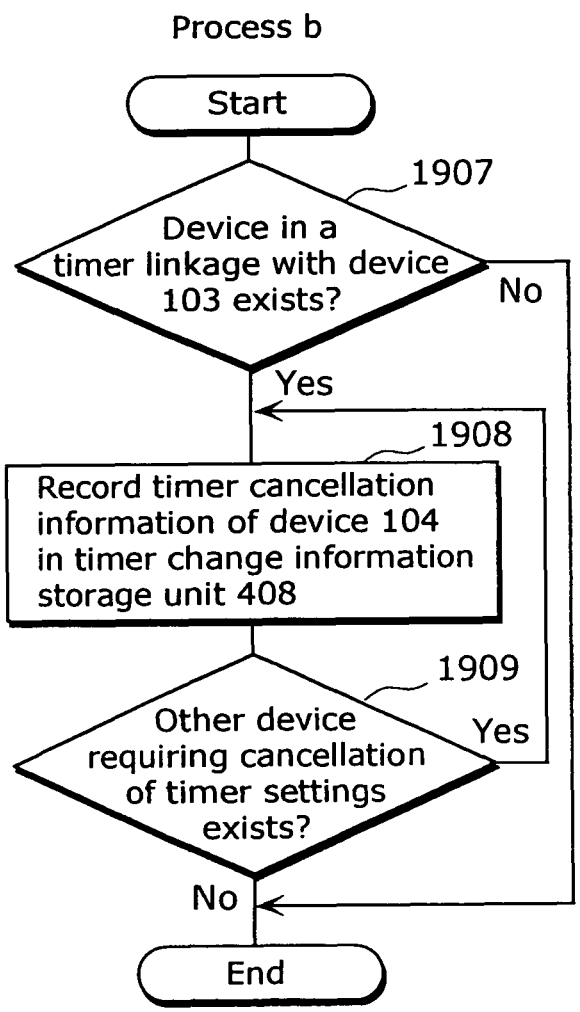
Figure 89:
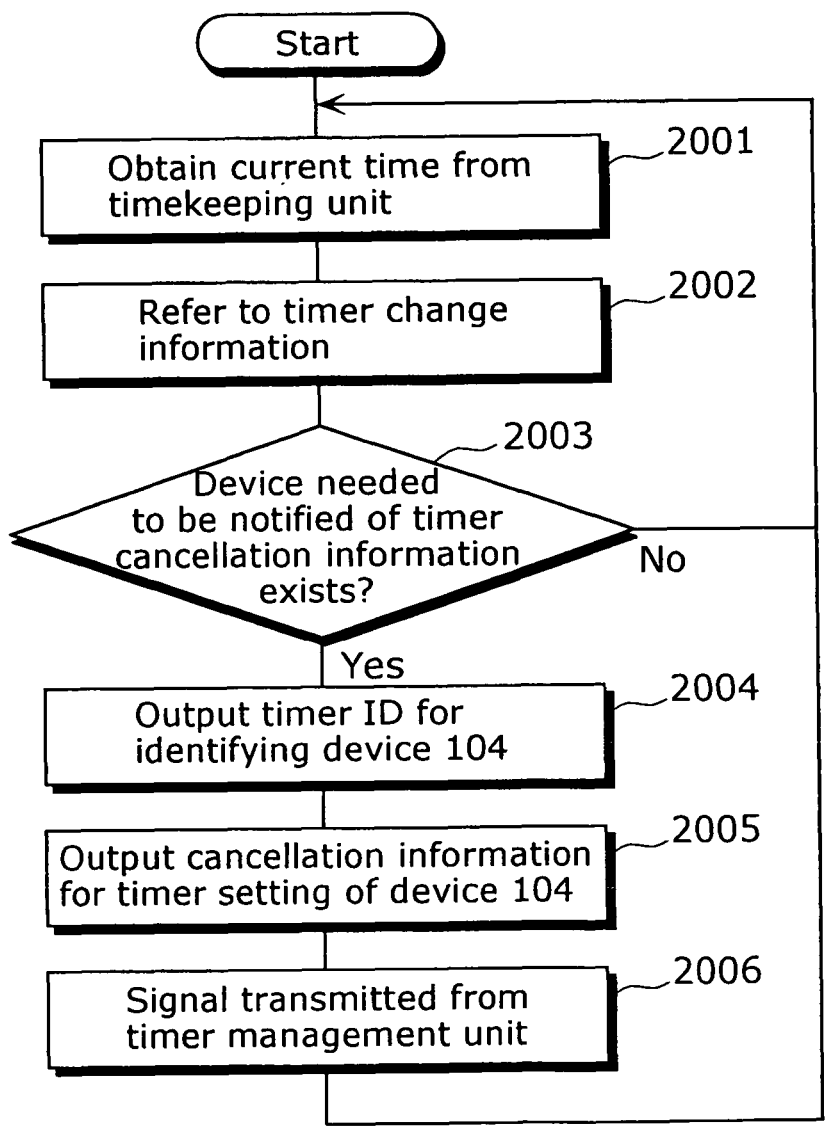
FIG. 89 is a flowchart showing the operational procedure for the output of a cancellation signal for the timer setting details of each device.

Next, using the flowcharts in FIGS. 88A and 88B, explanation shall be made regarding the operational procedure up to the point in which the timer management apparatus 101c detects the signal notified by the device 103 having the timer setting cancelled by the user, and identifies the other devices operating in linkage with the device 103. Moreover, the details of the process (b) shown in FIG. 88A is equivalent to FIG. 88B. Furthermore, the operational process up to the output of cancellation signals for the timer setting details of each device 104 to 106 identified according to the operational procedure shown in the flowcharts in FIGS. 88A and 88B, is as in the flowchart in FIG. 89. Hereinafter, explanation shall be made regarding the operational procedures of the flowcharts in FIGS. 88A and 88B, and FIG. 89.

The signal detection unit 401 detects the presence of a signal notified, from an outside source, to the timer management apparatus 101c (step 1901). Here, step 1901 is repeated when a signal from an outside source is not detected. In the present embodiment, the timer management apparatus 101c detects the signal from the alarm clock, and the process moves to step 1902.

The signal detection unit 401 determines whether the detected signal is a signal notified, from the device 103, to the timer management apparatus 101c (step 1902). Here, the process moves to step 1903 in the case where the detected signal is determined to be a signal sent to the timer management apparatus 101c. In the case where the detected signal is a signal sent from the device 103 to the other devices 104 to 106, the process returns to step 1901. In the present embodiment, the process moves to step 1903 as the signal notified from the alarm clock is a signal sent to the timer management apparatus 101c.

The signal output unit 401 refers to the timer ID management information storage unit 406, identifies the timer setting of the device from which the detected signal was sent, and informs the timer management information updating unit 402 of the result of the identification (step 1903). In the present embodiment, the signal output unit 401 notifies the timer management information updating unit 402 that the detected signal is information regarding the alarm of the alarm clock.

The timer management information updating unit 402 updates the timer management information of the device 103 stored in the timer management information storage unit 407, into a cancelled status based on the timer setting details notified from the device 103 (step 1904). In the present embodiment, the timer management information of the alarm clock stored in the timer management information storage unit 407 is updated to a cancelled status.

The timer linkage analysis unit 403 refers to the timer management information of the device 103 and obtains a timer ID (step 1905). In the present embodiment, the timer linkage analysis unit 403 obtains the timer ID (002) of the alarm clock.

The timer analysis unit 403 obtains the timer linkage information stored inside the timer linkage information storage unit 404 (step 1906). In the present embodiment, the memory map in FIG. 67, stored in the timer linkage information storage unit 404 is obtained.

The timer linkage analysis unit 403 identifies the devices 104 to 106 operating in linkage with the device 103, from the timer ID obtained in step 1905 and the timer linkage information obtained in step 1906 (step 1907). Here, the process returns to step 1901 in the case where none of the devices 104 to 106 operate in linkage with the device 103. In the present embodiment, the air conditioner and the rice cooker are identified as respectively operating in linkage with the alarm of the alarm clock, based on the memory map in FIG. 67 and the timer ID (002) of the alarm clock.

The timer change information updating unit 405 records, in the timer change information storage unit 408, timer cancellation information indicating that timer settings are to be placed in a cancelled status with regard to the devices identified by the timer linkage analysis unit (step 1908). In the present embodiment, first, the timer cancellation information of the air conditioner obtained in step 1907 is recorded into the timer change information storage unit 408.

In the case where according to the timer analysis unit 403, other devices operating in linkage with the device 103 still exist, the process moves to step 1908 (step 1909). If none of the devices 105 to 106 operate in linkage, the process returns to step 1901. In the present embodiment, the process returns to step 1908 as, aside from the air conditioner, the rice cooker exists as a device operating in linkage with the alarm clock.

In the same manner as with the air conditioner, steps 1908 to 1909 are repeated on the rice cooker and the timer cancellation information of the rice cooker is recorded in the timer change information unit 408, and the process returns to step 1901.

The timer change information execution unit 410 obtains the current time from the timekeeping unit 411 (step 2001).

The timer change information execution unit refers to the timer cancellation information stored inside the timer change information storage unit 408, and obtains the time for notifying the other devices of the timer change information (step 2002). In the present embodiment, the time for notifying the timer cancellation information of the air conditioner and the rice cooker is not designated, and information designating an immediate execution is obtained.

The timer change information execution unit 410 compares the current time obtained in step 2001 and the time for notifying the other devices of the timer change information, obtained in step 2002 (step 2003). Here, when it is the time at which the timer cancellation information is notified to the plurality of devices, the process moves to step 2004. When it is not the time at which the notification needs to be made, the process returns to step 2001. In the present embodiment, the process moves to step 2004 as the time for notifying the timer cancellation information of the air conditioner and the rice cooker is not designated, and an immediate execution is designated.

The signal output unit 409 refers to the timer ID management information storage unit 406 and notifies the plurality of devices 103 to 106 of the timer ID of the device 104 that has had timer setting details cancelled (step 2004). In the present embodiment, the timer management apparatus 101c notifies the timer ID of the timer setting of the air conditioner to the plurality of devices 103 to 106.

The signal output unit 409 notifies the timer cancellation information of the device 104 to the plurality of devices 103 to 106 (step 2005). In the present embodiment, the timer management apparatus 101c notifies the timer cancellation information of the air conditioner to the plurality of devices 103 to 106.

The timer management information updating unit 402 updates the timer management information of the device 104 stored inside the timer management information storage unit 407 to the cancelled status (step 2006). When the process within the step is finished, the process returns to step 2001.

In this manner, the timer management apparatus 101c detects the signal from the device 103 having the timer setting cancelled by the user, identifies the other devices 104 to 106 operating in linkage with the device 103, and notifies the timer cancellation information of the identified devices to the plurality of devices 104 to 106.

Figure 90:
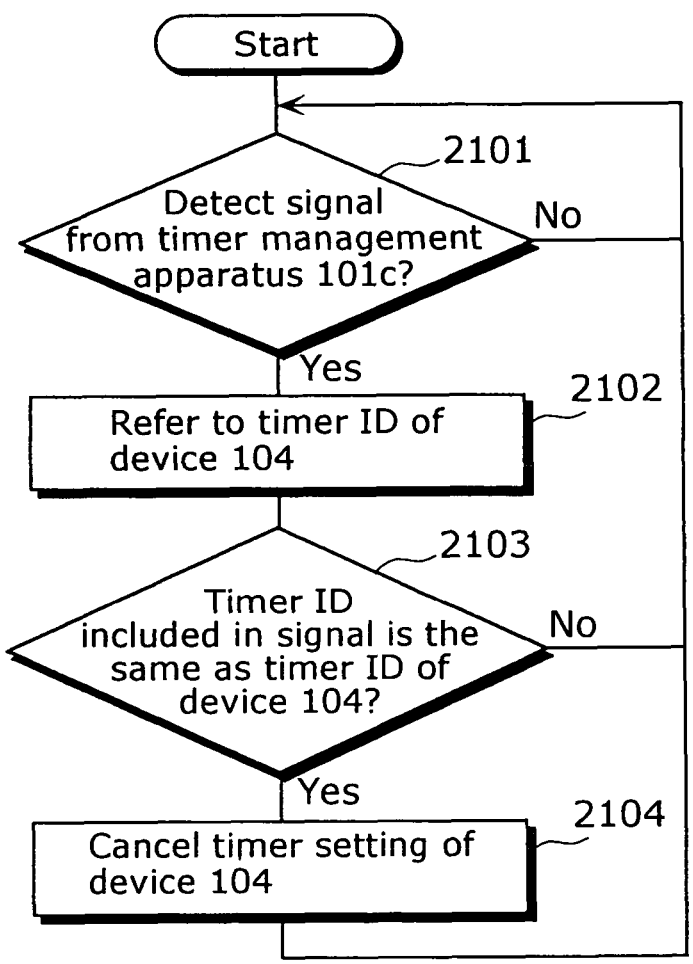
FIG. 90 is a flowchart showing the operational procedures from the point where the device to which a cancellation signal from the timer management apparatus has been sent, detects the cancellation signal, up to the point where the timer setting details of the device per se is cancelled.

Next, using the flowchart shown in FIG. 90, explanation shall be made regarding the operational procedure up to the point in which the devices 103 to 106 to which the cancellation signal is sent from the timer management apparatus, detects the cancellation signal, and the timer setting details of the devices 103 to 106 per se, are cancelled.

The setting information detection unit 306 detects the presence of the timer cancellation signal from the timer management apparatus 101c (step 2101). Here, step 2101 is repeated when the signal is not detected.

In the present embodiment, when the timer cancellation information is notified from the timer management apparatus 101c, each of the devices such as the alarm clock, air conditioner, and rice cooker detects the timer cancellation information, and the process moves to step 2102.

The setting information detection unit 306 refers to the timer ID storage unit 304, and obtains the timer ID provided by the devices per se. In the present embodiment, the respective setting information detection unit 306 of the alarm clock, air conditioner, and rice cooker detects the timer ID information (step 2102).

The setting information detection unit 306 compares the timer ID included in the signal notified from the timer management apparatus 101c and the timer ID of the devices 103 to 106, per se, obtained in step 2102 (step 2103). Here, in the case where the respective IDs match, the timer ID informs the timer setting update unit 305 of the arrival of a signal intended for it. In the case where the timer IDs do not match, the process returns to step 2101.

In the present embodiment, the air conditioner and the rice cooker move to step 2104 as timer IDs, together with timer cancellation information, are notified to the air conditioner and the rice cooker from the timer management apparatus 101c. The alarm clock returns to step 2101 as a timer ID is not notified from the timer management apparatus 101c.

The timer setting updating unit 305 updates the timer setting details to the cancelled status using the timer cancellation information sent from the timer management apparatus 101c (step 2104). In the present embodiment, the timer setting updating unit 305 cancels the timer setting of the air conditioner and the timer setting of the rice cooker.

In this manner, with respect to the timer setting details of the plurality of devices 103 to 106, the timer settings of a plurality of devices are automatically cancelled according to the timer ID and the timer cancellation information sent from the timer management apparatus 101c. In other words, according to the present embodiment, when a user cancels the timer setting of a random device, the operations involved in timer cancellation for a plurality of devices, needed to be done by the user, can be reduced as it is possible to collectively cancel the timer settings of the other devices operating in linkage with the device that has had timer settings cancelled by the timer management apparatus.

Moreover, although explanation is carried out in the present embodiment using an alarm clock, an air conditioner, and a rice cooker, it goes without saying that the objective of the present invention is still achieved even when using devices having a timer function, other than those mentioned above.

Furthermore, although the present embodiment uses the case where the timer management unit 109 is provided only in the timer management apparatus 101c and not in the other devices, it goes without saying that the objective of the present invention is still achieved even in the case where the timer management unit 109 is included in a random device, as in the function blocks shown in FIG. 73.

In addition, although the present embodiment uses FIG. 86 as the memory map stored in the timer management information storage unit 407, it goes without saying that the objective of the present invention is still achieved even when a different memory map is used.

Eleventh Embodiment

Next, the device linkage control system in the eleventh embodiment of the present invention shall be explained. The present embodiment relates to a method for making a user verify the details of change of timer settings by converting the details of the timer change information notified by the timer management apparatus 101 to the plurality of devices, into a signal that can be verified through the interface provided in a random device, and sending the converted signal.

In other words, the device linkage control system in the present embodiment has almost the same configuration as the device linkage control system in the seventh embodiment except for having the characteristic of including a new timer management apparatus 101*d* in place of the timer management apparatus 101 in the seventh embodiment.

Figure 91:
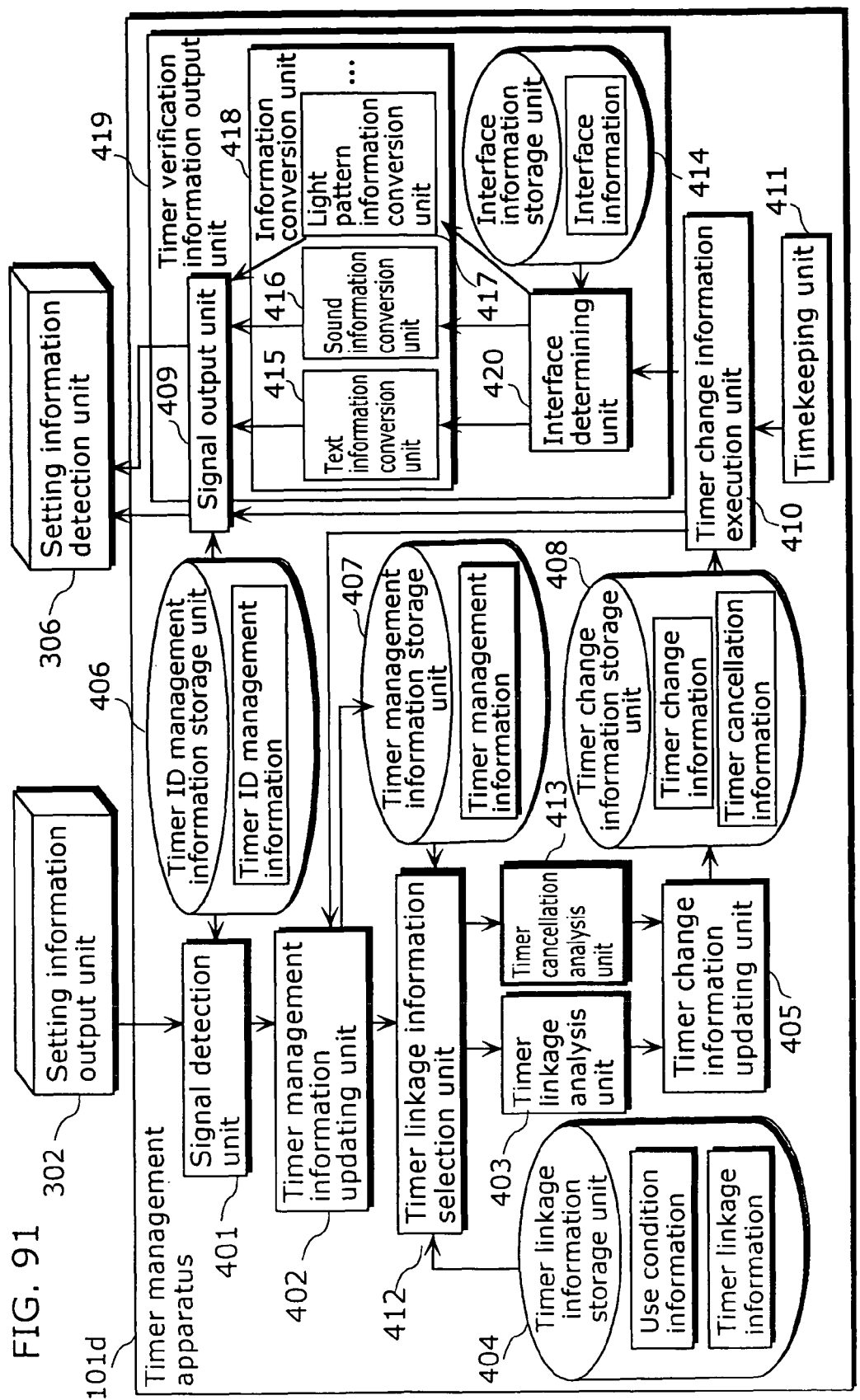
FIG. 91 is a function block diagram showing the structure of the timer management apparatus in the device linkage control system in the eleventh embodiment of the present invention.

FIG. 91 is a function block diagram of the timer management apparatus 101*d* in the device linkage control system in the present embodiment. The timer management apparatus 101*d* includes a timer verification information output unit 419, in addition to the modules 401 to 413 included in the timer management apparatus 101*c* in the tenth embodiment, shown in FIG. 85. The modules that are the same as the modules in FIG. 85 are given the same numbering, and explanation on these shall be omitted.

The timer verification information output unit 419 is a processing unit for converting the timer change information of the devices 104 to 106 to be notified of timer settings from the timer management apparatus 101*d* into a signal that can be verified through the interface provided in the device 103, and notifying the converted signal to the device 103. The timer verification information output unit 419 includes: a information conversion unit 418 structured from a text information conversion unit 415, a sound information conversion unit 416, and a light pattern conversion unit 417; an interface determining unit 420; and an interface information storage unit 414.

The interface determining unit 420 is a processing unit which refers to the interface information storage unit 414, and identifies the interface provided in the device that is notified of timer verification information by the timer verification information output unit 419.

The interface information storage unit 414 is a storage unit such as a memory for storing interface information, shown in FIG. 92, provided in each of the devices 103 to 106.

The text information conversion unit 415 is a processing unit for converting timer change information into text information that can be shown on a display, for devices having a display as an interface.

The sound information conversion unit 416 is a conversion unit for converting timer change information into sound information that comes through a speaker, for a device having a speaker as an interface.

The light pattern information conversion unit 417 is a conversion unit for converting timer change information into light pattern information to be displayed in a light-emitting unit, for a device having a light-emitting unit as an interface.

The information conversion unit 418 is a processing unit for converting timer change information into information that can be outputted through each interface.

Figure 93:
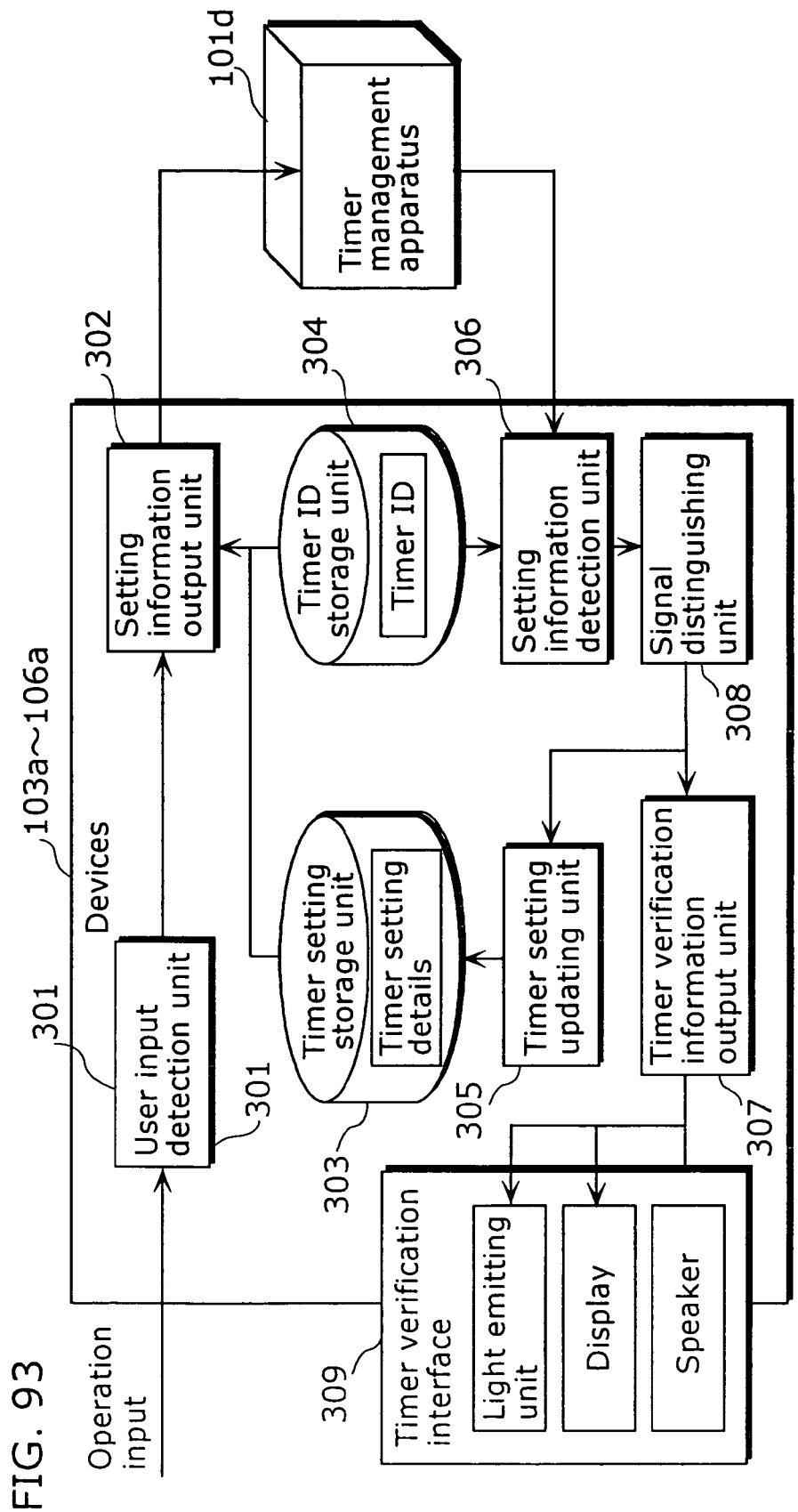
FIG. 93 is a function block diagram showing the structure of a device.

FIG. 93 is a function block diagram of the respective devices 103*a* to 106*a* in the present embodiment. Each of the devices 103*a* to 106*a* respectively include a timer verification information output unit 307, a signal distinguishing unit 308 and a timer verification interface 309, in addition to the modules 301 to 306 included in each of the devices 103 to 106 in the seventh embodiment, shown in FIG. 64. The modules that are the same as the modules in FIG. 64 are given the same numbering, and explanation on these shall be omitted.

The signal distinguishing unit 308 is a processing unit for distinguishing whether a signal sent from the timer management apparatus 101*d* is a signal regarding the changing of a timer setting, or information regarding the verification of a timer setting.

The timer verification information output unit 307 is an output unit for outputting timer verification information from the signal sent from the timer management apparatus 101*d*, through the interfaces included in each of the devices 103*a* to 106*a*.

The timer verification interface 309 is an interface that can verify the timer setting details provided in the devices 103*a* to 106*a*.

Figure 94:
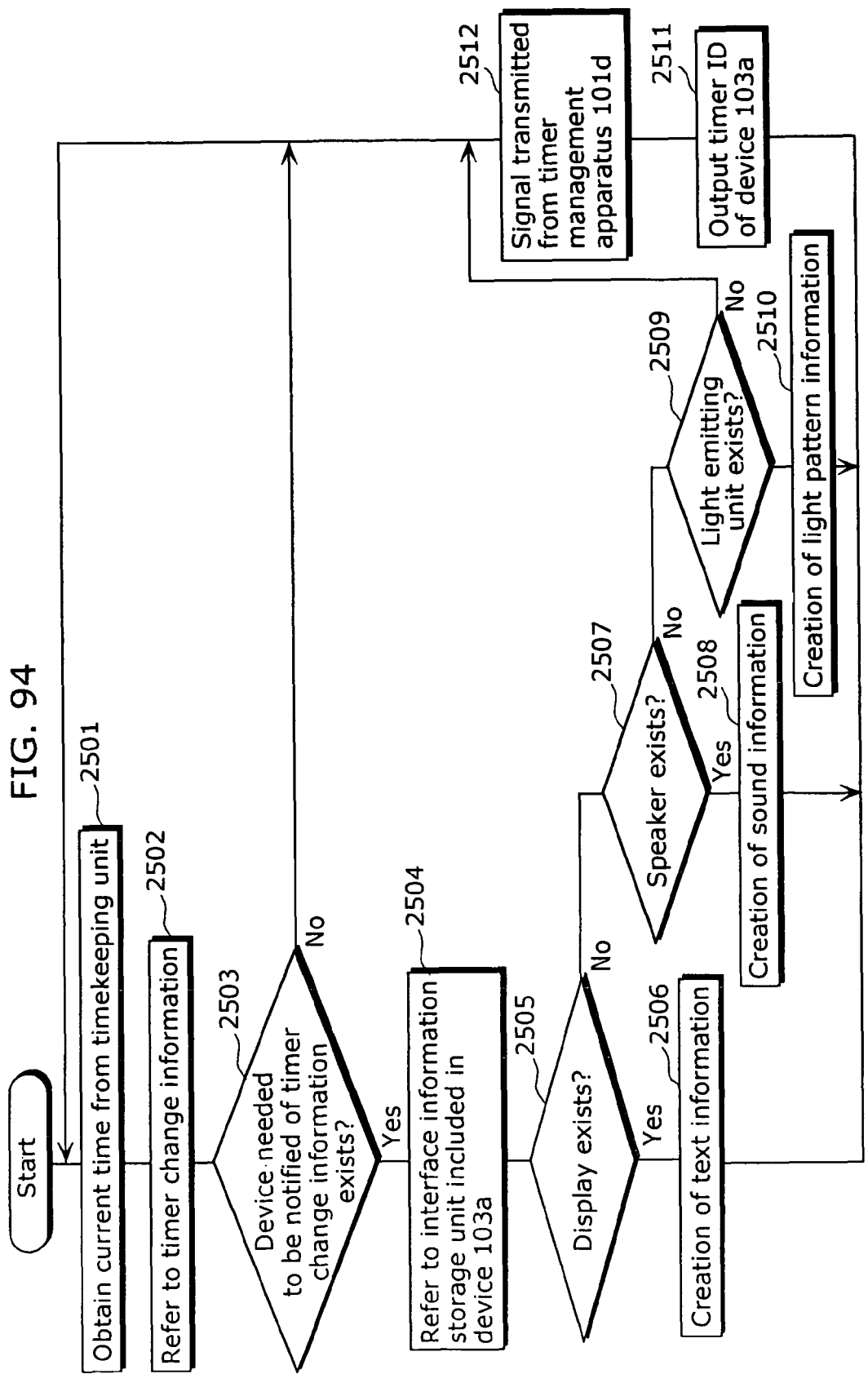
FIG. 94 is a flowchart showing the operational procedure of the timer verification information output unit.

Next, the operational procedure among each of the function blocks making up the timer verification information output unit 419 shown in FIG. 91 shall be explained using the flowchart in FIG. 94. Here, as a concrete embodiment, the case in which timer change information for an air conditioner is converted to sound information by the timer verification information output unit 419 and outputted from a speaker of an alarm clock provided with the speaker, when the timer setting of the alarm clock is changed by the timer management apparatus 101*d*.

The timer change information execution unit 410 obtains the present time from the timekeeping unit 411 (step 2501).

The timer change information execution unit 410 refers to the timer change information stored inside the timer change information storage unit 408, and obtains the time at which the change information for the timer setting details is to be sent (step 2502). In the present embodiment, the time at which the timer setting time of the air conditioner is to be changed is not designated, and information designating an immediate execution is obtained.

The timer change information execution unit 410 compares the current time obtained in step 2501 and the time for notifying the timer change information obtained in step 2502 (step 2503). Here, when it is the time for notifying the timer change information to the plurality of devices 103*a* to 106*a*, the process moves to step 2504. When it is not the time at which the timer settings need to be notified, the process returns to step 2501. In the present embodiment, the process moves to step 2504 as the time for changing the timer setting of the air conditioner is not designated, and an immediate execution is designated.

The interface determining unit 420 refers to interface information stored in the interface information storage unit 414, and obtains the interface information included in the device 103*a* that has had timer setting details changed by the user (step 2504). In the present embodiment, it is referred from the memory map in FIG. 92 that the interface included in the alarm clock that has had the timer setting changed by the user, is a speaker.

The interface determining unit 420 determines whether or not a display is included in the alarm clock that has had the timer setting changed by the user (step 2505). If a display is included, the timer change information outputted from the timer change information execution unit 410 is sent to the text information conversion unit. When a display is not included, the process moves to step 2507. In the present embodiment, the process moves to step 2507 as the alarm clock does not include a display for showing timer change information.

The text information conversion unit 415 converts the timer change information outputted from the timer change information execution unit 410 into text information (step 2506).

The interface determining unit 420 determines whether or not a speaker is included in the device 103*a* that has had the timer setting changed by the user (step 2507). If a speaker is included, the timer change information outputted from the timer change information execution unit 410 is sent to the sound information conversion unit 416, and the process moves to step 2508. When a speaker is not included, the process moves to step 2509. In the present embodiment, the process moves to step 2508 as a speaker is included in the alarm clock.

The sound information conversion unit 416 converts the timer change information outputted from the timer change information execution unit 410 into sound information (step 2508). In the present embodiment, the timer change information for the air conditioner is converted into a sound signal, and the process moves to step 2511.

The interface determining unit 420 determines whether or not a light emitting unit is included in the device 103*a* that has had the timer setting changed by the user (step 2509). If a light emitting unit is included, the timer change information outputted from the timer change information execution unit 410 is sent to the light pattern information conversion unit, and the process moves to step 2510. When a light emitting unit is not included, the process returns to step 2501. In the present embodiment, the process moves to step 2508 as a speaker is included in the alarm clock.

The light pattern information conversion unit 417 converts the timer change information outputted from the timer change information execution unit 410 into light pattern information (step 2510).

The signal output unit 409 refers to the timer ID management information storage unit 406 and notifies the plurality of devices 103*a* to 106*a* of the timer ID of the device 103*a* that has had timer setting details changed (step 2511). In the present embodiment, the timer ID of the alarm clock is notified to the other devices 104*a* to 106*a*, from the signal output unit 409.

The signal output unit 409 sends to the other devices, the timer change information stored in the timer change information storage unit 408 which is converted into a signal that can be sent to the interface included in the device 103*a* that has had timer the timer setting changed by the user (step 2512). When the process within the step is finished, the process returns to step 2501.

In this manner, the timer change information of the alarm clock is notified as sound information, from the timer management apparatus 101*d*, to the alarm clock, the air conditioner, and the rice cooker.

Figure 95:
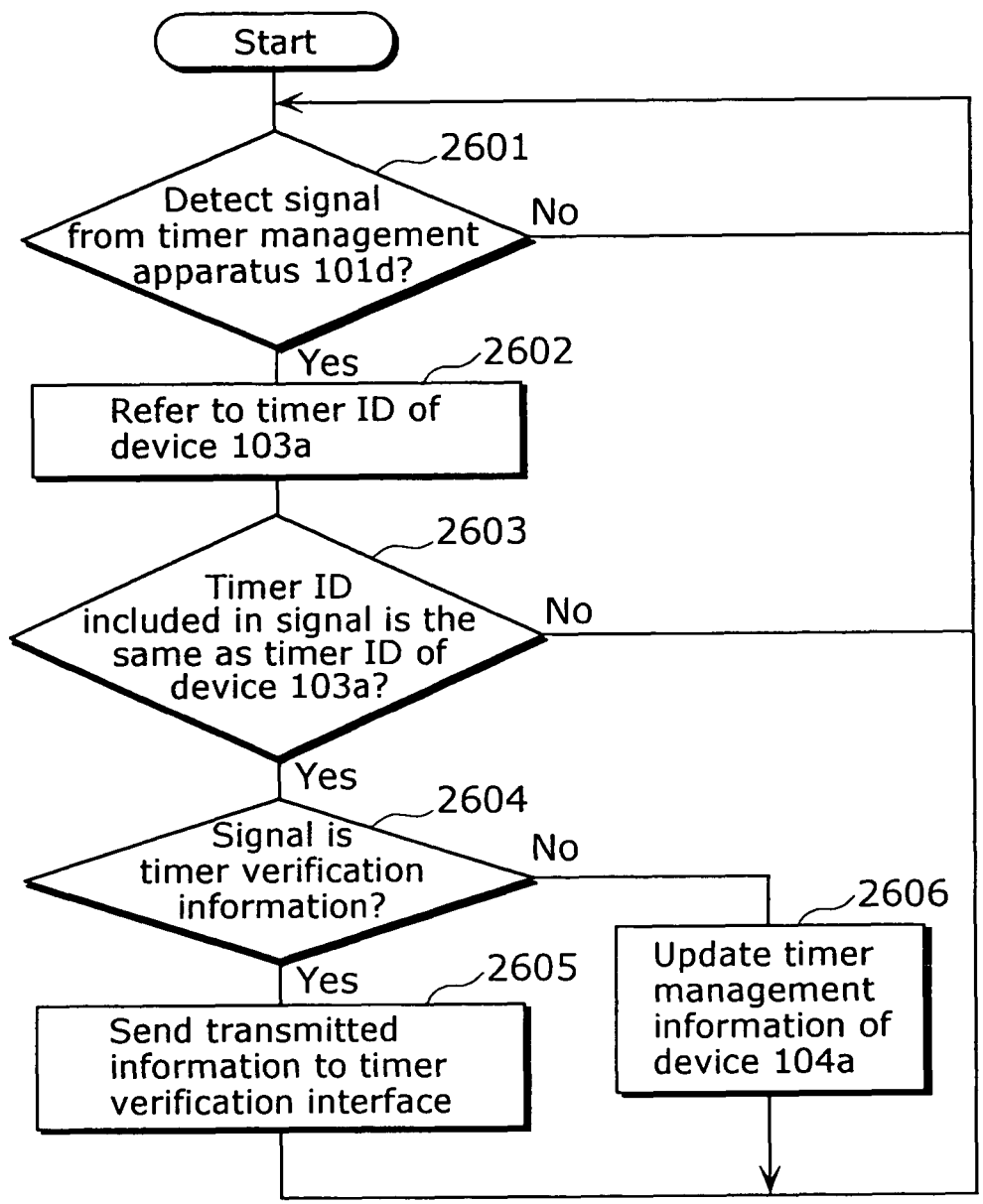
FIG. 95 is a flowchart showing the operational procedure up to the point where timer verification information notified by the timer management apparatus is sent to the interface provided in each device.

Next, using the flowchart in FIG. 95, explanation shall be made regarding the operational procedure up to the point in which timer verification information sent from the timer management apparatus 101*d* is notified through the interfaces included in each of the devices 103*a* to 106*a*.

The setting information detection unit 306 detects the presence of a signal sent from the timer management apparatus 101*d*. Here, in the case a signal is not detected, step 2601 is repeated (step 2601). In the present embodiment, when a signal is notified from the timer management apparatus 101*d*, the alarm clock, the air conditioner, and the rice cooker, each detect the signal, and the process moves to step 2602.

The setting information detection unit 306 refers to the timer ID storage unit 304 and obtains the timer IDs of the devices 103*a* to 106*a* per se (step 2602). In the present embodiment, each of the alarm clock, the air conditioner, and the rice cooker, obtains a timer ID through the setting information detection unit 306.

The setting information detection unit 306 compares the timer ID included in the signal sent from the timer management apparatus 101*d* and the timer ID of the devices 103*a* to 106*a* per se obtained in step 2602 (step 2603). Here, the process returns to step 2601 when the timer IDs do not match. In the present embodiment, as the timer IDs of the air conditioner and rice cooker are not transmitted from the timer management apparatus 101, the. air conditioner and the rice cooker each return to step 2601. The alarm clock has its timer ID notified by the timer management apparatus 101*d*, and moves to step 2604.

The signal distinguishing unit 308 distinguishes whether the signal sent from the timer management apparatus 101*d* is information regarding the updating of timer settings, or information regarding the verification of timer settings (step 2604). If the signal is information regarding the verification of timer settings, the process moves to step 2605. If the signal is information regarding the updating of timer settings, the process moves to step 2606. In the present embodiment, the process moves to step 2605 as verification information for the timer change information for the air conditioner is sent from the timer management apparatus 101*d*.

The timer verification information output unit 307 outputs, to the timer verification interface included in the device 103, the verification information of the timer setting details, sent from the timer management apparatus 101*d* (step 2605). When the process within the step is finished, the process returns to step 2601. In the present embodiment, the new timer setting details of the air conditioner is outputted from the speaker of the alarm clock as sound information.

The timer setting updating unit 305 updates the timer setting details stored in the timer setting storage unit 303 using the timer change information sent from the timer management apparatus 101*d* (step 2606). When the process within the step is finished, the process returns to step 2601.

As shown above, in the present embodiment, the details of the timer change information of a device notified of timer change information by the timer management apparatus 101*d* can be verified using the interface included in each of the devices 103*a* to 106*a*. As such, it is possible for the user to verify the timer setting details of devices connected to the network, without having to prepare a special interface. In other words, according to the present embodiment, it is possible to let the user verify changed timer setting details of a device that has had the timer setting details changed by the timer management apparatus, by using the interface included in a random device.

Moreover, although explanation is carried out in the present embodiment using an alarm clock, an air conditioner, and a rice cooker, it goes without saying that the objective of the present invention is still achieved even when using devices having a timer function, other than those mentioned above.

Furthermore, although the present embodiment uses the case where the timer management unit 109 is provided only in the timer management apparatus 101*d* and not in the other devices, it goes without saying that the objective of the present invention is still achieved even in the case where the timer management unit 109 is included in a random device.

Furthermore, although the present embodiment shows a display, a speaker, and a light-emitting unit, as examples of interfaces included in the devices, it goes without saying that the objective of the present invention is still achieved even when using interfaces that allow the user to recognize timer change information, other than those mentioned.

Furthermore, although in distinguishing the interface provided in a device in the present embodiment, the presence of an interface is checked in the order that begins with t he display, followed by the speaker, and then the light emitting unit, it goes without saying that the objectives of the present invention is still achieved even when the presence of interfaces is checked in an order other than that mentioned above.

Figure 96:
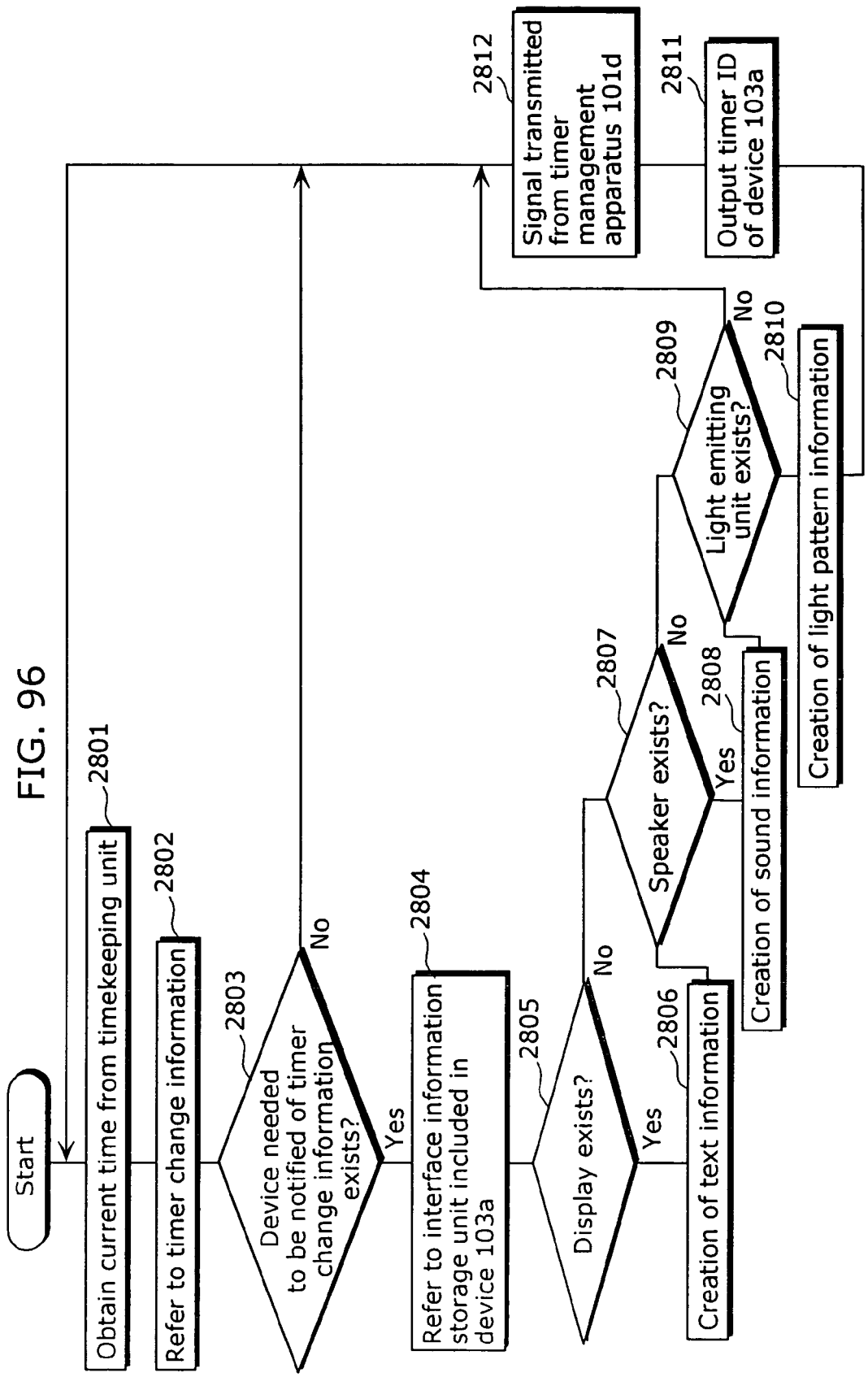
FIG. 96 is a flowchart showing another example of operations.

In addition, although the present embodiment shows the case where timer change information is notified by selecting one of the text information, the sound information, and light pattern information, it goes without saying that the objectives of the present invention is still achieved even when timer verification information is notified by using a plurality of interfaces at the same time, for devices including the plurality of interfaces, through an operational procedure such as that shown in the flowchart in FIG. 96, for example.

Here, steps 2801 to 2805, 2807, 2809, 2811, and 2812, in FIG. 96 are the same as the steps shown in FIG. 94. The point of difference is that after the text information conversion unit 415 creates text information by converting the timer change information outputted from the timer change information execution unit 410 into text information in step 2806, the process moves to step 2807.

Furthermore, after the sound information conversion unit 416 creates sound information by converting the timer change information outputted from the timer change information execution unit 410 into sound information in step 2808, the process moves to step 2809.

As mentioned above, with regard to the seventh to eleventh embodiments, explanation is carried out using, as an example, the case where the details of the timer settings of a plurality of devices are linked and changed to suit the life pattern of the user. However, the linked operation according to the device linkage control system is not limited to timer setting only. The linked operation according to the device linkage control system can also be used in linked control of a plurality of functions, or in assisting the operations of the user, or in providing information and services, to suit the present situation and life pattern of the user.

Figure 97:
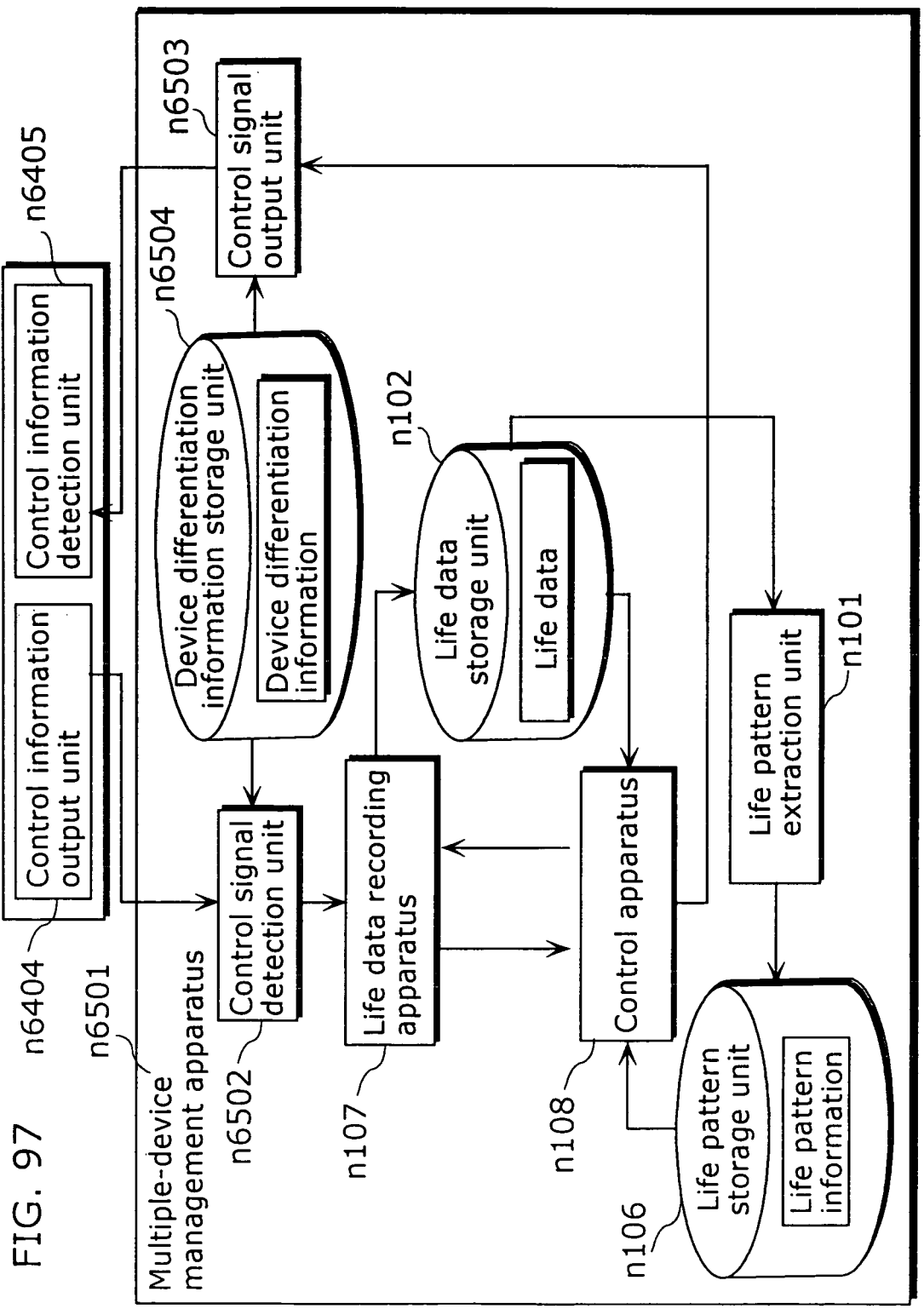
FIG. 97 is a function block diagram showing the structure of the multiple-device management apparatus.
Figure 98:
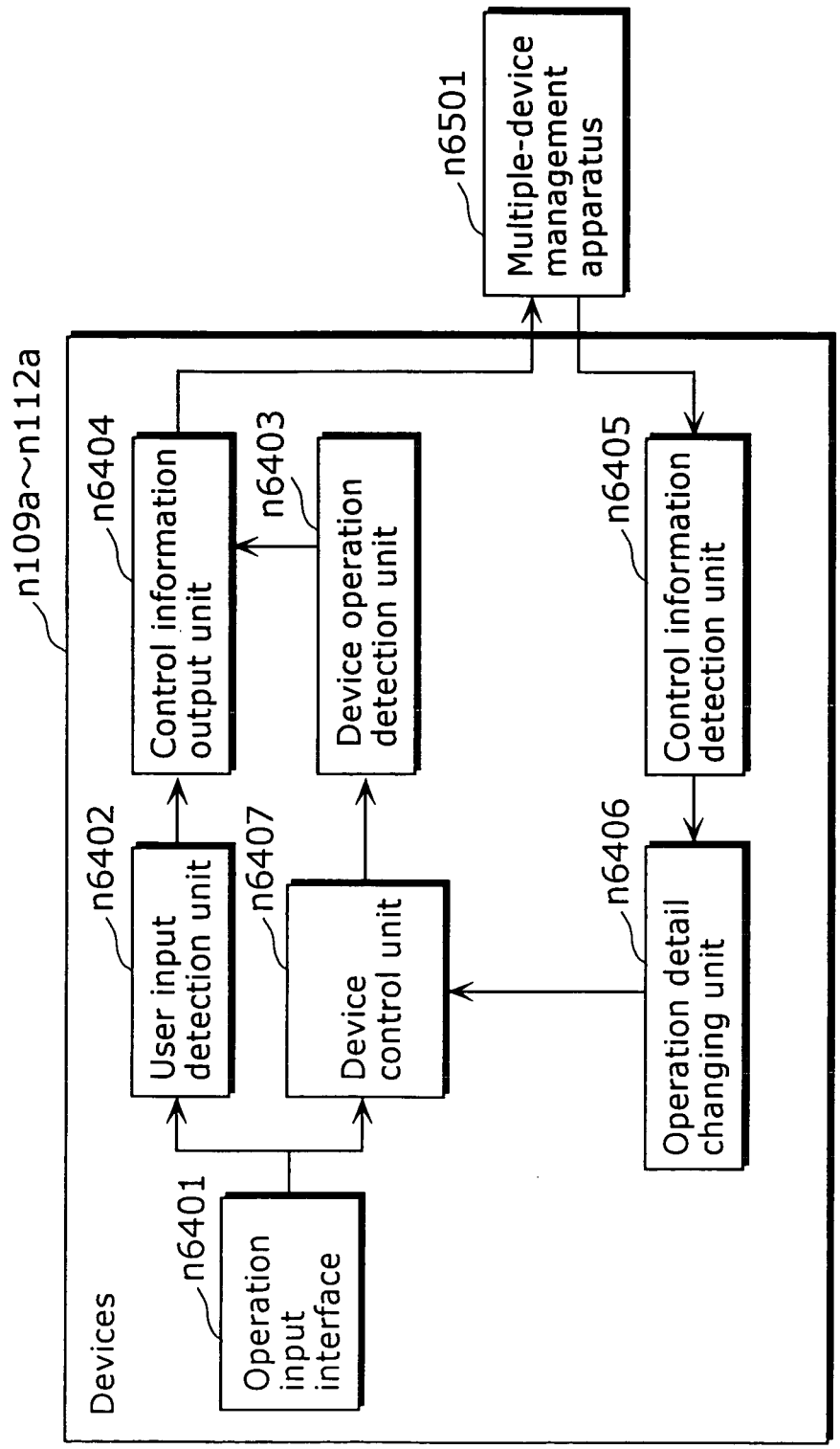
FIG. 98 is a function block diagram showing the structure for each device.

Furthermore, the device linkage control system performing the linked control of a plurality of devices to suit the life pattern of the user, which also includes linked timer setting, is configured from a multiple-device management apparatus n6501 that adopts the module structure shown in FIG. 97, and devices n109a to n112a that adopt the module structure shown in FIG. 98.

As shown in FIG. 97, the multiple-device management apparatus n6501 includes a life pattern extraction unit n101, a life data storage unit n102, a life pattern storage unit n106, a life data recording apparatus n107, a control apparatus n108, a control signal detection unit n6502, a control signal output unit n6503, and a device differentiation information storage unit n6504.

The control signal detection unit n6502 is a detection unit for detecting control information notified from a random device within the device linkage system, and identifying the device sending the signal and the details thereof.

The control signal output unit n6503 is a signal output unit for classifying control information of devices created by the multiple-device management apparatus according to the subject device, and sending the classified information.

The device differentiation information storage unit n6504 is a storage unit for storing device differentiation information which differentiates control information notified from the random device within the device linkage system.

Explanation regarding the modules n101, n102, n106, n107, n108, is omitted as these modules are the same as those in the first to sixth embodiments.

At the same time, as shown in FIG. 98, the devices n109a to n112a include an operation input interface n6401, a user input detection unit n6402, a device operation detection unit n6403, a control information output unit 6404, a control information detection unit n6405, an operation detail changing unit n6406, and a device control unit n6407.

The operation input interface n6401 is an input unit for accepting an operation input from the user.

The user input detection unit n6402 is a processing unit for detecting the presence of an operation input from the user and identifying the details of the operation input.

The device operation detection unit n6403 is a detection unit for monitoring the details of controlling carried out inside the device and identifying these details.

The control information output unit n6404 is an output unit for notifying the multi-device management apparatus of the details of controlling carried out inside the device.

The control information detection unit n6405 is a detection unit for detecting control information notified from the multiple-device management apparatus.

The operation detail changing unit n6406 is a processing unit for changing the operation details of a device according to details notified by the multiple-device management apparatus.

The device control unit n6407 is a device control unit that controls the operation of the device.

In the abovementioned module structure, the following modules in the timer management apparatus in the seventh to eleventh embodiments and the multi-device management apparatus n6501 correspond with each other: the signal detection unit 401 and the control signal detection unit n6502; the timer ID management information storage unit 406 and the device differentiation information storage unit n6504; the timer management information updating unit 402 and the life data recording apparatus n107; the timer management information storage unit 407 and the life data storage unit n102; the timer linkage analysis unit 403 and the control apparatus n108; the timer linkage information storage unit 404 and the life pattern information storage unit n106; the timer linkage information creation unit 450 and the life pattern extraction unit n101; and the signal output unit 409 and the control signal output unit n6503. In the relationship between the devices 103 to 106 and the devices n109a to n112a, the following devices correspond with each other: the user input detection unit 301 and the user input detection unit n6402; the setting information output unit 302 and both the device operation detection unit n6403 and the control information output unit n6404; the setting information detection unit 306 and the control information detection unit n6405; and the timer setting updating unit 305 and the operation detail changing unit n6406.

Figure 99:
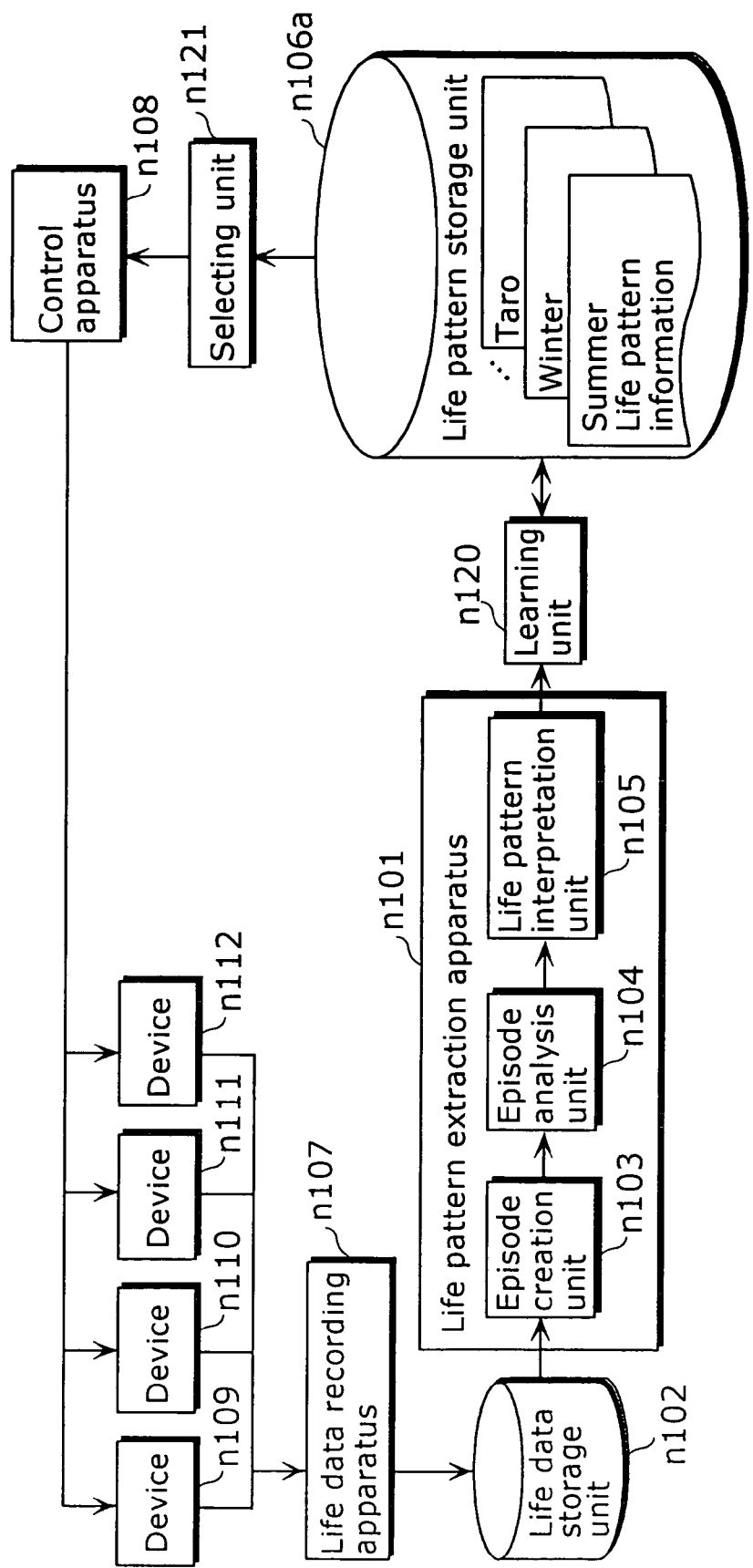
FIG. 99 is a function block diagram showing the configuration of the device linkage control system according to the variation.

Furthermore, although one type of life pattern information, such as that shown in FIG. 18, is created by the life pattern extraction apparatus n101 in the aforementioned embodiment, it is also possible to adopt a method in which a plurality of types of life patterns are created, and the plurality of life patterns are used in accordance with various generating environments, users, and so on. For example, as in the device linkage control system shown in FIG. 99, a learning unit n120, and a selecting unit n121 are added to the device linkage control system in FIG. 1. After differentiating the current date and time (season) and the operator through a built-in calendar function, or a user ID transmitted from the user via a remote control or the like, and so on, the learning unit n120 stores life pattern information created by the life pattern extraction apparatus n101 in the life pattern storage unit n106, in a differentiated manner such as life pattern information for "summer", "winter", and a user "Taro", in accordance with the current date and time (season) and the user. At the same time, the selection unit n121 also differentiates the current date and time (season) and the operator through a built-in calendar function, or a user ID transmitted from the user via a remote control or the like, and so on, and reads out the life pattern information corresponding to the differentiated current date and time (season) and operator from the life pattern storage unit n106 and sends this to the control apparatus n108. With this, finely detailed, date and time (season) or operator-differentiated device linkage control is possible. Likewise, device linkage control can also be performed differentiating week days and rest days.

In addition, even with regard to the threshold value for the confidence level during the extraction of nodes having strong co-occurrence relationships from an FP-Tree, it is possible to adopt a scheme which learns and converges in an optimal threshold value by updating the threshold value by previously setting a value differentiated depending on the time frame, day of the week, week day/rest day, user, gender, age, and so on, and getting feedback on the user's evaluation of an executed linkage control.

Figure 100:
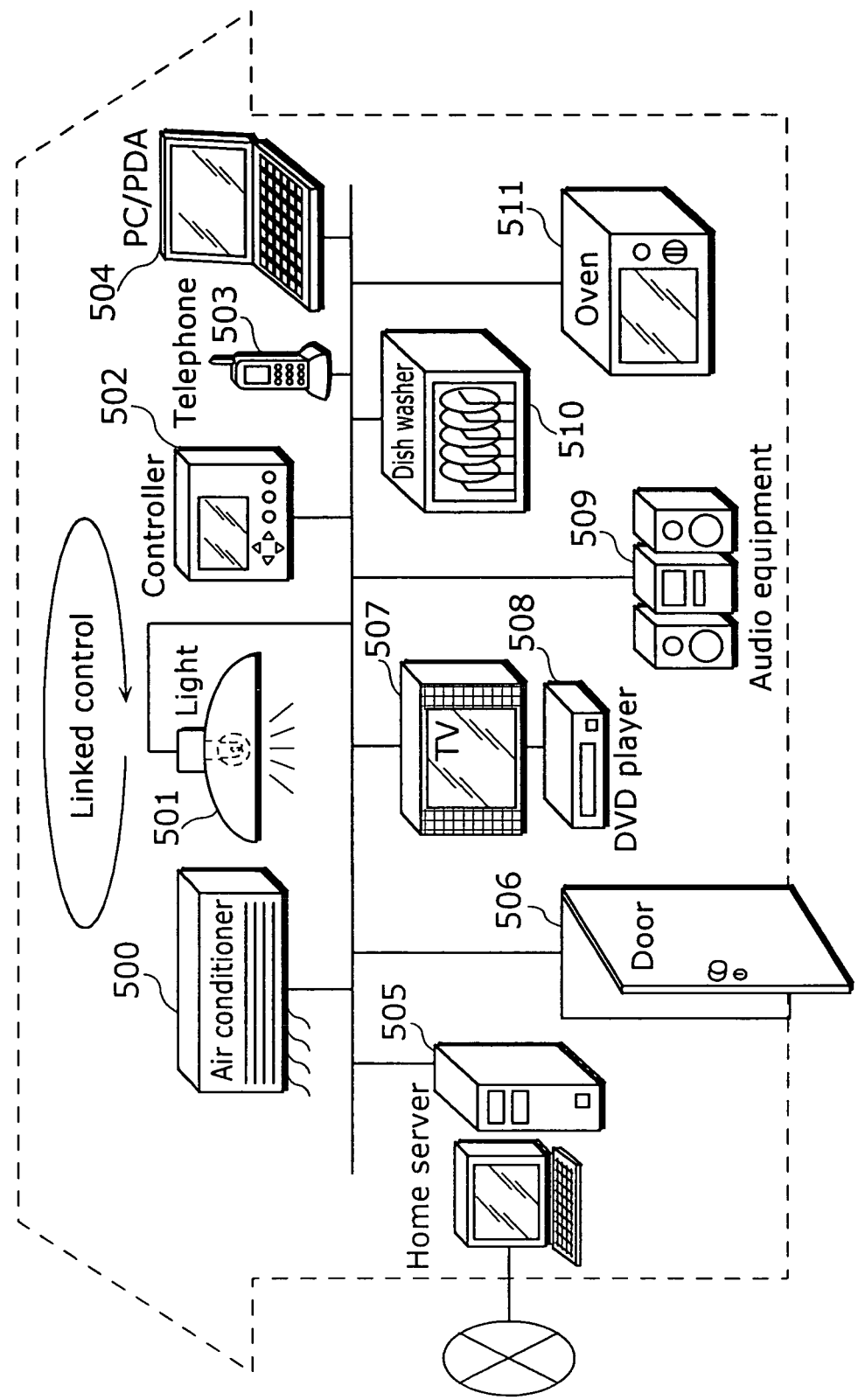
FIG. 100 is a diagram showing the configuration of a home appliance system illustrating various examples for the application of the present invention.

Furthermore, examples of the device linkage control system are not limited to the timer linked setting shown in the seventh to eleventh embodiments. The device linkage control system can be applied in various linked controls in the household appliance system shown in FIG. 100. To be specific, various types of convenient controls, such as those mentioned below, can be realized.

For example, in the case where a light and air conditioner usage pattern which is characteristic of the user is extracted, it is possible to have operation assistance-type controls in the living environment such as the turning ON and OFF of a plurality of lights 501 or changing the temperature for an air conditioner 500 by simple switch operation to suit the situation of the user.

Furthermore, for example, in the case where the operation of a digital key of a door 506 upon coming home or going out, is detected, and an operating pattern for the light 501, a television 507, the air conditioner 500, or the like, that are operated in linkage, is extracted, it is possible to carry out an event-dependent type of linkage control such as the automatic completion of operations involved in going out or coming home by merely operating the key of the door 506.

Furthermore, for example, in the case where a device usage pattern in which a web browser is a PC 504 is used after the user has finished eating supper (after a dish washer 510 is started-up), it is possible to perform a role-defining linked control between devices having the same function. Here, the power of a device that is most suited for use, among devices having a web browsing function such as the PC or PDA 504 and a cellular phone 503, is turned on and the browser function activated, to suit the situation of the user.

Furthermore, for example, in the case of the extraction of the co-occurrence pattern of content viewing and device usage such as the changing of the settings for devices such as the air conditioner 500 and the light 500 when the user views a television program and listens to music through the television 507 and audio equipment 509, or the like, and peruses a web page, or the like, through the PC 504, it is possible to perform a content viewing-dependent type of linked control such as the linked control of the air conditioner 500 and the light 501 in time with the start of contents use.

Furthermore, for example, in the case of the detection of the co-occurrence pattern of device usage and content viewing such as the viewing of a television program and listening to music through the television 507 and audio equipment 509, or the like, and perusing a web page, or the like, through the PC 504, in a different area, when using a washing machine and a cooking appliance such as an oven 511, it is possible to perform a situation-dependent type of linked control such as the control for turning ON the power of the PC 504, the control for switching the picture output lines between the television 507 and a DVD player 508, and the gathering of recommended contents from a home server 505 and a website, in advance, in time with the waiting time in the use of the oven 511 and the washing machine.

Industrial Applicability

The present invention can be used as a control apparatus for the linked control of a plurality of devices, and especially as a home appliance controller for the adaptive automatic control of devices such as an air conditioner, a light, a television, within a household, to suit the life pattern of a user.

The invention claimed is:

1. A device linkage control apparatus which identifies a frequency of associated use between devices among a plurality of devices, and controls, in linkage with each other, a set of the devices having a high frequency for being used in association with each other, the apparatus comprising:
   a life data accumulation unit operable to accumulate life data indicating a usage history of the plurality of devices;
   an episode creation unit operable to create, from the life data, a plurality of episode data, based on episode data creation rules which determine devices that have been used in association with each other, the plurality of episode data having, as data, a plurality of the devices that have been used in association with each other;
   an episode analysis unit operable to create, from the plurality of episode data, a frequent pattern tree representing, as a tree structure, a frequency at which the device sets are used in association with each other;
   a life pattern interpretation unit operable to identify, according to the frequent pattern tree, a combination of device sets as life pattern information, the device sets having a high frequency for being used in association with each other; and
   a control unit operable to control, in linkage with each other, the device sets having a high frequency for being used in association with each other,
   wherein, with regard to subtrees having nodes of the frequent pattern tree as roots, the episode analysis unit constructs the frequent pattern tree with a structure in which element data having a highest frequency becomes a root of a subtree,
   the life pattern interpretation unit identifies, based on the frequent pattern tree, a device A and a device B, which have a high frequency for being used in association with each other, as a combination having a high association frequency, even when each of device A and device B are combined and used in association with other devices, and
   the control unit controls, in linkage with each other, at least device A and device B, and
   wherein the episode analysis unit (i) creates new episodes by extracting subtrees having, as new roots, nodes which are offspring of a node equivalent to a root of the frequent pattern tree, tracking nodes within each of the extracted subtrees starting from the root, and combining element data stored in the nodes, (ii) recursively performs the subtree extraction and the episode creation on the created episodes until there are no more subtrees, and (iii) reconstructs the frequent pattern tree by integrating recursively constructed subtree frequent pattern trees, into positions in the frequent pattern tree, and the control unit controls, in association with each other, devices corresponding to nodes separated from each other by a predetermined number of nodes in the reconstructed frequent pattern tree, the devices being controlled as associated devices.

2. The device linkage control apparatus according to claim 1, wherein the episode analysis unit determines a structure of an associated use relationship by representing, as the frequent pattern tree, an appearance frequency and a combination pattern of the element data included in the plurality of episode data created by the episode creation unit, the frequent pattern tree associating, in each node, a type of the element data and a frequency which indicates the appearance frequency.

3. The device linkage control apparatus according to claim 2, wherein the episode analysis unit includes:
a frequency derivation unit operable to calculate a frequency of each element data included in the plurality of episode data;
a sorting unit operable to rearrange the element data within each of the plurality of episode data, in a decreasing order of frequency; and
a frequent pattern tree generation unit operable to generate, with regard to the plurality of episode data, the frequent pattern tree by sequentially retrieving the element data, and placing the retrieved element data as new nodes in the frequent pattern tree, or incrementing the frequency of an existing node.

4. The device linkage control apparatus according to claim 1, wherein the life pattern interpretation unit generates, as the life pattern information, information indicating a combination of devices corresponding to nodes that are in a parent-offspring relationship in the frequent pattern tree.

5. The device linkage control apparatus according to claim 4, wherein the life pattern interpretation unit includes:
a node detection unit operable to detect a current node in the frequent pattern tree;
a parent node detection unit operable to detect all nodes that are parent nodes of the detected current node; and
a life pattern output unit operable to output, as the life pattern information, information indicating that a device corresponding to the detected parent node and a device corresponding to the current node are in an associated use relationship.

6. The device linkage control apparatus according to claim 1, wherein the episode analysis unit includes:
a frequency derivation unit operable to calculate the frequency of each element data included in the plurality of episode data;
a sorting unit operable to rearrange the element data within the each of the plurality of episode data, in a decreasing order of frequency;
a frequent pattern tree generation unit operable to generate, with regard to the plurality of episode data, the frequent pattern tree by sequentially retrieving the element data, and placing the retrieved element data as new nodes in the frequent pattern tree, or incrementing the frequency of an existing node;
a subtree extraction unit operable to separate the generated frequent pattern tree into subtrees having, as new roots, nodes which are offspring of the root of the frequent pattern tree;
an episode re-creation unit operable to create episode data from the separated subtrees;
a reconstruction unit operable to reconstruct the subtrees by repeating, on the created episode data, the calculation by the frequency derivation unit, the rearrangement by the sorting unit, and the frequent pattern tree generation by the frequent pattern tree generation unit; and
a subtree combining unit operable to combine the reconstructed subtrees to the frequent pattern tree.

7. The device linkage control apparatus according to claim 1, wherein the episode analysis unit includes:
an input episode data storage unit operable to store, as input episode data, the plurality of episode data created by the episode creation unit;
an input episode number determination unit operable to obtain a number of the input episode data stored in the input episode data storage unit;
a most-frequent element identification unit operable to identify the element data with the highest frequency from within each input episode data;
a most-frequent element extraction unit operable to extract the element data with the highest frequency from within each input episode data, and add the extracted element data to output episode data;
an output episode data storage unit operable to store the output episode data;
an input episode classification unit operable to classify the input episode data according to the type of the element data; and
a frequent pattern tree generation unit operable to generate the frequent pattern tree that associates, in respective nodes, the appearance frequency and combination pattern of the element data with the type of the element data and the frequency which indicates the appearance frequency, the element data being included in the output episode data stored in the output episode data storage unit.

8. The device linkage control apparatus according to claim 1, wherein the episode creation unit creates element data indicating a device and the usage time of the device based on the life data, and creates, when the usage times of the element data have a fixed inclusive relationship or an overlapping relationship, episode data that includes the element data.

9. The device linkage control apparatus according to claim 1, wherein the episode creation unit creates, based on the life data, event data indicating a device, an event occurring with the device, and an occurrence time of the event, and creates, when the occurrence times of the respective event data have a fixed inclusive relationship or an overlapping relationship, episode data including element data corresponding to the devices indicated by the event data.

10. The device linkage control apparatus according to claim 4, wherein the life pattern interpretation unit calculates, for each of the nodes that are in the parent-offspring relationship in the frequent pattern tree, a confidence level indicating a degree of an associated use relationship, and generates the life pattern information with only the nodes that are connected with a confidence level that is equal to or higher than a fixed value.

11. The device linkage control apparatus according to claim 1,
wherein, when a state of a first device indicated in the life pattern information is detected as changed, the control unit causes a state of a second device indicated in the life pattern information to change by controlling the second device.

12. The device linkage control apparatus according to claim 11,
wherein the first and the second device each include a timer, and
when setting details of the timer included in the first device are detected as changed, the control unit changes setting details of the timer included in the second device.

13. The device linkage control apparatus according to claim 12, wherein, when a setting of a preset time of the timer included in the first device is detected as changed, the control unit changes a setting of a preset time of the timer included in the second device in such a way that a difference between the times before changing and the times after changing is the same.

14. The device linkage control apparatus according to claim 11, wherein, when the state of the first device indicated in the life pattern information is detected as changed, the control unit i) previously generates and records change information indicating that the state of the second device indicated in the life pattern information should be changed, and ii) causes the state of the second device to change by controlling the second device according to the change information after a predetermined time elapses.

15. The device linkage control apparatus according to claim 14, wherein
the first and the second devices each include a timer, and
when setting details of the timer included in the first device are detected as changed, the control unit i) previously generates and records change information that includes an instruction to change the setting details of the timer included in the second device and a designation for a time for the change, and ii) changes the setting details of the timer included in the second device according to the change information at the time for the change.

16. The device linkage control apparatus according to claim 11, wherein the control unit previously stores a plurality of linkage information identifying details of control and selection condition information indicating conditions for selecting one linkage information from among the plurality of linkage information, and when the state of the first device indicated in the life pattern information is detected as changed, the control unit selects one of the plurality of linkage information by referring to the selection condition information, and causes the state of the second device indicated in the life pattern information to change, by controlling the second device according to the selected linkage information.

17. The device linkage control apparatus according to claim 16,
wherein the first and the second devices each include a timer,
the linkage information indicates a difference between preset times of timers included in the first and second devices,
the selection condition information indicates a correspondence of a setting value of the preset time of the timer included in the first device and the linkage information that is to be selected, and
when setting details of the preset time of the timer included in the first device are detected as changed, the control unit selects one linkage information corresponding to the changed preset time from among the plurality of linkage information by referring to the selection condition information, and changes the preset time of the timer included in the second device according to the selected linkage information.

18. The device linkage control apparatus according to claim 11,
wherein the first and the second devices each include a timer, and
when setting details of the timer included in the first device are detected as cancelled, the control unit cancels the setting details of the timer included in the second device.

19. The device linkage control apparatus according to claim 11,
wherein the first and the second devices each include a timer, and
when setting details of the timer included in the first device are detected as changed, the control unit causes the second device to make a sound output or a display output by controlling the second device, the output indicating that the setting details are changed.

20. The device linkage control apparatus according to claim 1, wherein the episode creation unit creates the plurality of episode data, based on previously stored episode data creation rules, by gathering the element data included in the life data accumulated by the life data accumulation unit.

21. A device linkage control method, for use in a device linkage control apparatus, for identifying a frequency of associated use between devices among a plurality of devices, and controlling, in linkage with each other, a set of the devices having a high frequency for being used in association with each other, the method comprising:
accumulating life data indicating a usage history of the plurality of devices;
creating, from the life data, a plurality of episode data, based on episode data creation rules which determine devices that have been used in association with each other, the plurality of episode data having, as data, a plurality of the devices that have been used in association with each other;
creating, from the plurality of episode data, a frequent pattern tree representing, as a tree structure, a frequency at which device sets are used in association with each other;
identifying, according to the frequent pattern tree, a combination of device sets as life pattern information, the device sets having a high frequency for being used in association with each other;
controlling, in linkage with each other, the device sets having a high frequency for being used in association with each other, wherein
said accumulating life data operation, said creating a plurality of episode data operation, said creating the frequent pattern tree operation, said identifying operation, and said controlling operation are executed by the device linkage control apparatus,
with regard to subtrees having respective nodes of the frequent pattern tree as roots, the frequent pattern tree is constructed, in said creating a frequent pattern tree operation, with a structure in which element data having a highest frequency becomes a root of a subtree,
in said identifying operation, a device A and a device B which have a high frequency for being used in association with each other are identified, based on the frequent pattern tree, as a combination having a high association frequency, even when each of device A and device B are combined and used in association with other devices, and in said controlling operation, at least device A and device B are controlled in linkage with each other; and creating new episodes by extracting subtrees having, as new roots, nodes which are offspring of a node equivalent to a root of the frequent pattern tree, tracking nodes within each of the extracted subtrees starting from the root, and combining element data stored in the nodes;

performing, recursively, the subtree extraction and said creating new episode operation on the created new episodes until there are no more subtrees;

reconstructing the frequent pattern tree by integrating recursively constructed subtree frequent pattern trees, into positions in the frequent pattern tree; and controlling, in association with each other, devices corresponding to nodes separated from each other by a predetermined number of nodes in the reconstructed frequent pattern tree, the devices being controlled as associated devices.

22. A program, for use in a device linkage control apparatus, for identifying a frequency of associated use between devices among a plurality of devices, and controlling, in linkage with each other, a set of the devices having a high frequency for being used in association with each other, the program being held in a storage unit of the device linkage control apparatus, and causing a CPU which controls operation of the device linkage control apparatus to execute at least the following:

accumulating life data indicating a usage history of the plurality of devices;

creating, from the life data, a plurality of episode data, based on episode data creation rules which determine devices that have been used in association with each other, the plurality of episode data having, as data, a plurality of the devices that have been used in association with each other;

creating, from the plurality of episode data, a frequent pattern tree representing, as a tree structure, a frequency at which device sets are used in association with each other;

identifying, according to the frequent pattern tree, a combination of device sets as life pattern information, the device sets having a high frequency for being used in association with each other;

controlling, in linkage with each other, the device sets having a high frequency for being used in association with each other, wherein with regard to subtrees having respective nodes of the frequent pattern tree as roots, the frequent pattern tree is constructed, in said creating a frequent pattern tree operation, with a structure in which element data having a highest frequency becomes a root of a subtree, in said identifying operation, a device A and a device B which have a high frequency for being used in association with each other are identified, based on the frequent pattern tree, as a combination having a high association frequency, even when each of device A and device B are combined and used in association with other devices, and in said controlling operation, at least device A and device B are controlled in linkage with each other; and creating new episodes by extracting subtrees having, as new roots, nodes which are offspring of a node equivalent to a root of the frequent pattern tree, tracking nodes within each of the extracted subtrees starting from the root, and combining element data stored in the nodes;

performing, recursively, the subtree extraction and said creating new episode operation on the created new episodes until there are no more subtrees;

reconstructing the frequent pattern tree by integrating recursively constructed subtree frequent pattern trees, into positions in the frequent pattern tree; and controlling, in association with each other, devices corresponding to nodes separated from each other by a predetermined number of nodes in the reconstructed frequent pattern tree, the devices being controlled as associated devices.

23. A device linkage control system comprising a plurality of devices and a control apparatus that are connected to each other by a transmission line, the control apparatus controlling the plurality of devices in linkage with each other, wherein the control apparatus includes:

a life data accumulation unit operable to accumulate life data indicating a usage history of the plurality of devices;

an episode creation unit operable to create, from the life data, a plurality of episode data, based on episode data creation rules which determine devices that have been used in association with each other, the plurality of episode data having, as data, a plurality of the devices that have been used in association with each other;

an episode analysis unit operable to create, from the plurality of episode data, a frequent pattern tree representing, as a tree structure, a frequency at which device sets are used in association with each other;

a life pattern interpretation unit operable to identify, according to the frequent pattern tree, a combination of device sets as life pattern information, the device sets having a high frequency for being used in association with each other; and a control unit operable to control, in linkage with each other, the device sets having a high frequency for being used in association with each other, wherein, with regard to subtrees having nodes of the frequent pattern tree as roots, the episode analysis unit constructs the frequent pattern tree with a structure in which element data having a highest frequency becomes a root of a subtree, the life pattern interpretation unit identifies, based on the frequent pattern tree, a device A and a device B, which have a high frequency for being used in association with each other, as a combination having a high association frequency, even when each of device A and device B are combined and used in association with other devices, and the control unit controls, in linkage with each other, at least device A and device B, and wherein the episode analysis unit (i) creates new episodes by extracting subtrees having, as new roots, nodes which are offspring of a node equivalent to a root of the frequent pattern tree, tracking nodes within each of the extracted subtrees starting from the root, and combining element data stored in the nodes, (ii) recursively performs the subtree extraction and the episode creation on the created episodes until there are no more subtrees, and (iii) reconstructs the frequent pattern tree by integrating recursively constructed subtree frequent pattern trees, into positions in the frequent pattern tree, and the control unit controls, in association with each other, devices corresponding to nodes separated from each other by a predetermined number of nodes in the reconstructed frequent pattern tree, the devices being controlled as associated devices.

24. A life pattern information generating apparatus that generates life pattern information for a device linkage control apparatus that controls a plurality of devices in linkage with each other based on the life pattern information, the life pattern information generating apparatus comprising:
- a life data accumulation unit operable to accumulate life data indicating a usage history of the plurality of devices;
- an episode creation unit operable to create, from the life data, a plurality of episode data, based on episode data creation rules which determine devices that have been used in association with each other, the plurality of episode data having, as data, a plurality of the devices that have been used in association with each other;
- an episode analysis unit operable to create, from the plurality of episode data, a frequent pattern tree representing, as a tree structure, a frequency at which device sets are used in association with each other; and
- a life pattern interpretation unit operable to identify, according to the frequent pattern tree, a combination of device sets as life pattern information, the device sets having a high frequency for being used in association with each other,
- wherein, with regard to subtrees having nodes of the frequent pattern tree as roots, the episode analysis unit constructs the frequent pattern tree with a structure in which element data having a highest frequency becomes a root of a subtree, and
- the life pattern interpretation unit identifies, based on the frequent pattern tree, a device A and a device B, which have a high frequency for being used in association with each other, as a combination having a high association frequency, even when each of device A and device B are combined and used in association with other devices, and
- wherein the episode analysis unit (i) creates new episodes by extracting subtrees having, as new roots, nodes which are offspring of a node equivalent to a root of the frequent pattern tree, tracking nodes within each of the extracted subtrees starting from the root, and combining element data stored in the nodes, (ii) recursively performs the subtree extraction and the episode creation on the created episodes until there are no more subtrees, and (iii) reconstructs the frequent pattern tree by integrating recursively constructed subtree frequent pattern trees, into positions in the frequent pattern tree, and
- the control unit controls, in association with each other, devices corresponding to nodes separated from each other by a predetermined number of nodes in the reconstructed frequent pattern tree, the devices being controlled as associated devices.

25. A life pattern information generation method for generating, using a life pattern information generation apparatus, life pattern information for a device linkage control apparatus that controls a plurality of devices in linkage with each other based on the life pattern information, the method comprising:
- accumulating life data indicating a usage history of the plurality of devices;
- creating, from the life data, a plurality of episode data, based on episode data creation rules which determine devices that have been used in association with each other, the plurality of episode data having, as data, a plurality of the devices that have been used in association with each other;
- creating, from the plurality of episode data, a frequent pattern tree representing, as a tree structure, a frequency at which device sets are used in association with each other;
- identifying, according to the frequent pattern tree, a combination of device sets as life pattern information, the device sets having a high frequency for being used in association with each other,
- wherein said accumulating life data operation, said creating a plurality of episode data operation, said creating the frequent pattern tree operation, and said identifying operation are executed by the life pattern information generation apparatus,
- with regard to subtrees having respective nodes of the frequent pattern tree as roots, the frequent pattern tree is constructed, in said creating a frequent pattern tree operation, with a structure in which element data having a highest frequency becomes a root of a subtree, and
- in said identifying operation, a device A and a device B which have a high frequency for being used in association with each other are identified, based on the frequent pattern tree, as a combination having a high association frequency, even when each of device A and device B are combined and used in association with other devices;
- creating new episodes by extracting subtrees having, as new roots, nodes which are offspring of a node equivalent to a root of the frequent pattern tree, tracking nodes within each of the extracted subtrees starting from the root, and combining element data stored in the nodes;
- performing, recursively, the subtree extraction and said creating new episode operation on the created new episodes until there are no more subtrees;
- reconstructing the frequent pattern tree by integrating recursively constructed subtree frequent pattern trees, into positions in the frequent pattern tree; and
- controlling, in association with each other, devices corresponding to nodes separated from each other by a predetermined number of nodes in the reconstructed frequent pattern tree, the devices being controlled as associated devices.

26. A program for generating, using a life pattern information generation apparatus, life pattern information for a device linkage control apparatus that controls a plurality of devices in linkage with each other based on the life information, the program being held in a storage unit of the life pattern information generation apparatus, and causing a CPU controlling operation of the life pattern information generation apparatus to execute at least the following:
- accumulating life data indicating a usage history of the plurality of devices;
- creating, from the life data, a plurality of episode data, based on episode data creation rules which determine devices that have been used in association with each other, the plurality of episode data having, as data, a plurality of the devices that have been used in association with each other;
- creating, from the plurality of episode data, a frequent pattern tree representing, as a tree structure, a frequency at which device sets are used in association with each other;
- identifying, according to the frequent pattern tree, a combination of device sets as life pattern information, the device sets having a high frequency for being used in association with each other, wherein
- with regard to subtrees having respective nodes of the frequent pattern tree as roots, the frequent pattern tree is constructed, in said creating a frequent pattern tree operation, with a structure in which element data having a highest frequency becomes a root of a subtree, and in said identifying operation, a device A and a device B which have a high frequency for being used in association with each other are identified, based on the frequent pattern tree, as a combination having a high association frequency, even when each of device A and device B are combined and used in association with other devices;

creating new episodes by extracting subtrees having, as new roots, nodes which are offspring of a node equivalent to a root of the frequent pattern tree, tracking nodes within each of the extracted subtrees starting from the root, and combining element data stored in the nodes;

performing, recursively, the subtree extraction and said creating new episode operation on the created new episodes until there are no more subtrees;

reconstructing the frequent pattern tree by integrating recursively constructed subtree frequent pattern trees, into positions in the frequent pattern tree; and controlling, in association with each other, devices corresponding to nodes separated from each other by a predetermined number of nodes in the reconstructed frequent pattern tree, the devices being controlled as associated devices.

27. A device linkage control apparatus that controls a plurality of devices in linkage with one another, which is used by being connected to a life data accumulating apparatus that accumulates life data indicating usage of the plurality of devices in daily life of a user, the device linkage control apparatus comprising:

a life data accumulation unit operable to accumulate life data indicating a usage history of the plurality of devices;

an episode creation unit operable to create, from the life data, a plurality of episode data, based on episode data creation rules which determine devices that have been used in association with each other, the plurality of episode data having, as data, a plurality of the devices that have been used in association with each other;

an episode analysis unit operable to create, from the plurality of episode data, a frequent pattern tree representing, as a tree structure, a frequency at which device sets are used in association with each other;

a life pattern interpretation unit operable to identify, according to the frequent pattern tree, a combination of device sets as life pattern information, the device sets having a high frequency for being used in association with each other; and a control unit operable to control, in linkage with each other, the device sets having a high frequency for being used in association with each other, wherein, with regard to subtrees having nodes of the frequent pattern tree as roots, the episode analysis unit constructs the frequent pattern tree with a structure in which element data having a highest frequency becomes a root of a subtree, the life pattern interpretation unit identifies, based on the frequent pattern tree, a device A and a device B, which have a high frequency for being used in association with each other, as a combination having a high association frequency, even when each of device A and device B are combined and used in association with other devices, and the control unit controls, in linkage with each other, at least device A and device B, and wherein the episode analysis unit (i) creates new episodes by extracting subtrees having, as new roots, nodes which are offspring of a node equivalent to a root of frequent pattern tree, tracking nodes within each of the extracted subtrees starting from the root, and combining element data stored in the nodes, (ii) recursively performs the subtree extraction and the episode creation on the created episodes until there are no more subtrees, and (iii) reconstructs the frequent pattern tree by integrating recursively constructed subtree frequent pattern trees, into positions in the frequent pattern tree, and the control unit controls, in association with each other, devices corresponding to nodes separated from each other by a predetermined number of nodes in the reconstructed frequent pattern tree, the devices being controlled as associated devices.

28. A life pattern information generating apparatus that generates life pattern information for a device linkage control apparatus controlling a plurality of devices in linkage with each other based on the life pattern information, the life pattern information generating apparatus being used by being connected to a life data accumulating apparatus that accumulates life data indicating usage of a plurality of devices in daily life of a user, and comprises:

a life data accumulation unit operable to accumulate life data indicating a usage history of the plurality of devices;

an episode creation unit operable to create, from the life data, a plurality of episode data, based on episode data creation rules which determine devices that have been used in association with each other, the plurality of episode data having, as data, a plurality of the devices that have been used in association with each other;

an episode analysis unit operable to create, from the plurality of episode data, a frequent pattern tree representing, as a tree structure, a frequency at which device sets are used in association with each other; and a life pattern interpretation unit operable to identify, according to the frequent pattern tree, a combination of device sets as life pattern information, the device sets having a high frequency for being used in association with each other, wherein, with regard to subtrees having nodes of the frequent pattern tree as roots, the episode analysis unit constructs the frequent pattern tree with a structure in which element data having a highest frequency becomes a root of a subtree, and the life pattern interpretation unit identifies, based on the frequent pattern tree, a device A and a device B, which have a high frequency for being used in association with each other, as a combination having a high association frequency, even when each of device A and device B are combined and used in association with other devices, and wherein the episode analysis unit (i) creates new episodes by extracting subtrees having, as new roots, nodes which are offspring of a node equivalent to a root of the frequent pattern tree, tracking nodes within each of the extracted subtrees starting from the root, and combining element data stored in the nodes, (ii) recursively performs the subtree extraction and the episode creation on the created episodes until there are no more subtrees, and (iii) reconstructs the frequent pattern tree by integrating recursively constructed subtree frequent pattern trees, into positions in the frequent pattern tree, and the control unit controls, in association with each other, devices corresponding to nodes separated from each other by a predetermined number of nodes in the reconstructed frequent pattern tree, the devices being controlled as associated devices.

29. The device linkage control apparatus according to claim 1, wherein each of the nodes of the frequent pattern tree correspond to a different one of the devices that are to be controlled, the life pattern interpretation unit identifies information indicating two or more of the different devices as the life pattern information, and the control unit controls the two or more different devices indicated by the life pattern information that are in linkage with each other.

* * * * *